US012117832B2

(12) United States Patent
Rivers et al.

(10) Patent No.: US 12,117,832 B2
(45) Date of Patent: Oct. 15, 2024

(54) DYNAMIC PROXIMITY ALERT SYSTEMS AND METHODS

(71) Applicant: FLIR Belgium BVBA, Meer (BE)

(72) Inventors: Mark C. Rivers, Winchester (GB); Stuart Newcombe, Fareham (GB)

(73) Assignee: FLIR Belgium BVBA, Meer (BE)

( * ) Notice: Subject to any disclaimer, the term of this patent is extended or adjusted under 35 U.S.C. 154(b) by 0 days.

(21) Appl. No.: 18/077,062

(22) Filed: Dec. 7, 2022

(65) Prior Publication Data

US 2023/0103359 A1 Apr. 6, 2023

Related U.S. Application Data

(63) Continuation of application No. PCT/US2021/037127, filed on Jun. 11, 2021, and a
(Continued)

(51) Int. Cl.
  *G05D 1/00* (2024.01)
  *B63B 79/10* (2020.01)
  *B63B 79/40* (2020.01)

(52) U.S. Cl.
  CPC ........... *G05D 1/0044* (2013.01); *B63B 79/10* (2020.01); *B63B 79/40* (2020.01); *G05D 1/0038* (2013.01); *G05D 1/0206* (2013.01)

(58) Field of Classification Search
  CPC ........ B63B 49/00; B63B 79/10; B63B 79/40; B63H 21/213; B63H 25/02; G01C 21/203; G01C 21/3807; H04N 7/181
  See application file for complete search history.

(56) References Cited

U.S. PATENT DOCUMENTS

| 2,968,957 A | 1/1961 | Condie et al. |
| 3,140,436 A | 7/1964 | Hatch |

(Continued)

FOREIGN PATENT DOCUMENTS

| CN | 101145200 | 3/2008 |
| CN | 102692225 | 9/2012 |

(Continued)

OTHER PUBLICATIONS

Chin et al., "Accurate localization of low-level radioactive source under noise and measurement errors", pp. 183-196. 10.1145/1460412.1460431, Computer Science Technical Reports, 2008.
(Continued)

*Primary Examiner* — Hongmin Fan
(74) *Attorney, Agent, or Firm* — Haynes and Boone, LLP

(57) ABSTRACT

Techniques are disclosed for systems and methods to provide graphical user interfaces for assisted and/or autonomous navigation for mobile structures. A navigation assist system includes a user interface with a display for a mobile structure and a logic device configured to render a docking user interface on the display. The logic device determines a direction and magnitude of a navigational bias associated with navigation of the mobile structure and determines a spatially biased safety perimeter and hazard monitoring area within a monitoring perimeter of a perimeter ranging system mounted to the mobile structure, based on the direction and magnitude of the navigational bias. The docking user interface includes a maneuvering guide with a virtual bumper perimeter intrusion indicator configured to indicate a relative position and/or proximity of a navigation hazard within the spatially biased hazard monitoring area.

20 Claims, 80 Drawing Sheets

Related U.S. Application Data continuation-in-part of application No. 17/246,489, filed on Apr. 30, 2021, which is a continuation of application No. PCT/US2019/058958, filed on Oct. 30, 2019.

(60) Provisional application No. 63/038,626, filed on Jun. 12, 2020, provisional application No. 62/851,025, filed on May 21, 2019, provisional application No. 62/753,763, filed on Oct. 31, 2018.

(56) References Cited

U.S. PATENT DOCUMENTS

| | | |
|---|---|---|
| 3,301,510 A | 1/1967 | Cook |
| 3,436,531 A | 4/1969 | Throckmorton |
| 3,488,954 A | 1/1970 | Thomas et al. |
| 3,741,474 A | 6/1973 | Kawada et al. |
| 4,063,240 A | 12/1977 | Isbister et al. |
| 4,129,087 A | 12/1978 | Dimmick et al. |
| 5,140,416 A | 8/1992 | Tinkler |
| 5,488,674 A | 1/1996 | Burt et al. |
| 5,523,951 A | 6/1996 | Kriesgman et al. |
| 5,525,081 A | 6/1996 | Mardesich et al. |
| 5,537,818 A | 7/1996 | Hosseini et al. |
| 6,450,112 B1 | 9/2002 | Deghuee |
| 7,021,231 B2 | 4/2006 | Smart |
| 7,305,928 B2 | 12/2007 | Bradley et al. |
| 7,469,168 B1 | 12/2008 | Richey |
| 7,727,036 B1 | 6/2010 | Poorman et al. |
| 8,078,297 B2 | 12/2011 | Lasher et al. |
| 8,275,544 B1 | 9/2012 | Wells et al. |
| 8,604,976 B1 | 12/2013 | Chang et al. |
| 8,622,778 B2 | 1/2014 | Tyers et al. |
| D707,705 S | 6/2014 | Folken et al. |
| D707,708 S | 6/2014 | Harre |
| D713,411 S | 9/2014 | Gall et al. |
| 9,123,220 B2 | 9/2015 | Icove et al. |
| D752,637 S | 3/2016 | Yun et al. |
| 9,471,970 B2 | 10/2016 | Strandmar |
| 9,515,106 B2 | 12/2016 | Hourtash et al. |
| D783,659 S | 4/2017 | Park |
| D785,025 S | 4/2017 | Zimmerman et al. |
| 9,676,464 B2 | 6/2017 | Johnson et al. |
| 9,778,657 B2 | 10/2017 | Tyers |
| D802,611 S | 11/2017 | Mangold et al. |
| D815,148 S | 4/2018 | Martin et al. |
| D816,714 S | 5/2018 | Oh et al. |
| D823,342 S | 7/2018 | Kobayashi |
| 10,095,232 B1 | 10/2018 | Arbuckle et al. |
| 10,324,468 B2 | 6/2019 | Arbuckle et al. |
| D854,032 S | 7/2019 | Jones et al. |
| D864,977 S | 10/2019 | Lehmann |
| D870,145 S | 12/2019 | Christian et al. |
| D872,109 S | 1/2020 | Folken et al. |
| D879,119 S | 3/2020 | Kim |
| D883,324 S | 5/2020 | Mollinga |
| 10,671,073 B2 | 6/2020 | Arbuckle et al. |
| D890,788 S | 7/2020 | Biberger et al. |
| D891,444 S | 7/2020 | Ueta et al. |
| D894,230 S | 8/2020 | Butler et al. |
| D896,830 S | 9/2020 | Shi et al. |
| D898,048 S | 10/2020 | Protzman et al. |
| D907,661 S | 1/2021 | Bettig et al. |
| D910,075 S | 2/2021 | Butcher et al. |
| 10,908,678 B2 | 2/2021 | Johnson et al. |
| 10,931,934 B2 | 2/2021 | Richards et al. |
| 10,942,028 B2 | 3/2021 | Johnson et al. |
| 2002/0030591 A1 | 3/2002 | Paranjpe |
| 2003/0137443 A1 | 7/2003 | Rees et al. |
| 2003/0149528 A1 | 8/2003 | Lin |
| 2005/0075016 A1 | 4/2005 | Bertetti et al. |
| 2007/0055446 A1 | 3/2007 | Schiffmann et al. |
| 2007/0089660 A1 | 4/2007 | Bradley et al. |
| 2009/0043904 A1 | 2/2009 | Okuyama |
| 2009/0048726 A1 | 2/2009 | Lofall |
| 2009/0076717 A1 | 3/2009 | Goutelard et al. |
| 2009/0171520 A1 | 7/2009 | Kaji |
| 2009/0222154 A1 | 9/2009 | Lopriore |
| 2010/0094491 A1 | 4/2010 | Oehlgrien et al. |
| 2010/0138083 A1 | 6/2010 | Kaji |
| 2010/0228420 A1 | 9/2010 | Lee |
| 2010/0235129 A1 | 9/2010 | Sharma et al. |
| 2010/0309315 A1 | 12/2010 | Hogasten et al. |
| 2011/0046843 A1 | 2/2011 | Caveney |
| 2011/0279673 A1 | 11/2011 | Teich et al. |
| 2011/0307128 A1 | 12/2011 | Igarashi et al. |
| 2012/0129410 A1 | 5/2012 | Tyers |
| 2012/0130570 A1 | 5/2012 | Pease |
| 2012/0132120 A1 | 5/2012 | Gai et al. |
| 2012/0262584 A1 | 10/2012 | Strandemar |
| 2012/0290175 A1 | 11/2012 | Hisanaga |
| 2013/0063599 A1 | 3/2013 | Imai et al. |
| 2013/0113939 A1 | 5/2013 | Strandemar |
| 2013/0173096 A1 | 7/2013 | Chalhoub et al. |
| 2013/0297104 A1 | 11/2013 | Tyers et al. |
| 2014/0106631 A1 | 4/2014 | Ito |
| 2014/0156133 A1 | 6/2014 | Cullinane et al. |
| 2014/0316657 A1 | 10/2014 | Johnson et al. |
| 2014/0330480 A1 | 11/2014 | Kopper et al. |
| 2015/0061880 A1 | 3/2015 | Rosenstern |
| 2015/0089427 A1 | 3/2015 | Akuzawa |
| 2015/0089434 A1 | 3/2015 | Akuzawa |
| 2015/0125065 A1 | 5/2015 | Lee et al. |
| 2015/0154460 A1 | 6/2015 | Baba et al. |
| 2016/0187883 A1 | 6/2016 | Tyers et al. |
| 2016/0214534 A1 | 7/2016 | Richards et al. |
| 2016/0217578 A1 | 7/2016 | Can et al. |
| 2017/0210449 A1 | 7/2017 | Frisbie et al. |
| 2017/0365175 A1 | 12/2017 | Harnett |
| 2018/0075383 A1 | 3/2018 | Fogel et al. |
| 2019/0127033 A1* | 5/2019 | Doig ............... B63B 35/34 |
| 2019/0359300 A1 | 11/2019 | Johnson et al. |
| 2019/0361457 A1 | 11/2019 | Johnson et al. |
| 2020/0025873 A1 | 1/2020 | Kubertschak et al. |
| 2020/0202719 A1 | 6/2020 | Derginer |
| 2020/0401143 A1 | 12/2020 | Johnson et al. |
| 2021/0166568 A1 | 6/2021 | Kersulec et al. |
| 2021/0206460 A1 | 7/2021 | Hawker |

FOREIGN PATENT DOCUMENTS

| | | | |
|---|---|---|---|
| CN | 103149948 | 6/2013 | |
| CN | 105637441 A | 6/2016 | |
| DE | 19803078 | 7/1999 | |
| DE | 19807525 | 9/1999 | |
| EP | 1873052 | 1/2008 | |
| EP | 2096018 | 9/2009 | |
| EP | 3168705 B1 * | 9/2021 | ............ B25J 9/0003 |
| GB | 1223986 | 3/1971 | |
| GB | 1419244 | 12/1975 | |
| GB | 2369607 | 6/2002 | |
| GB | 2388355 | 11/2003 | |
| GB | 2388356 | 11/2003 | |
| GB | 2429541 | 2/2007 | |
| JP | 2013086745 | 5/2013 | |
| JP | 2017/052297 | 3/2017 | |
| KR | 2008-0071269 A | 8/2008 | |
| WO | WO 02/030291 A1 | 4/2002 | |
| WO | WO 02/097763 A1 | 12/2002 | |
| WO | WO 2008/084465 A2 | 7/2008 | |
| WO | WO 2014/168674 | 10/2014 | |
| WO | WO 2016/034516 A2 | 3/2016 | |
| WO | WO 2017/167890 | 10/2017 | |
| WO | WO 2020/092643 A1 | 5/2020 | |

OTHER PUBLICATIONS

Gorovyi et al., "A Novel Trajectory Restoration Algorithm for High-Resolution SAR Imaging", 2014 15th International Radar Symposium, Jun. 16, 2014, 4 pages, IEEE, Piscataway, NJ.

Gierusz et al., "Multivariable Robust Steering of the Ship with Feedforward Controller", IFAC Proceedings vols. 2007, pp. 310-314, vol. 40, Issue 17, Elsevier, Amsterdam, Netherlands.

(56) References Cited

OTHER PUBLICATIONS

Rao et al., "Identification of Low-Level Point Radiation Sources Using a Sensor Network," 2008 International Conference on Information Processing in Sensor Networks, pp. 493-504, St. Louis, MO, 2008.

Riley et al., "Low Cost Dept and Radiological Sensor Fusion to Detect Moving Sources," 2015 International Conference on 3D Vision (3DV), Oct. 19-22, 2015.

\* cited by examiner 100E-1
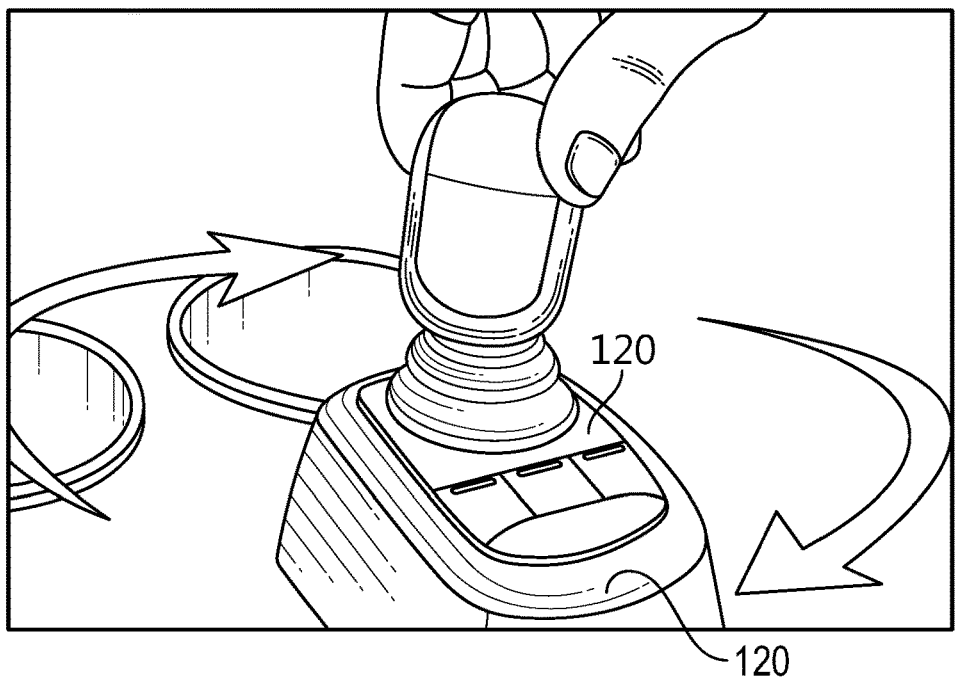
100E-2
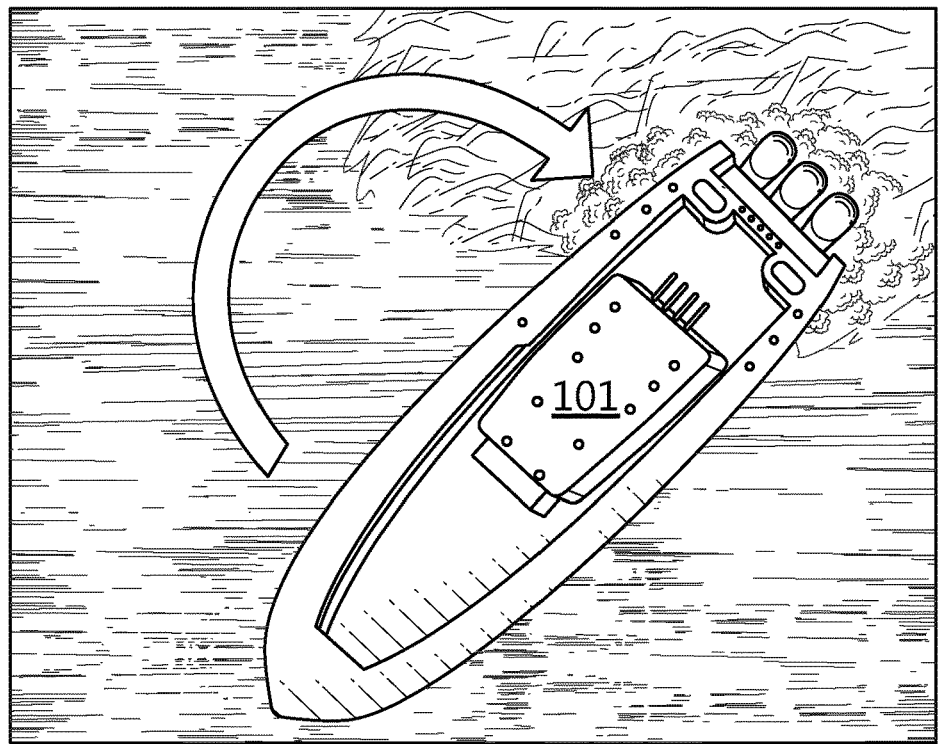
FIG. 1E

1410

```
function [PosErr, Spd2Target, HeadingError] =
fcn(SetupData4plot,Time,TargetManeuver, PosEstNth, Hdg, SpdStbFwd)
coder.extrinsic('legend'); coder.extrinsic('quiver'); coder.extrinsic('num2str');
coder.extrinsic('patch'); coder.extrinsic('sprintf'); % codegen
PositionErrors = TargetManeuver(:, 1:2) - repmat(PosEstNth',size(TargetManeuver,1),1);
[~, Idx] = min(sqrt(PositionErrors(:,1).^2 + PositionErrors(:,2).^2));
c = cosd(Hdg); s = sind(Hdg); PosErr = [c -s ; s c]*PositionErrors(Idx,:)';
HeadingError = TargetManeuver(Idx,3)-Hdg;
if Idx==1   TargetApproachDelta = TargetManeuver(Idx+1,1:2)-TargetManeuver(Idx,1:2);
else   TargetApproachDelta = TargetManeuver(Idx,1:2)-TargetManeuver(Idx-1,1:2); end
TargetApproachVel = TargetManeuver(Idx,4) * TargetApproachDelta /
norm(TargetApproachDelta);
TargetApproachVelStbFwd = [c -s ; s c] * TargetApproachVel;
Spd2Target = SpdStbFwd-TargetApproachVelStbFwd;
% Update the plot
UpdatePeriod_s = 0.25;
if mod(Time,UpdatePeriod_s) == 0
  figure(1);
  hold off
  kts2ms = 0.5;
  x = SetupData4plot(2)*sind(SetupData4plot(1))*kts2ms; y =
SetupData4plot(2)*cosd(SetupData4plot(1))*kts2ms;
  quiver(x,y,-x,-y,'c','MaxHeadSize',3);
  x = SetupData4plot(4)*sind(SetupData4plot(3))*3; y =
SetupData4plot(4)*cosd(SetupData4plot(3))*3; %scale to make visible
  hold on
  quiver(0,0,x,y,'m','MaxHeadSize',6);
  boatwidth_m = 4; boatlength_m = 12;
  boatX = [0 3 3 2 -2 -3 -3 0]*boatwidth_m/6; boatY = [8 3 -1 -4 -4 -1 3
8]*boatlength_m/12;
```

FIG. 22

```
boat = [c s ; -s c]*[boatX ; boatY];
plot(TargetManeuver(:,1),TargetManeuver(:,2),'g');
n = 8; Step = floor(size(TargetManeuver,1)/n);
for i = 1:n
    idx = Step*i;
    c = TargetManeuver(idx,4) * cosd(TargetManeuver(idx,3));
    s = TargetManeuver(idx,4) * sind(TargetManeuver(idx,3));
    x = TargetManeuver(idx,1); y = TargetManeuver(idx,2);
    plot([s -s]+x,[c -c]+y,'r'); plot(s+x,c+y,'r.'); end
plot(boat(1,:)+PosEstNth(1),boat(2,:)+PosEstNth(2),'b');
plot(PosEstNth(1),PosEstNth(2),'ob');
xlim([min(TargetManeuver(:,1))-8 max(TargetManeuver(:,1))+8]);
ylim([min(TargetManeuver(:,2))-8 max(TargetManeuver(:,2))+8]);
TimeStr = sprintf('%2.1f',Time);
title(['Autonomous docking demonstration, time: ',TimeStr,'s']); xlabel('Distance (m)');ylabel('Distance (m)');
legend(['Wind ',num2str(SetupData4plot(2)),'kts'], ['Current ',num2str(SetupData4plot(4)),'kts'],...
['SensorDelay ',num2str(SetupData4plot(5)),'s'])
dockwidth = 1.5; docklength = 20; fenderwidth = 0.5; dock = zeros(2,4);
endpoint = [TargetManeuver(end,1); TargetManeuver(end,2)];
c = cosd(TargetManeuver(end,3)); s = sind(TargetManeuver(end,3));
dock(:,1) = [-dockwidth ; -docklength]/2; dock(:,2) = [dockwidth ; -docklength]/2;
dock(:,3) = [dockwidth ; docklength]/2; dock(:,4) = [-dockwidth ; docklength]/2;
dock = [c s ; -s c]*dock;
offset = (boatwidth_m/2+dockwidth/2+fenderwidth)*[-c ; s];
docking_configuration = atan2d(offset(1),offset(2)) - atan2d(endpoint(1),endpoint(2));
if abs(docking_configuration)>90 offset = - offset; end
patch(dock(1,:)+endpoint(1)+offset(1),dock(2,:)+endpoint(2)+offset(2),[0.4 0.2 0.1]);
axis equal
end
```

FIG. 22 (continued)

```
TargetManeuver = [0 0 0 1; -1 -10 50 1; -13 -15 80 0.5; -14 -20 110 0];
WindDir_deg = 245;WindSpd_kts = 15;CurrentSet_deg = 180;CurrentDrift_kts = 0.5;
Mass_kg = 5000;
I_kgm2 = Mass_kg*2^2;
ThrusterLatMax_N = 4000;
ThrusterLonMax_N = 8000;
ThrusterYawMax_Nm = 2000;
Dist4FullJoystickLat_m = 5;
Dist4FullJoystickLon_m = 5;
Angl4FullJoystickYaw_deg = 40;
FullSpeedLat_ms = 1.5;
FullSpeedLon_ms = 3;
FullSpeedYaw_degs = 10;
DampLat = ThrusterLatMax_N/Mass_kg/FullSpeedLat_ms
DampLon = ThrusterLonMax_N/Mass_kg/FullSpeedLon_ms
DampYaw = ThrusterYawMax_Nm/I_kgm2/(FullSpeedYaw_degs*pi/180)
FilterLatTimeConst = 1; %seconds
FilterLonTimeConst = 1; %seconds
FilterYawTimeConst = 1; %seconds
NomLatGain = ThrusterLatMax_N/Mass_kg/DampLat;
NomLonGain = ThrusterLonMax_N/Mass_kg/DampLon;
```

```
NomYawGain = (180/pi)*ThrusterYawMax_Nm/1_kgm2/DampYaw;
ErrorGainLon = 1/Dist4FullJoystickLon_m;
ErrorGainLat = 1/Dist4FullJoystickLat_m;
ErrorGainYaw = 1/Angl4FullJoystickYaw_deg;
NomLatTimeConst = 1/DampLat %seconds
NomLonTimeConst = 1/DampLon %seconds
NomYawTimeConst = 1/DampYaw %seconds
Ts = 1/50;
MeasurementDelay_s = 0.2;

% Resize TargetManeuver so it has many more points, giving it fine
% granularity to avoid sudden jumps in output
PointsIn = size(TargetManeuver,1);
PointsOut = 1000;
TargManFineRes = zeros(PointsOut,size(TargetManeuver,2));
for j = 1 : PointsOut % new scale index
    i = (j-1)*(PointsIn-1)/(PointsOut-1); % old scale index with decimal to represent
progress between points
    r = mod(i,1);
    TargManFineRes(j,:) = (1-r)*TargetManeuver(floor(i)+1,:) + r*TargetManeuver(ceil(i)+1,:);
end
TargetManeuver = TargManFineRes;
```

FIG. 23
(Continued)

DYNAMIC PROXIMITY ALERT SYSTEMS AND METHODS

CROSS-REFERENCE TO RELATED APPLICATIONS

This application is a continuation of International Patent Application No. PCT/US2021/037127 filed Jun. 11, 2021 and entitled "DYNAMIC PROXIMITY ALERT SYSTEMS AND METHODS," which claims priority to and the benefit of U.S. Provisional Patent Application No. 63/038,626 filed Jun. 12, 2020 and entitled "DYNAMIC PROXIMITY ALERT SYSTEMS AND METHODS," all of which are incorporated herein by reference in their entirety.

This application is a continuation-in-part of U.S. patent application Ser. No. 17/246,489 filed Apr. 30, 2021 and entitled "ASSISTED DOCKING GRAPHICAL USER INTERFACE SYSTEMS AND METHODS," which is a continuation of International Patent Application No. PCT/US2019/058958 filed Oct. 30, 2019 and entitled "ASSISTED DOCKING GRAPHICAL USER INTERFACE SYSTEMS AND METHODS," which claims priority to and the benefit of U.S. Provisional Patent Application No. 62/851,025 filed May 21, 2019 and entitled "ASSISTED DOCKING GRAPHICAL USER INTERFACE SYSTEMS AND METHODS" and U.S. Provisional Patent Application No. 62/753,763 filed Oct. 31, 2018 and entitled "ASSISTED DOCKING GRAPHICAL USER INTERFACE SYSTEMS AND METHODS," all of which are incorporated herein by reference in their entirety.

The following matters are incorporated herein by reference in their entirety: International Patent Application No. PCT/US2019/017382 filed Feb. 9, 2019 and entitled "AUTOPILOT INTERFACE SYSTEMS AND METHODS," which claims priority to and the benefit of U.S. Provisional Patent Application No. 62/671,394 filed May 14, 2018 and entitled "AUTOPILOT INTERFACE SYSTEMS AND METHODS" and U.S. Provisional Patent Application No. 62/628,905 filed Feb. 9, 2018 and entitled "AUTONOMOUS AND ASSISTED DOCKING SYSTEMS AND METHODS."

The following matters are incorporated herein by reference in their entirety: U.S. Design patent application No. 29/692,011 filed May 21, 2019 and entitled "DISPLAY SCREEN OR PORTION THEREOF WITH GRAPHICAL USER INTERFACE."

The following matters are incorporated herein by reference in their entirety: International Patent Application No. PCT/US2018/037954 filed Jun. 15, 2018 and entitled "PERIMETER RANGING SENSOR SYSTEMS AND METHODS," which claims priority to and the benefit of U.S. Provisional Patent Application No. 62/584,718 filed Nov. 10, 2017 and entitled "AUTONOMOUS AND ASSISTED DOCKING SYSTEMS AND METHODS;" and International Patent Application No. PCT/US2018/037953 filed Jun. 15, 2018 and entitled "AUTONOMOUS AND ASSISTED DOCKING SYSTEMS AND METHODS," which claims priority to and the benefit of U.S. Provisional Patent Application No. 62/521,346 filed Jun. 16, 2017 and entitled "AUTONOMOUS AND ASSISTED DOCKING SYSTEMS AND METHODS."

The following matters are incorporated herein by reference in their entirety: U.S. patent application Ser. No. 15/620,675 filed Jun. 12, 2017 and entitled "ADAPTIVE AUTOPILOT CONTROL SYSTEMS AND METHODS," which is a continuation of International Patent Application No. PCT/US2015/068342 filed Dec. 31, 2015 and entitled "ADAPTIVE AUTOPILOT CONTROL SYSTEMS AND METHODS," which claims priority to and the benefit of U.S. Provisional Patent Application No. 62/273,402 filed Dec. 30, 2015 and entitled "ADAPTIVE TRACK KEEPING WITH ENHANCED VELOCITY ESTIMATION SYSTEMS AND METHODS," U.S. Provisional Patent Application No. 62/099,016 filed Dec. 31, 2014 and entitled "ADAPTIVE TRACK KEEPING SYSTEMS AND METHODS," U.S. Provisional Patent Application No. 62/099,103 filed Dec. 31, 2014 and entitled "ADAPTIVE CONTOUR FOLLOWING SYSTEMS AND METHODS," and U.S. Provisional Patent Application No. 62/099,022 filed Dec. 31, 2014 and entitled "STABILIZED DIRECTIONAL CONTROL SYSTEMS AND METHODS." International Patent Application No. PCT/US2015/068342 is also a continuation-in-part of International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS," all of which are hereby incorporated herein by reference in their entirety.

International Patent Application No. PCT/US2015/068342 is also a continuation-in-part of International Patent Application No. PCT/US2015/015281 filed Feb. 10, 2015 and entitled "ACCELERATION CORRECTED ATTITUDE ESTIMATION SYSTEMS AND METHODS" which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS," all of which are hereby incorporated herein by reference in their entirety.

International Patent Application No. PCT/US2015/068342 is also a continuation-in-part of International Patent Application No. PCT/US2015/013141 filed Jan. 27, 2015 and entitled "HYDRAULIC SLIP COMPENSATION SYSTEMS AND METHODS" which claims priority to and the benefit of U.S. Provisional Patent Application No. 61/934,678 filed Jan. 31, 2014 and entitled "HYDRAULIC SLIP COMPENSATION SYSTEMS AND METHODS," all of which are hereby incorporated herein by reference in their entirety.

International Patent Application No. PCT/US2015/068342 is also a continuation-in-part of International Patent Application No. PCT/US2015/067959 filed Dec. 29, 2015 and entitled "PROACTIVE DIRECTIONAL CONTROL SYSTEMS AND METHODS" which claims priority to and the benefit of U.S. Provisional Patent Application No. 62/099,032 filed Dec. 31, 2014 and entitled "PROACTIVE DIRECTIONAL CONTROL SYSTEMS AND METHODS," all of which are hereby incorporated herein by reference in their entirety.

International Patent Application No. PCT/US2015/068342 is also a continuation-in-part of U.S. patent application Ser. No. 14/321,646 filed Jul. 1, 2014 and entitled "STABILIZED DIRECTIONAL CONTROL SYSTEMS AND METHODS" which is a continuation of International Patent Application No. PCT/US2014/013441 filed Jan. 28, 2014 and entitled "STABILIZED DIRECTIONAL CONTROL SYSTEMS AND METHODS" which claims priority to and the benefit of U.S. Provisional Patent Application No. 61/759,238 filed Jan. 31, 2013 and entitled "STABILIZED DIRECTIONAL CONTROL SYSTEMS AND METHODS," all of which are hereby incorporated herein by reference in their entirety.

International Patent Application No. PCT/US2015/068342 is related to International Patent Application No. PCT/US2015/032304 filed May 22, 2015 and entitled "MULTICHANNEL SONAR SYSTEMS AND METHODS" which claims priority to and the benefit of U.S. Provisional Patent Application No. 62/005,838 filed May 30, 2014 and entitled "MULTICHANNEL SONAR SYSTEMS AND METHODS," all of which are hereby incorporated herein by reference in their entirety.

TECHNICAL FIELD

One or more embodiments of the invention relate generally to directional control and more particularly, for example, to graphical user interfaces and methods for assisted and/or fully autonomous docking and/or navigation for watercraft.

BACKGROUND

Directional control systems are used to provide automated and/or supplemented control for planes, watercraft, and, more recently, automobiles. Conventional directional control systems typically include a multitude of sensors that produce results that are not intuitive enough to be used to provide reliable docking or parking assist for a vehicle, particularly in crowded conditions and/or while navigational control is complicated by external disturbances, such as by wind or water currents. Thus, there is a need for improved docking assist methodologies.

SUMMARY

Techniques are disclosed for systems and methods to provide docking assist for a mobile structure. In accordance with one or more embodiments, a docking assist system may include a logic device, a memory, one or more sensors, one or more actuators/controllers, and modules to interface with users, sensors, actuators, and/or other modules of a mobile structure. The logic device may be adapted to receive docking assist parameters for a mobile structure and perimeter sensor data from a perimeter ranging system. The logic device may be configured to determine docking assist control signals based, at least in part, on the docking assist parameters and perimeter sensor data. The determined docking assist control signals may be provided to a navigation control system for the mobile structure. These and other control signals may be displayed to a user and/or used to adjust a steering actuator, a propulsion system thrust, and/or other operational systems of the mobile structure.

In various embodiments, a docking assist system may include a logic device configured to communicate with a user interface and a perimeter ranging system mounted to a mobile structure and to provide docking assist for the mobile structure. The logic device may be configured to receive docking assist parameters from the user interface and perimeter sensor data from the perimeter ranging system; determine one or more docking assist control signals based, at least in part, on the received docking assist parameters and the received perimeter sensor data; and provide the one or more docking assist control signals to a navigation control system for the mobile structure.

In some embodiments, a method to provide docking assist for a mobile structure may include receiving docking assist parameters from a user interface for the mobile structure and perimeter sensor data from a perimeter ranging system mounted to the mobile structure; determining one or more docking assist control signals based, at least in part, on the received docking assist parameters and the received perimeter sensor data; and providing the one or more docking assist control signals to a navigation control system for the mobile structure.

In additional embodiments, a docking assist or more generalized autopilot system may include a control signal coupling configured to couple to a control signal line of a manual user interface for a mobile structure and a logic device configured to communicate with the control signal coupling. The logic device may be configured to monitor control signals communicated between the manual user interface and a navigation control system for the mobile structure, determine a navigation mode for the mobile structure, and selectively relay, block, or modify the monitored control signals based, at least in part, on the determined navigation mode for the mobile structure and the monitored control signals. In related embodiments, the logic device may be configured to identify maneuvering signals generated by the manual user interface based, at least in part, on the monitored control signals, determine a maneuvering protocol corresponding to the manual user interface based, at least in part, on the identified maneuvering signals, and selectively relay, block, or modify the monitored control signals based on the determined navigation mode for the mobile structure, the monitored control signals, and the determined maneuvering protocol.

In further embodiments, a method for providing docking and/or autopilot assistance may include monitoring control signals communicated between a manual user interface and a navigation control system for a mobile structure, identifying maneuvering signals generated by the manual user interface based, at least in part, on the monitored control signals, and determining a maneuvering protocol corresponding to the manual user interface based, at least in part, on the identified maneuvering signals. A related method may include monitoring control signals communicated between a manual user interface and a navigation control system for a mobile structure, determining a navigation mode for the mobile structure, and selectively relaying, blocking, or modifying the monitored control signals based, at least in part, on the determined navigation mode for the mobile structure and the monitored control signals.

In other embodiments, graphical user interfaces for assisted and/or autonomous navigation for mobile structures may be provided. In some embodiments, a navigation assist system may include a user interface for a mobile structure comprising a display and a logic device configured to communicate with the user interface and render a docking user interface on the display. The logic device may be configured to monitor perimeter sensor data provided by a perimeter ranging system mounted to the mobile structure, where the perimeter sensor data corresponds to at least a hazard monitoring area within a monitoring perimeter of the perimeter ranging system, and to render the docking user interface based, at least in part, on the monitored perimeter sensor data. The docking user interface may include a maneuvering guide including one or more of a mobile structure perimeter indicator, a virtual bumper perimeter indicator disposed about the mobile structure perimeter indicator and corresponding to a safety perimeter for the mobile structure, and/or a virtual bumper perimeter intrusion indicator disposed substantially within the virtual bumper perimeter indicator, where the virtual bumper perimeter intrusion indicator is configured to indicate a relative position and/or proximity of a navigation hazard disposed within the monitoring perimeter of the perimeter ranging system.

In other embodiments, a method includes monitoring perimeter sensor data provided by a perimeter ranging system mounted to a mobile structure, where the perimeter sensor data corresponds to at least a hazard monitoring area within a monitoring perimeter of the perimeter ranging system, and rendering a docking user interface based, at least in part, on the monitored perimeter sensor data. The docking user interface may include a maneuvering guide including a mobile structure perimeter indicator, a virtual bumper perimeter indicator disposed about the mobile structure perimeter indicator and corresponding to a safety perimeter for the mobile structure, and/or a virtual bumper perimeter intrusion indicator disposed substantially within the virtual bumper perimeter indicator, where the virtual bumper perimeter intrusion indicator is configured to indicate a relative position and/or proximity of a navigation hazard disposed within the monitoring perimeter of the perimeter ranging system.

In further embodiments, a method includes determining a direction and magnitude of a navigational bias associated with navigation of a mobile structure, determining a spatially biased safety perimeter for the mobile structure and a spatially biased hazard monitoring area within a monitoring perimeter of a perimeter ranging system mounted to the mobile structure, based, at least in part, on the determined direction and magnitude of the navigational bias, and rendering a docking user interface based, at least in part, on the spatially biased safety perimeter and/or the spatially biased hazard monitoring area. The docking user interface may include a maneuvering guide comprising a mobile structure perimeter indicator and a virtual bumper perimeter intrusion indicator disposed at least partially about and/or adjacent to the mobile structure perimeter indicator, where the virtual bumper perimeter intrusion indicator is configured to indicate a relative position and/or proximity of a navigation hazard detected at or within the spatially biased hazard monitoring area, one or more spatially biased hazard escalation zones distributed within the spatially biased hazard monitoring area, and/or the spatially biased safety perimeter for the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 1D-E are diagrams illustrating operation of a thrust maneuver system for a docking assist system in accordance with an embodiment of the disclosure.

FIGS. 22-23 illustrate processes to provide docking assist in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, docking assist systems and methods may provide assisted and/or full automated docking and/or directional control for mobile structures that is substantially more reliable and accurate than conventional systems across a wide variety of types of structures and environmental conditions. Embodiments disclosed herein address deficiencies of conventional methodologies with respect to selection of target docking position and orientation and/or target docking track, perimeter monitoring, navigation hazard avoidance, user control of docking approach, and adaptive navigational control of a mobile structure during assisted and/or autonomous docking.

One or more embodiments of the described docking assist system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops to model and/or control navigation of the mobile structure during a docking assist. The system may be configured to receive measured or modeled sensor signals and provide docking assist control signals, as described herein. For example, the sensors may be mounted to or within the mobile structure (e.g., a watercraft, aircraft, motor vehicle, and/or other mobile structure), or may be integrated with the controller. Various embodiments of the present disclosure may be configured to automatically coordinate steering actuator operations with various orientation and/or position measurements to provide relatively high quality and low noise directional control.

Figure 1A:
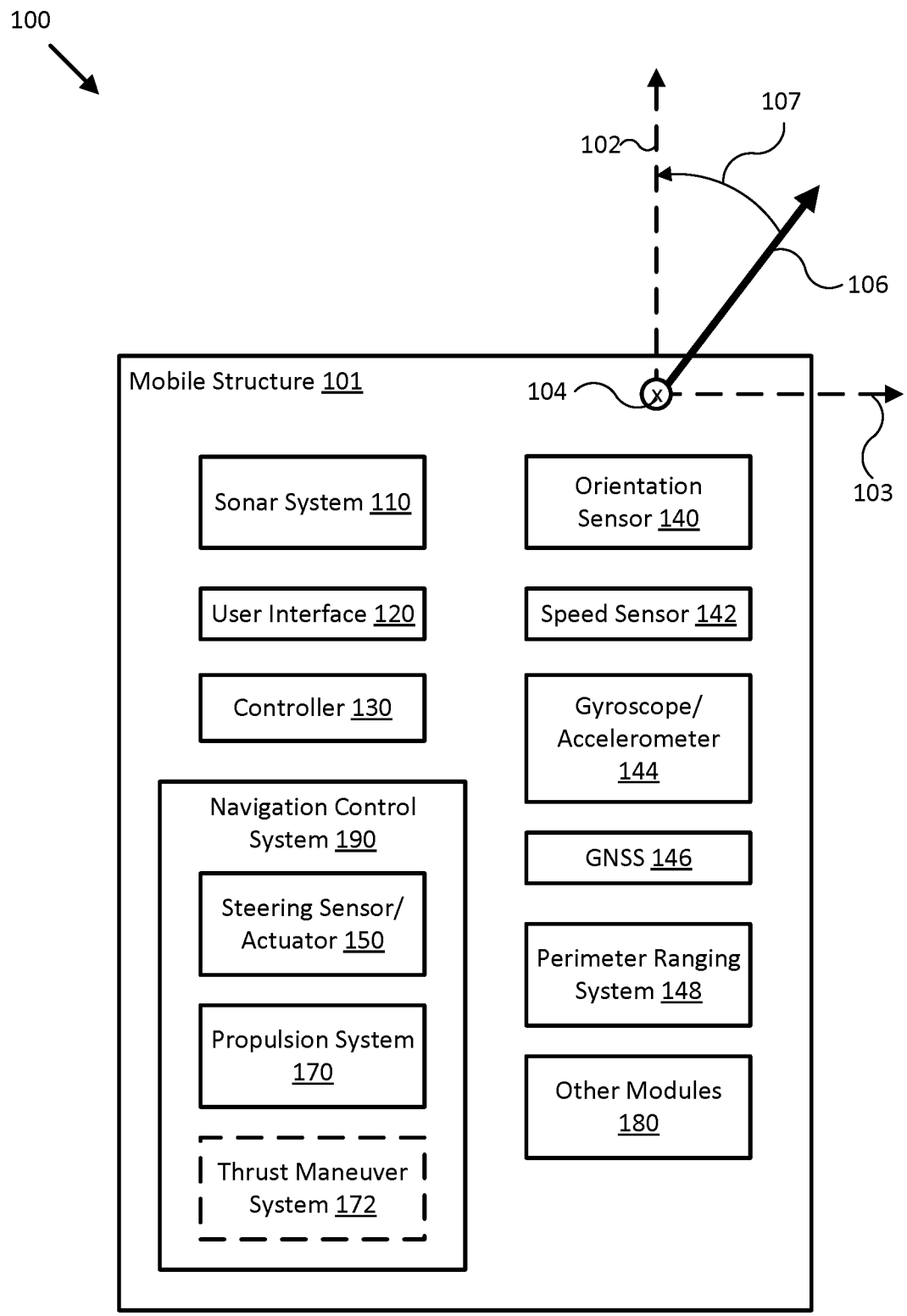
FIG. 1A illustrates a block diagram of a mobile structure including a docking assist system in accordance with an embodiment of the disclosure.

As an example, FIG. 1A illustrates a block diagram of system 100 in accordance with an embodiment of the disclosure. In various embodiments, system 100 may be adapted to provide docking assist for a particular mobile structure 101. Docking assist of a mobile structure may refer to fully automated docking of the mobile structure, for example, or to assisted docking of the mobile structure, where the system compensates for detected navigation hazards (e.g., such as an approaching dock) and/or various environmental disturbances (e.g., such as a cross wind or a water current) while assisting direct user control of mobile structure maneuvers. Such docking assist may include control of yaw, yaw rate, and/or linear velocity of mobile structure 101. In some embodiments, system 100 may be adapted to measure an orientation, a position, and/or a velocity of mobile structure 101, a relative or absolute wind, and/or a water current. System 100 may then use these measurements to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide docking assist for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS," U.S. Provisional Patent Application 61/943,170 filed Feb. 21, 2014 and entitled "MODULAR SONAR TRANSDUCER ASSEMBLY SYSTEMS AND METHODS," and/or U.S. Provisional Patent Application 62/087,189 filed Dec. 3, 2014 and entitled "AUTONOMOUS SONAR SYSTEMS AND METHODS," each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS," which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein. For docking responsiveness, control loop responsiveness may be fast and coupled with relatively low maximum acceleration limits.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water current velocity impacting mobile structure 101. In various embodiments, system 100 may include multiple embodiments of speed sensor 142, such as one wind velocity sensor and one water current velocity sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10s of meters from a perimeter of mobile structure 101), visible spectrum and/or infrared/thermal imaging modules or cameras, stereo cameras, LIDAR systems, combinations of these, and/or other perimeter ranging systems configured to provide relatively fast and accurate perimeter sensor data (e.g., so as to accommodate suddenly changing navigation conditions due to external disturbances such as tide/current and wind loadings on mobile structure 101). An embodiment of perimeter ranging system 148 implemented by cameras mounted to watercraft is discussed with reference to FIGS. 2A-I.

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101 and may be adapted to sense and/or physically adjust the control surfaces to a variety of positive and/or negative steering angles/positions.

Figure 1B:
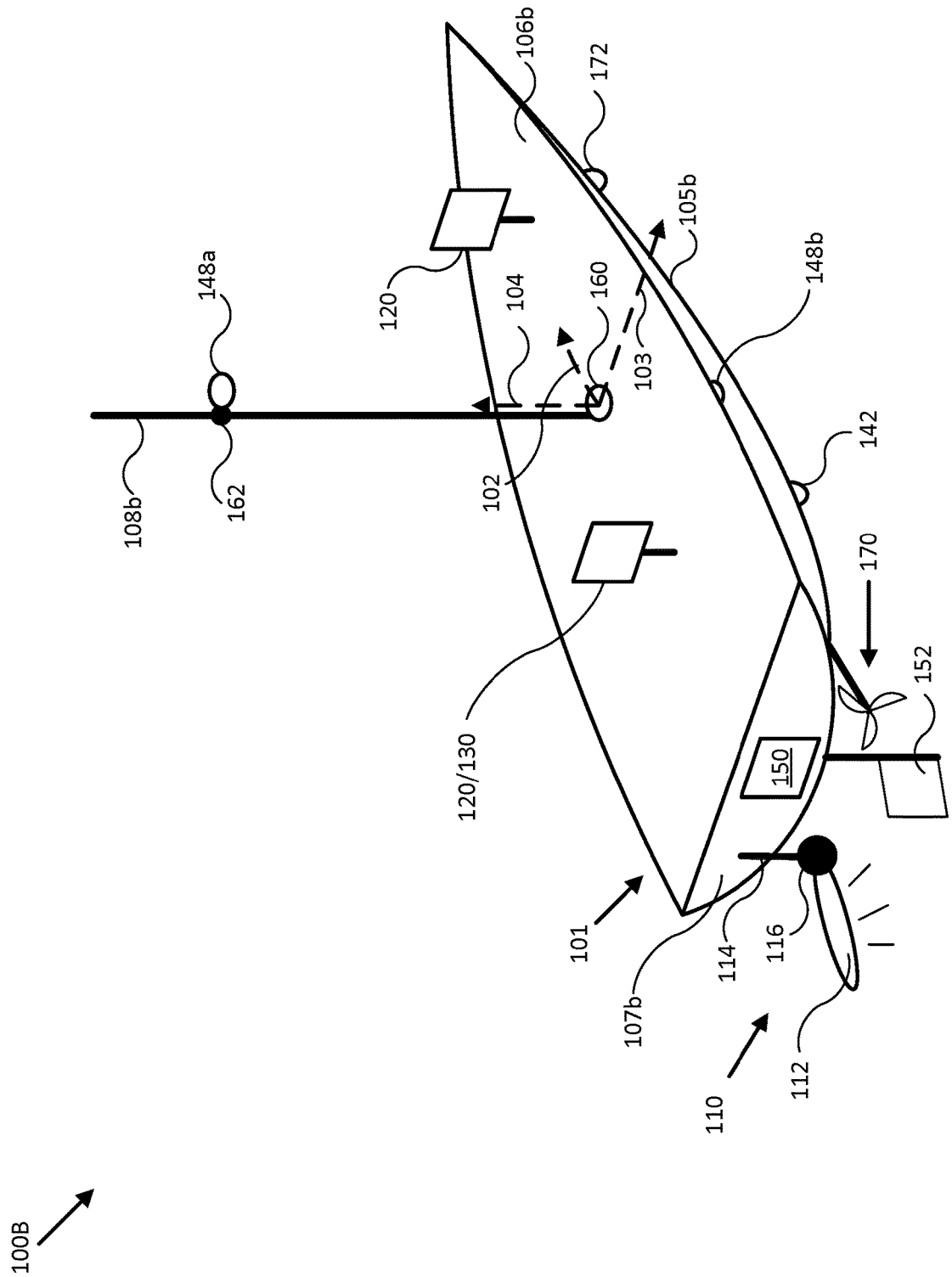
FIG. 1B illustrates a diagram of a watercraft including a docking assist system in accordance with an embodiment of the disclosure.
Figure 1C:
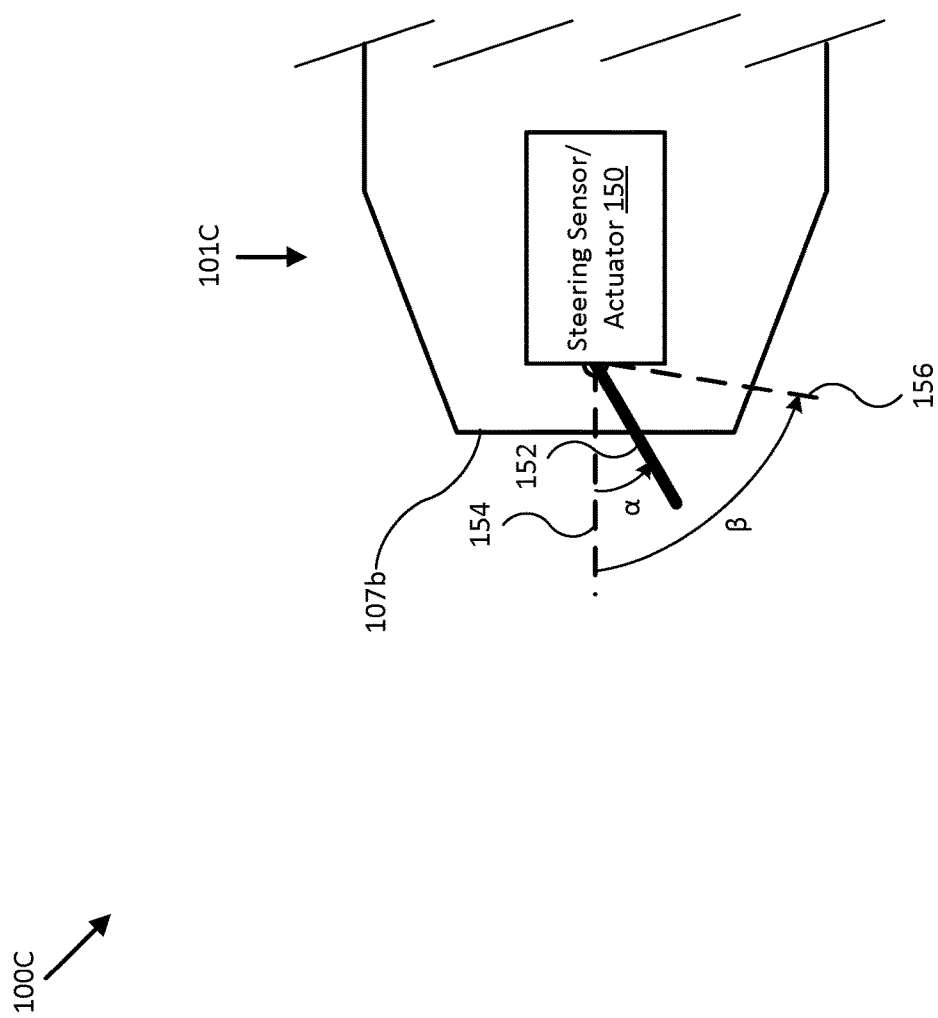
FIG. 1C illustrates a diagram of a steering sensor/actuator for a docking assist system in accordance with an embodiment of the disclosure.

For example, FIG. 1C illustrates a diagram of a steering sensor/actuator for a docking assist system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle α measured relative to a zero steering angle direction (e.g., designated by a dashed line 134). In various embodiments, steering sensor/actuator 150 may be implemented with a steering actuator angle limit (e.g., the positive limit is designated by an angle ß and a dashed line 136 in FIG. 1), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as a number of separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular docking assist maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle α may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle α may be determined by controller 130 according to a pre-determined algorithm, for example, or through use of an adaptive algorithm for training various control loop parameters characterizing the relationship of steering angle α to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Figure 1D:
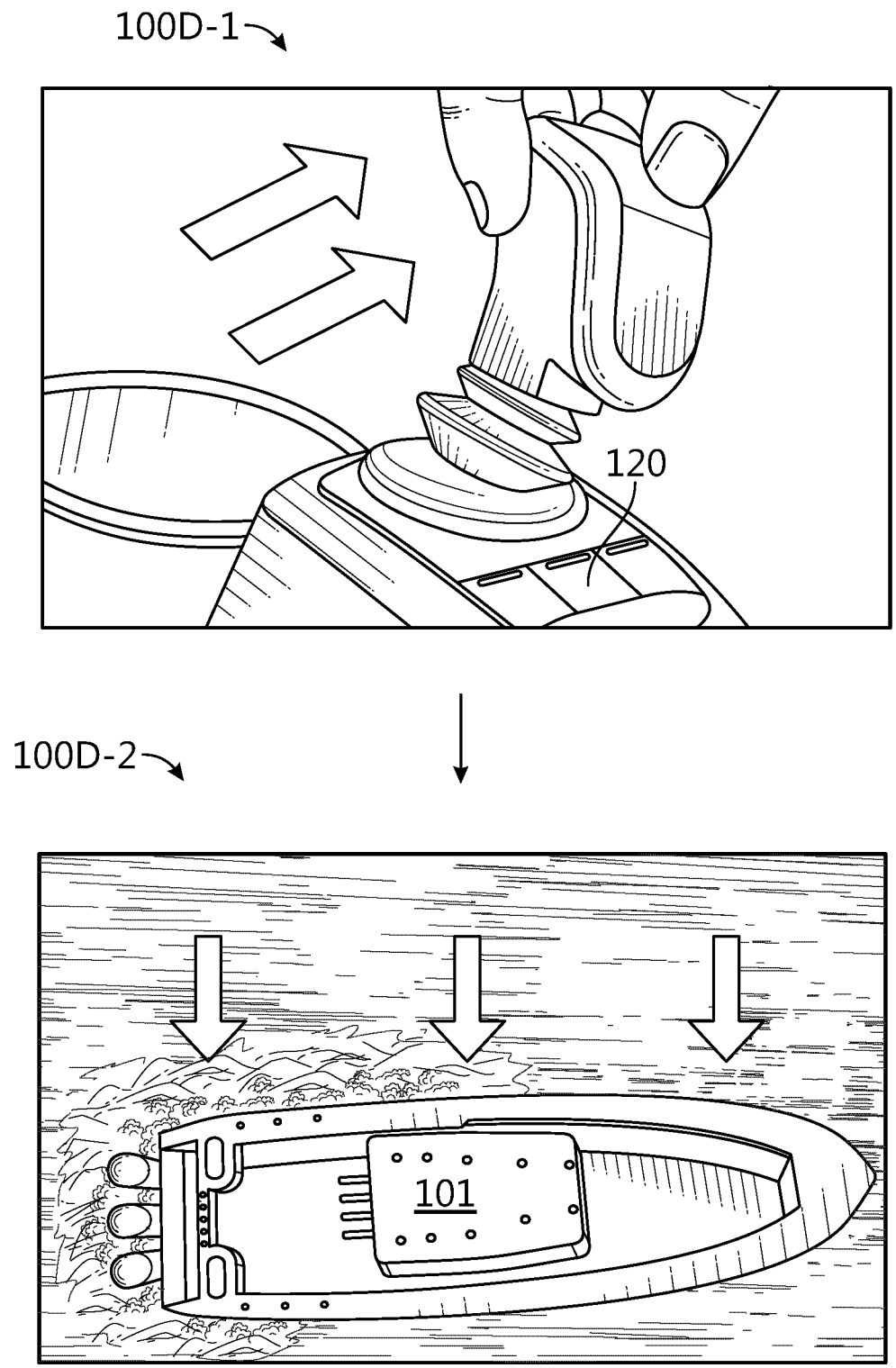

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity. For example, FIGS. 1D-E are diagrams illustrating operation of a thrust maneuver system for a docking assist system in accordance with an embodiment of the disclosure. As shown in diagram 100D-1 of FIG. 1D, joystick user interface 120 may be moved laterally by user input to produce the corresponding lateral velocity for mobile structure 101 shown in diagram 100D-2. Similarly, as shown in diagram 100E-1 of FIG. 1E, joystick user interface 120 may be rotated clockwise by user input to produce the corresponding clockwise angular velocity for mobile structure 101 shown in diagram 100E-2.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), controller area network (CAN) bus interfaces, and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide docking assist and/or other operational control of mobile structure 101, similar to system 100 of FIG. 1B. For example, system 100B may include integrated user interface/controller 120/130, secondary user interface 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system)) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148 according to control signals and/or an orientation or position of mobile structure 101 provided by user interface/controller 120/130. For example, user interface/controller 120/130 may be adapted to receive an orientation of transducer assembly 112 and/or perimeter ranging system 148 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
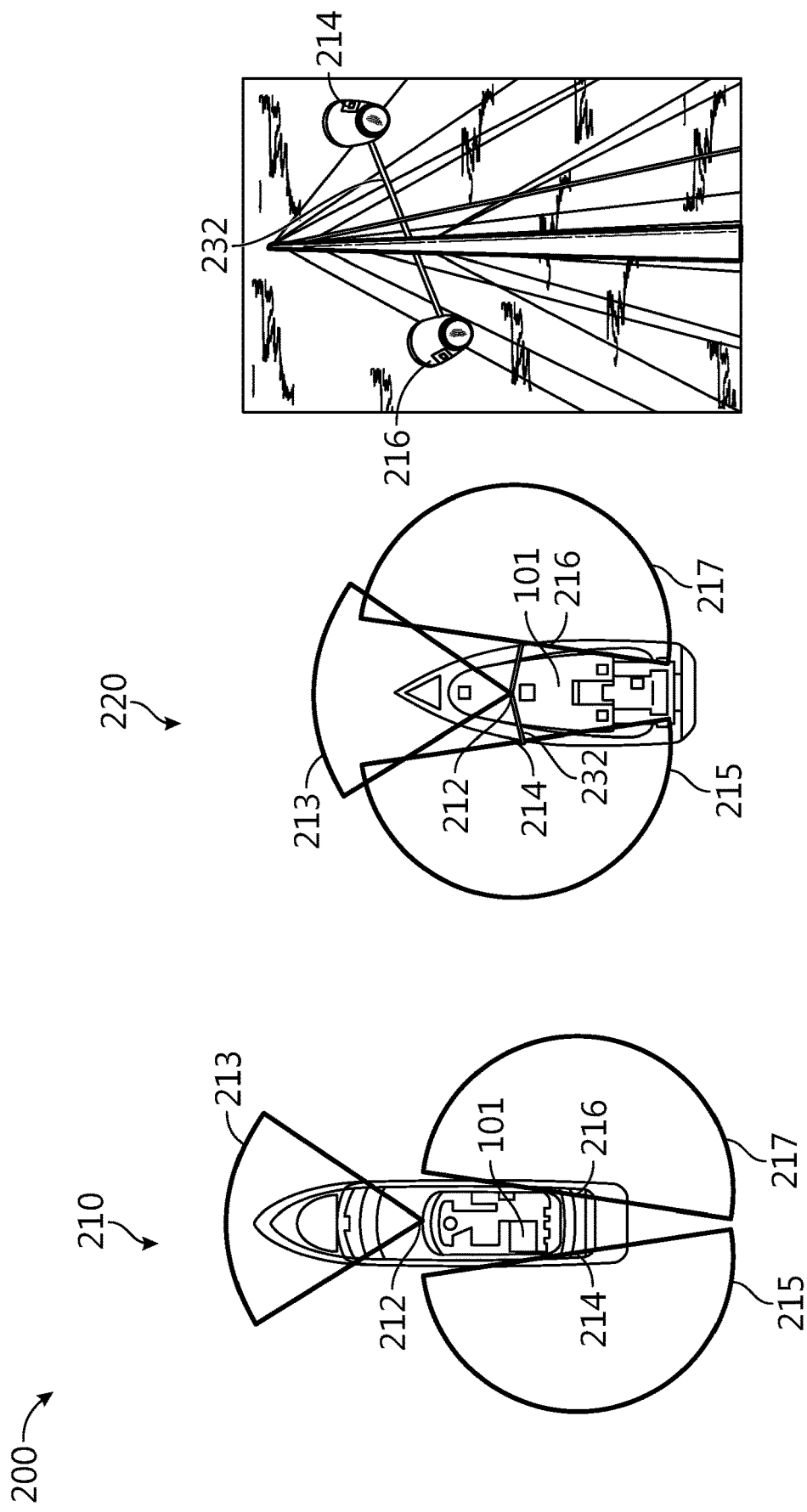
FIGS. 2A-K show diagrams illustrating various aspects of a perimeter ranging system for a docking assist system in accordance with an embodiment of the disclosure.

FIGS. 2A-I show diagrams illustrating various aspects of a perimeter ranging system for a docking assist system in accordance with an embodiment of the disclosure. For example, FIG. 2A shows diagram 200 illustrating mounting positions and corresponding monitoring perimeters for perimeter ranging system components associated with powered yacht arrangement 210 and sailboat arrangement 220.

Each type of perimeter ranging system includes a variety of its own complications when used to implement a docking assist system, and a reliable and accurate perimeter ranging system is necessary for docking assist because GNSS data and cartography data for docks lack sufficient detail and resolution to provide safe docking assist by themselves and because, regardless of improvements in GNSS technology and cartography, there are often many uncharted navigation hazards associated with docking. As an example, conventional radar systems can be relatively easy to retrofit onto a mobile structure, if mounted conventionally high up on mobile structure 101, but they typically suffer from relatively low resolution and so can be unable to detect small objects, such as mooring lines. If mounted conventionally high, a conventional radar system would provide ranging data to controller 130, and controller 130 would be configured to use knowledge of the profile for mobile structure 101 and a measured orientation of mobile structure 101 to determine perimeter sensor data for a detected navigation hazard (e.g., the closest approach distance between a perimeter of mobile structure 101 and the detected navigation hazard). However, by being mounted high, the conventional radar system would typically miss low profile navigation hazards commonly encountered when docking a mobile structure, such as the leading edge of a dock floating minimally above a waterline, particularly as it approaches within a meter of a perimeter of mobile structure 101.

Conventional radar systems may instead be mounted relatively low (e.g., pontoon height) to reliably range such low profile navigation hazards, but this would increase mounting costs and complexity and still result in a system that could miss small but important detail either due to resolution issues or due to conventional beam shapes and corresponding detection areas being too narrow at the point of emission and lacking substantial vertical coverage. Furthermore, if mounted low, a conventional radar system couldn't be used while underway at sea (e.g., due to wave clutter), would be subject to increased risk of damage during docking and/or due to immersion (e.g., sail boat heeled over while underway), would be difficult to mount aesthetically and/or require holes in the hull, and might require extensive cabling routing. As such, conventional radar can be a useful and relatively inexpensive complimentary sensor for a docking assist system, particularly when mounted conventionally to a mast, but would typically require supplemental perimeter sensor data from a separate perimeter ranging system to provide reliable and safe docking assist.

Alternatives include ultrasonic sensor arrays, LIDAR systems, and short range radar systems. Conventional ultrasonic sensor arrays typically do not provide sufficient resolution and range to detect relatively small navigation hazards or to allow a user to specify a docking location, and so, like conventional radar systems, conventional ultrasonic sensor arrays would typically need supplemental perimeter sensor data from a separate perimeter ranging system to provide reliable and safe docking assist, which would increase system cost and complexity.

Newer ultrasonic sensor arrays may include relatively small individual transducer/sensor elements each implemented with its own microcontroller so as not to require relatively expensive shielded sensor wiring to each element (e.g., each element can measure and digitally communicate ranges and/or range profiles to controller 130). For example, unlike automotive solutions which are relatively large and so have to be recessed into the bumper or other surface of the vehicle, and each requiring their own sensor leads, single chip transducer/sensor elements are so small that they can be integrated into a self-adhesive strip that may be surface mounted without significantly impacting a watercraft's aesthetics, hydrodynamic efficiency, or hull/fuselage integrity, and without requiring complex wiring. Rather than having to wire each sensor individually, an array or strip of such single chip transducer/sensor elements can be linked together (e.g., daisy chained, bus linked, mesh linked, and/or linked according to other topologies) so that the array includes a single common power line input and/or a single common communication line input/output, from which all chips may draw power and communicate with each other and/or controller 130, for example. Such strip or array may have a single electrical coupling at one end, so a single cable can be routed to neatly enter into the hull through a single hole disposed in the transom, for example, or the deck. In some embodiments, the power line may support both power delivery to the individual sensor elements and communication between the sensor elements and to/from controller 130. In various embodiments, such sensor arrays/strips may be integrated with and/or along a hull or gunwale of a vessel.

Lidar is improving rapidly and has the advantage of being able to detect navigation hazards without ambient light. Lidar produces a 3d point cloud and so is suited to measuring distances to the dock, and analytics to determine dock/obstacle vs water are straightforward since the water is substantially a flat plane and objects more than a predetermined threshold above this plane can be designated as navigation hazards. The LIDAR data can be rendered as an image from an elevated perspective, making it relatively easy and intuitive for a user to designate a target docking position. However, LIDAR is currently expensive, especially if multiple installations are required to get a clear view of the perimeter of mobile structure 101 (e.g., port and starboard installations). Short range radar systems (e.g., including approximate square centimeter sized two and/or three dimensional radar antenna arrays configured to detect and/or range objects between a few centimeters and 10s of meters away) are also improving rapidly, but such systems could be relatively prone to damage and would be relatively complex to mount and wire along a perimeter of mobile structure 101 in order to provide sufficient coverage for common docking assist maneuvers.

A less expensive alternative, according to embodiments disclosed herein, is one or more cameras (e.g., including visible spectrum and/or infrared/thermal imaging modules) mounted relatively high on mobile structure 101 to provide a sufficient monitoring perimeter around mobile structure 101 and a sufficient vertical perspective of a perimeter of mobile structure 101 to reliably detect and range navigation hazards relatively close to the perimeter of mobile structure 101 (e.g., within a meter of the perimeter of mobile structure 101). Each camera may include a microelectromechanical systems (MEMS) based gyroscope/accelerometer sensor (e.g., similar to gyroscope/accelerometer 144) configured to provide a vertical reference (e.g., corresponding to the gravitational "down" vector) for images captured by the camera, for example, and/or the camera and/or controller 130 may be configured to determine a horizontal reference (e.g. corresponding to a horizon, such as where the sea surface meets the horizon). From these references and a known height of the camera, reliable and precise ranges between a perimeter of mobile structure 101 and a detected navigation hazard can be determined, and without need of supplemental perimeter sensor data and/or perimeter ranging systems, as described herein.

FIG. 2A shows diagram 200 illustrating mounting positions and corresponding monitoring perimeters for perimeter ranging system components associated with powered yacht arrangement 210 and sailing yacht arrangement 220, in accordance with an embodiment of the disclosure. In powered yacht arrangement 210, perimeter ranging system 148 includes cameras mounted at positions 212, 214, and 216 providing a monitoring perimeter for mobile structure 101 corresponding roughly to the combined fields of view (FOVs) 213, 215, and 217, as shown. As can be seen from FOVs 213, 215, and 217, camera 212 may be implemented by a relatively narrow FOV navigational camera aimed substantially forward with respect to mobile structure 101 so as to detect navigation hazards substantially off the bow of mobile structure 101, both while docking and while underway. Cameras 214 and 216 may be implemented by relatively wide FOV docking cameras (e.g., fisheye lens cameras) aimed down and over respective port and starboard sides of mobile structure 101 so as to detect navigational hazards substantially port, starboard, and/or aft of mobile structure 101. In various embodiments, one or more of cameras 212, 214, and 216 may be mounted to mobile structure 101 at different mounting points and/or using an actuated mount, so as to adjust FOVs 213, 215, and 217 and/or a monitoring perimeter for perimeter ranging system 148 (e.g., according to a speed of mobile structure 101 and/or other operational modes for mobile structure 101 and/or system 100).

In sailing yacht arrangement 210, perimeter ranging system 148 includes cameras mounted at positions 212, 214, and 216 providing a monitoring perimeter for mobile structure 101 corresponding roughly to the combined FOVs 213, 215, and 217, as shown. As can be seen from FOVs 213, 215, and 217, cameras 214 and 216 may be mounted at ends of a spreader 232 to place them as close to the width of the beam of mobile structure 101 as possible so they can view navigation hazards arbitrarily close to a perimeter (e.g., the hull) of mobile structure 101. Furthermore, cameras 214 and 216 may be mounted such that their respective FOVs 215 and 217 each at least partially overlap with FOV 213 of camera 212, so as to provide a seamless monitoring perimeter.

More generally, perimeter ranging system 148 may include any number of articulated and/or non-articulated cameras mounted about mobile structure 101 to provide a targeted monitoring perimeter (e.g., a temporally changing monitoring perimeter) and/or seamless monitoring perimeter about mobile structure 101. For example, such monitoring perimeter may increase or decrease in size with a linear and/or angular velocity of mobile structure 101, and/or may be biased towards a linear or angular velocity of mobile structure 101 to provide a larger monitoring perimeter in the direction of motion of mobile structure 101. Controller 130 and/or perimeter ranging system 130 may be configured to detect navigation hazards within the monitoring perimeter, for example, and determine ranges to the navigation hazards and/or relative velocities of the navigation hazards.

If the ranges to the navigation hazards are within a safety perimeter for mobile structure 101, or the relative velocities of the navigation hazards towards mobile structure 101 are greater than a hazard velocity limit, controller 130 may be configured to determine docking assist control signals configured to cause navigation control system 190 to maneuver mobile structure 101 to evade the navigation hazards by maintaining or increasing the range to a navigation hazard or by decreasing the relative velocity of the navigation hazard towards the mobile structure. Such safety perimeter may be a preselected range from a perimeter of mobile structure 101 and/or from an approximate center of mobile structure 101, for example, may be provided by a manufacturer, by regulation, and/or by user input, and may vary according to a velocity of mobile structure 101. The hazard velocity limit may be a preselected velocity limit corresponding to relative velocities of navigation hazards towards mobile structure 101 (e.g., the component of their relative velocities towards a center of mobile structure 101 and/or towards a neared approach to a perimeter of mobile structure 101), for example, may be provided by a manufacturer, by regulation, and/or by user input, and may vary according to a velocity of mobile structure 101.

Because cameras intrinsically measure angle to a high degree of accuracy and precision, and because the camera mounting height above the water surface can be known accurately, it is possible to obtain reliable distance measurements navigation hazards in view of the cameras.

Figure 2B:
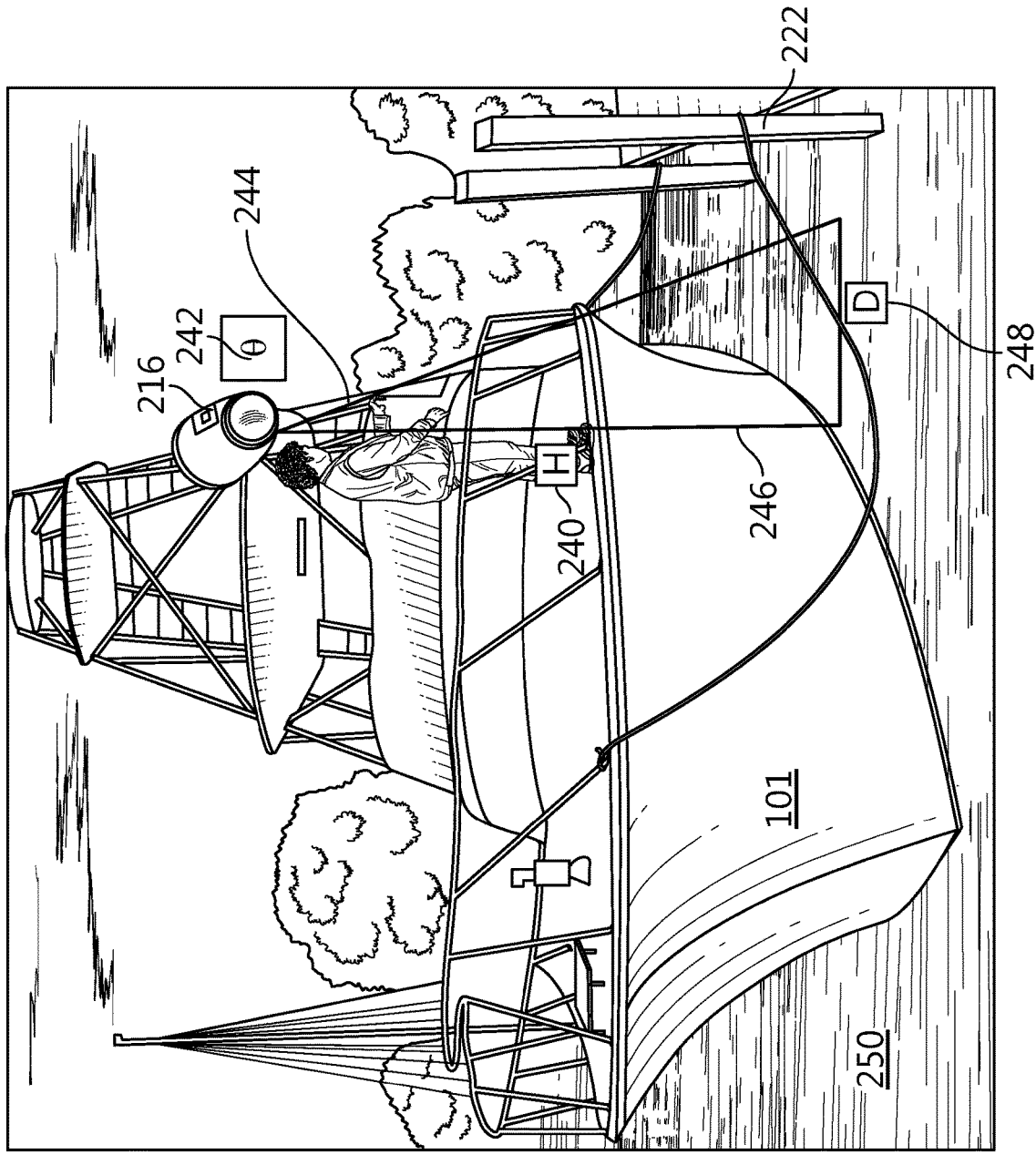

For example, FIG. 2B shows diagram 201 illustrating a range measurement associated with perimeter ranging system 148 including docking camera 216, in accordance with an embodiment of the disclosure. As shown in diagram 201, camera 216 may be mounted to mobile structure 101 at height 240 above water surface 250 and in view of at least a portion of a side of mobile structure 101 and dock 222. In various embodiments, angle 242 between vertical vector 246 and navigation hazard view vector 244 may be used to find the range 248 from mobile structure 101 to dock 222, where range 248=height 240*tan(angle 242). In various embodiments, navigation hazard view vector 244 may correspond to the position within the FOV of camera 216 where dock 222 intersects water surface 250, and angle 242 may be determined based on operating characteristics of camera 216.

Figure 2C:
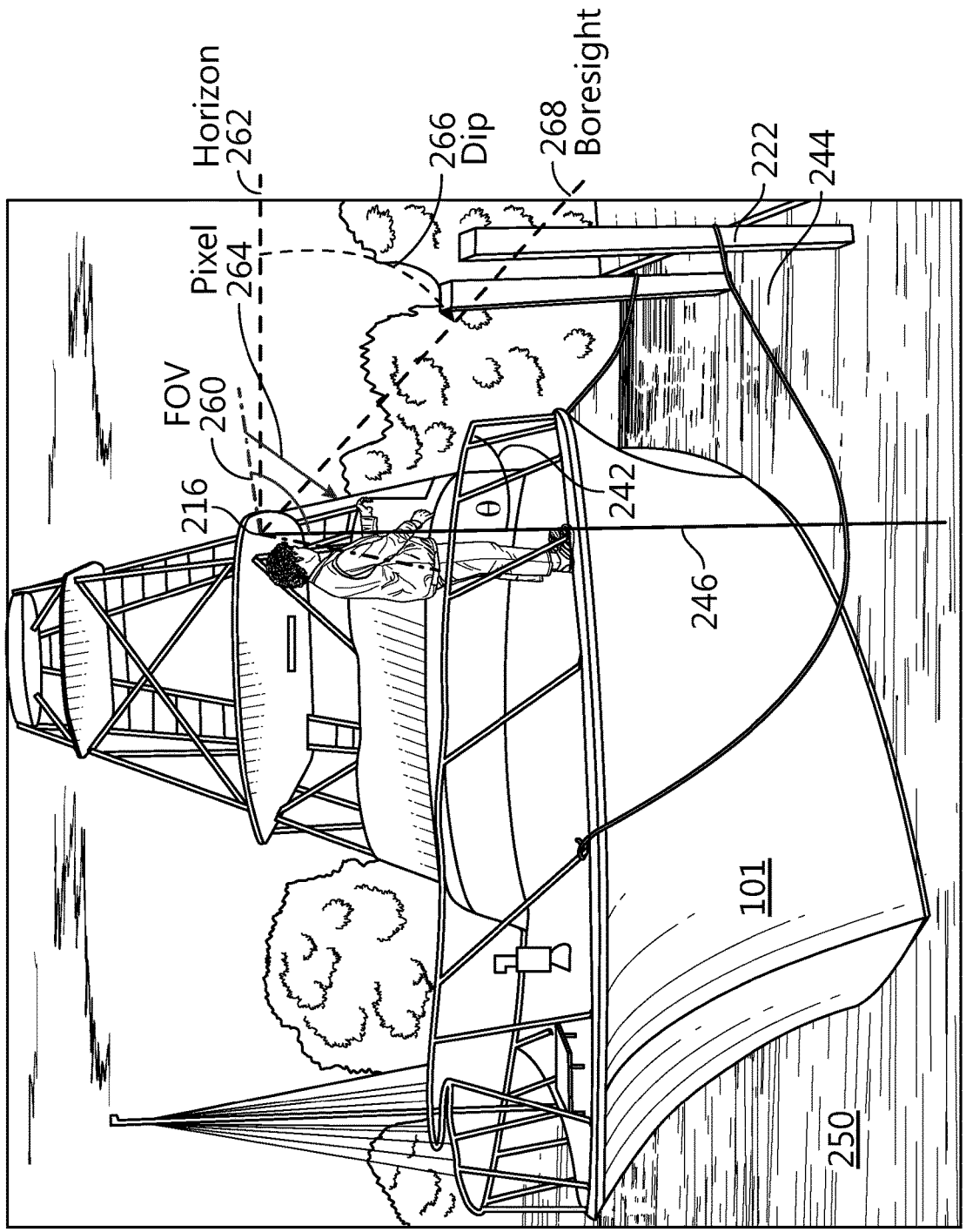

FIG. 2C shows diagram 202 illustrating a range measurement associated with perimeter ranging system 148 including docking camera 216, in accordance with an embodiment of the disclosure. In particular, diagram 202 shows one technique to determine angle 242 of FIG. 2B. As noted herein, water surface 250 is substantially horizontal, which can be used to provide one of two triangle perpendiculars (e.g., the horizontal reference); the other perpendicular is a vertical reference. A vertical reference may be provided by user input indicating mounting offsets, an automatic calibration process configured to detect vertical offsets through image processing (e.g., through horizon detection or similar), and/or by gyroscope/accelerometer sensors integrated with the camera and factory aligned to the FOV of the camera. For example, a 3 axis MEMS accelerometer can be integrated with the camera and factory aligned to its boresight. Furthermore, the MEMS accelerometer may be combined with a MEMS gyroscope to detect and compensate for momentary accelerations of mobile structure 101 to prevent such accelerations from introducing short term errors in the vertical reference.

As such, in various embodiments, angle 242 can be obtained from: angle 242=90−((Pixel 264−NoPixels/2) *CameraFOV 260/NoPixels)−DipAngle 266, where DipAngle 266 is the angle between horizontal reference vector 262 (e.g., which is perpendicular to the vertical reference and parallel to the horizon) and boresight vector 268, CameraFOV 260 is the vertical angular FOV of camera 216, Pixel 264 is the pixel distance between an edge of CameraFOV 260 and navigation hazard view vector 244, and NoPixels is the number of pixels across CameraFOV 260. Other techniques are contemplated, including other techniques relying on physical and/or operating characteristics of camera 216.

Such distance measurements require some image analytics to detect where dock 222 intersects water surface 250. In some embodiments, controller 130 may be configured to execute neural networks trained to recognize dock features and other navigation hazards such as mooring warps or other watercraft and to differentiate such navigation hazards from other objects such as seaweed, seagulls. Alternative and complimentary statistical processes can be used. In some embodiments, such analytics architected for minimal latency by performing the analytics before compressing and converting the images for further image processing. For example, a wired communications link may be formed between camera 216 of perimeter ranging system 148 and controller 130 where the communications link enables uncompressed high speed video to be transferred down a single cable with lower speed control and data overlaid bi-directionally.

Figure 2D:
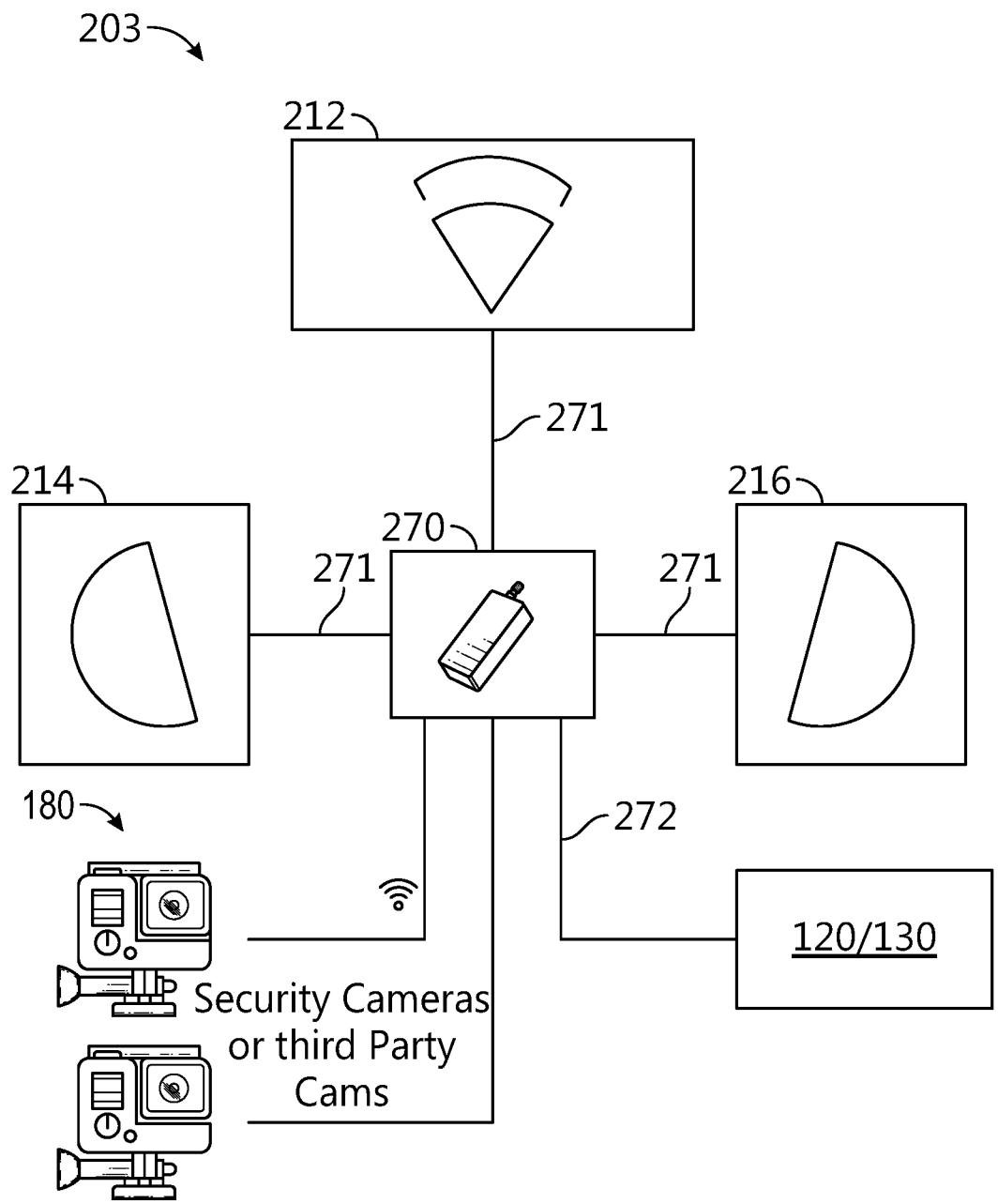

FIG. 2D shows diagram 203 illustrating a system architecture for perimeter ranging system 148 utilizing such communication link, in accordance with an embodiment of the disclosure. As shown in diagram 203, perimeter ranging system 148 may include cameras 212, 214, and 216 coupled to image analyzer 270 over wired communication links 271, which may be configured to provide processed imagery and analytics metadata to user interface/controller 120/130 over communication link 272. Such architecture allows image analyzer 270 to provide analytics substantially in real time with minimal latency at relatively low cost. For example, image analyzer 270 may be implemented with a vector processor (e.g., such as a Myriad 2 or Myriad 3 vector processor) coupled to a video processing integrated circuit (e.g., such as the Ambarella S3L or S5L video processing ICs). In various embodiments, image analyzer 270 may be configured to identify navigation hazards and other objects in a maritime scene, such as those shown in display views provided in FIGS. 2F-I. Image analyzer 270 may be configured to precisely stitch images received from cameras 212, 214, and 216 (e.g., by recognizing shoreline feature and using them as a basis for aligning images from different cameras). Also shown in diagram 203 are various other imaging devices 180, which may include security cameras, sports cameras, smart phone cameras, and/or other imaging devices that can be configured to interface with image analyzer 270.

Figure 2E:
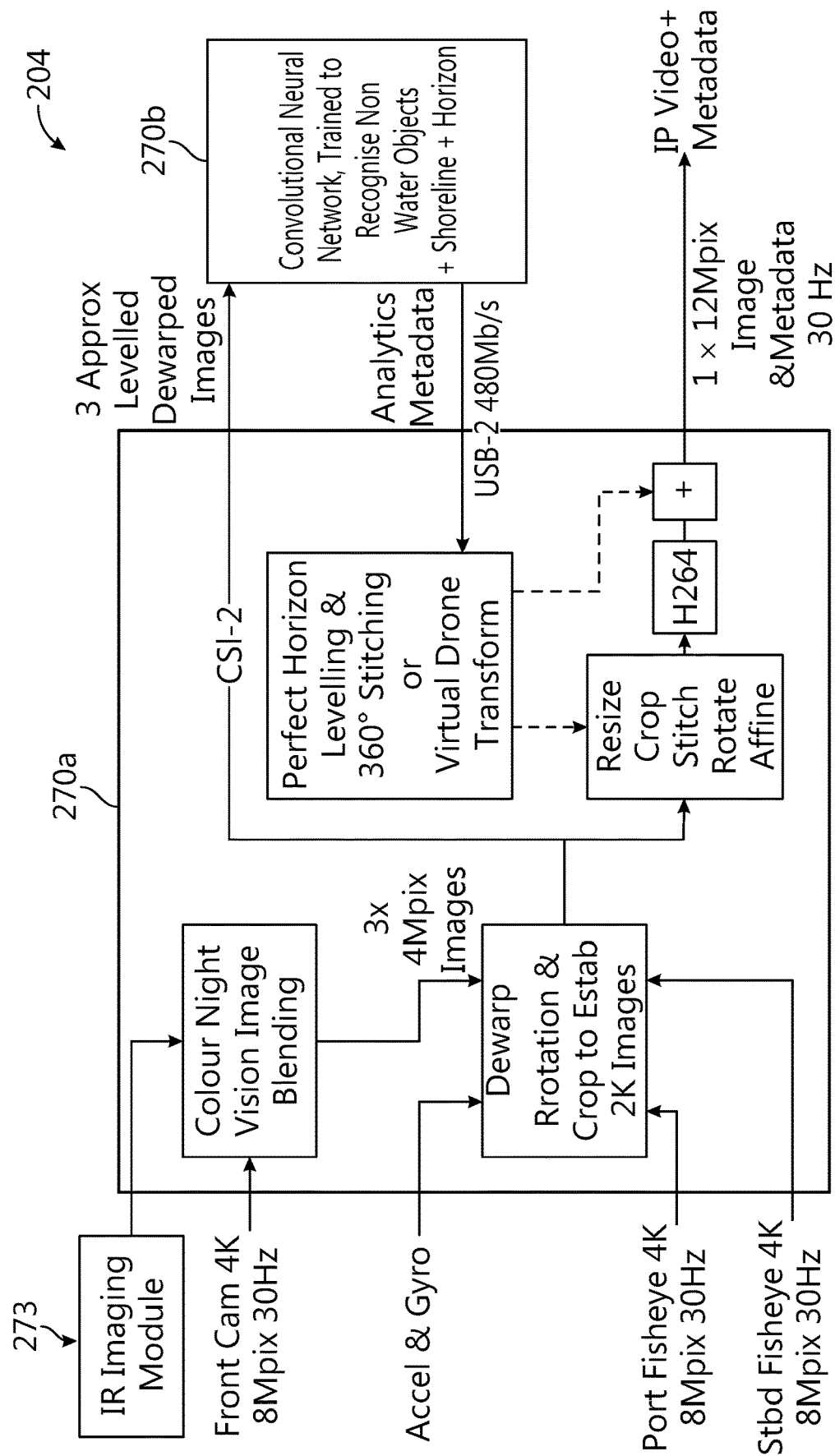

FIG. 2E shows diagram 204 illustrating a system architecture for perimeter ranging system 148 utilizing image analyzer 270, in accordance with an embodiment of the disclosure. As shown in diagram 2E, imaging devices 273 provide images and/or video to video processing integrated circuit 270a of image analyzer 270, which collaborates with co-processor 270b of image analyzer 270 to detect and identify navigation hazards and other objects in the images provided by imaging devices 273. Resulting processed imagery (e.g., stitched imagery, synthetic viewpoint elevation imagery, and/or other processed imagery) and/or analytics metadata (e.g., bounding boxes, extents, type, and/or other characteristics of detected and identified navigation hazards and other objects) may then be provided to other elements of system 100, such as user interface 120 and/or controller 130.

In some embodiments, image analyzer 270 may be configured to stitch images provided by any one or combination of cameras 212, 214, and/or 216, for example, to generate an all-around view while navigating at sea and/or to generate a synthetic elevated view (e.g., a top-down view) while docking. In general, it is topologically impossible to show an all-round de-warped view by simply stitching two fisheye camera outputs together. However, a synthetic elevated view, also referred to as a virtual drone view, may be generated from such images, which changes the viewpoint to something that can be projected onto a flat screen. Unlike conventional automotive systems, which typically create significant distortions with respect to nearby objects, the relatively high mounting point of at least cameras 214 and 216 results in less distortion and thereby facilitates producing accurate distance measurements and more intuitive imagery. In some embodiments, such virtual drone views may be scaled so that distances can be read off directly from the display of user interface 120 by a user.

Figure 2F:
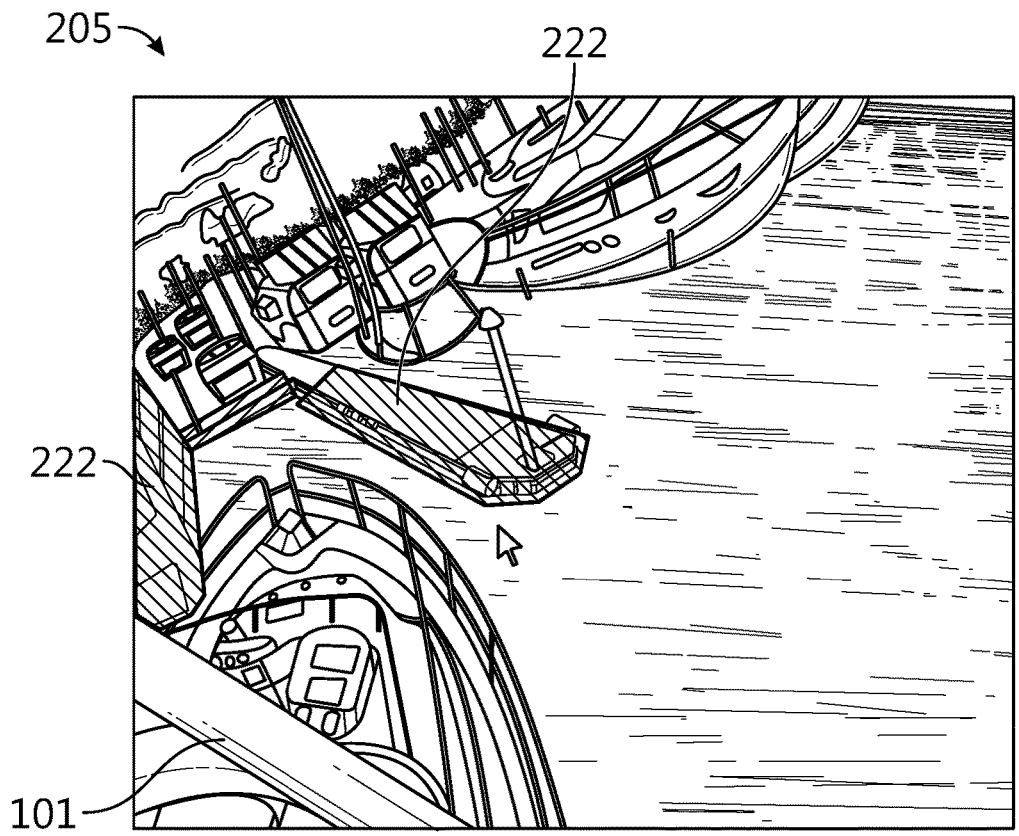
Figure 2G:
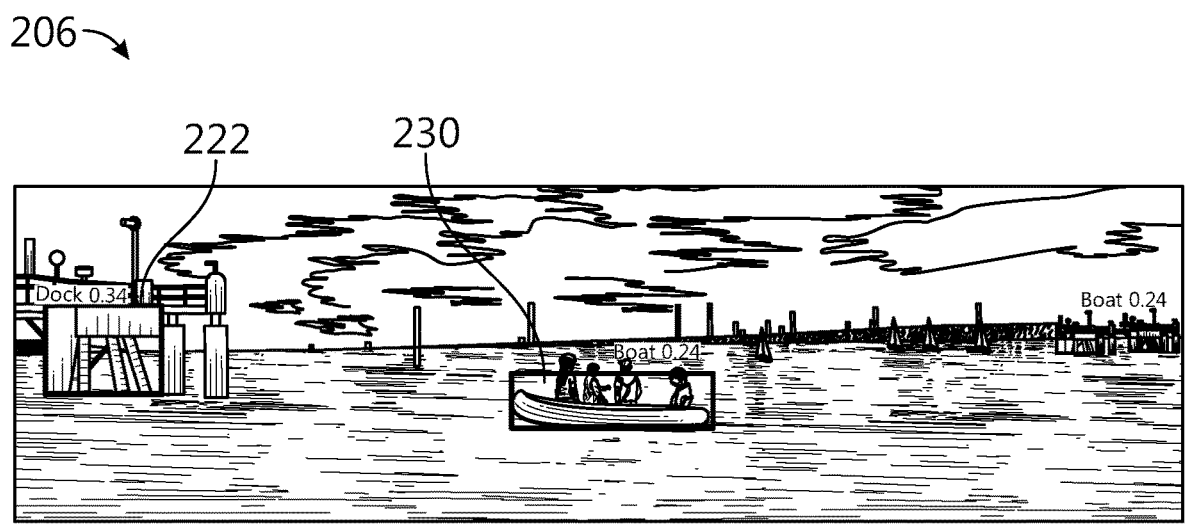
Figure 2H:
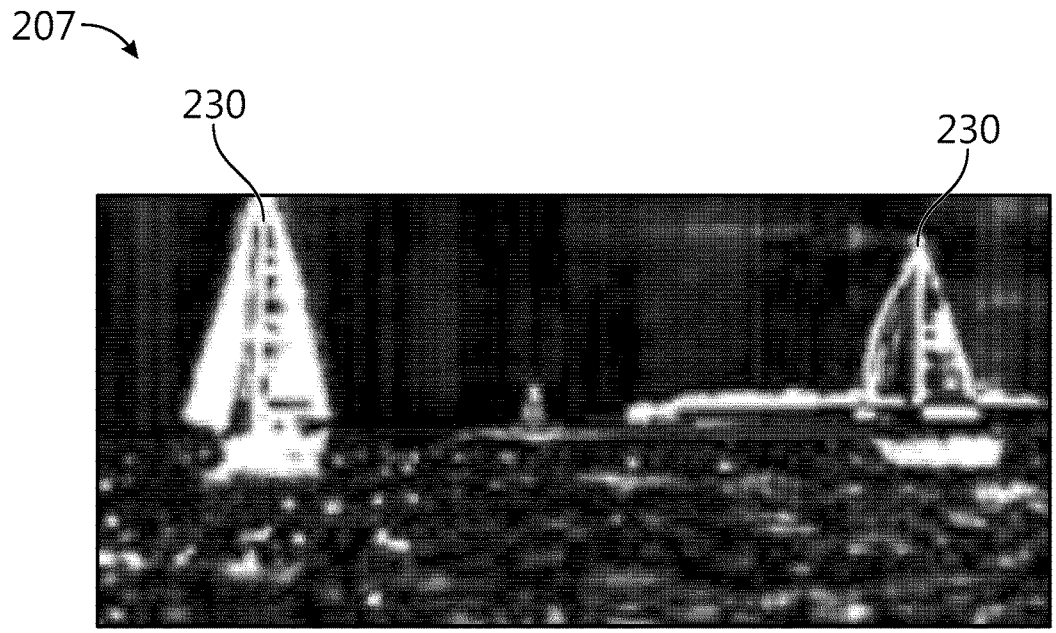
Figure 2I:
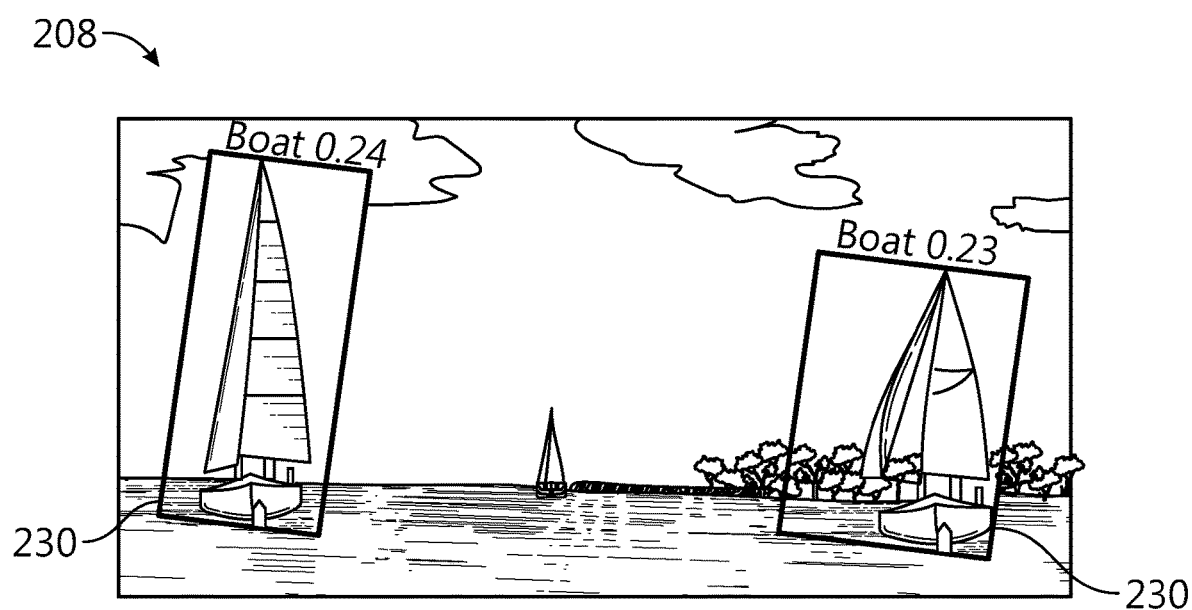

FIGS. 2F-J show display views 205-209 illustrating perimeter sensor data from perimeter ranging system 148, in accordance with an embodiment of the disclosure. For example, display view 205 of FIG. 2F shows an image captured by camera 216 of a docking area including dock 222 after processing by image analyzer 270. As shown in display view 205, dock 222 has been identified (e.g., by co-processor 270b) and highlighted with a green overlay (e.g., provided as analytics metadata by video processing IC 270a) to help a user guide mobile structure 101 into dock 222. Display view 206 of FIG. 2G shows an image captured by camera 212 of a docking area including dock 222 and watercraft 230 after processing by image analyzer 270, which includes bounding boxes and identifiers (e.g., textual names and/or ranges) associated with dock 222 and watercraft 230. Display view 207 of FIG. 2H shows a thermal image captured by camera 212 of two watercraft 230 after processing by image analyzer 270 to increase contrast and/or provide identifiers for watercraft 230. Display view 208 of FIG. 2I shows a visible spectrum image captured by camera 212 of two watercraft 230 after processing by image analyzer 270, which includes bounding boxes and identifiers associated with detected watercraft 230.

Figure 2J:
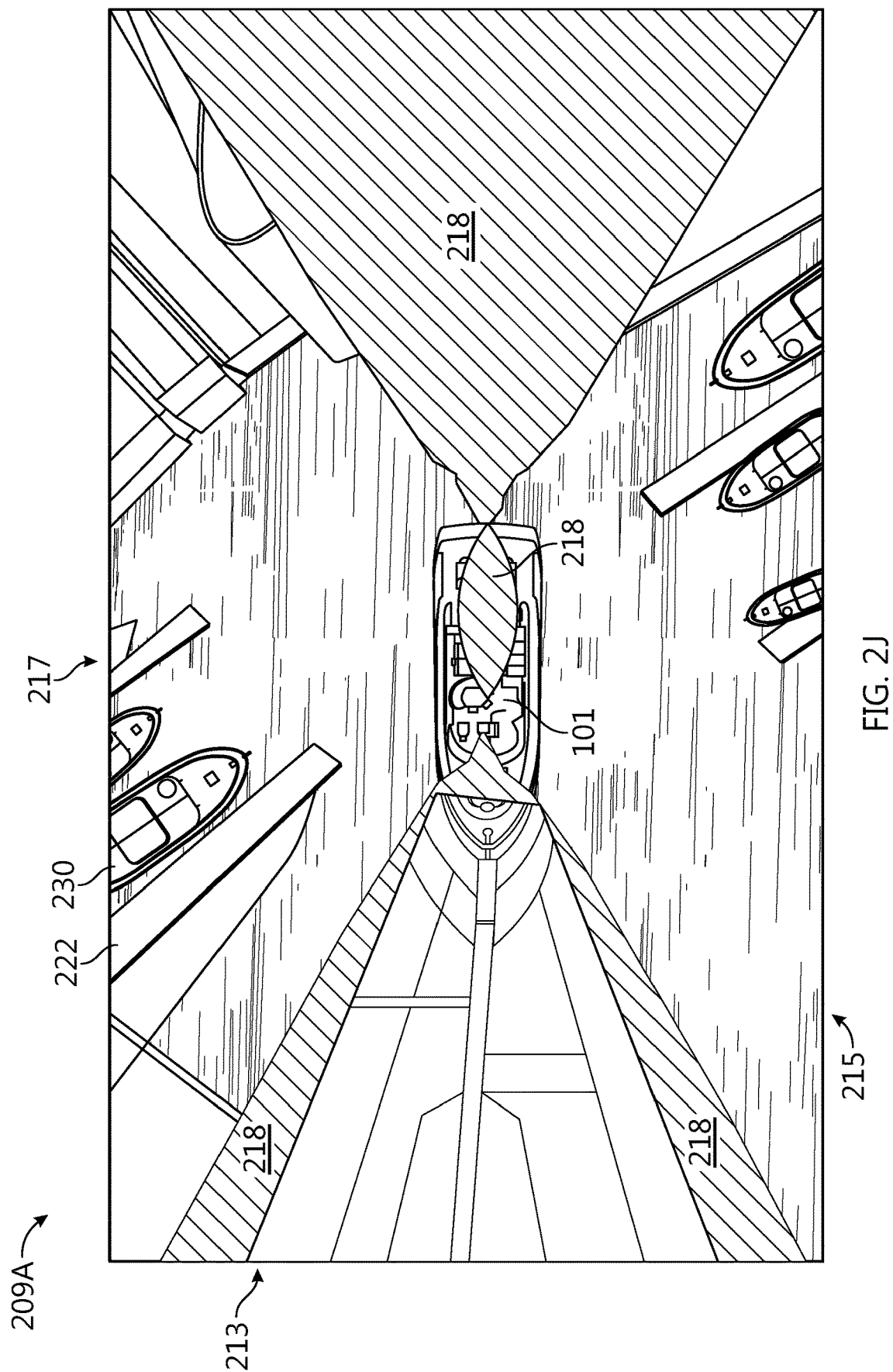

As noted herein, a synthetic elevated view/virtual drone view, may be generated from images captured by cameras mounted to various portions of mobile structure 101, such as a gunwale, bridge, mast, and/or other portion of mobile structure 101, and a fused or stitched version of such images may be projected onto a flat surface and rendered in a display of user interface 120. For example, display view 209 of FIG. 2J shows a combination of visible spectrum images captured by cameras 212, 214, and 216 coupled to mobile structure 101 and projected/mapped onto a (virtual) flat surface and rendered for display (e.g., by image analyzer 270 and/or user interface 120). As shown in FIG. 2J, display view 209A shows mobile structure 101 attempting to dock at dock 222 while navigating to avoid collision with other watercraft 230 and/or other structures identified within FOVs 213, 215, and 217. Display view 209A also shows various un-imaged areas 218 (e.g., where the various FOVs fail to overlap), which may in some embodiments be left blank or supplemented with prior-image data (e.g., captured while mobile structure 101 was at a different position or orientated differently) and/or other perimeter ranging system data, such as above or below water sonar data indicating the relative position of an object surface or underwater hazard within un-imaged areas 218.

Figure 2K:
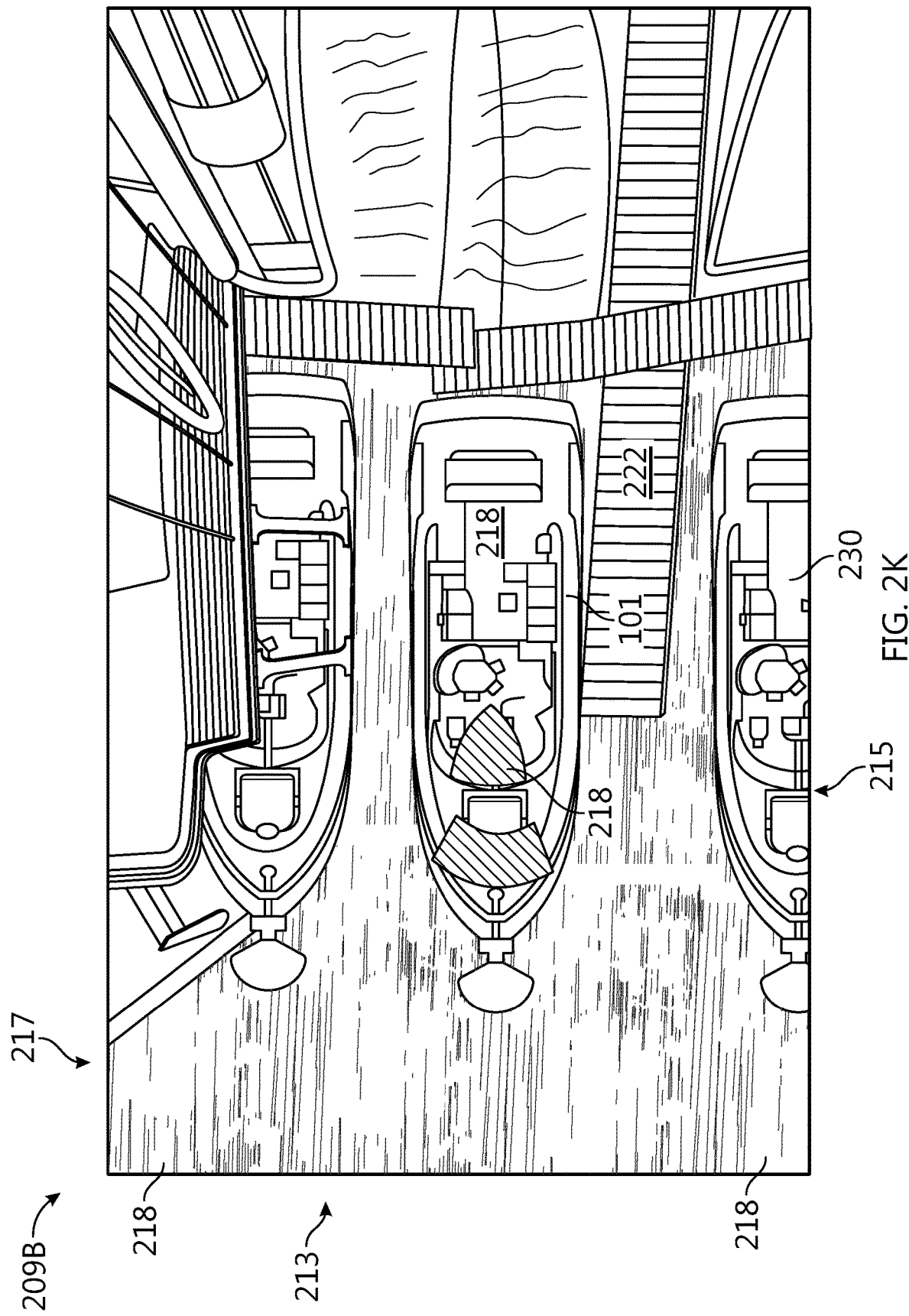

Another example is provided by display view 209B of FIG. 2K, which shows a combination of visible spectrum images captured by cameras 212, 214, and 216 coupled to mobile structure 101 and projected/mapped onto a (virtual) flat surface and rendered for display (e.g., by image analyzer 270 and/or user interface 120), but where FOVs 213, 215, and 217 corresponding to images captured by cameras 212, 214, and 216 are processed to generate a substantially isomorphic representation of at least the perimeter of mobile structure 101. Such processing may include, for example, linear and/or non-linear unwarping/dewarping, scaling, translating, cropping, resampling, image stitching/combining, and/or other image processing techniques configured to generate an isomorphic representation of at least the perimeter of mobile structure 101 from images captured by cameras 212, 214, and 216, for instance, and/or to minimize the size and/or prevalence of un-imaged areas 218.

As shown in FIG. 2K, display view 209B shows mobile structure 101 docked at dock 222 next to other watercraft 230 and/or other structures identified within FOVs 213, 215, and 217. Display view 209B also shows various un-imaged areas 218 (e.g., where the various processed FOVs fail to overlap), which may in some embodiments be left blank or supplemented with prior-image data and/or other perimeter ranging system data and/or other ranging system data.

To simplify installation and setup of perimeter ranging system 148, and generate display views 209A, 209B, and/or other display views described herein, the various camera angles can be automatically calibrated/derived/determined by capturing images while maneuvering mobile structure 101 through 360° while close to dock 222, and the resulting set of images can be used to self-calibrate for camera height, distance from a centerline of mobile structure 101, and/or other operating and/or mounting characteristics of the cameras. For example, the calibration of the cameras may be performed automatically; when the boat executes a 360° turn in a crowded environment such as a marina or port, the images that sweep past the different cameras move out of one field of view and into the next in a manner which is only consistent with the yaw rate data (e.g., from orientation sensor 140) and a single set of calibration parameters for the cameras. In alternative embodiments, range may be measured, calibrated, and/or adjusted using motion of mobile structure 101 and various image analytics applied to images captured by perimeter ranging system 148. While multiple cameras can be used in stereo to determine ranges, such arrangements undesirably add to system cost and complexity.

In some embodiments, cameras 212, 214, and 216 may be characterized by a manufacturer in a lab prior to use, or may be characterized by a user and a known geometry reference (e.g., a poster of images with known geometries placed a known distance and orientation relative to the camera), and the resulting camera characteristics may be used to determine unwarping parameters for an unwarping process that, for example, removes various types of image distortions introduced by lenses and/or other physical characteristics of cameras 212, 214, and 216. Each camera may include an orientation sensor and/or accelerometer or similar sensor configured to provide an elevation (e.g., downward pointing angle) and/or an azimuth (e.g., relative heading/bearing) corresponding to respective FOVs 213, 215, and 217, or approximate elevations and/or azimuths may be assumed for a typical mounting (e.g., 45 degree negative elevation and +−110 degree relative azimuth for lateral view cameras 214 and 216, 10 degree negative elevation and zero degree relative azimuth for forward view camera 212). Similarly, other installation geometries can be estimated or assumed (e.g., all cameras mounted at an altitude of 3 meters, forward view camera 212 2 meters longitudinally in front of lateral view cameras 214 and 216, lateral view cameras 214 and 216 3 meters laterally apart from each other).

From these measured and/or assumed/estimated installation geometries, an initial or estimated image stitching, unwarping, and/or other processing may be performed to generate the isometric representation of at least a perimeter of mobile structure 101. Such initial or estimated isometric mapping may be modified and/or refined based on isometric registration of structures imaged by spatially overlapping FOVs and/or time-spaced overlapping FOVs (e.g., as mobile structure maneuvers and/or rotates through a scene). The magnitudes of such adjustments to the isometric mapping may be adjusted over time (e.g., by a multiplicative coefficient) and be fairly aggressive initially (e.g., coefficient close or equal to 1) but taper off based on the number of co-registered structures, time of calibration, and/or other calibration parameters (e.g., coefficient trending to a value between 0.1 and zero).

Autonomous docking assist requires techniques for defining target docking positions and/or orientations, for example, and/or target docking tracks (e.g., a waypoint defined path from a current position and orientation of mobile structure 101 to a target docking position and/or orientation, which may include a series of waypoints indicating corresponding series of positions and/or orientations for mobile structure 101). Such target docking tracks may include one or more specified target linear and/or angular velocities along the track, target transit times, target mobile structure orientations, and/or other docking track characteristics, for example, which may be selected by a user and/or specified by various docking safety parameters (e.g., regulations or user-supplied limits on maneuvers within a docking area). Thus, a docking assist user interface should include display views allowing a user to specify target docking positions and/or orientations, and/or target docking tracks, as described herein.

In some embodiments, user interface 120 and/or controller 130 may be configured to render, on a display of user interface 120, a selectable image or icon representing at least the profile of mobile structure 101 over a navigational chart of a docking area and/or a camera image of an area surrounding mobile structure 101 and including the docking area, captured by perimeter ranging system 148. Such icon may be moved across the chart or image by user input (e.g., user touch, joystick input, mouse input, and/or other user input) to indicate a target docking track and/or a target docking position and/or orientation within the generated view of the docking area. Typically, a user would manually steer mobile structure 101 to a point in clear view of a target berth, then stop mobile structure 101, and then engage an autonomous docking mode. The docking assist system may be configured to hold the position and/or orientation of mobile structure 101 while the user defines the target docking track and/or a target docking position and/or orientation, which may in some embodiments be performed using a two finger slide/rotate of the icon/image corresponding to mobile structure 101 through the docking area as presented by the chart and/or image of the docking area. In some embodiments, such movement of the icon/image within the rendered view relative to various navigation hazards may be limited by a predefined minimum safety perimeter, as disclosed herein, which may be set to approximately 20 cm.

Advantageously, embodiments provide a user substantial influence over docking maneuvers; for example, the user may choose when to engage the autonomous docking process (e.g., the user may define both a starting point and an ending point of the docking maneuver). A user wishing to exercise relatively tight control over the starting point can engage the autonomous docking process closer to the target docking position, whereas a user wishing less control over the process could engage earlier, thereby allowing the docking assist system to manage more of the maneuver. In some embodiments, a safety limit may limit how early the process can be engaged, such as no further than 20 boat lengths from the target docking position.

Docking assist system 100 may also be configured to provide various types of convenience-centric target selection techniques when rendering a docking assist user interface, as described herein. For example, a docking assist user interface may include a selection of favorite or pre-memorized 'home' or commonly used target docking positions and orientations. A docking assist user interface may also include a listing of auto-prompted best docking positions corresponding to a selected docking area, a current position of mobile structure 101, a current traffic within the selected docking area, and/or other docking area characteristics and/or operational status of mobile structure 101.

In some embodiments, docking assist system 100 may be configured to detect an optical target positioned and/or held at a target dock and/or slip/berth (e.g., using perimeter ranging system 148) and determine the target docking position and/or orientation based on the position and/or orientation of the optical target. Similarly, docking assist system 100 may be configured to detect a system of fixed optical targets (e.g., provided by a marina) and identify a target docking position, orientation, and/or track indicated by the system of fixed optical targets. In a further embodiment, docking assist system 100 may be configured to identify a target docking position and/or orientation based on a berth reference (e.g., provided by user input) associated with a charted and/or imaged docking area.

In addition to receiving selection of target docking position, orientation, and/or track, docking assist system 100 may be configured to adjust and/or reroute a selected target docking position, orientation, and/or track according to navigation hazards detected along the docking track by perimeter ranging system 148 and/or any external disturbances (e.g., wind and/or water currents affecting navigation of mobile structure 101). For example, docking assist system 100 may be configured to maintain a safety perimeter to navigation hazards and/or other objects, which may be speed dependent. In some embodiments, prevailing wind and water currents may be stronger than the maximum thrust of thrust maneuver system 172, for example, or thrust maneuver system 172 may be absent, and docking assist system 100 may be configured to maintain a relatively high velocity using propulsion system 170 until relatively close to a target docking position, then use a combination of reverse thrust provided by propulsion system 170, steering input provided by steering actuator 150, and/or supplemental vectored thrust provided by optional thrust maneuver system 172 to slow and/or orient mobile structure 101 just before entering the target docking position and/or orientation.

In various embodiments, docking assist system 100 may be configured to compensate for slip dynamics of mobile structure 101 (e.g., unlike road vehicles that follow a prescribed direction of travel, watercraft slip sideways when they turn and this leeway effect can be significant at low speeds and very significant for power boats which have almost no keel) and/or for other operating characteristics of mobile structure 101, such as the effects of prop torque, which tends to turn a watercraft.

In addition, a target track for a powered watercraft will typically be different from the target track for a sailing watercraft: a sailboat can aim at the docking pontoon and turn at the last second because its keel substantially prevents sideslip; a powerboat should turn a few seconds earlier because its sideslip is typically significant and can cause the powerboat to drift sideways at the docking pontoon and potentially cause damage to its hull; a zodiac should tend to aim 45° to the side of a docking pontoon, coasting in during the last 5 or so seconds, and applying a burst of full reverse helm in the last 2 or so seconds, to slow the zodiac and tuck its stern into the docking berth.

The simplest target docking tracks are for mobile structures with thrust maneuver systems providing full control of sideways and rotational thrust. However, in the general case, a docking track generation process is non-linear and cannot be solved simply. As such, embodiments disclosed herein may be configured to execute a control loop including a non-linear dynamic model of mobile structure 101, including navigation control system 190, sideslip characteristics, and wind and water current disturbances, and computing such model iteratively with respect to a starting state of mobile structure 101, a target docking position and orientation, and known navigation hazards. Such model provides target linear and angular velocities along the target docking track and can anticipate slide-slip. Embodiments disclosed herein may also designate a target docking track according to a set of predefined docking track patterns which are linked mobile structure type. Such patterns may be adjusted to fit a particular docking area and/or circumstance. Such docking track patterns may in some embodiments be learned from a user providing user input during a manual docking process, such as part of a training process; this can be done in real time or offline from a large database of recorded docking maneuvers. More specifically with regard to a docking assist user interface, docking assist system 100 may be configured to receive a target docking track as user input provided to user interface 120 as the user drags the icon/image of mobile structure 101 across a rendered chart or image of a docking area to a target docking position.

Figure 3A:
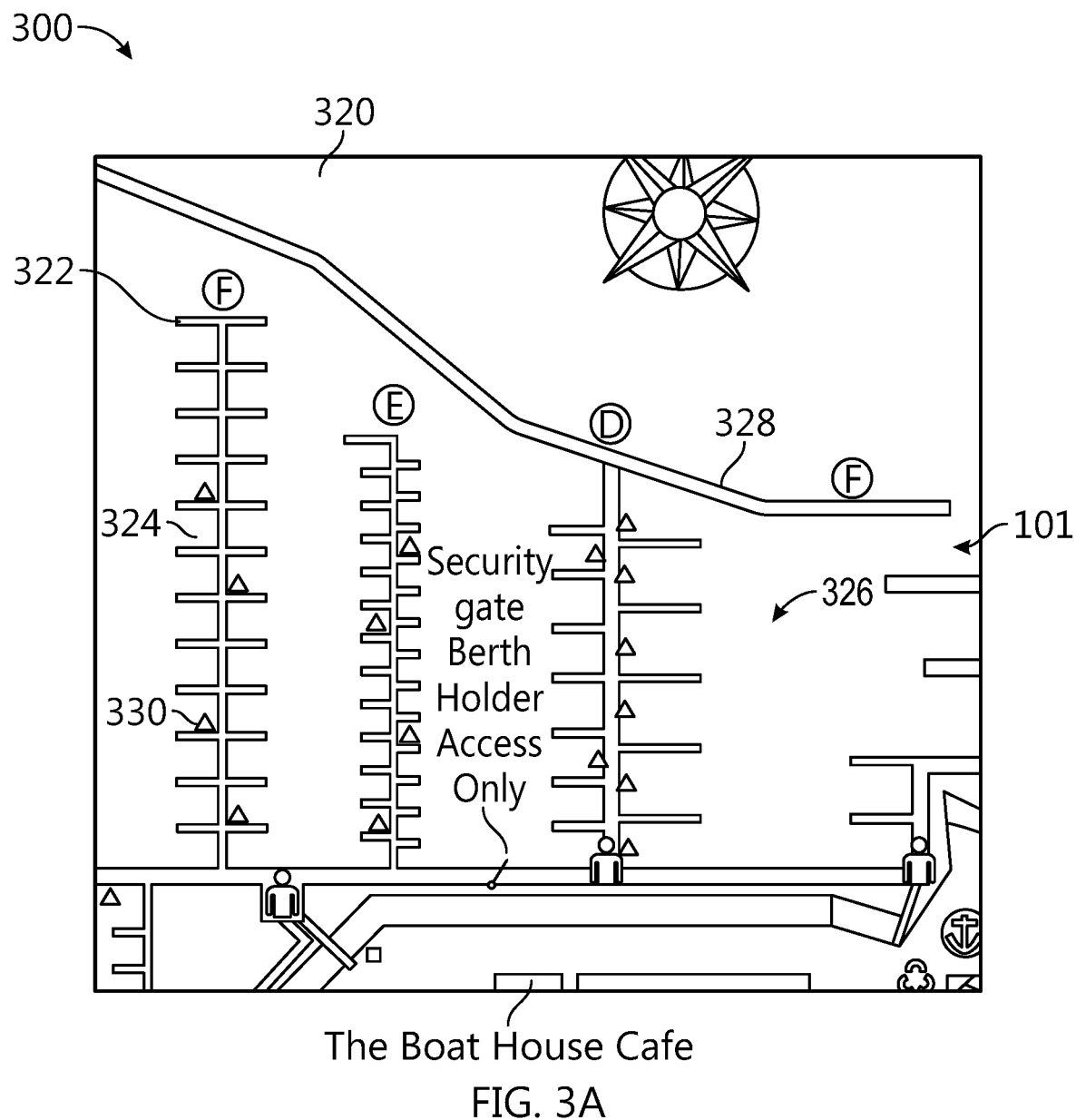
FIGS. 3A-E show display views and target docking tracks for a docking assist system in accordance with an embodiment of the disclosure.

FIGS. 3A-E show display views and selected target docking tracks for a docking assist system in accordance with an embodiment of the disclosure. For example, display view 300 of FIG. 3A shows a chart 320 of a docking area proximate mobile structure 101 and including multiple docks 322, slips or berths 324, docking area channels 326, sea wall 328, and other watercraft 330. In some embodiments, a user may select icon 101 (corresponding to a position of mobile structure 101) and drag it along channel 326 to a target docking position 324. In display view 300, a pop up menu may be provided to select a target docking orientation for mobile structure 101, since icon 101 only indicates position. In other embodiments, a user may select a berth or slip ID and docking assist system 100 may be configured to determine a target docking track to the corresponding berth or slip 324. Docking assist system 100 may be configured to adjust the determined target docking track according to various docking safety parameters and/or charted navigation hazards, for example, and may be configured to evade uncharted navigation hazards while maneuvering along the determined target docking track, as described herein.

Figure 3B:
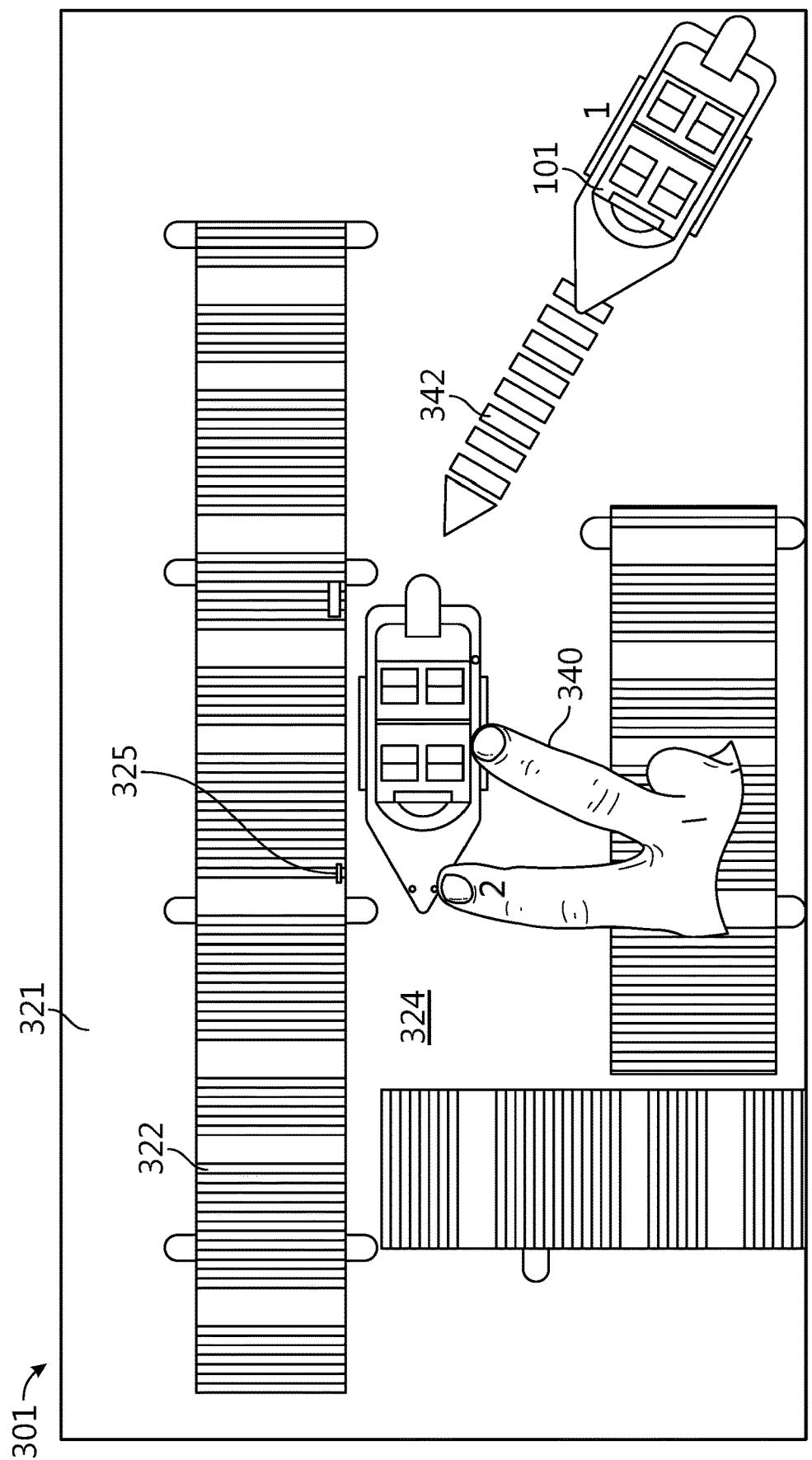
Figure 3C:
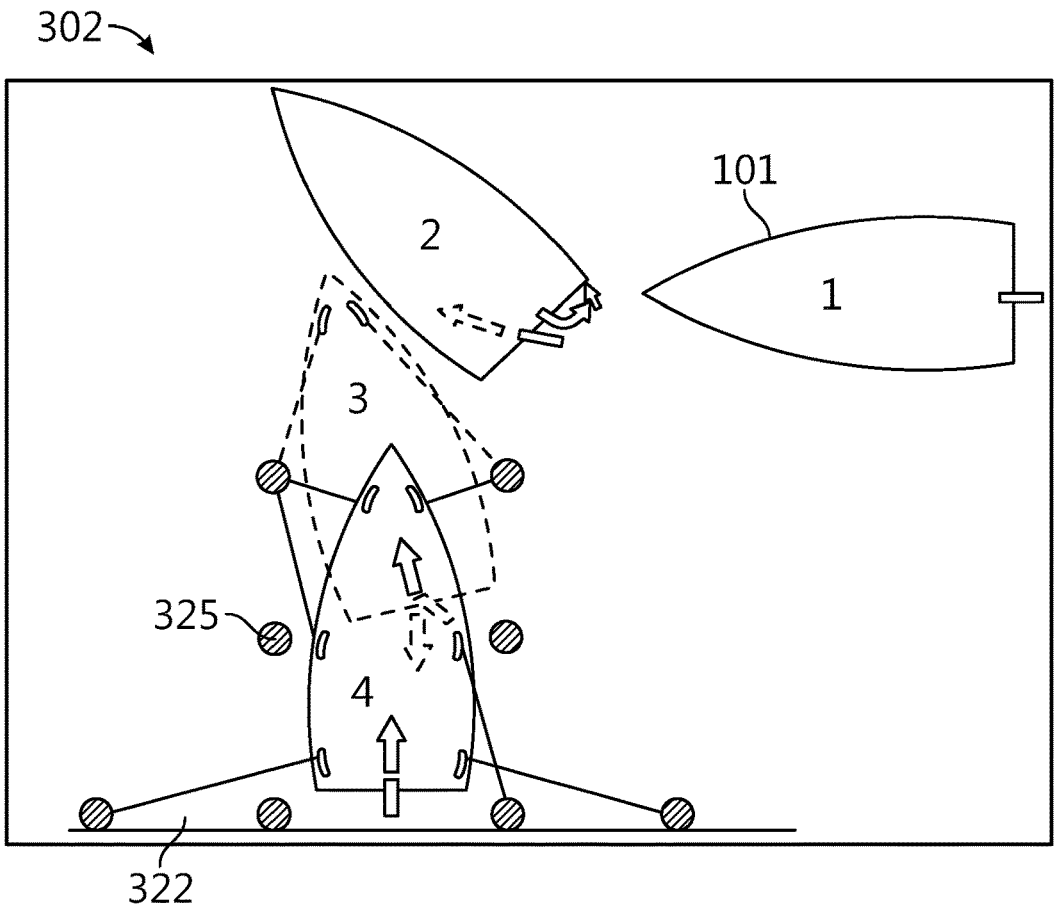

Display view 301 of FIG. 3B shows an image 321 of a docking area proximate mobile structure 101 and including docks 322, slip 324, and mooring lines 325. Also shown in display view 301 is a user providing user selection 340 to drag mobile structure icon 101 from starting position and/or orientation "1" along target docking track 342 and to target docking position and/or orientation "2". In some embodiments, a user may employ a two finger touch to a touchscreen display of user interface 120 to identify target docking track 342 and/or target docking position and/or orientation "2". A user may employ similar techniques to designate the target docking track ("1" through "4" and/or target docking position and/or orientation "4" in display view 302 of FIG. 3C. Display view 302 illustrates it can be nonobvious how a user wishes to dock mobile structure 101, and in the illustrated example, the user has chosen to be stern too, rather than side or bow too. Even when side too, a user may choose port or starboard sides as preferred due to wind direction, proximity to friends next door, facility to refuel, etc. Also shown in display view 302 are posts 325, which may be used to moor mobile structure 101.

Figure 3D:
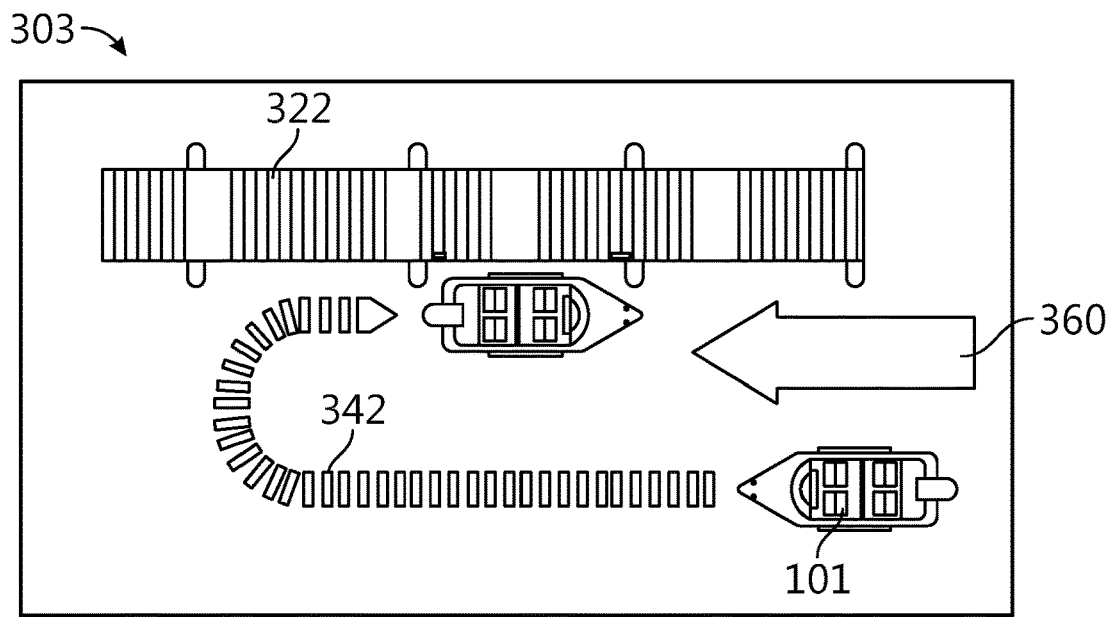
Figure 3E:
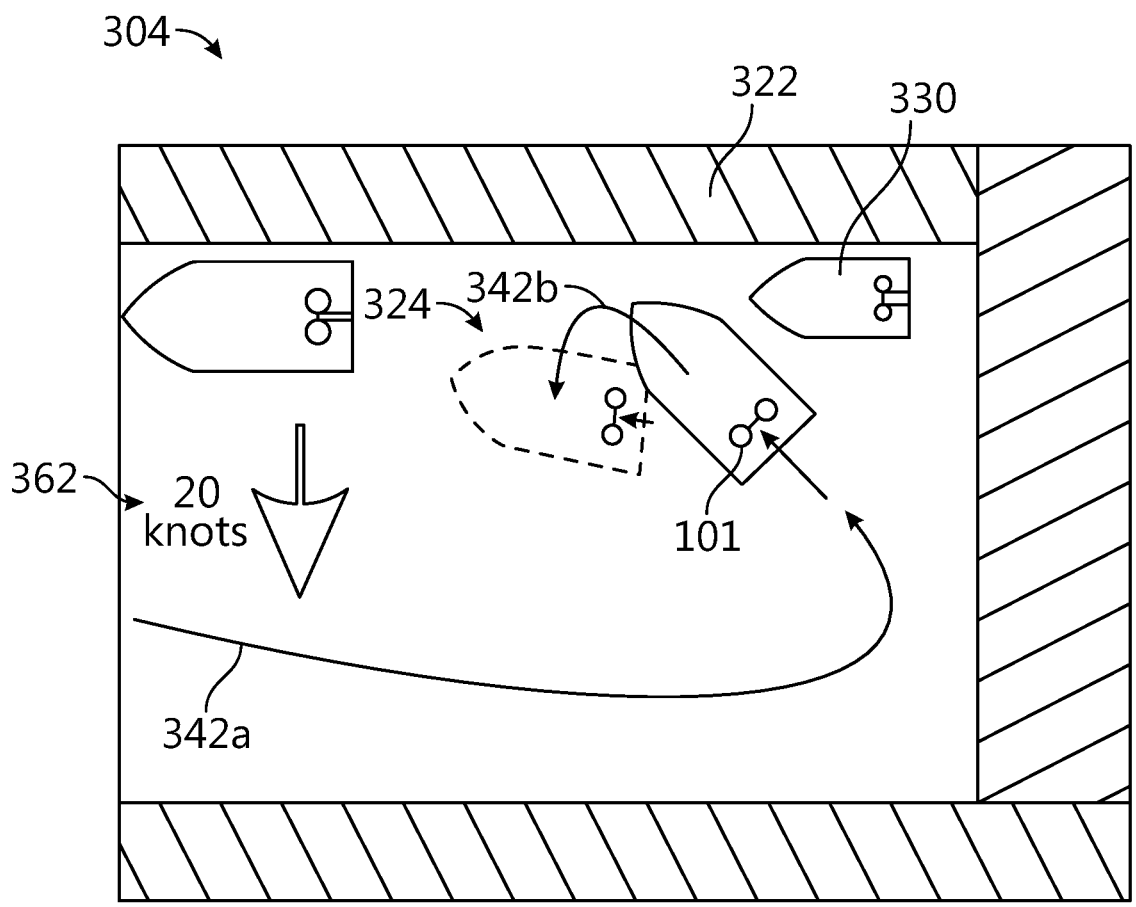

Display view 303 of FIG. 3D shows an image or chart of a docking area proximate mobile structure 101 and including dock 322, target docking path 342, and water current disturbance indicator 360. As shown, docking assist system 100 has determined target docking path 342 so as to compensate for water current disturbance 360 and simplify docking of mobile structure 101 to dock 322. Display view 304 of FIG. 3E shows and image or chart of a docking area proximate mobile structure 101 and including dock 322, slip 324, other docked watercraft 330, initial portion of target docking path 342a, final portion of target docking path 342b, and wind disturbance indicator 362. As shown, docking assist system 100 has determined target docking paths 342a and 342b so as to compensate for wind disturbance 362 and dock mobile structure 101 at slip 324 of dock 322.

A particular selected target docking operation (e.g., a target docking position, orientation, and/or track) may or may not be achievable given the available maneuvering capability of mobile structure 101 and/or a distribution of navigation hazards and/or corresponding docking safety parameters. Docking assist system 100 may be configured to evaluate a selected target docking operation and allow or confirm or engage such selection only if the operation is achievable. To evaluate a selected target docking operation, docking assist system 100 may be configured to simulate the target docking process using a dynamic model of the docking process, including maneuvering characteristics of mobile structure 101 and any navigation hazards and/or external disturbances, as described herein. Such dynamic model (e.g., described more fully with respect to FIGS. 4-11 and 13-24) may be used to simulate and thereby evaluate a selected target docking track, for example, and to automatically determine a target docking track (e.g., based, at least in part, on a selected target docking position and/or orientation). Moreover, such dynamic model may be used to evade a navigation hazard and/or to compensate for changing external disturbances.

For assisted docking, as opposed to fully autonomous docking, a user may provide primary control of maneuvering of mobile structure 101 through user interface 120 (e.g., a helm or joystick, for example), and docking assist system 100 may be configured to adjust and/or modify such user input to facilitate docking of mobile structure 101, such as by providing for intuitive control of maneuvering of mobile structure 101 and/or by overriding or modifying user input that would otherwise risk damage caused by impact with navigation hazards.

For example, docking assist system 100 may be configured to convert a standard joystick thrust controller (e.g., providing forward, backward, sideways, and/or rotational thrust in response to user input manipulating the joystick) into a joystick velocity controller (e.g., providing a linear and/or angular velocity in response to user input manipulating the joystick). Such conversion results in a controller that is analogous to cruise control in a road vehicle where the throttle pedal is switched out for a speed demand. Such conversion may be based on known characteristics of mobile structure 101 and navigation system 190, for example, or may be based on system characteristics derived from a calibration process, such as a sea trial, where the control signals are provided to navigation control system 190 and the resulting motion of mobile structure 101 and other effects are measured (e.g., using sensors 140-148), creating calibration parameters linking control signal input and motive reaction.

A sideslip factor for mobile structure 101 may also be determined based on such sea trial calibrations, for example, or may be provided by a manufacturer. Such calibration processes would typically be performed while perimeter ranging system 148 is active and able to operate sufficiently well to estimate velocity based on perimeter sensor data corresponding to nearby navigation hazards, for example, but where mobile structure 101 is not at risk of collision with navigation hazards. Wind and/or water currents, and/or other external disturbances, may be estimated using such systems, such as by placing docking assist system 100 in a hover mode (e.g., by providing user input corresponding to a dead stick input to user interface 120), where the target linear and/or angular velocities are substantially zero, such as prior to engaging autonomous docking, as described herein. Any thrust necessary to keep mobile structure 101 from moving may be attributed to an appropriate external disturbance (e.g., as modulated by other sensors, such as speed sensor 142).

In related embodiments, docking assist system 100 may be configured to provide "brakes" for mobile structure 101 corresponding to such hover mode, where the system uses navigation control system 190 to keep mobile structure substantially still, even while buffeted by various external disturbances. Docking can be frightening, especially so when wind or water currents are strong. Aside from anchors, which are severely limited in application when attempting to maneuver into a docking area, there are no true brakes for watercraft, and so it often requires continual skillful thrust control to hover a watercraft using conventional navigation controllers. By converting the thrust controller into a velocity controller, as described herein, embodiments allow a user to hover or halt mobile structure 101 simply by letting go of the joystick. In some embodiments, controller 130 may be configured to limit a linear and/or angular velocity generated by docking assist system 100 to a value that can be sufficiently counteracted to hover mobile structure 101 within a predefined period of time (e.g., 2-3 seconds) and/or a predefined linear and/or angular motion of mobile structure 101 (e.g., 0.5 meters and/or 1 degree of rotation). Such control is more intuitive, particularly for novice users, and provides an additional safety measure when utilizing docking assist, where fine navigation control can be critical.

In additional embodiments, docking assist system 100 may be configured to provide collision avoidance while substantially adhering to the provided user input. For example, embodiments of the present disclosure provide full control over the path mobile structure 101 takes and provide the ability to stop at any time. In addition, by monitoring a perimeter about mobile structure 101, embodiments are able to modify and/or override user input to prevent a collision, such as if a user overlooks a detected navigation hazard, tries to approach a dock at too high a speed, or otherwise makes a navigation mistake.

FIGS. 4-11 illustrate flow diagrams of control loops to provide docking assist (e.g., assisted and/or fully automated docking) in accordance with embodiments of the disclosure. In some embodiments, the operations of FIGS. 4-11 may be performed by controller 130 processing and/or operating on signals received from one or more of sensors 140-148, navigation control system 190, user interface 120, and/or other modules 180. For example, in various embodiments, control loop 400 (and/or other control loops of FIGS. 5-11) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS," and/or U.S. Patent application Ser. No. 14/321,646 filed Jul. 1, 2014 and entitled "STABILIZED DIRECTIONAL CONTROL SYSTEMS AND METHODS," each of which are hereby incorporated by reference in their entirety.

In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of in the control loops may be performed in an order or arrangement different from the embodiment illustrated by FIGS. 4-11. For example, although control loop 400 includes block 440, in other embodiments, block 440 may not be present, for example, and/or may be replaced with one or more sensors providing corresponding measured data.

Figure 4:
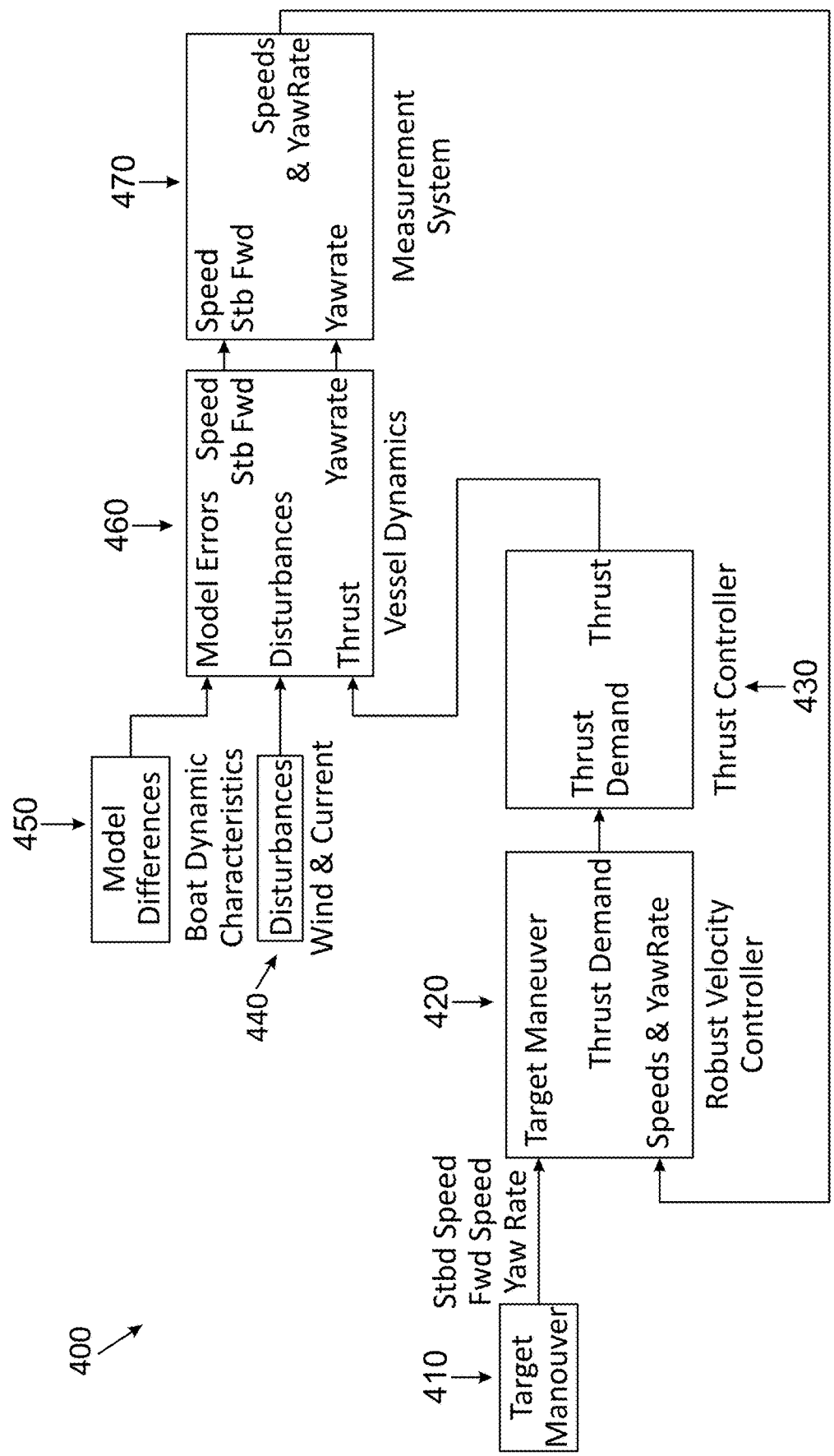
FIGS. 4-11 illustrate flow diagrams of control loops to provide docking assist in accordance with embodiments of the disclosure.

As shown in FIG. 4, control loop 400 includes target maneuver block 410 providing a target linear and/or angular velocity for mobile structure 101 to velocity controller block 420. Target maneuver block 410 may be configured to receive a time series of user input from user interface 120, for example, and convert it into a corresponding time series of target linear and/or angular velocities. For example, target maneuver block 410 may be configured to effectively convert a thrust controller into a velocity controller, as described herein. Such conversion may be based, at least in part, on a maximum linear and/or angular thrust for navigation control system 190 and/or thrust maneuver system 172, for example, such that the maximum linear and/or angular velocity output by target maneuver block 410 is limited by the time or distance it would require to hover mobile structure 101 given maximum counteracting linear and/or angular thrust, as described herein. In other embodiments, target maneuver block 410 may be configured to receive a time series of target linear and/or angular velocities corresponding to a target docking track and/or a target docking position and/or orientation, as described herein, which may be adjusted to evade one or more navigation hazards, and forward them on to velocity controller block 420.

Velocity controller block 420 receives the target linear and/or angular velocity from target maneuver block 410 and a current measured linear and/or angular velocity of mobile structure 101 from measurement block 470 and generates a thrust demand (e.g., a linear and/or angular thrust demand) based on the received target and current linear and/or angular velocities and provides it to thrust controller block 430. When control loop 400 is used to model maneuvering of mobile structure 101, thrust controller 430 simply converts the thrust demand into a corresponding thrust force (e.g., a linear and/or angular thrust force) and provides the thrust force to vessel dynamics block 460. When control loop 400 is used to control maneuvering of mobile structure 101, thrust controller 430 may be configured to provide docking assist control signals corresponding to the thrust demand received from velocity controller 420 to navigation control system 190 (e.g., to one or more of steering sensor/actuator 150, propulsion system 170, and/or thrust maneuver system 172) in order to control maneuvering of mobile structure 101.

When control loop 400 is used to model maneuvering of mobile structure 101, vessel dynamics block 460 aggregates the thrust force provided by thrust controller 430, external disturbance velocities provided by disturbances block 440, and/or model errors provided by model error block 450 and converts them into expected linear and angular velocities for mobile structure 101, which are then provided to measurement block 470. While control loop 400 is used to model maneuvering of mobile structure 101, measurement block 470 may be configured to receive the expected linear and angular velocities for mobile structure 101 from vessel dynamics block 460 and generate simulated measurements of the expected linear and angular velocities for mobile structure 101 (e.g., by adding in a measurement delay, for example), which are then provided to velocity controller 420 to update the model.

When control loop 400 is used to control maneuvering of mobile structure 101, measurement block 470 may be configured to receive measured linear and angular velocities for mobile structure 101 (e.g., from sensors 140-148) and provide them to velocity controller 420 to proceed through another iteration of control loop 400. In some embodiments, measurement block 470 may be configured to receive or request such measurements upon receiving expected linear and angular velocities for mobile structure 101 from vessel dynamics block 460, so as to provide timing linking for control loop 400, for example. Other timing linking for control loop 400 may be accomplished by receiving or requesting such measurements upon navigation control system 190 receiving docking assist control signals from thrust controller 430. In alternative embodiments, measurement block 470 may be configured to operate asynchronously with respect to one or more other blocks of control loop 400.

Figure 5:
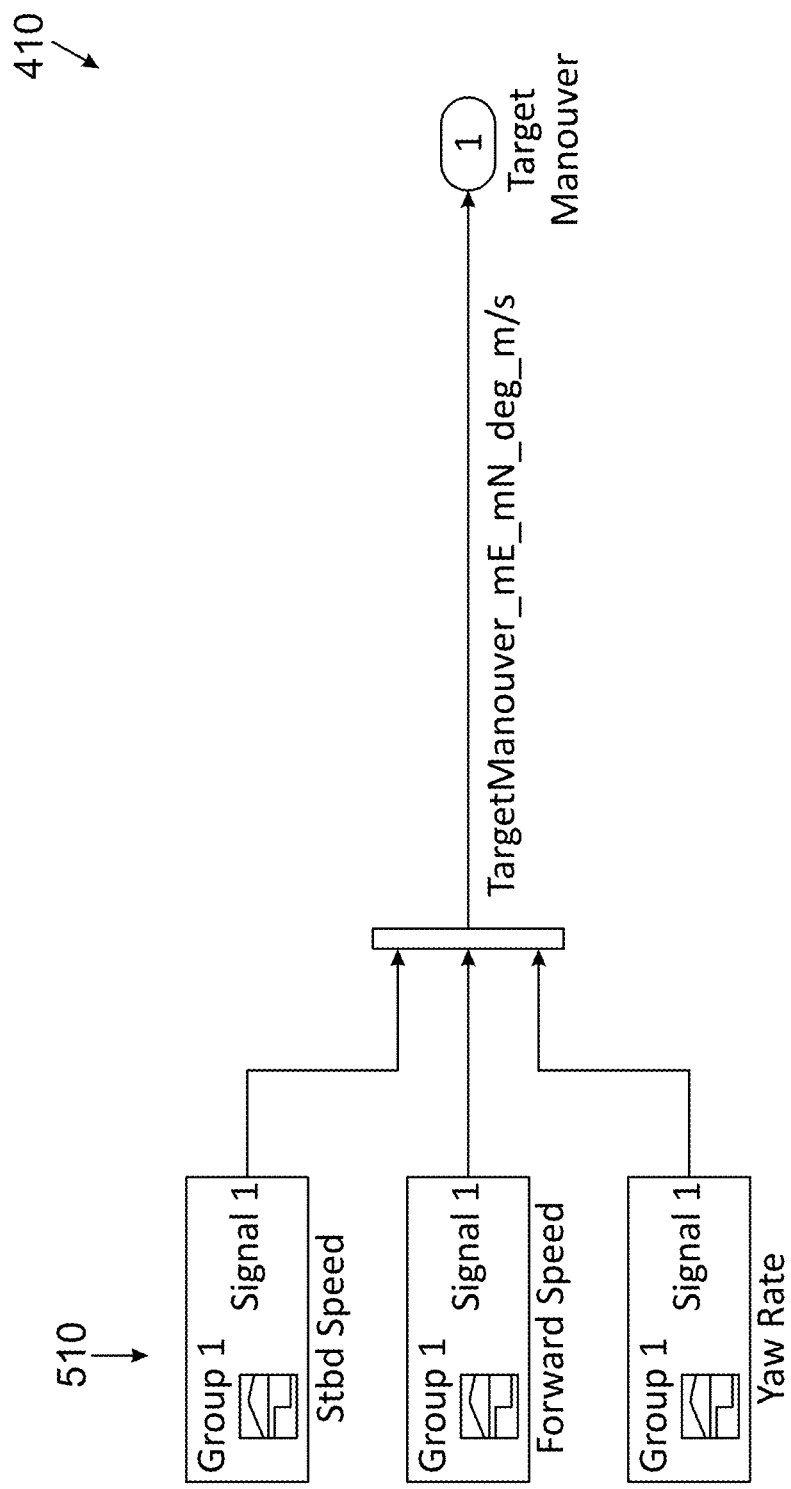

As shown in FIG. 5, in some embodiments, target maneuver block 410 may include input blocks 510 configured to receive a time series of user input from user interface 120 and convert the time series of user input into target linear and angular velocities for mobile structure 101, for example, or to receive a time series of target linear and/or angular velocities corresponding to a target docking track and/or docking position and/or orientation, and forward the time series of target linear and angular velocities as output of target maneuver block 410.

Figure 6:
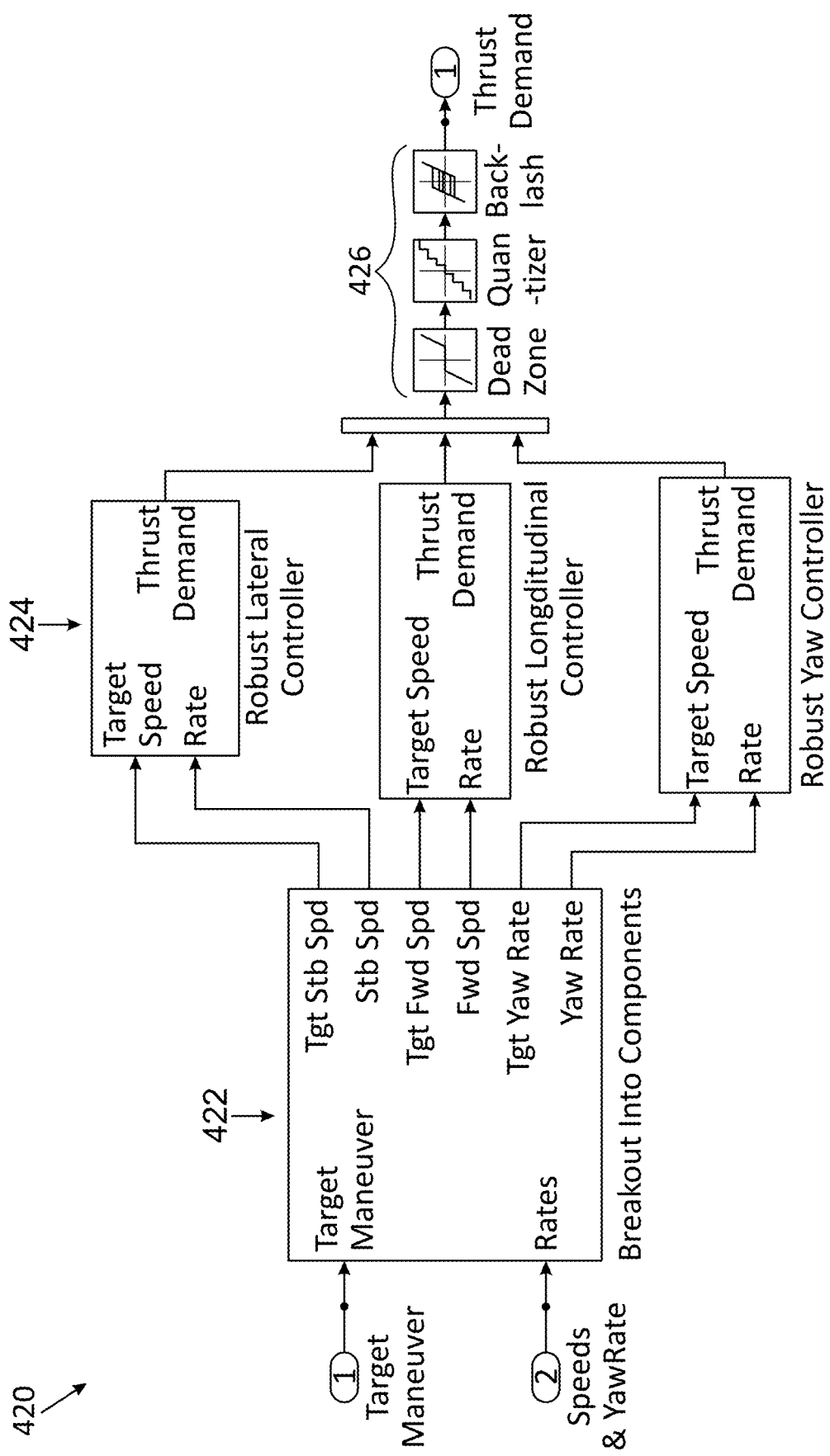
Figure 7:
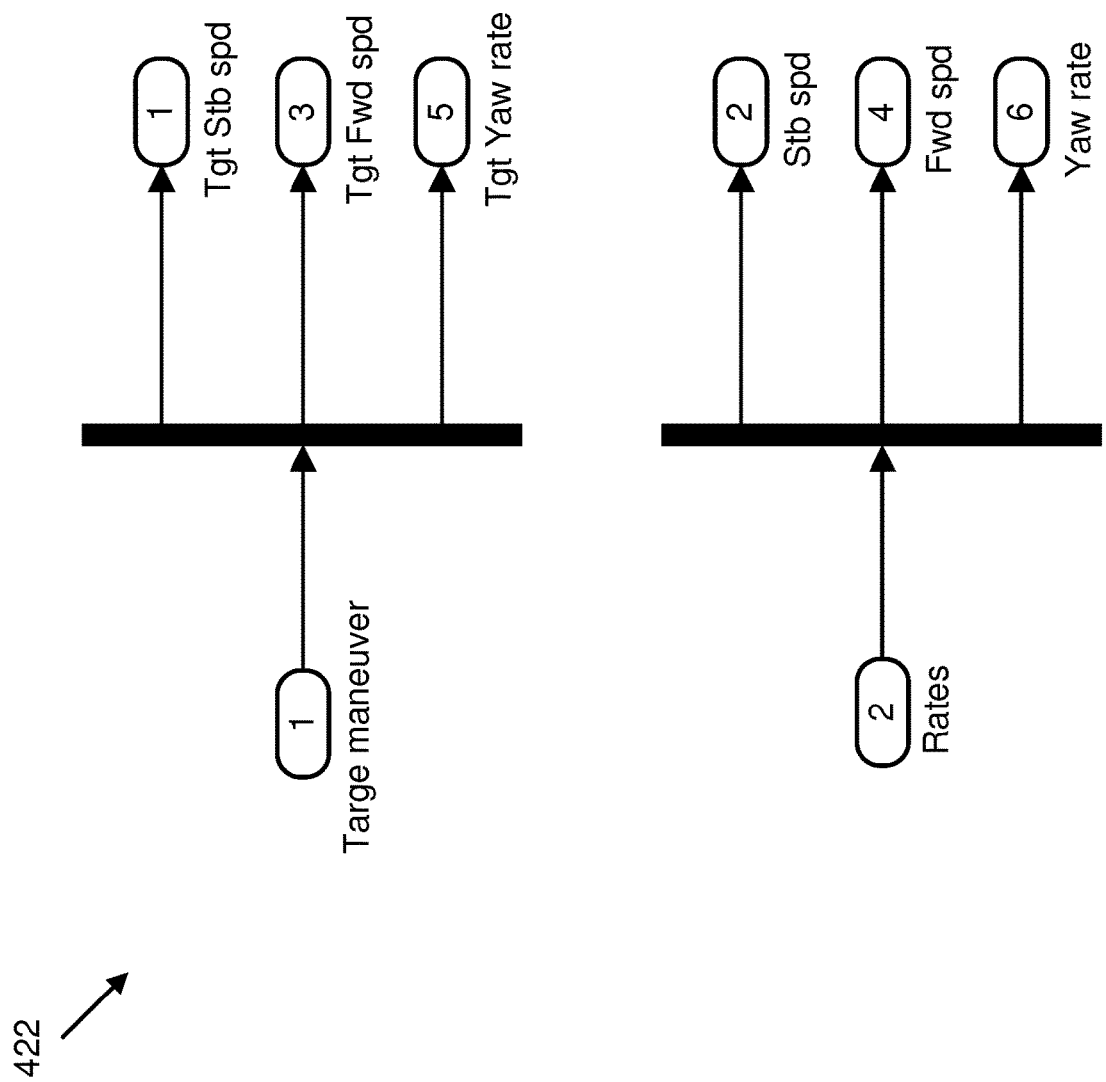
Figure 8:
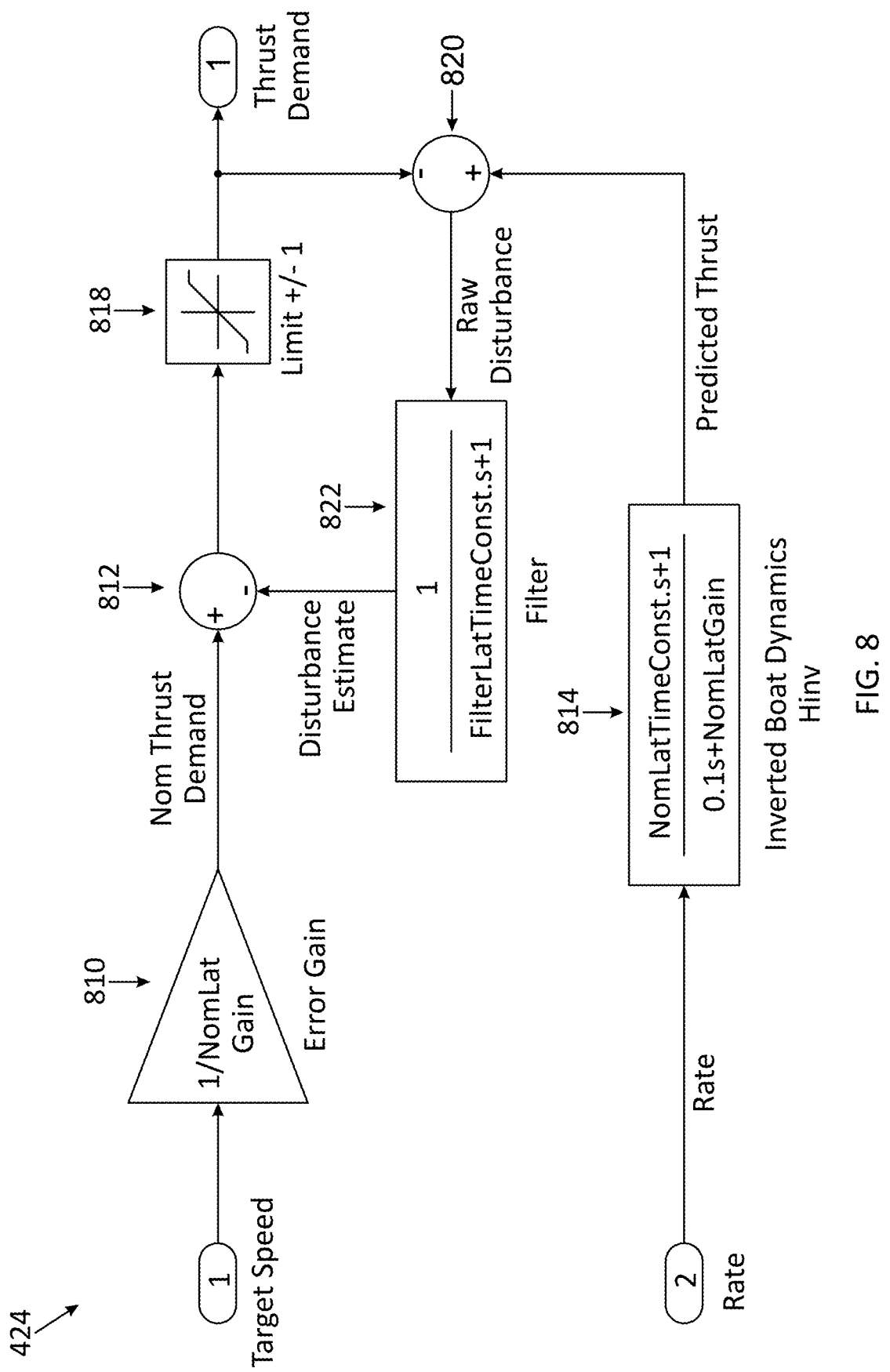

As shown in FIG. 6, in some embodiments, velocity controller 420 may include breakout block 422, thrust demand blocks 424, and thrust demand conditioner blocks 426. As shown in FIG. 7, breakout block 422 may be configured to receive target and current linear and angular velocities for mobile structure 101 and split them into components to be provided to thrust demand blocks 424. As shown in FIG. 8, (e.g., showing only lateral velocities, though similar to longitudinal and rotational (yaw) velocities) each thrust demand block 424 may be configured to generate a linear or angular thrust demand based on corresponding target and current linear or angular velocities for mobile structure 101. In FIG. 8, the current velocity is converted into a predicted thrust force by block 814 (e.g., based on an inverted dynamic model for a nominal vehicle corresponding to mobile structure 101). The target velocity is converted into a nominal thrust demand by block 810, combined with the predicted thrust force at block 820, and the resulting raw disturbance is fed back into the nominal thrust demand at block 812 to produce the thrust demand as output. Blocks 818 and 822 clamp and filter the feedback loop, respectively, so that the output thrust demand is within bounds and to reduce a noise level of the raw disturbance, and therein, the output thrust demand. Thrust demand conditioner blocks 426 further condition the thrust demand before providing it as output by limiting minor numerical oscillations and large signal changes (e.g., which could otherwise overwork the navigation controller and/or cause it to fail).

Figure 9A:
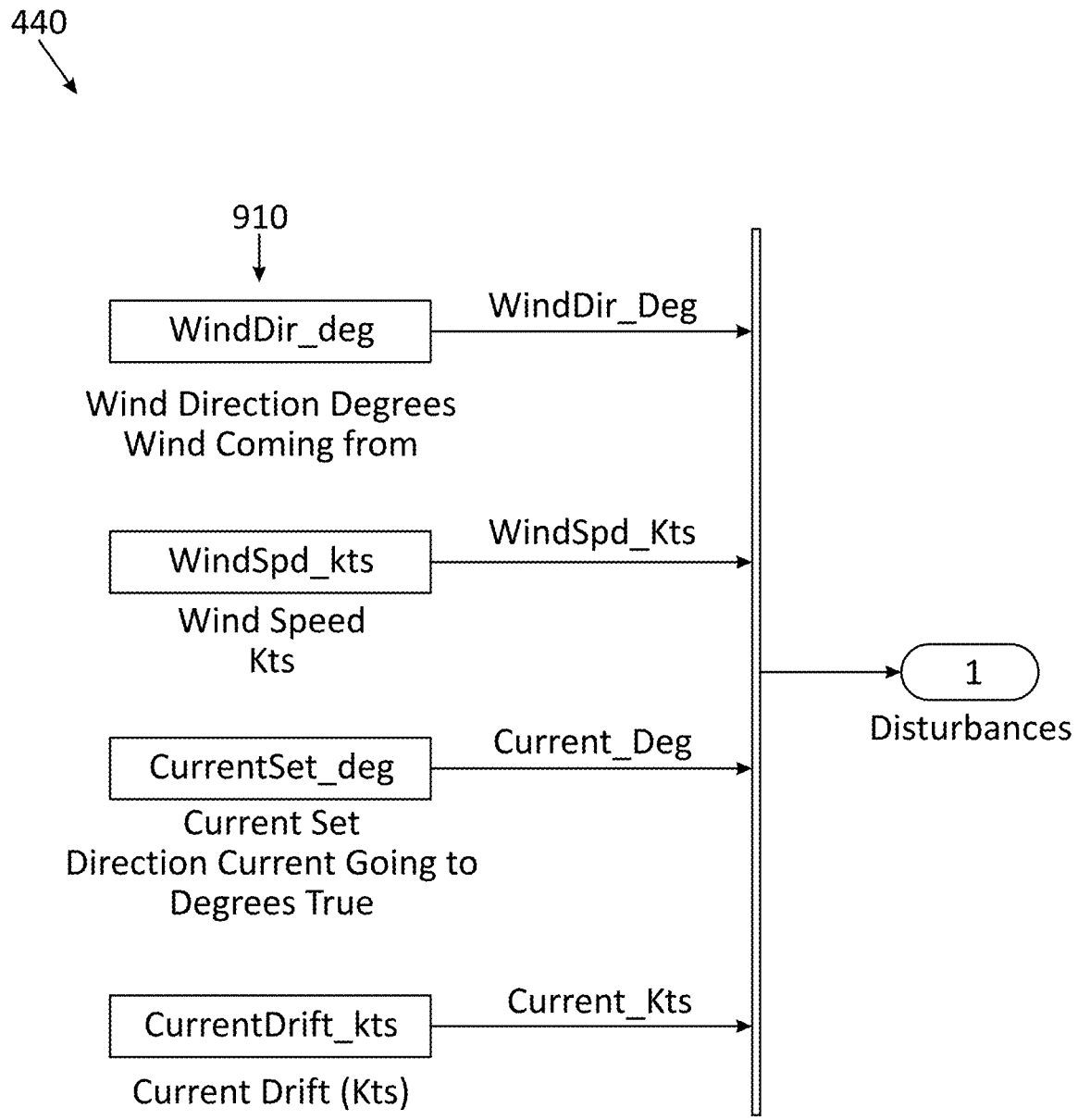

As shown in FIG. 9A, in some embodiments, disturbances block 440 may include disturbance inputs 910 receiving measurements corresponding to wind velocities and water current velocities (e.g., magnitude and direction) and be configured to provide the disturbances as a single output to vessel dynamics block 460. In other embodiments, disturbances block 440 may be configured to receive other collateral sensor data, such as GNSS data and/or wind or water speed data, for example, and to determine the wind and water current velocities based on the collateral sensor data, as described herein.

Figure 9B:
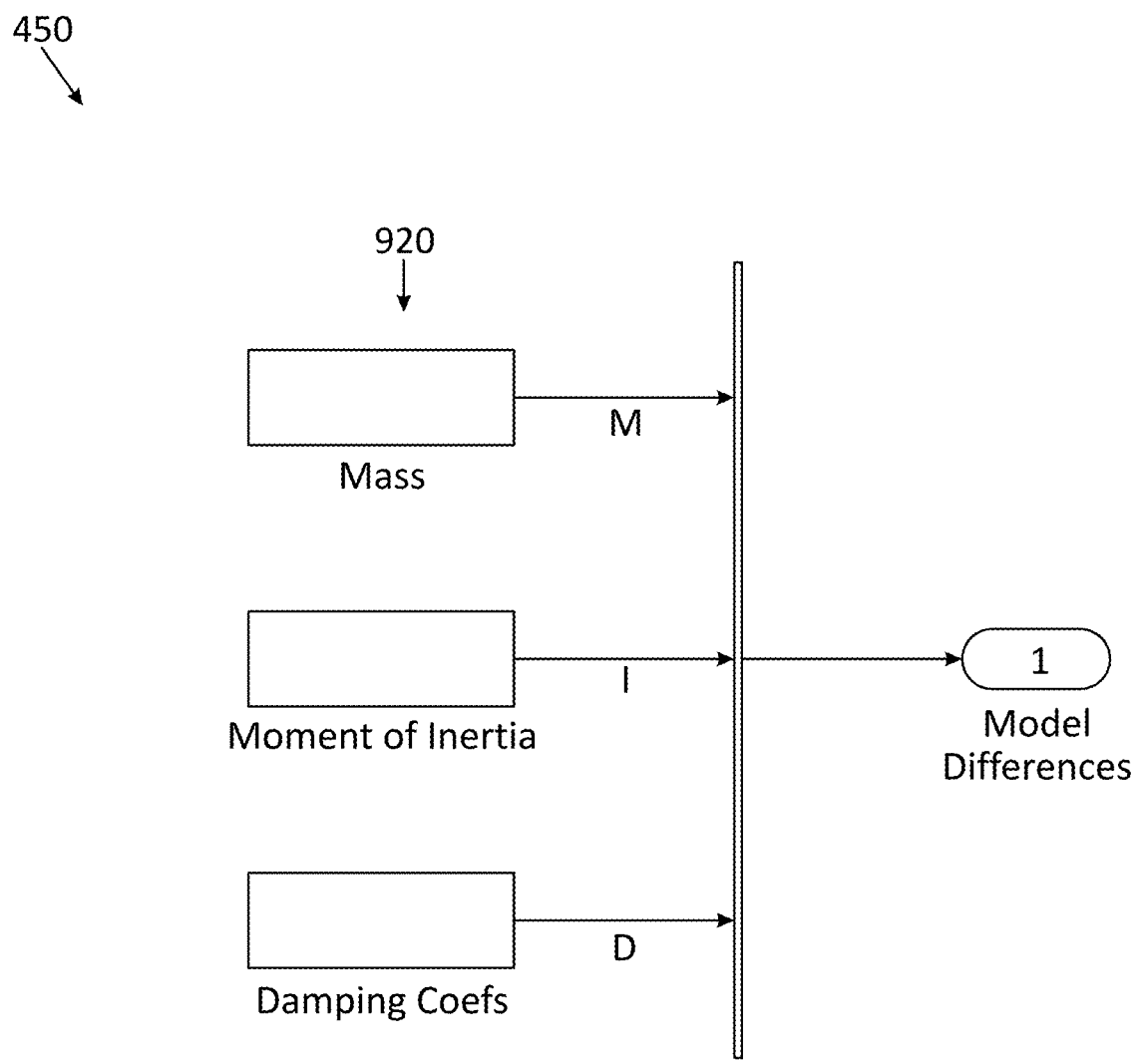

As shown in FIG. 9B, in some embodiments, model error block 450 may include model inputs 920 receiving mobile structure characteristics (e.g., mass, moment of inertia, and any motion damping coefficients, such as direction/rotation-specific and/or medium-specific damping coefficients) corresponding to mobile structure 101 and be configured to provide the mobile structure characteristics as a single output to vessel dynamics block 460. In other embodiments, model error block 450 may be configured to receive other collateral sensor data, such as GNSS data and/or wind or water speed data, for example, and to estimate the mobile structure characteristics based on the collateral sensor data, as described herein.

Figure 10:
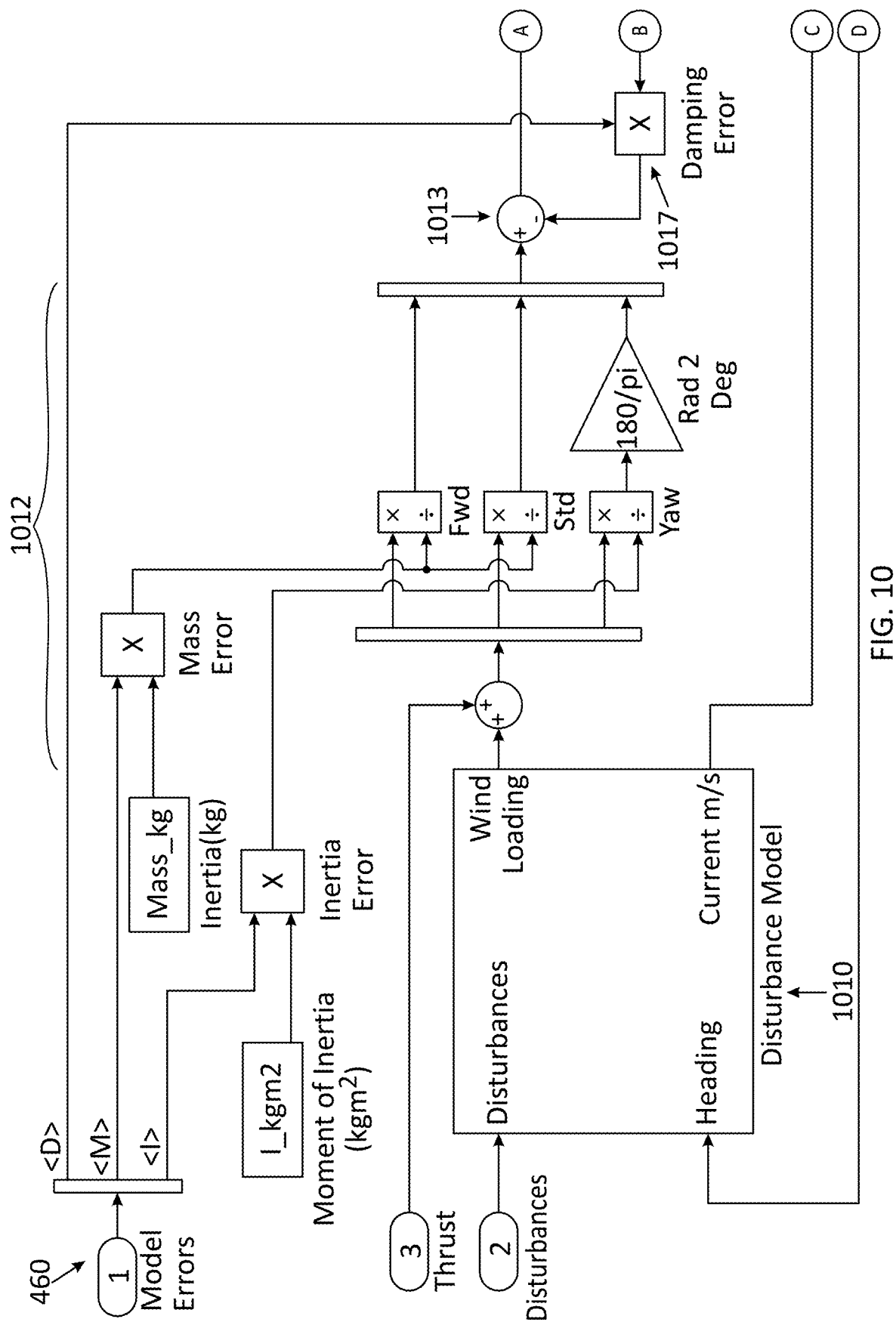
Figure 10:
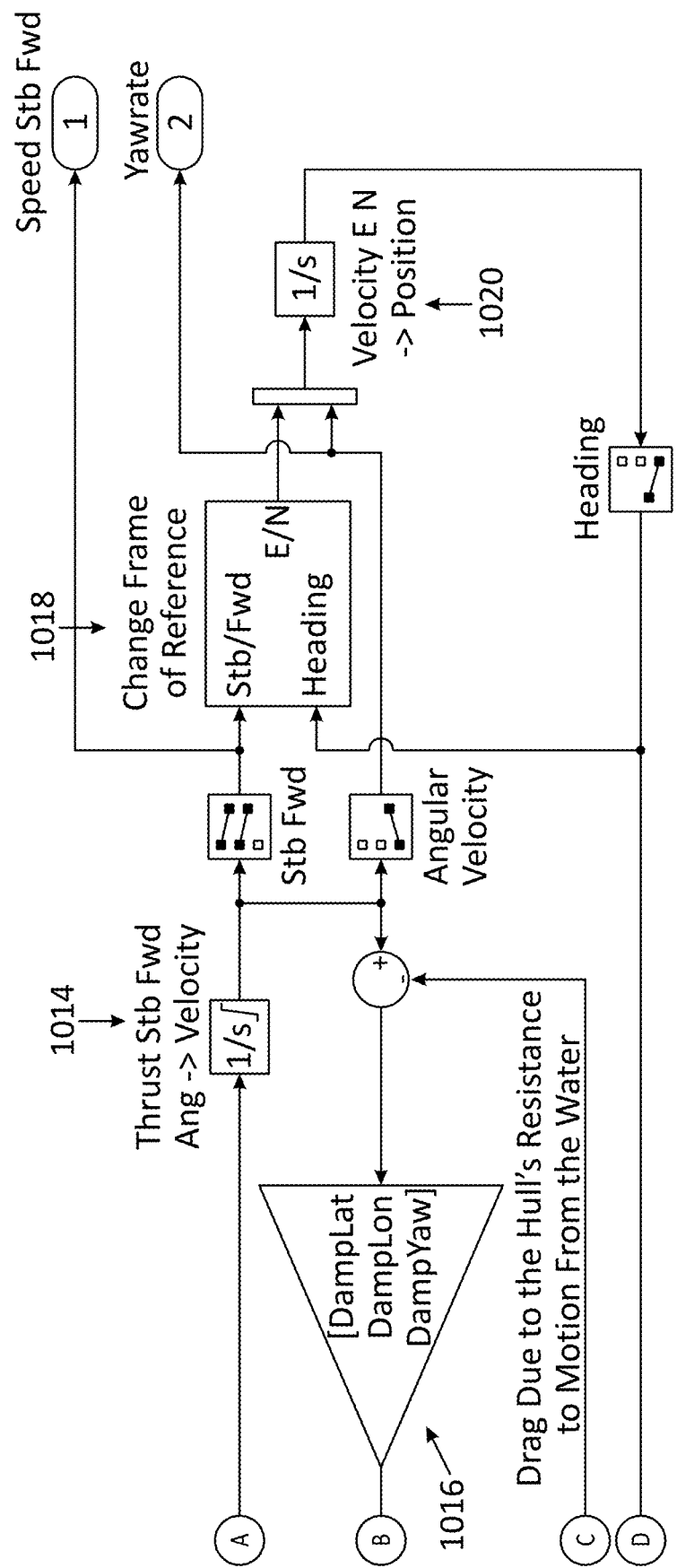

As shown in FIG. 10, in some embodiments, vessel dynamics block 460 may include disturbance model block 1010, which may be configured to receive disturbance velocities and an estimated heading for mobile structure 101 and provide a wind force (e.g., dependent on an orientation of mobile structure 101 relative to the wind direction) and a water current velocity. In some embodiments, disturbance model block 1010 may be implemented similarly to disturbance model block 1710 illustrated in detail in FIG. 18. The wind force is combined with the thrust force (e.g., provided by thrust controller 430 in FIG. 4) and provided to combinatorial blocks 1012.

Combinatorial blocks 1012 convert the model errors corresponding to linear and rotational inertia into mass and inertia errors and divide the already combined wind and thrust forces by the mass and inertia errors to produce a model and disturbance corrected thrust acceleration. The corrected thrust acceleration is integrated by block 1014 to provide an expected linear and angular velocity for mobile structure 101, which is then output by block 460. The water current velocity is combined with the expected linear and angular velocity for mobile structure 101 provided by block 1014 and the resulting relative water velocity is provided to motion damping block 1016. Motion damping block 1016 determines the drag acceleration (e.g., related to drag force) on mobile structure 101 caused by its relative motion within a body of water and provides it to block 1017. Block 1017 applies a drag error to the drag acceleration to generate a corrected drag acceleration, which is combined with the corrected thrust acceleration provided by combinatorial blocks 1012, as part of a feedback loop, at block 1013.

In some embodiments, vessel dynamics block 460 may also include reference frame conversion block 1018 configured to convert the expected linear velocity of mobile structure 101 provided by block 1014 (e.g., which may be in a lateral/longitudinal local reference frame for mobile structure 101) into an expected linear velocity as represented in an absolute reference frame (e.g., east and north), which may be combined with the expected angular velocity of mobile structure 101 provided by block 1014 and provided to integrator block 1020 to provide a heading of mobile structure 101 (e.g., which may be fed back to blocks 1010 and 1018, as shown). In some embodiments, reference frame conversion block 1018 may be implemented similarly to reference frame conversion block 1718 illustrated in detail in FIG. 19.

Figure 11:
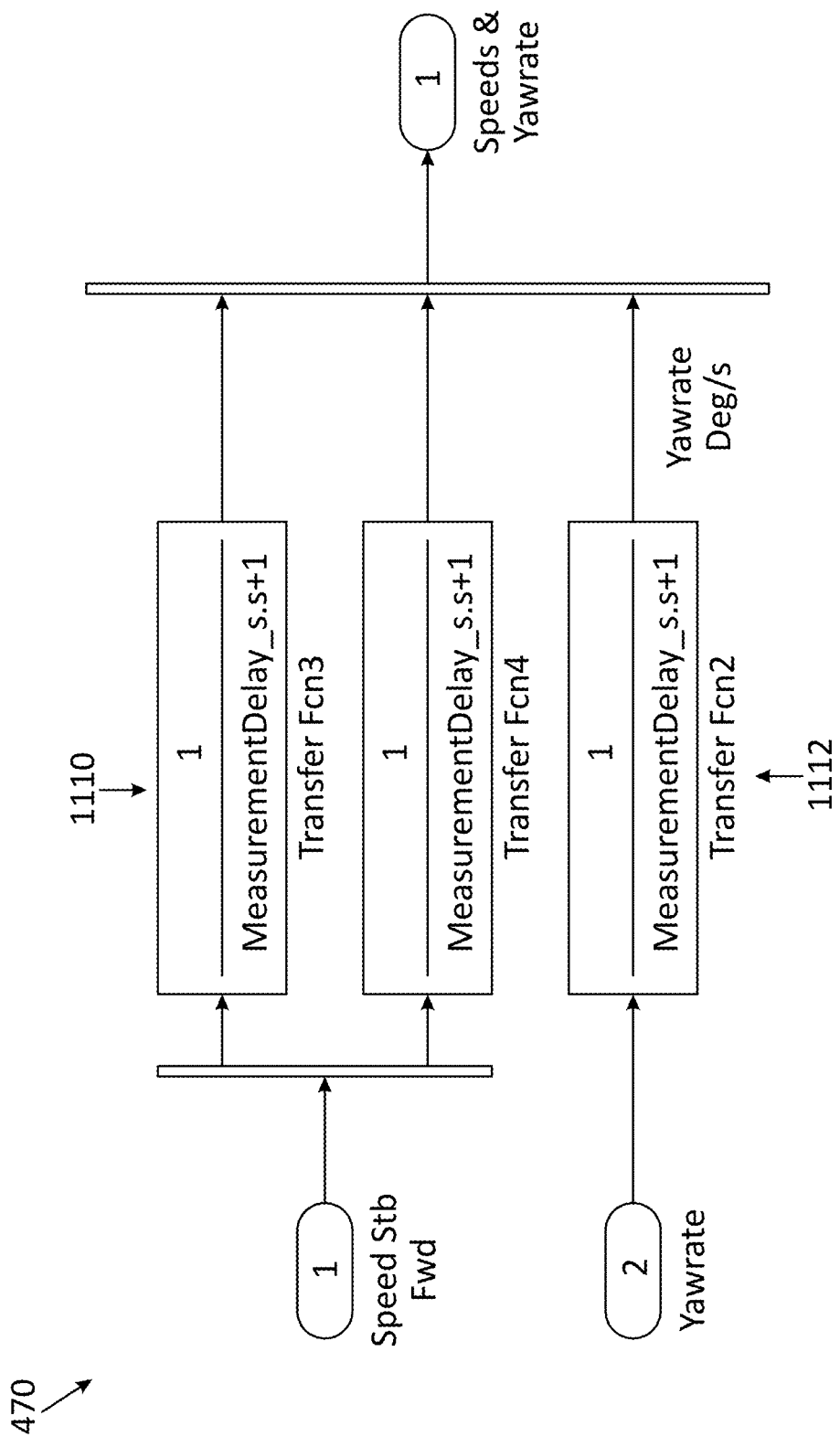

As shown in FIG. 11, in embodiments where control loop 400 is used to model maneuvering of mobile structure 101, measurement block 470 may include linear velocity transfer function blocks 1110 and rotational velocity transfer function block 1112 each configured to model a measurement delay and provide such measurement delayed linear and rotational velocities as output, which are then provided to velocity controller 420 to update the model. In some embodiments, the transfer function blocks may be implemented as first order filters. In embodiments where control loop 400 is used to control maneuvering of mobile structure 101, measurement block 470 may instead include blocks configured to receive measured linear and angular velocities for mobile structure 101 (e.g., from sensors 140-148), which may be provided as output to velocity controller 420 to proceed through another iteration of control loop 400. In various embodiments, measurement block 470 may include blocks configured to receive measured linear and angular velocities for mobile structure 101 for mobile structure 101 from perimeter ranging system 148.

Figure 12:
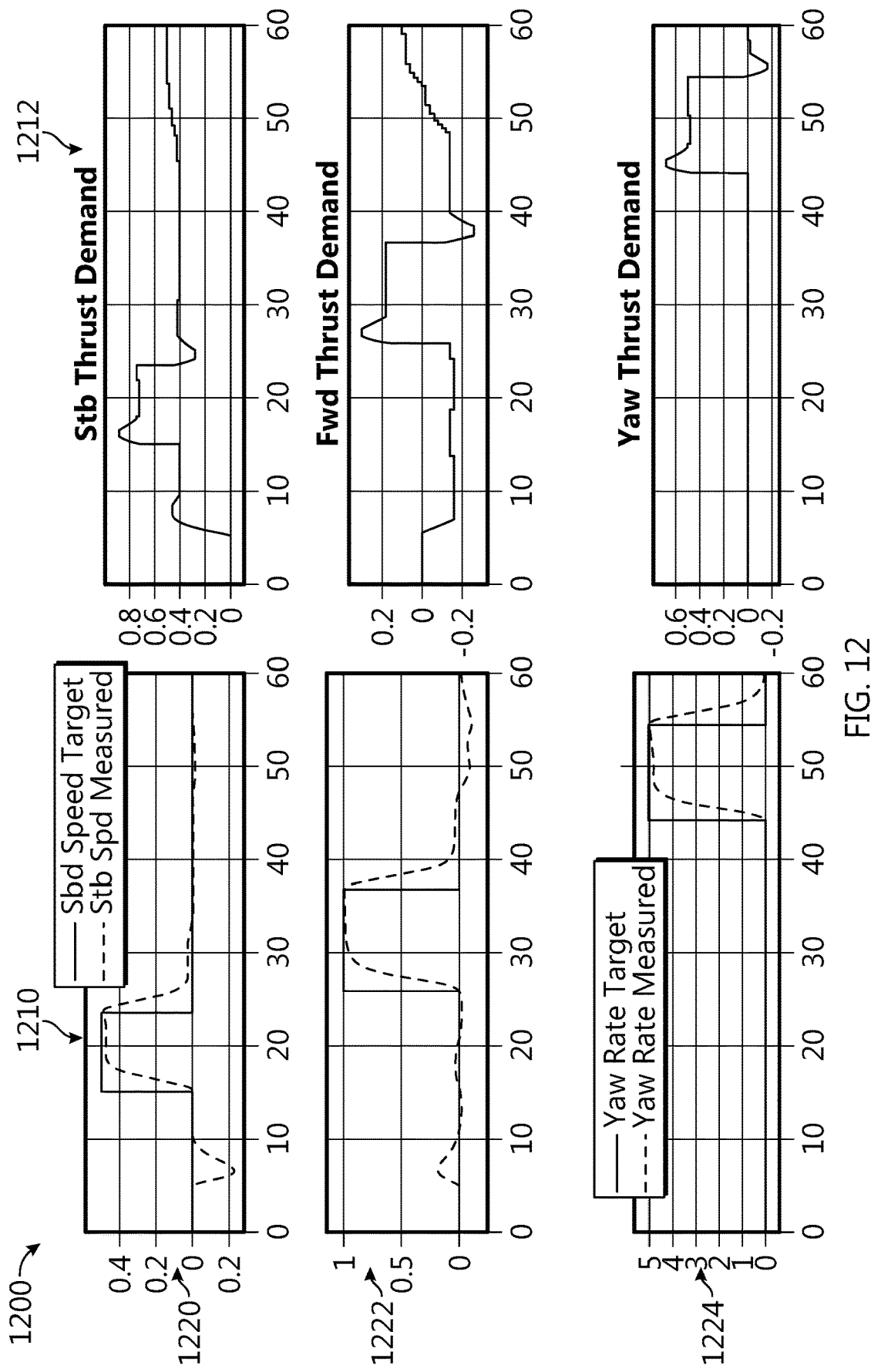
FIG. 12 illustrates plots of various control signals for a docking assist system, in accordance with embodiments of the disclosure.

FIG. 12 illustrates plots of various control signals generated by docking assist system 100, in accordance with embodiments of the disclosure. For example, plots 1210 show target velocities plotted with measured velocities (e.g., lateral velocities along row 1220, longitudinal velocities along row 1222, and angular velocities along row 1224) and plots 1212 show corresponding thrust demands (e.g., lateral thrust demands along row 1220, longitudinal thrust demands along row 1222, and angular thrust demands along row 1224). In the embodiment shown in FIG. 12, at time 5s, external disturbances are imposed (significant wind and water currents suddenly hit), and the thrust demand can be seen to react, correcting the velocity buildup, and initially hovering mobile structure 101. As mobile structure 101 is moved according to the target velocities, the linear thrusts change, adapting to the "rotating" disturbance vector.

FIGS. 13-21 illustrate flow diagrams of control loops to provide docking assist (e.g., assisted and/or fully automated docking) in accordance with embodiments of the disclosure. In particular, by contrast to control loop 400 of FIG. 4, FIGS. 13-21 illustrate control loops configured to accept user input corresponding to a series of positions and/or headings for mobile structure 101, such as those implementing a target docking track, as described herein.

In some embodiments, the operations of FIGS. 13-21 may be performed by controller 130 processing and/or operating on signals received from one or more of sensors 140-148, navigation control system 190, user interface 120, and/or other modules 180. For example, in various embodiments, control loop 1300 (and/or other control loops of FIGS. 14-21) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS," and/or U.S. patent application Ser. No. 14/321,646 filed Jul. 1, 2014 and entitled "STABILIZED DIRECTIONAL CONTROL SYSTEMS AND METHODS," each of which are hereby incorporated by reference in their entirety.

In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of in the control loops may be performed in an order or arrangement different from the embodiment illustrated by FIGS. 13-21. For example, although control loop 400 includes block 440, in other embodiments, block 450 may not be present, for example.

Figure 13:
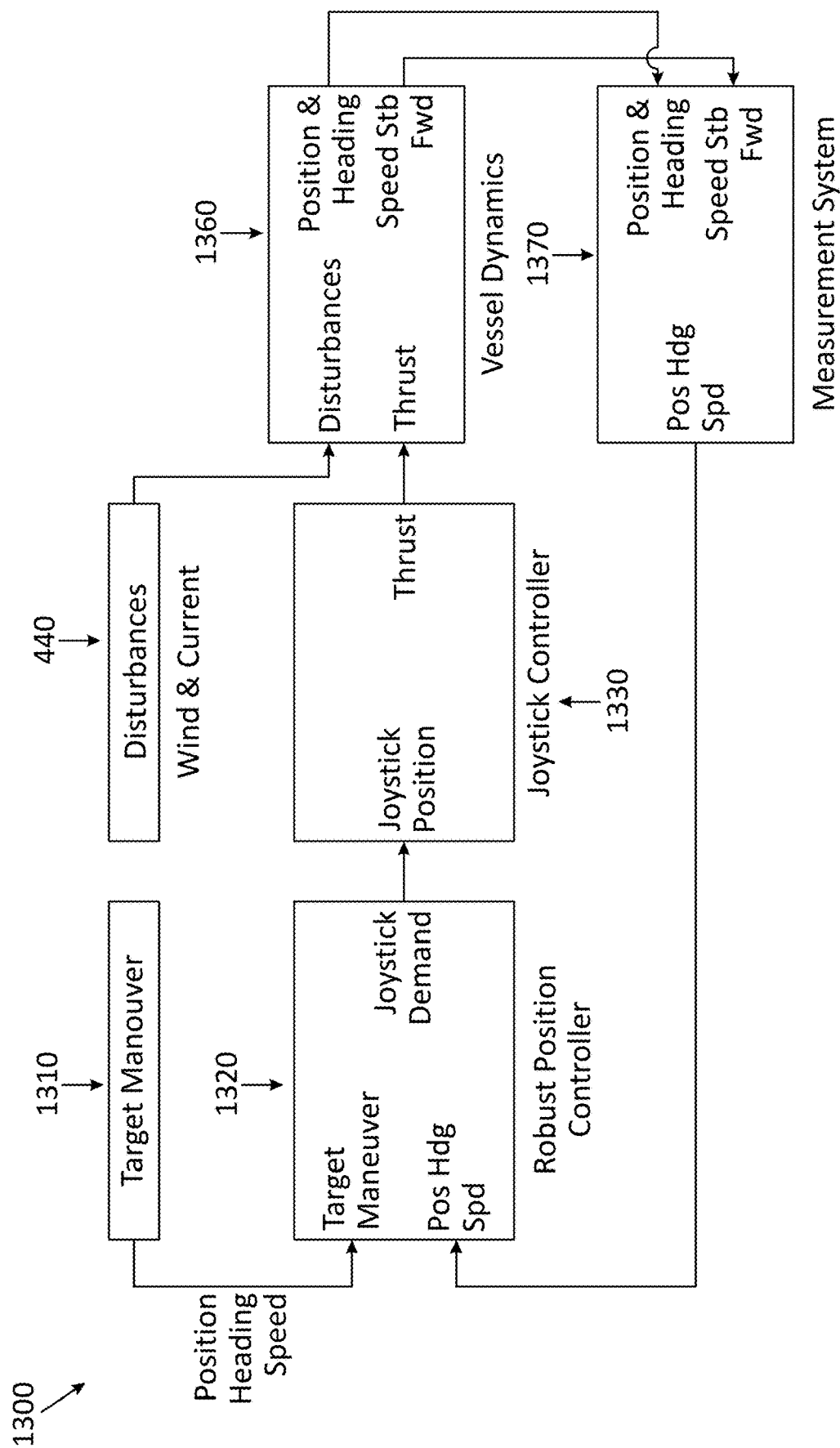
FIGS. 13-21 illustrate flow diagrams of control loops to provide docking assist in accordance with embodiments of the disclosure.

As shown in FIG. 13, control loop 1300 includes target maneuver block 1310 providing a target maneuver to position controller block 1320. In some embodiments, the target maneuver may include a target docking track and/or a corresponding target docking track speed (e.g., the desired and/or maximum speed along a target docking path from a current position of mobile structure 101 to a target docking position and/or orientation). In other embodiments, the target maneuver many include a target docking position and/or orientation, a target docking heading (e.g., the desired general heading from which to initiate a target docking track), and/or a corresponding target docking track speed. As described herein, a target docking track may include (e.g., as an end point) a target docking position and/or orientation.

In some embodiments, target maneuver block 1310 may be configured to receive user input from user interface 120, for example, and generate a target docking track, target docking position and/or orientation, a target docking heading, and/or target docking track speed corresponding to the received user input. In other embodiments, any such target maneuver may be provided by a memory device, an autopilot, and/or other element of system 100 of FIG. 1A and/or process executed by one or more elements of system 100 of FIG. 1A. Target maneuver block 1310 may also be configured to receive a series of such target maneuvers, as described herein, which may be adjusted and/or include adjustments to evade one or more navigation hazards and forward them on to position controller block 1320.

Position controller block 1320 receives the target maneuver from target maneuver block 1310 and a current measured position, orientation, and/or velocity of mobile structure 101 from measurement block 1370 and generates a controller demand (e.g., a user interface or joystick demand) based on the received target maneuver and current measured state of mobile structure 101 and provides it to thrust controller block 1330. When control loop 1300 is used to model maneuvering of mobile structure 101, thrust controller 1330 simply converts the controller demand into a corresponding thrust force (e.g., a linear and/or angular thrust force) and provides the thrust force to vessel dynamics block 1360. When control loop 1300 is used to control maneuvering of mobile structure 101, thrust controller 1330 may be configured to provide docking assist control signals corresponding to the controller demand received from position controller 1320 to navigation control system 190 (e.g., to one or more of steering sensor/actuator 150, propulsion system 170, and/or thrust maneuver system 172) in order to control maneuvering of mobile structure 101. In alternative embodiments, position controller block 1320 and thrust controller 1330 may be modified to provide/receive a thrust demand and generate a corresponding thrust force and provide the thrust force to vessel dynamics block 1360, similar to blocks 420 and 430 of control loop 400 of FIG. 4.

When control loop 1300 is used to model maneuvering of mobile structure 101, vessel dynamics block 1360 aggregates the thrust force provided by thrust controller 1330, external disturbance velocities provided by disturbances block 440, and/or model errors (e.g., provided by an optional model error block 450, as shown in FIG. 4) and converts them into expected positions, orientations, and velocities (e.g., expected maneuvers) for mobile structure 101, which are then provided to measurement block 1370, as shown. While control loop 1300 is used to model maneuvering of mobile structure 101, measurement block 1370 may be configured to receive the expected maneuvers for mobile structure 101 from vessel dynamics block 1360 and generate simulated measurements of the expected maneuvers for mobile structure 101 (e.g., by adding in a measurement delay, for example), which are then provided to position controller 1320 to update the model.

When control loop 1300 is instead used to control maneuvering of mobile structure 101, measurement block 1370 may be configured to receive measured positions, orientations, and velocities for mobile structure 101 (e.g., from sensors 140-148) and provide them to position controller 1320 to proceed through another iteration of control loop 1300. In some embodiments, measurement block 1370 may be configured to receive or request such measurements upon receiving expected linear and angular velocities for mobile structure 101 from vessel dynamics block 1360, so as to provide timing linking for control loop 1300, for example. Other timing linking for control loop 1300 may be accomplished by receiving or requesting such measurements upon navigation control system 190 receiving docking assist control signals from thrust controller 1330. In alternative embodiments, measurement block 1370 may be configured to operate asynchronously with respect to one or more other blocks of control loop 1300.

In general, the origin from which to model or implement various aspects of a target maneuver may be set to be any point, such as a target docking position, for example. By setting the origin to such end position of a target maneuver, renderings of maneuvering of mobile structure 101 according to the target maneuver (e.g., shown on a display of user interface 120) would adjust more naturally as the maneuver evolved; small changes in image geometry as a camera position shifts through a docking maneuver, in images provided by perimeter ranging system 148, would allow the destination origin to naturally adjust. However, for modeling purposes, it can be easy to initialize the model by setting the origin to the current or starting position, orientation, and/or velocity of mobile structure 101. In various embodiments, the term "speed" may refer to the longitudinal component of the velocity of mobile structure 101 and/or the component of its velocity along a corresponding target maneuver (e.g., a target docking track), or a track speed. This definition makes a target maneuver a 'human' definition; humans naturally think about the path a mobile structure will take, how fast it will go, and which way it will point. Humans often do not plan exactly how long a maneuver will take or at what time a mobile structure should be at a certain position. Such definition allows a maneuver to be defined with low granularity; as few as 4 or 5 waypoints are enough to define it. In some embodiments, system 100 may be configured to generate a target docking track (e.g., from user input designating a series of waypoint) with rounded corners, such as corners with 30 degree chamfers, for example, or adjustable chamfers, such as between approximately 10 degree chamfers to 45 degree chamfers.

In general, target maneuver block 1310 may be implemented similarly to target maneuver block 410 of FIG. 5 and include input blocks similar to input blocks 510 of FIG. 5 configured to receive user input from user interface 120 and convert the user input into target maneuvers for mobile structure 101, for example, or to receive a series of target maneuvers corresponding to a target docking track, and forward the series of target maneuvers as output of target maneuver block 1310.

Figure 14:
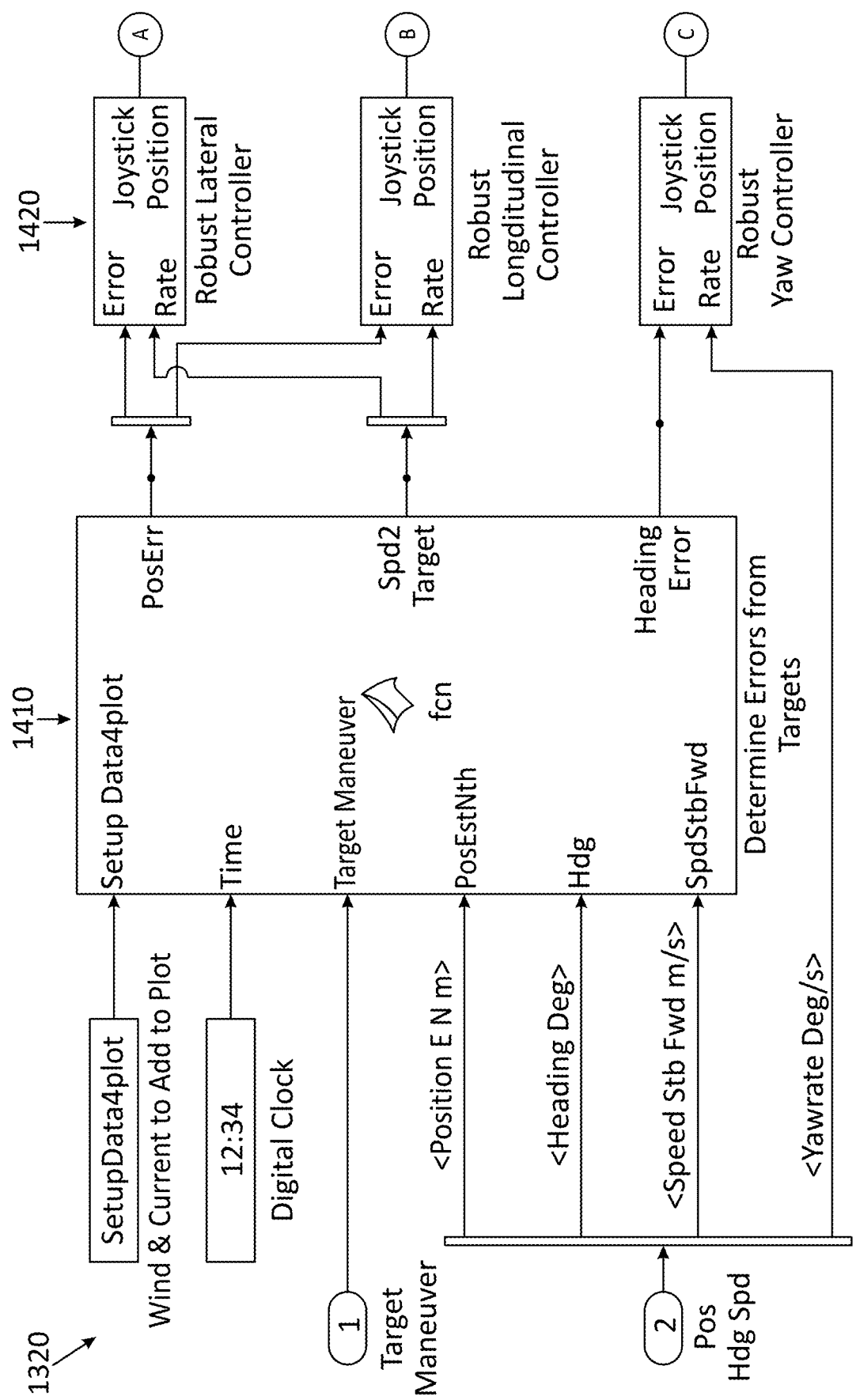
Figure 14:
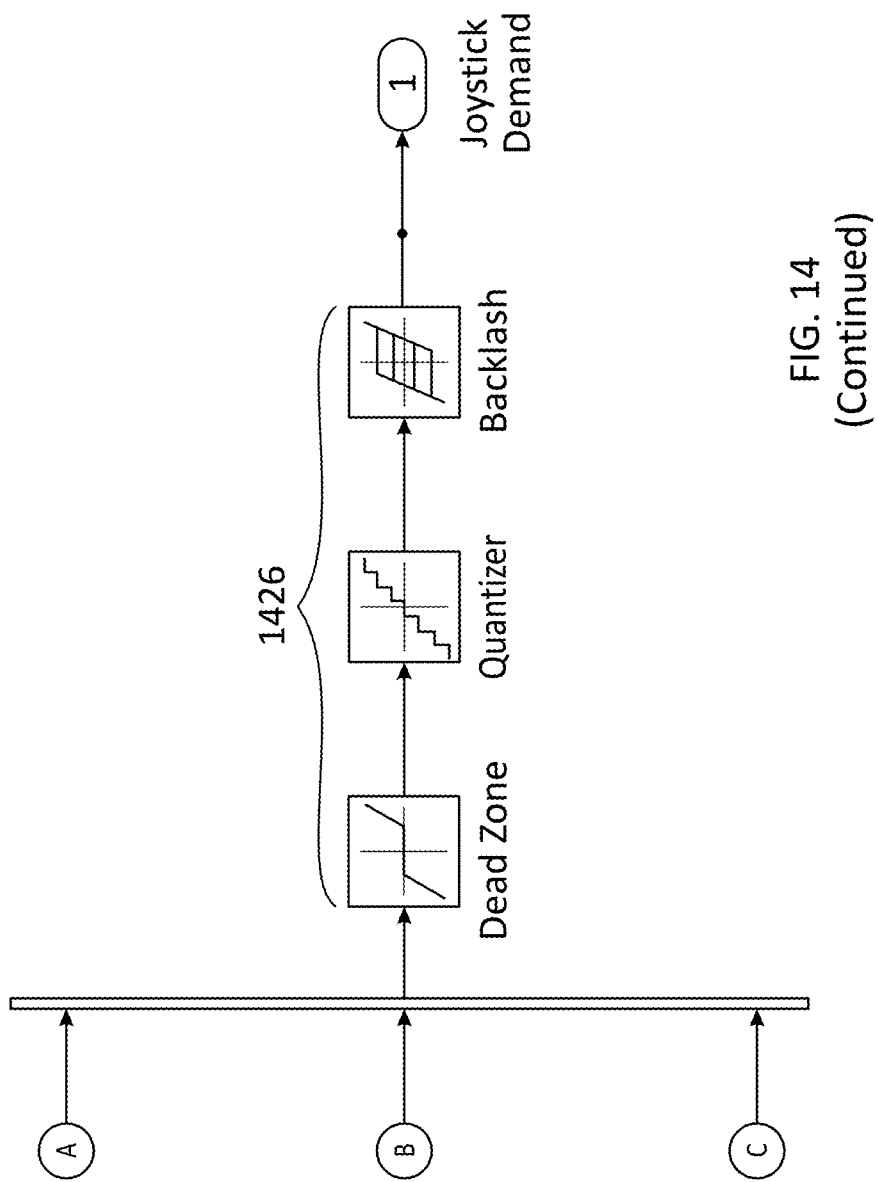
Figure 15:
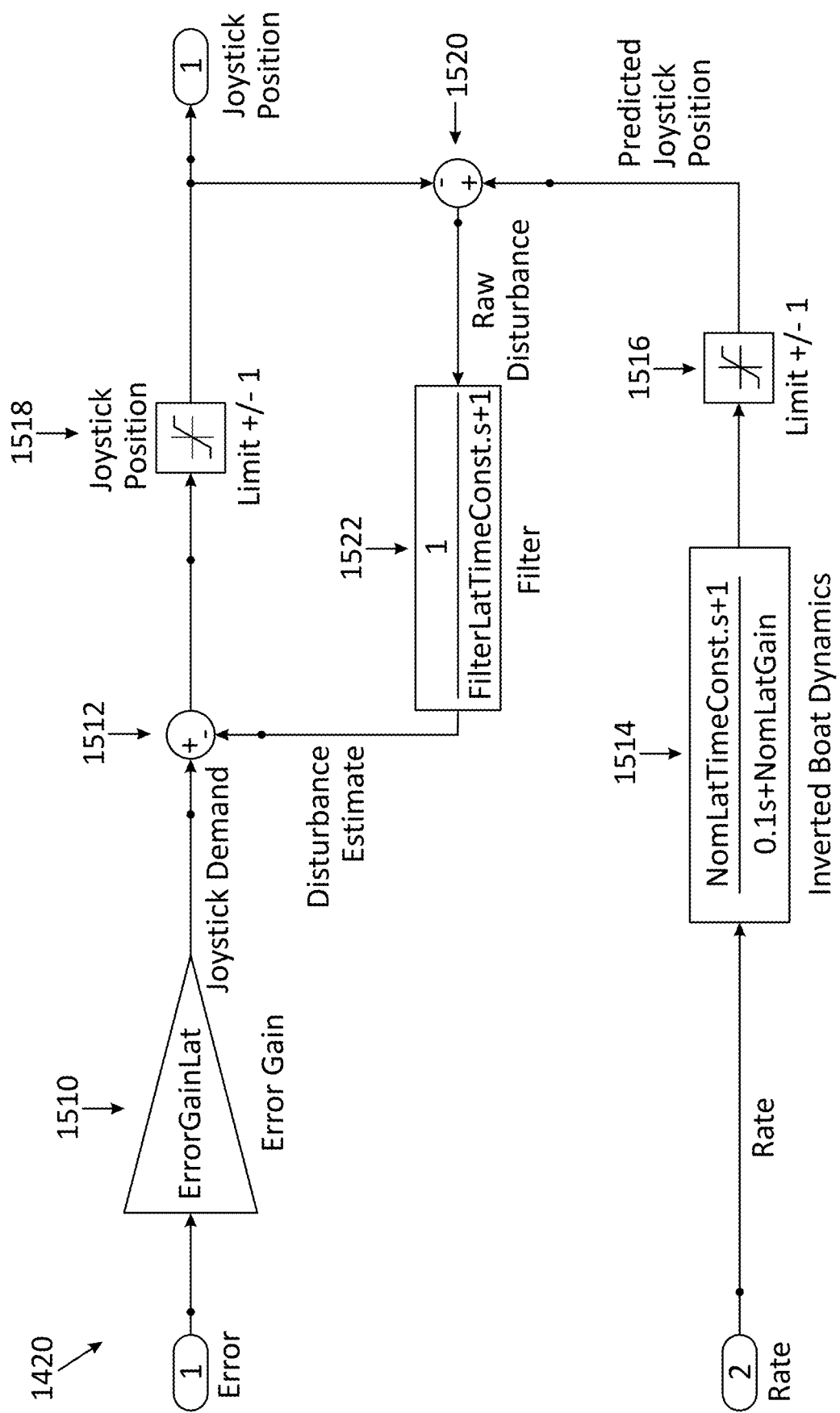

As shown in FIG. 14, in some embodiments, position controller 1320 may include error block 1410, controller demand blocks 1420, and controller demand conditioner blocks 1426. As shown in FIGS. 14 and 22, error block 1410 may be configured to receive target maneuvers and a current state for mobile structure 101 and generate corresponding target maneuver errors, which are then provided to controller demand blocks 1420. As shown in FIG. 15, (e.g., showing only lateral demands, though similar to longitudinal and rotational (yaw) demands) each controller demand block 1320 may be configured to generate a linear or angular controller demand based on corresponding target maneuver errors for mobile structure 101.

In FIG. 15, the current velocity is converted into a predicted controller demand by block 1514 (e.g., based on an inverted dynamic model for a nominal vehicle corresponding to mobile structure 101) and clamped by block 1516. The target maneuver error is converted into a nominal controller demand by block 1510, combined with the predicted controller demand at block 1520, and the resulting raw disturbance is fed back into the nominal controller demand at block 1512 to produce the controller demand as output. Blocks 1518 and 1522 clamp and filter the feedback loop, respectively, so that the output controller demand is within bounds and to reduce a noise level of the raw disturbance, and therein, the output controller demand. Controller demand conditioner blocks 1426 of FIG. 14 further condition the controller demand before providing it as output by limiting minor numerical oscillations and large signal changes (e.g., which could otherwise overwork the navigation controller and/or cause it to fail). In alternative embodiments, controller demand blocks 1420, as shown in FIGS. 14-15, may be modified to provide a thrust demand as output, similar to blocks 424 of velocity controller 420 of control loop 400 as shown in FIGS. 4, 6, and 8.

Figure 16:
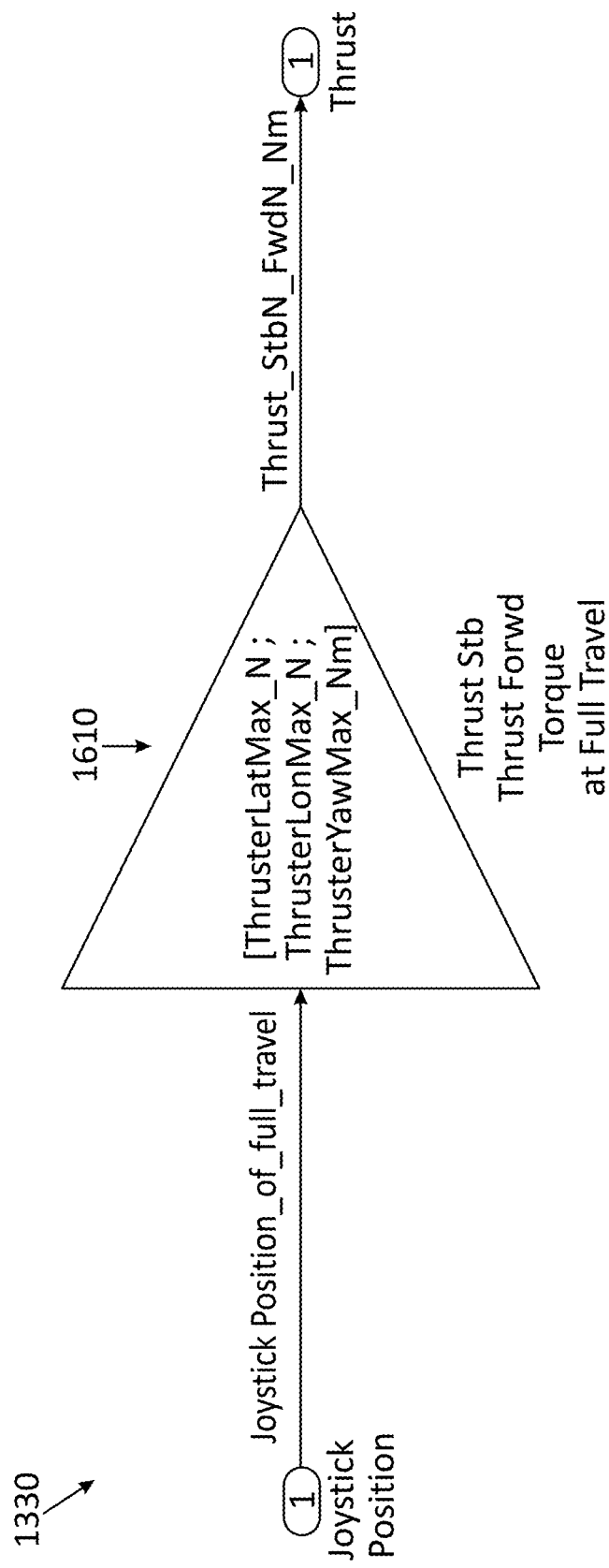

As noted herein, when control loop 1300 is used to control maneuvering of mobile structure 101, thrust controller 1330 may be configured to provide docking assist control signals corresponding to the controller demand received from position controller 1320 to navigation control system 190 in order to control maneuvering of mobile structure 101. When control loop 1300 is instead used to model maneuvering of mobile structure 101, thrust controller 1330 may include conversion block 1610, as shown in FIG. 16, which may be configured to convert controller demands received from position controller 1320 into corresponding thrust forces (e.g., a linear and/or angular thrust forces) and provide the thrust forces to vessel dynamics block 1360. In alternative embodiments, conversion block 1610 and thrust controller 1330 may be modified to receive a thrust demand and generate a corresponding thrust force and provide the thrust force to vessel dynamics block 1360, similar to block 430 of control loop 400 of FIG. 4.

Figure 17:
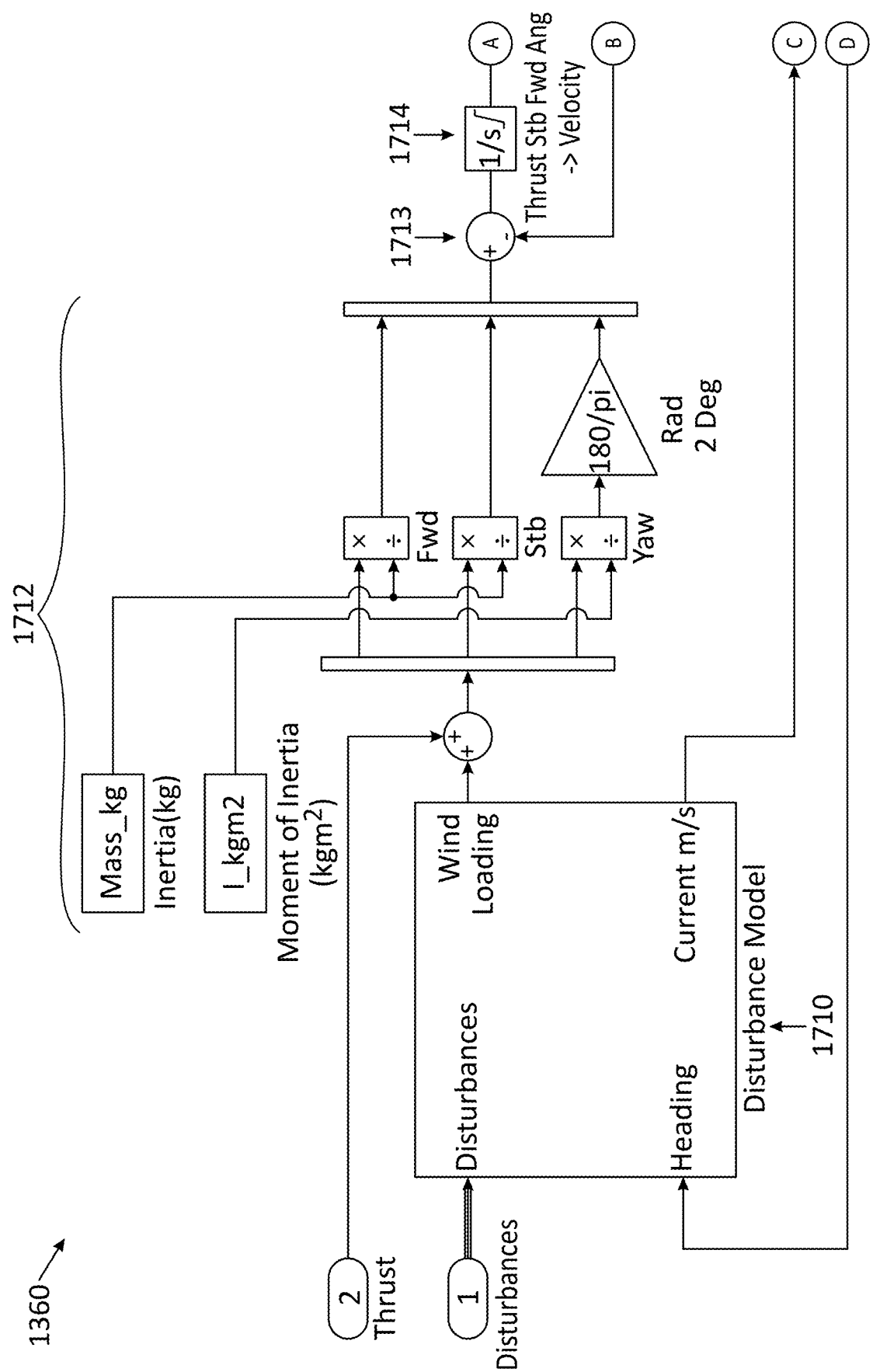
Figure 17:
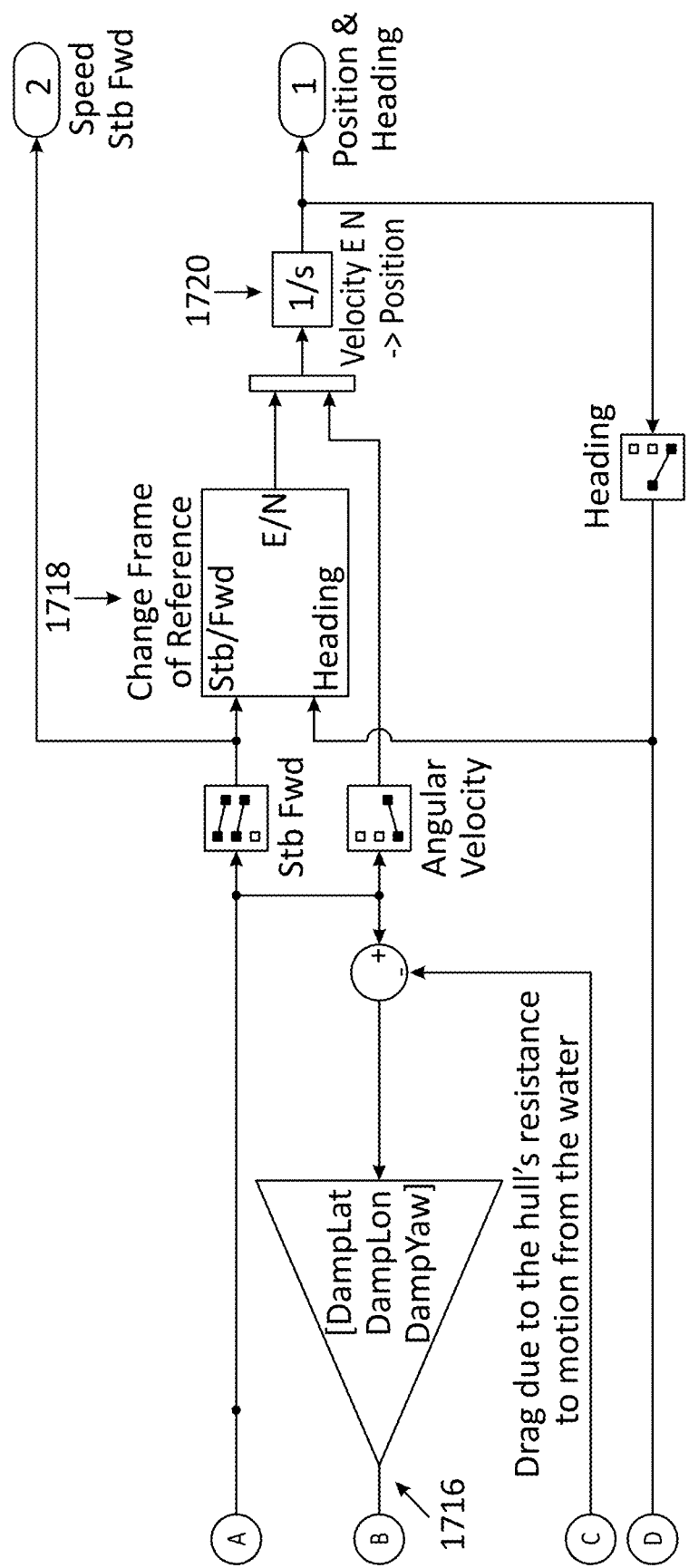
Figure 18:
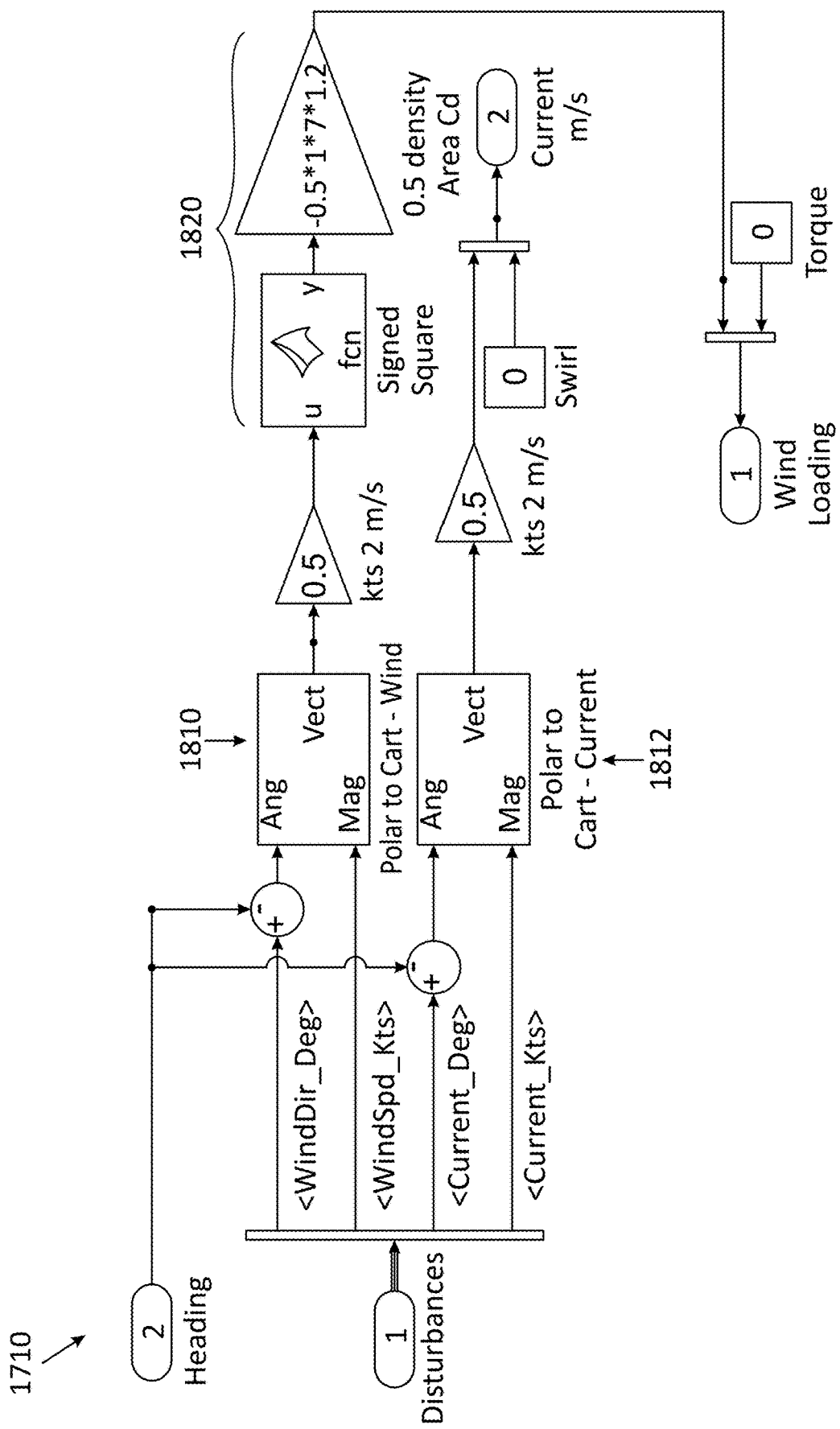

As shown in FIG. 17, in some embodiments, vessel dynamics block 1360 may include disturbance model block 1710, which may be configured to receive disturbance velocities and an estimated heading for mobile structure 101 and provide a wind force (e.g., dependent on an orientation of mobile structure 101 relative to the wind direction) and a water current velocity. The wind force is combined with the thrust force (e.g., provided by thrust controller 1330 in FIG. 16) and provided to combinatorial blocks 1712. As shown in FIG. 18, in some embodiments, disturbance model block 1710 may include coordinate system conversion blocks 1810 and 1812, which may be configured to convert typical coordinates for wind and current directions (e.g., polar coordinates) into Cartesian coordinates for further processing and/or output by disturbance model block 1710. Disturbance model block 1710 may also include wind force blocks 1820 configured to convert a wind disturbance velocity (e.g., which may be a relative wind disturbance velocity) and convert it into a wind force acting on mobile structure 101, for output by disturbance model block 1710, as shown.

Combinatorial blocks 1712 of disturbance model block 1710 convert model errors (e.g., shown in FIG. 17 as no error, or a multiplicative error coefficient of 1) corresponding to linear and rotational inertia into mass and inertia errors and divide the already combined wind and thrust forces by the mass and inertia errors to produce a model and disturbance corrected thrust acceleration. The corrected thrust acceleration is integrated by block 1714 to provide an expected linear and angular velocity for mobile structure 101. The linear velocity is output by block 1360. The water current velocity is combined with the expected linear and angular velocity for mobile structure 101 provided by block 1714 and the resulting relative water velocity is provided to motion damping block 1716. Motion damping block 1716 determines the drag acceleration on mobile structure 101 caused by its relative motion within a body of water.

The drag acceleration is combined with the corrected thrust acceleration provided by combinatorial blocks 1712, as part of a feedback loop, at block 1713.

Figure 19:
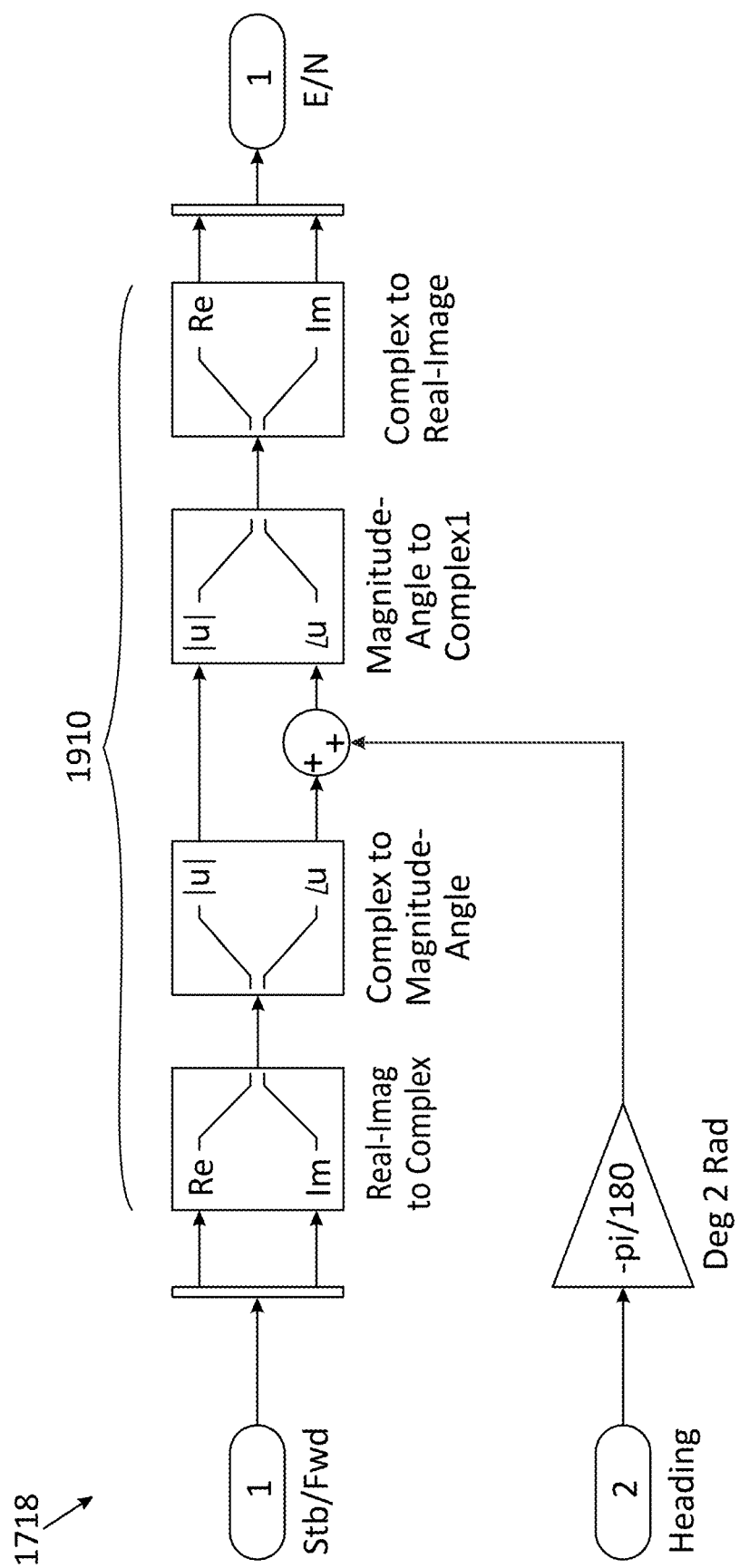
Figure 20:
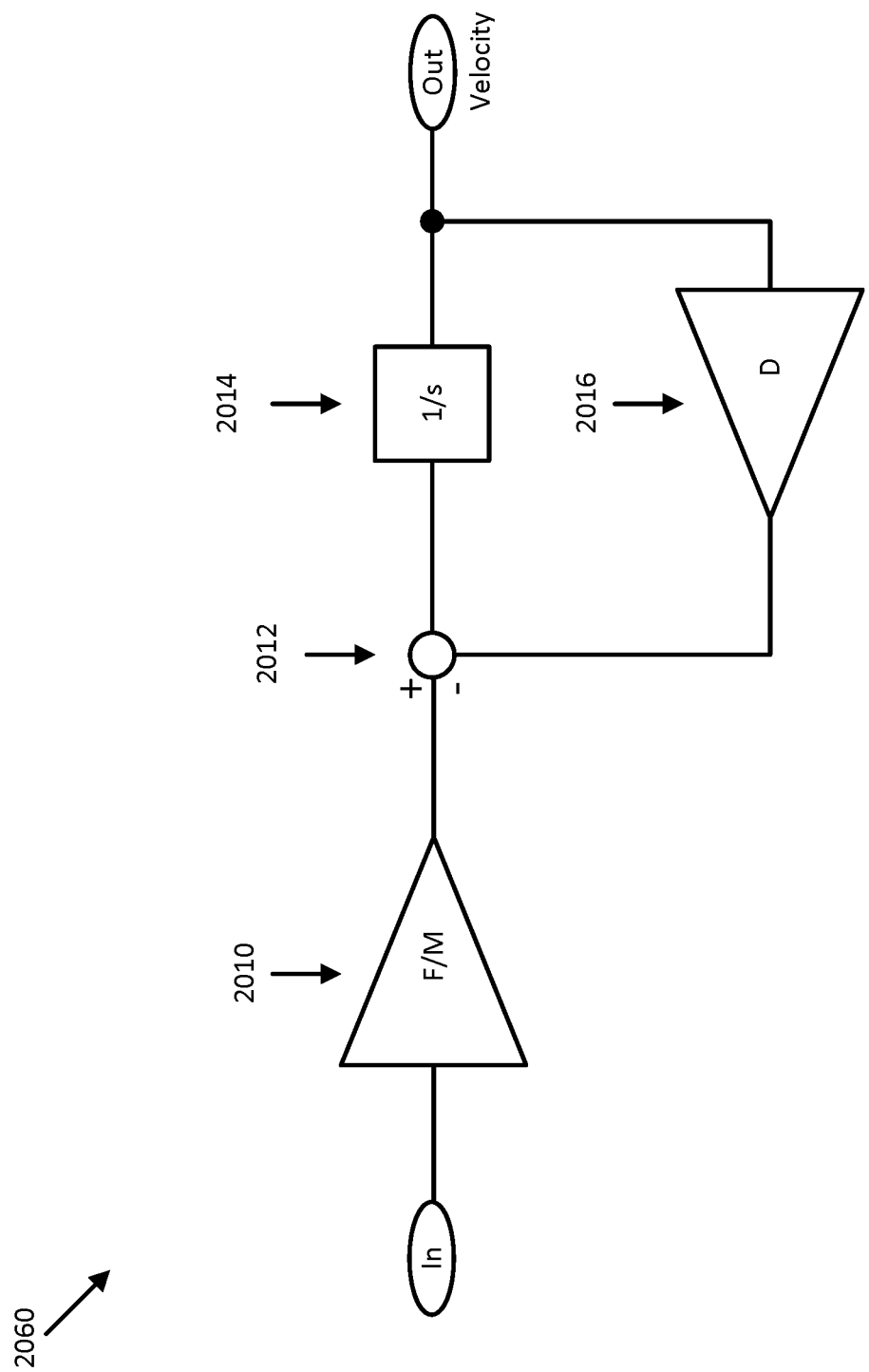

In some embodiments, vessel dynamics block 1360 may also include reference frame conversion block 1718 configured to convert the expected linear velocity of mobile structure 101 provided by block 1714 (e.g., which may be in a lateral/longitudinal local reference frame for mobile structure 101) into an expected linear velocity as represented in an absolute reference frame (e.g., east and north), which may be combined with the expected angular velocity of mobile structure 101 provided by block 1714 and provided to integrator block 1720 to provide a position and/or heading/orientation of mobile structure 101. The position and/or heading/orientation of mobile structure 101 is output by block 1360 and may be fed back to blocks 1710 and 1718, as shown. As shown in FIG. 19, in some embodiments, reference frame conversion block 1718 may include various coordinate frame conversion blocks 1910, which may be configured to convert linear velocities (e.g., in a relative coordinate frame) into linear velocities in an absolute coordinate frame, based on a heading for mobile structure 101, for further processing and/or output by frame conversion block 1718, as shown. In various embodiments, such conversion may be implemented as a simple rotation, as shown in FIG. 19. More generally, thrust controller 1330 and vessel dynamics block 1360 (e.g., and/or vessel dynamics block 460) may in some embodiments be simplified (e.g., to omit disturbances and/or model errors) into a combined thrust dynamics block 2060 according to the representation illustrated by FIG. 20, for example, when control loop 1300 is used to model maneuvering of mobile structure 101. For example, in some embodiments, thrust dynamics block 2060 may include conversion block 2010 configured to receive a controller or thrust demand (e.g., provided by position controller 1320 in FIG. 13) and provide a corresponding thrust acceleration. The thrust acceleration may be integrated by block 2014 to provide an expected linear and angular velocity for mobile structure 101, which is then output by thrust dynamics block 2060. The expected linear and angular velocity for mobile structure 101 may be provided to motion damping block 2016, which may be configured to determine a drag acceleration (e.g., related to drag force) on mobile structure 101 caused by its relative motion within a body of water. The drag acceleration is combined with the thrust acceleration provided by block 2010, as part of a feedback loop, at block 2012. In various embodiments, the expected linear and angular velocity output by thrust dynamics block 2060 may be converted into a position and/or orientation of mobile structure 101 using techniques and blocks similar to blocks 1718, 1720, and/or 1360 of FIGS. 17 and 19, for example, which may be used to provide appropriate outputs to measurement block 1370, as shown in FIG. 13.

Figure 21:
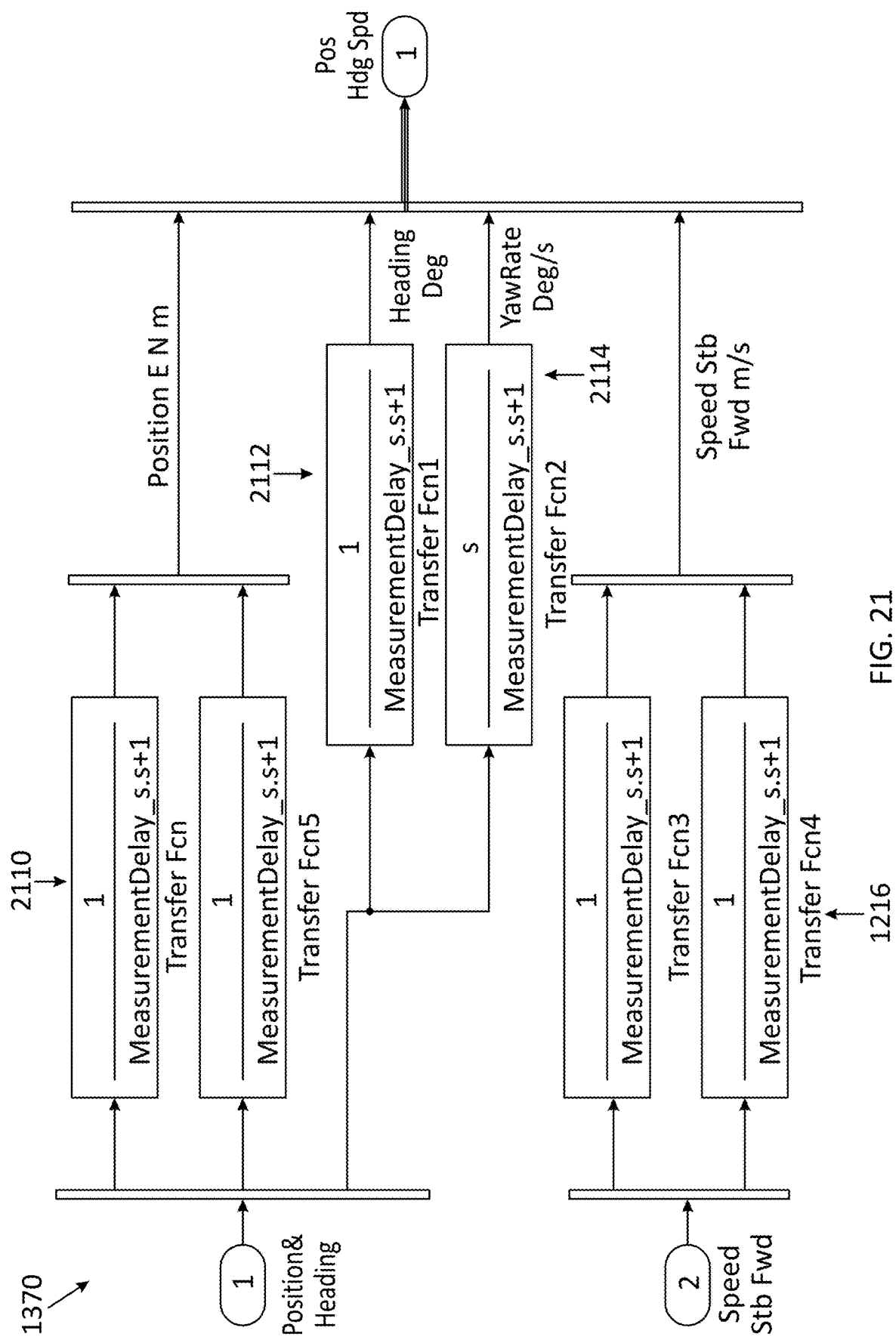

As shown in FIG. 21, in embodiments where control loop 1300 is used to model maneuvering of mobile structure 101, measurement block 1370 may include position transfer function blocks 2110, orientation transfer function block 2112, angular velocity transfer function block 2114, and linear velocity transfer function blocks 2116 each configured to model a measurement delay and provide such measurement delayed positions, orientations, and/or velocities as output, which are then provided to position controller 1320 to update the model. In some embodiments, the transfer function blocks may be implemented as first order filters. In embodiments where control loop 1300 is used to control maneuvering of mobile structure 101, measurement block 1370 may instead include blocks configured to receive measured positions, orientations, and/or velocities for mobile structure 101 (e.g., from sensors 140-148), which may be provided as output to position controller 1320 to proceed through another iteration of control loop 1300. In various embodiments, measurement block 1370 may include blocks configured to receive measured positions, orientations, and/or velocities for mobile structure 101 from perimeter ranging system 148.

As shown in FIGS. 14 and 22, error block 1410 may be implemented as executable script and/or program code configured to receive target maneuvers and a current state for mobile structure 101, along with various other system parameters, and generate corresponding target maneuver errors, which may then be provided to controller demand blocks 1420. For example, as shown in FIG. 22, error block 1410 may be configured to determine a target maneuver error by comparing a current position and/or orientation of mobile structure 101 to a position and/or orientation of the target maneuver (e.g., a target docking track) at a point of closest approach to the target maneuver (e.g., which may be used to generate a position and/or orientation error), and then comparing the current velocity of mobile structure 101 to a target velocity corresponding to the same point of closest approach. As shown in FIG. 23, in embodiments where the modeled maneuvering of mobile structure 101 is to be plotted for display to a user, error block 1410 may include initialization block 2300 (e.g., implemented in FIG. 23 as executable script and/or program code) configured to convert a target maneuver (e.g., a target docking track) represented by relatively few waypoints (e.g., 4, as would be typical for user input) into a target maneuver represented by larger number of waypoints (e.g., 1000) in order to provide sufficient resolution for fine control/modeling of maneuvering of mobile structure 101.

Figure 24:
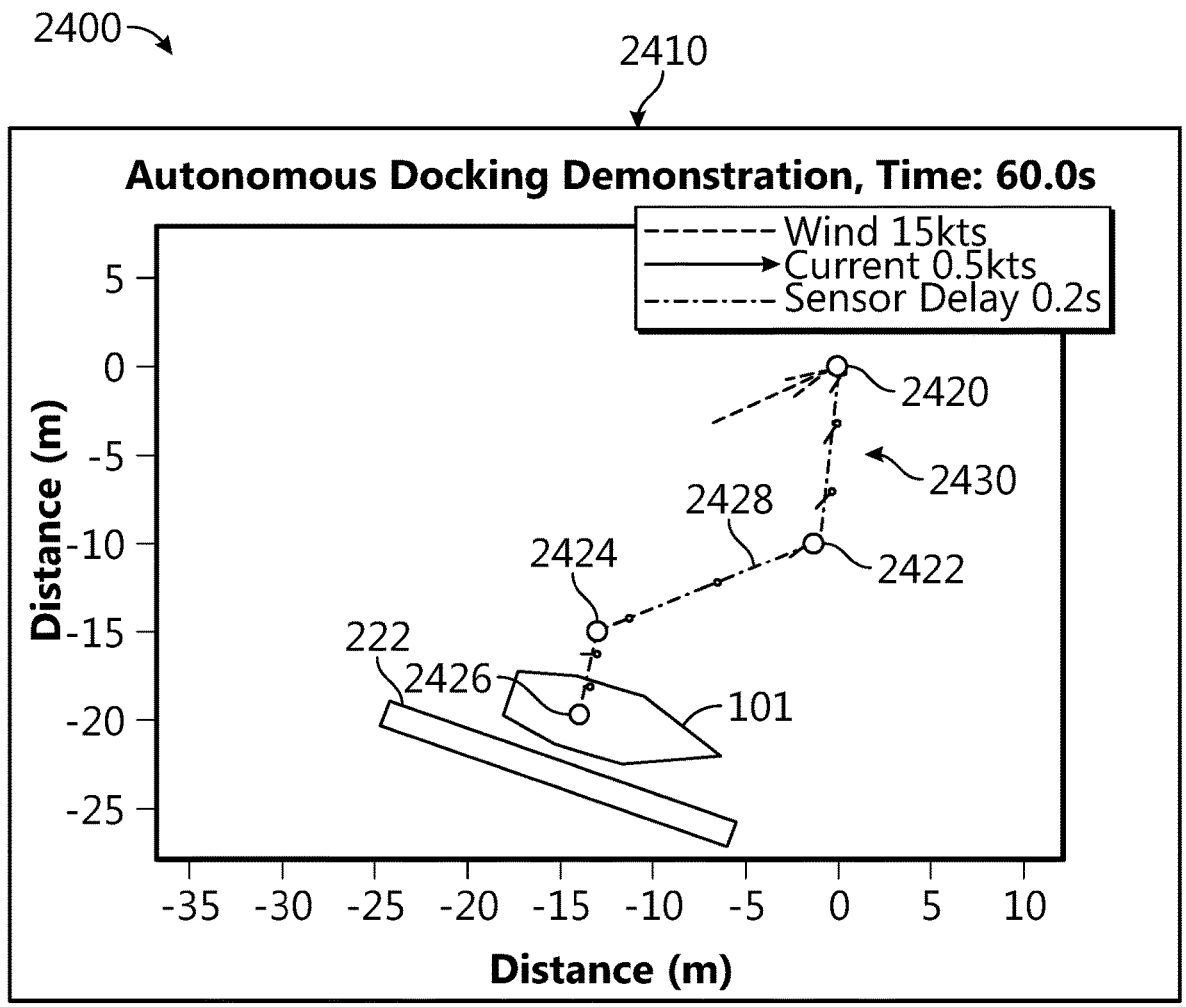
FIG. 24 illustrates plots of various simulation parameters and control signals for a docking assist system, in accordance with embodiments of the disclosure.
Figure 24:
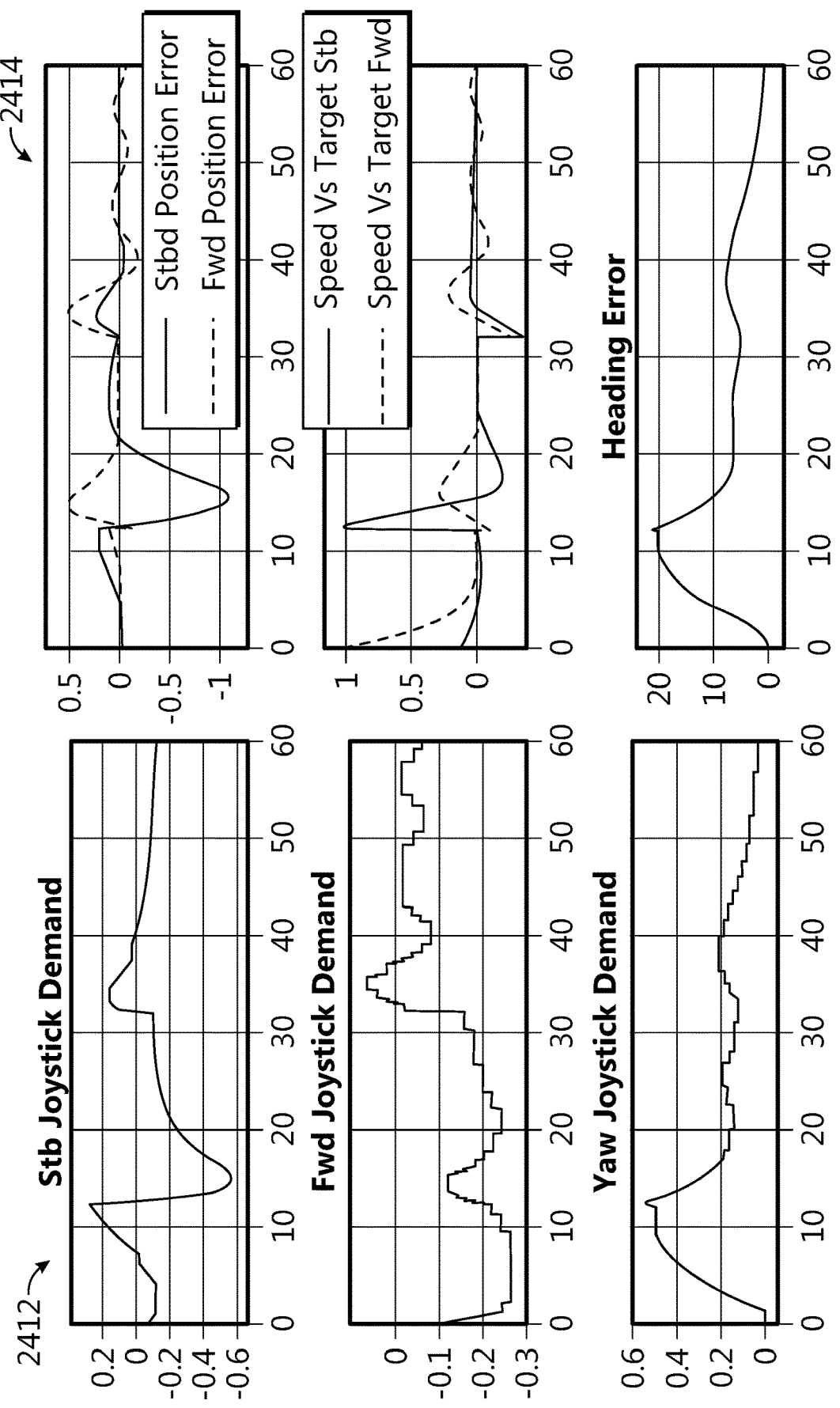

FIG. 24 includes plots 2400 of various simulation parameters and control signals for docking assist system 100, in accordance with embodiments of the disclosure. For example, plot 2410 shows a target maneuver for mobile structure 101 including a target docking track 2428 defined according to a starting position/orientation 2420, a target docking position/orientation 2426 at dock 222, and two waypoints 2422 2424 disposed therebetween. Also shown along target docking track 2430 are controller demand indicators 2430 indicating a controller demand (e.g., corresponding to a linear thrust for thrust controller 190) to maneuver mobile structure 101 along target docking track 2428. Plots 2412 shows plots of controller demands implementing target docking track 2428, and plots 2412 show plots of, from top to bottom, position, velocity, and heading error along target docking track 2428 while mobile structure 101 is piloted according to the controller demands shown in plots 2412, along the same time base.

In accordance with various embodiments of the present disclosure, various control loop parameters, user inputs, sensor signals, controller signals, and other data, parameters, and/or signals described in connection with system 100 and/or control loops depicted in FIGS. 4-11 and 13-21 may be stored at various points in the control loops, including within and/or during execution of any one of the blocks of a particular control loop.

As described herein, embodiments of the disclosed robust control automatically compensate for drift from tide/current and wind, giving fast disturbance rejection without destabilizing the control loop. However, such compensation can only be effective within the capability of the navigation control system; for example, a sailboat without bow thrusters cannot always compensate for cross wind. As such, it may not be possible to hold mobile structure 101 at a target position and/or orientation. In some embodiments, a docking process may be flagged as complete when mobile structure 101 is within predefined success tolerance range of a target position and/or orientation (e.g., 20 cm, 0.5 degrees) and unable to maneuver closer to the target position and/or orientation.

Fast feedback robust control can require high bandwidth measurements, and gyroscope/accelerometer 144 may be configured to provide such high bandwidth measurements to complement perimeter ranging system 148. Resulting ranging to navigation hazards and/or relative velocities of navigational hazards may then be the result of fusion of perimeter ranging system measurements and, for example, lateral acceleration measurements. Such fusion may be accomplished using various signal processing techniques, including fusion techniques employing Kalman filters, for example.

Figure 25:
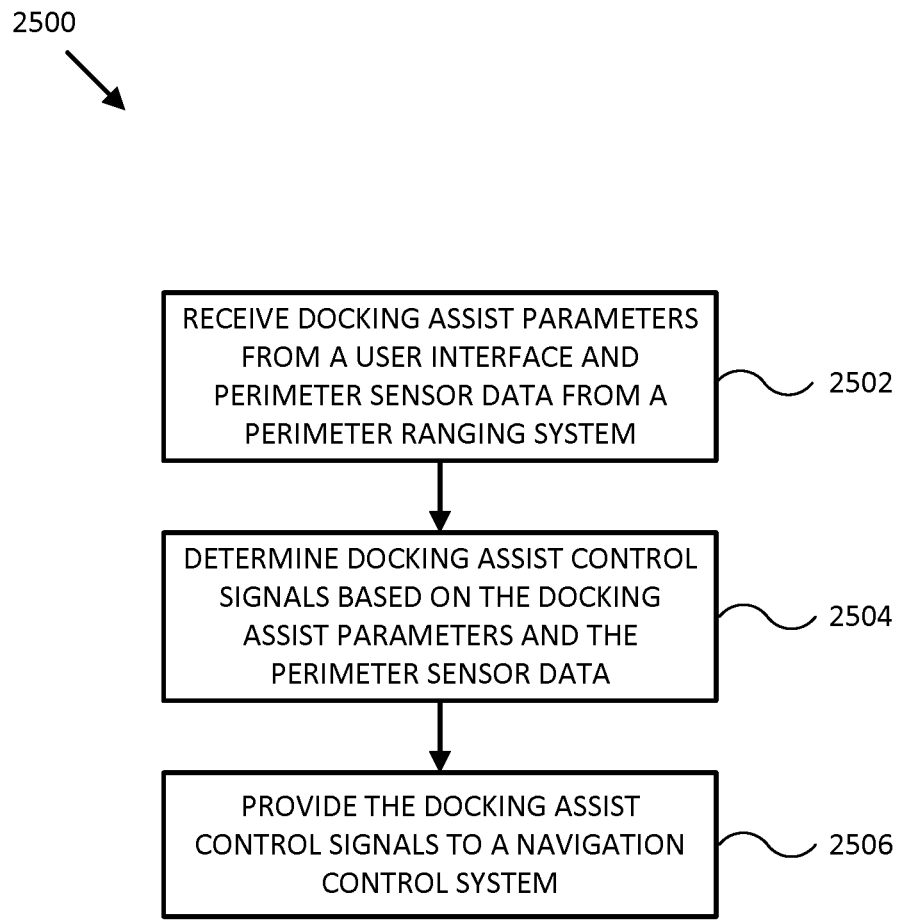
FIG. 25 illustrates a flow diagram of a process to provide docking assist for a mobile structure in accordance with an embodiment of the disclosure.

FIG. 25 illustrates a flowchart of a process 2500 to provide docking assist for a mobile structure in accordance with an embodiment of the disclosure. It should be appreciated that any step, sub-step, sub-process, or block of process 2500 may be performed in an order or arrangement different from the embodiments illustrated by FIG. 25. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2500 is described with reference to systems, processes, control loops, and images described in reference to FIGS. 1A-24, process 2500 may be performed by other systems different from those systems, processes, control loops, and images and including a different selection of electronic devices, sensors, assemblies, mobile structures, and/or mobile structure attributes, for example.

In block 2502, docking assist parameters are received from a user interface and perimeter sensor data is received from a perimeter ranging system. For example, controller 130 may be configured to receive docking assist parameters from user interface 120 and perimeter sensor data from perimeter ranging system 142.

In some embodiments, the docking assist parameters may include user pilot control signals, such as user input provided to user interface 120 for direct navigational control of mobile structure 101. Such user input may include linear and/or rotational joystick user input, a dead stick user input, and/or other direct user input to user interface 120. In other embodiments, the docking assist parameters may include a target docking position and/or orientation for mobile structure 101. For example, controller 130 may be configured to generate a view of a docking area for mobile structure 101 on a display of user interface 120 and receive user input from user interface 120 indicating a target docking track and/or a target docking position and/or orientation within the generated view of the docking area.

In block 2504, docking assist control signals are determined based on docking assist parameters and perimeter sensor data. For example, controller 130 may be configured to determine one or more docking assist control signals based, at least in part, on the docking assist parameters and the perimeter sensor data received in block 2502.

In some embodiments, where the docking assist parameters received in block 2502 include user pilot control signals, controller 130 may be configured to determine a target linear and/or angular velocity for mobile structure 101 based, at least in part, on the user pilot control signals and a maximum maneuvering thrust of the navigation control system. Controller 130 may be configured to then determine the one or more docking assist control signals based, at least in part, on the determined target linear and/or angular velocity, where the one or more docking assist control signals are configured to cause navigation control system 190 to maneuver mobile structure 101 according to the determined target linear and/or angular velocity. In related embodiments, the user pilot control signals may correspond to a dead stick user input, as described herein, and the target linear and/or angular velocity for mobile structure 101 may be set to zero.

In other embodiments, where the docking assist parameters received in block 2502 include a target docking position and/or orientation for mobile structure 101, controller 130 may be configured to determine a target docking track for the mobile structure based, at least in part, on the target docking position and/or orientation and one or more docking safety parameters corresponding to the target docking track. In further embodiments, the docking assist parameters received in block 2502 may themselves include a target docking track. In either embodiment, controller 130 may be configured to then determine the one or more docking assist control signals based, at least in part, on the determined or received target docking track, where the one or more docking assist control signals are configured to cause navigation control system 190 to maneuver mobile structure 101 according to the determined or received target docking track.

In additional embodiments, controller 130 may be configured to determine a range to a navigation hazard disposed within a monitoring perimeter of the perimeter ranging system based, at least in part, on the received perimeter sensor data, determine the range to the navigation hazard is within a safety perimeter for the mobile structure, and/or determine the one or more docking assist control signals based, at least in part, on the determined range to the navigation hazard, wherein the one or more docking assist control signals are configured to cause navigation control system 190 to maneuver mobile structure 101 to evade the navigation hazard by maintaining or increasing the range to the navigation hazard.

In further embodiments, controller 130 may be configured to determine a relative velocity of a navigation hazard disposed within a monitoring perimeter of perimeter ranging system 148 based, at least in part, on the received perimeter sensor data, to determine the relative velocity of the navigation hazard towards mobile structure 101 is greater than a hazard velocity limit, and determine the one or more docking assist control signals based, at least in part, on the determined relative velocity of the navigation hazard, wherein the one or more docking assist control signals are configured to cause navigation control system 190 to maneuver mobile structure 101 to evade the navigation hazard by decreasing the relative velocity of the navigation hazard towards mobile structure 101.

Controller 130 may also be configured to determine wind and/or water current disturbances affecting navigation of mobile structure 101 and to determine the one or more docking assist control signals based, at least in part, on the determined wind and/or water current disturbances, wherein the one or more docking assist control signals are configured to cause navigation control system 190 to compensate for the determined wind and/or water current disturbances while maneuvering mobile structure 101 according to the received docking assist parameters.

In block 2506, docking assist control signals are provided to a navigation control system. For example, controller 130 may be configured to provide the one or more docking assist control signals determined in block 2504 to navigation control system 190. In some embodiments, navigation control system 190 may include one or more of steering actuator 150, propulsion system 170, and thrust maneuver system 172, and providing the docking assist control signal to navigation control system 190 may include controlling steering actuator 150, propulsion system 170, and/or thrust maneuver system 172 to maneuver mobile structure 101 according to a target linear and/or angular velocity or a target docking position and/or orientation corresponding to docking assist parameters received in block 2504.

For example, controller 130 may be configured to control steering actuator 150, propulsion system 170, and/or thrust maneuver system 172 of mobile structure 101 to generate a target linear and/or angular velocity for mobile structure 101 identified in the docking assist parameters provided in block

2504. If the target linear and/or angular velocity is zero (e.g., corresponding to a dead stick user input), then the docking assist control signals may be configured to counteract any detected motion of mobile structure 101, including motion caused by various external disturbances, as described herein. In another example, controller 130 may be configured to control steering actuator 150, propulsion system 170, and/or thrust maneuver system 172 of mobile structure 101 to follow a target docking track to a target docking position and/or orientation identified in the docking assist parameters provided in block 2504.

In some embodiments, controller 130 may be configured to provide docking assist control signals configured to evade a navigation hazard detected by perimeter ranging system 190 by maintaining or increasing a range to the navigation hazard and/or by decreasing the relative velocity of the navigation hazard towards mobile structure 101. In such embodiments, the docking assist control signals may be configured to minimize deviation from the target linear and/or angular velocity, or to minimize deviation from the target docking track, while evading the navigation hazard.

Embodiments of the present disclosure can thus provide reliable and accurate docking assist for mobile structures. Such embodiments may be used to provide assisted and/or fully autonomous docking and/or navigation of a mobile structure and may assist in the operation of other systems, devices, and/or sensors coupled to or associated with the mobile structure, as described herein.

Navigation control systems, such as navigation control system 190 in FIG. 1A, sometimes employ a joystick or other manual user interface, typically as part of a thrust maneuver system (e.g., similar to thrust maneuver system 172 of FIG. 1A) to provide additional degrees of freedom (e.g. sliding a vessel from side to side or rotating on the spot) not usually afforded by a conventional helm and throttle. These manual user interfaces may employ a number of non-linear characteristics to make the input more accessible to a human operator, such as a null zone or dead zone in the center of a joystick control range, in which joystick movement/manipulation below a certain deflection threshold is ignored.

Typically, joysticks and other types of manual user interfaces employ control signal techniques and cabling that present a convenient electrical interface with which to couple a docking assist system and/or autopilot to control a vessel programmatically. However, the various deliberate non-linear characteristics of such manual user interfaces can render programmatic control through manipulation of such control signals a considerably complex problem, especially when, for example, the characteristics of a particular manual user interface's null zone are unknown or undocumented. Embodiments described herein present a methodology capable of characterizing and adaptively compensating for an initially-unknown null zone and/or other non-linearity of a 3rd-party (and therefore black-box) joystick/manual user interface, allowing a docking assist system/autopilot to "see" a navigation control system with no null zone and to interface transparently with the navigation control system.

Without null zone compensation, a docking assist system or autopilot will attempt to apply engine thrust on demand, yet because the control signal may still be within the null zone of the joystick/manual user interface, the engines/thrusters may not respond. The docking assist system may then overcompensate, causing a discrepancy between the requested and applied thrust when the control signal eventually leaves the null zone, which will hamper the ability of the docking assist system to control the vessel. It will also present a significant latency as the docking assist system tries to move the vessel by generating control signals within the null zone with no initial reaction from the engines/thrusters, which will significantly reduce the ability of the docking assist system to make fine or rapid adjustments. As such, the null zone deliberately imposed upon a joystick/manual user interface for operator comfort can have a detrimental impact on the ability of a docking assist system or autopilot to control a vessel programmatically. Embodiments described herein adaptively characterize and compensate for such non-linearities, thereby facilitating assisted or autonomous control of a vessel via such manual user interfaces.

In general, null zone compensation can be implemented in three stages: null zone characterization, null zone boundary initialization, and null zone compensation (e.g., used to supplement and/or replace control signals provided by a manual user interface, such as a joystick). In one embodiment, null zone characterization may be performed by instructing a user (e.g., through graphics and/or text displayed on a display of user interface 120) to manipulate such joystick through a null zone boundary at different points along the null zone boundary in order to determine a set of null zone transition points between the null zone and the operative zone of the joystick and/or the control signals of the joystick. Each null zone transition point is typically represented as a two dimensional point in Cartesian space (e.g., X deflection, Y deflection) that represents a particular joystick position or a joystick control signal corresponding to that particular position.

In another embodiment, a docking system/autopilot configured to sense feedback of operation of navigation control system 190 (e.g., through engine/thruster sensors and/or through motion sensors, such as sensors 140-148 shown in FIG. 1) may be configured to perform an exhaustive search of such control signals/joystick positions, to determine a relatively complete set of such null zone transition points. Such null zone transition points may then be used to describe a null zone boundary segregating null zone control signals/joystick positions within the null zone from operative zone control signals/joystick positions equal to or outside the null zone boundary.

In various embodiments, null zone boundary initialization may refer to any of a number of different techniques to convert an acquired set of null zone transition points for a joystick/manual user interface into a set of straight line segments that, when combined, characterize/represent a null zone boundary. For example, the null zone transition points may be converted to polar form (e.g., rho, theta) about the center/neutral position of a characterized joystick (and/or the corresponding control signal), and then sorted by theta. This sorting allows neighboring null zone transition points to be joined together to create a set of null zone boundary line segments that represent a continuous and well defined function with only one value for rho for each theta. Such null zone boundary line segments may be individually characterized by a set of two null zone transition points that constitute the boundary of each null zone boundary line segment, and the thetas of the polar form of the two null zone transition points. Null zone boundary line segments may be linked together so as to be continuous (e.g., such that the "end" marker of segment n is equal to the "start" marker of segment n+1). Thus, a list of null zone boundary line segments may be created in the form [XStart, YStart, XEnd, YEnd, ThetaStart, ThetaEnd].

Sometimes one null zone boundary line segment will cross the theta=0 degrees boundary, and as such its ThetaEnd (being after 0 degrees) may be less than its ThetaStart (which will be just before 360 degrees). The intention is that given an arbitrary joystick position/control signal in polar form, a corresponding null zone boundary line segment can be chosen based on whether the theta of the joystick position/control signal falls between ThetaStart and ThetaEnd for a given null zone boundary line segment. With this in mind, the zero crossing segment can be duplicated within the list such that ThetaEnd of one +=360, and ThetaStart of the other −=360, resulting in a pair of null zone boundary line segment that cover all cases around the zero crossing (e.g., ranging from −10 to 10 degrees and 350 to 370 degrees, for example), regardless of how a particular joystick position/control signal is converted to polar form. Alternatively, ThetaEnd of one can be set to 360, and ThetaStart of the other to 0 to achieve the same effect.

In various embodiments, null zone compensation may refer to any of a number of different techniques to use an initialized/characterized null zone boundary to convert joystick deflections and/or corresponding control signals to null zone compensated control signals. For example, a raw joystick deflection/input control signal may be received and converted into polar form (e.g., [rhoIn, thetaIn], as described herein. ThetaIn of the raw input control signal may be compared to the already generated list of null zone boundary line segments in order to determine a particular null zone boundary line segment in which thetaIn resides (e.g., thetaIn is within range of ThetaStart and ThetaEnd of that particular null zone boundary line segment). ThetaIns that equal ThetaStart or ThetaEnd of a neighboring pair of null zone boundary line segments may be assigned to either null zone boundary line segment. Rho equal to zero may be treated as a special case and assigned a null zone compensated control signal/joystick position of [0,0].

In various embodiments, an intersection point between the corresponding deflection vector (e.g., [0, 0; Joystick_deflection_x, Joystick_deflection_y]) and the identified null zone boundary line segment (e.g., [XStart YStart; XEnd YEnd]) may be determined geometrically, and the intersection point may be represented in/converted to polar form (e.g., [rhoInter, thetaInter]). Subsequently, an operative zone width along the theta of the raw deflection/control signal may be determined, where the operative zone width corresponds to the distance between the intersection point and a corresponding operative zone boundary point, at which a line through the origin ([0 0]) and the intersection point intersects the "frame" of the manual user interface (e.g., the maximum deflection/control signal space in which the joystick can operate, sometimes represented by [−1 1; −1 1]). Such operative zone boundary point (e.g., rhoEdge, thetaEdge]) corresponds to effectively the greatest possible value for rho at the given theta of the raw deflection/control signal. Thus, the distance from the origin/neutral position/deflection/control signal to the boundary of the null zone is known, and the distance from the origin to the frame boundary along the theta of the raw joystick deflection is also known. Such values may be used to determine the corresponding null zone compensated control signals.

For example, in one embodiment, the following method, represented in pseudocode, may be used to perform null zone compensation (e.g., where rhoDeadMin defines the size of a synthetic control signal damping zone imposed/presented to the control system to allow tiny variations in the control signals about [0 0] to be permitted without causing wild jumps in the navigation control system response; in a true null zone such variations would be forced to zero and therefore not impact functioning of thrust maneuver system 172; the pseudo synthetic control signal damping zone prevents instability or other operational issues in some systems that might otherwise be caused by a tiny amount of input noise about [0 0], yet retains enough sensitivity to reliably control operation of thrust maneuver system 172).

```
if rhoIn >= rhoDeadMin
   rhoProportionalOutsideDeadzone = (rhoIn − rhoDeadMin) / (rhoEdge − rhoDeadMin);
   rhoOut = rhoInter + (rhoEdge − rhoInter) * rhoProportionalOutsideDeadzone;
else
   rhoProportionalInsideDeadzone = rhoIn / rhoDeadMin;
   rhoOut = rhoProportionalInsideDeadzone * rhoInter;
end
```

Once rhoOut is determined, [rhoOut, thetaIn] may be converted to Cartesian coordinates to provide the corresponding null zone compensated control signal (e.g., corresponding to an XY joystick deflection/control signal). Null zone characterization and initialization may be performed once or periodically (e.g., if the null zone for the particular manual user interface might change over time), and null zone compensation is typically performed at the rate control signals are generated by the joystick/manual user interface.

In various embodiments, such null zone compensation may be used in both assisted and autonomous maneuvering of a vessel. For example, if a user is maneuvering mobile structure 101 using joystick 120, and system 100 is assisting in such maneuvering by converting manual joystick inputs and their corresponding control signals into velocity demands, as described herein, the described null zone compensation may be used to compensate for any null zone integrated with or between, for example, joystick 120 and thrust maneuver system 172, so as to provide a more intuitive and response control over maneuvering of mobile structure 101, and/or to slow or stop mobile structure 101 if approaching a dock or navigation hazard, as described herein. If system 100 is maneuvering mobile structure 101 autonomously, such as for autonomous docking assistance, the described null zone compensation may be used to compensate for any null zone integrated with thrust maneuver system 172, so as to allow for reliable and accurate control of propulsion system 170, thrust maneuver system 172, and/or other elements of navigation control system 190 and/or system 100.

Figure 26:
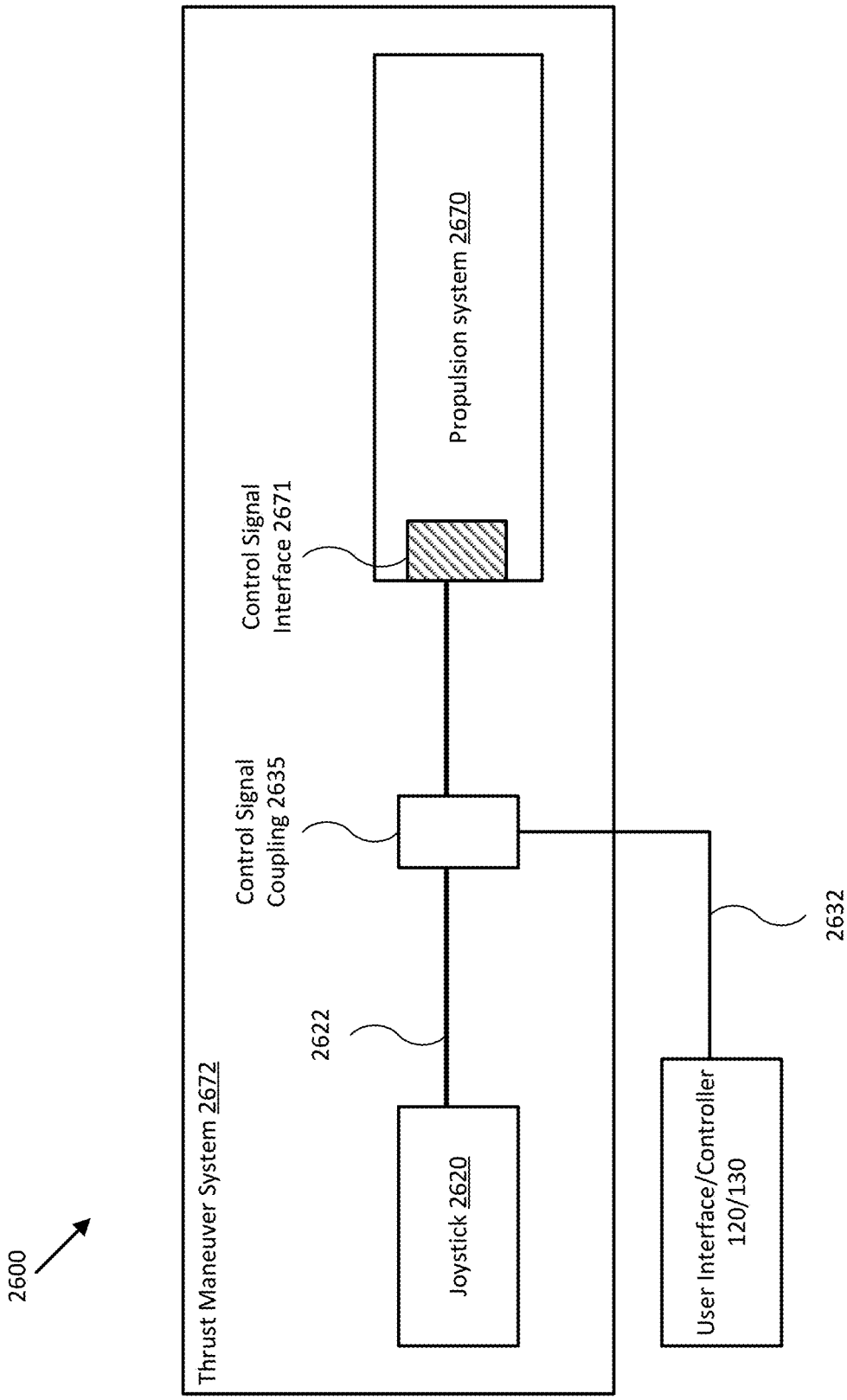
FIG. 26 illustrates a block diagram of a docking assist system integrated with a thrust maneuver system in accordance with an embodiment of the disclosure.

FIG. 26 illustrates a block diagram of a docking assist system 2600 (e.g., user interface/controller 120/130, with one or more additional elements of system 100 shown in FIG. 1A) integrated with a thrust maneuver system 2672 in accordance with an embodiment of the disclosure. As shown in FIG. 26, thrust maneuver system 2672 includes joystick 2620 providing corresponding joystick control signals over control signal line 2622 to propulsion system 2670, similar to joystick 120 providing control signals to elements of navigation control system 190, as described herein. Generally, thrust maneuver system 2672 may be implemented similarly to thrust maneuver system 172 of FIG. 1A. In various embodiments, propulsion system 2670, which may be implemented as an articulated and/or multi-thruster thruster propulsion system, for example, may include a control signal interface 2671, which may be configured to receive control signals from joystick 2622 and control propulsion system 2670 to implement navigation maneuvers corresponding to the control signals, as described herein. Either or both joystick 2620 and control signal interface may include a null zone in which physical manipulation and/or corresponding control signals do not change operation of propulsion system 2670 (e.g., to the extent that it would affect maneuvering of mobile structure 101, for example). Null zone compensation, as described herein, may be used to compensate for such null zone(s), regardless of where they reside within thrust maneuver system 2672.

Also shown in FIG. 26 is user interface 120/controller 130 (e.g., from FIG. 1A) coupled to control signal line 2622 through autopilot/control signal coupling 2635. In various embodiments, control signal coupling 2635 may be configured to selectively transmit control signals generated by joystick 2620 to controller 130 over controller line 2632, pass or relay control signals generated by joystick 2620 to propulsion system 2670 over control signal line 2622, block control signals generated by joystick 2620 from reaching propulsion system 2670, and/or to replace or modify control signals generated by joystick 2620 according to control signals generated by controller 130 and provided over controller line 2632, all as controlled by controller 130 over controller line 2632. As such, control signal coupling 2635 allows components of docking assist system 100 (e.g., user interface 120, controller 130, and/or other such components) to be linked and/or communicate with and control elements of navigation control system 190, including thrust maneuver system 2672, without having to substantially alter or replace joystick 2620, control signal interface 2671, and/or propulsion system 2670. More generally, controller 130 may be configured to implement any of the processes described herein, including providing null zone compensation for thrust maneuver system 2672. Control signal line 2622 may be implemented according to any wired and/or wireless communication protocol or combination of protocols, for example, including one or multiple CAN buses and/or interconnects.

Figure 27:
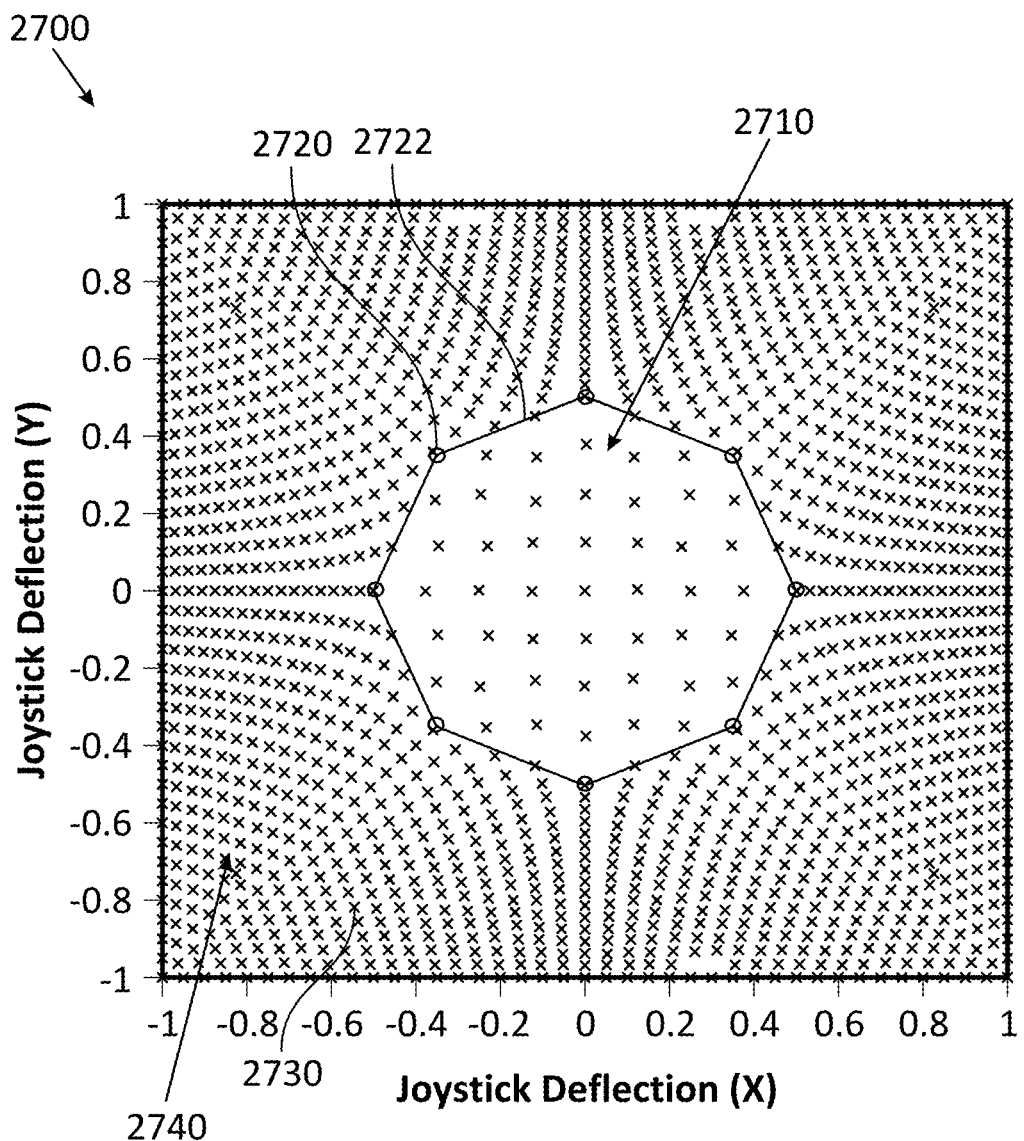
FIGS. 27-29 illustrate null zone transfer functions in accordance with embodiments of the disclosure.
Figure 28:
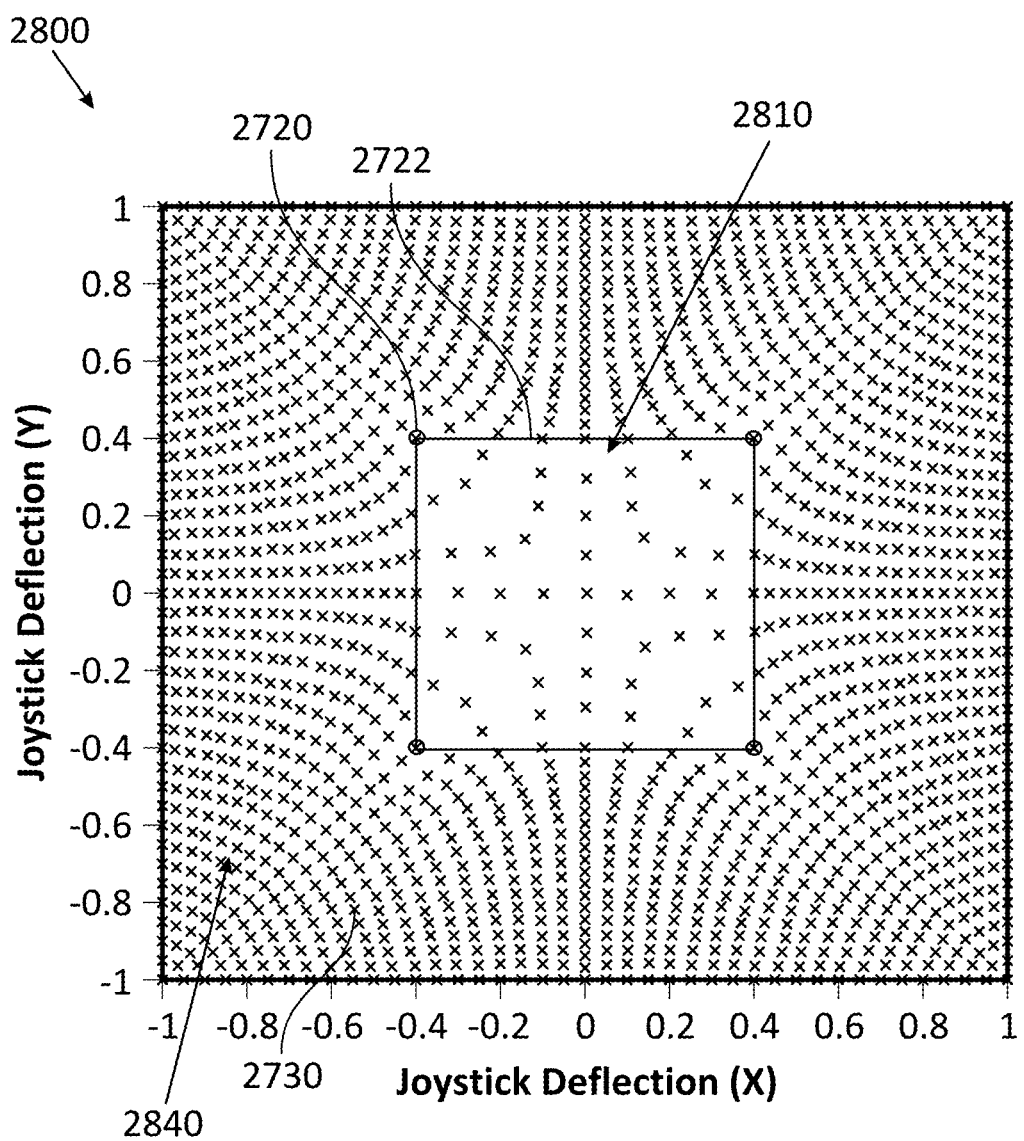
Figure 29:
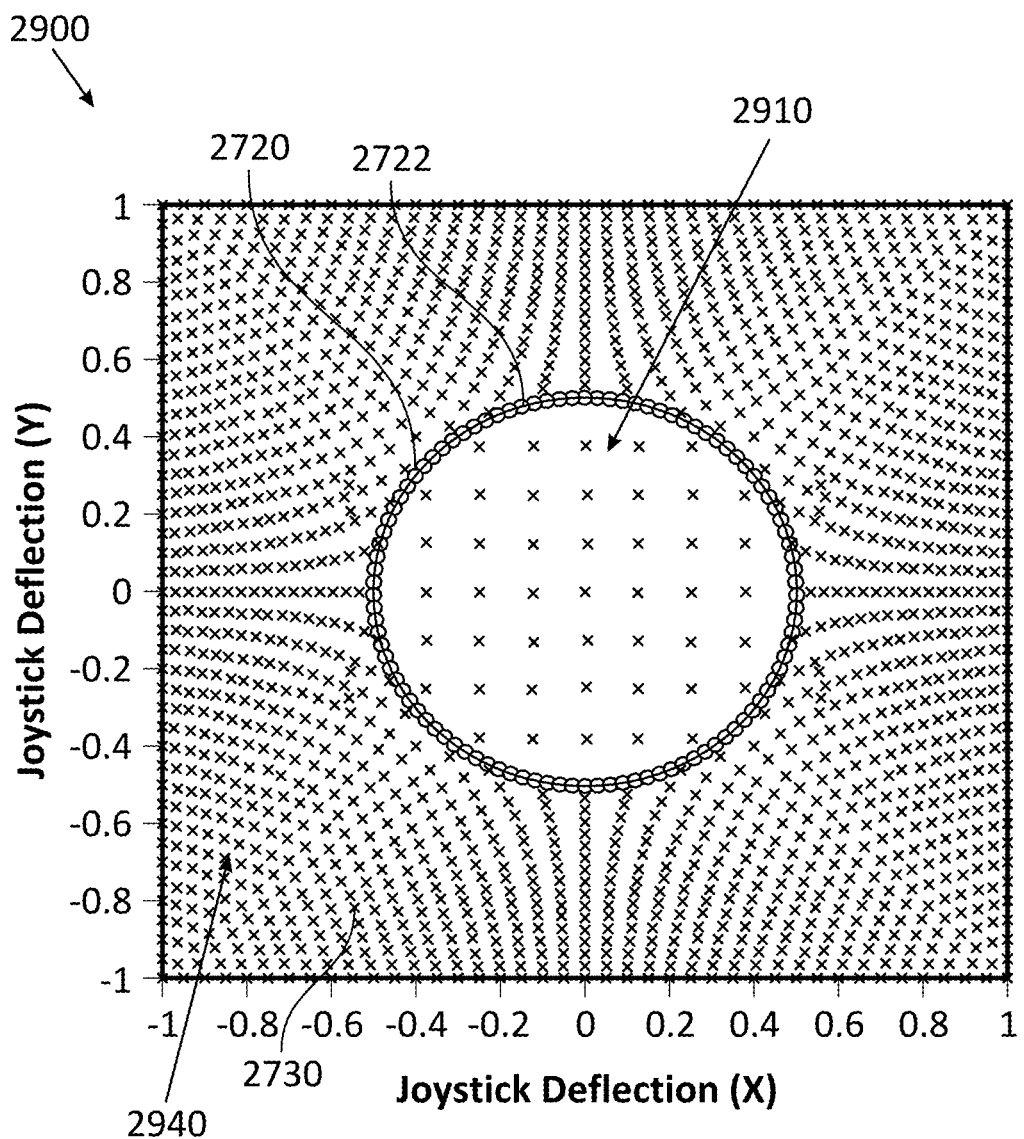

FIGS. 27-29 illustrate null zone transfer functions in accordance with embodiments of the disclosure. For example, FIGS. 27-29 each show identified null zone transition points 2720 (marked 'o'), derived null zone boundary segments 2722 (marked with lines) and a linearly spaced sampling 2730 (marked 'x') of the transfer function implemented according to the methodology described herein, given three different example null zones 2710, 2810, 2910, and three corresponding operational zones 2740, 2840, and 2940. Crucially, the number of sample points 2730 that fall within each null zone 2710, 2810, 2910 is minimized in a manner controlled by "rhoDeadMin." As shown in FIGS. 27-29, null zone 2710 corresponds to an octagonal shape, null zone 2810 corresponds to a square shape, and null zone 2910 corresponds to a circular or elliptical shape, and embodiments are able to compensate for each shape using the methodology described herein.

Figure 30:
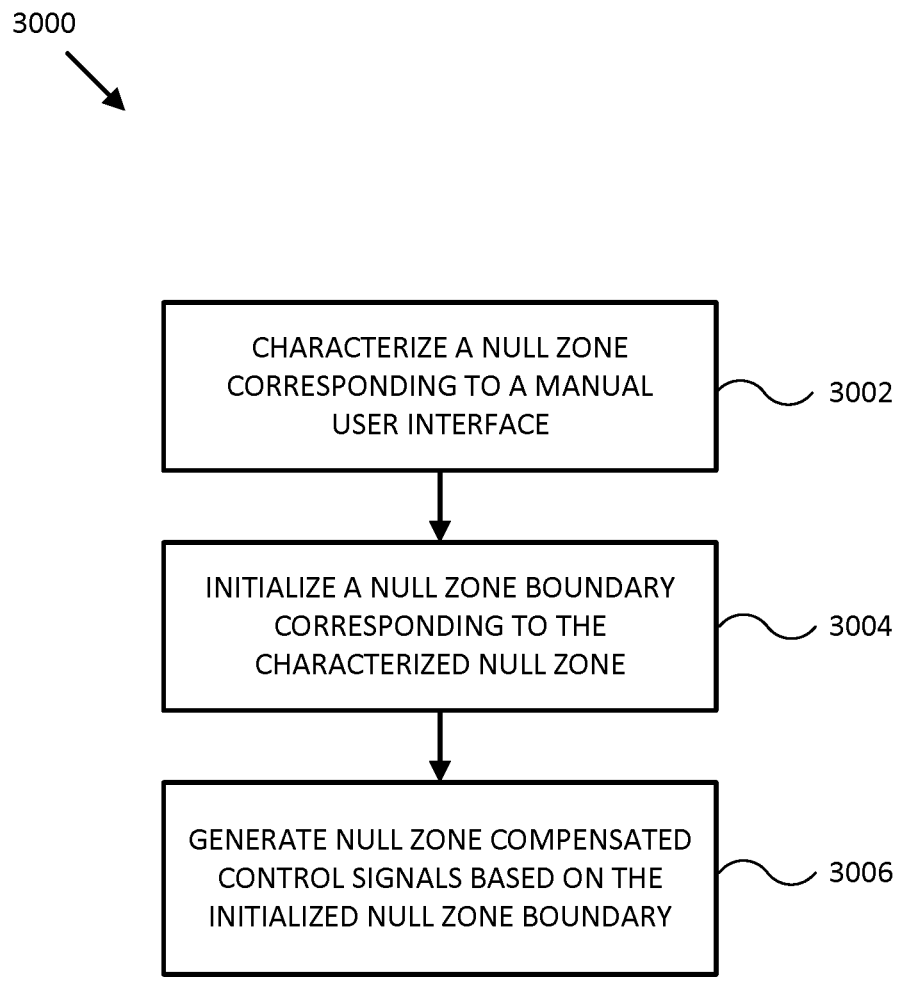
FIG. 30 illustrates a flow diagram of a process to provide null zone compensation for a docking assist system in accordance with an embodiment of the disclosure.

FIG. 30 illustrates a flow diagram of a process 3000 to provide null zone compensation for a docking assist system in accordance with an embodiment of the disclosure. It should be appreciated that any step, sub-step, sub-process, or block of process 3000 may be performed in an order or arrangement different from the embodiments illustrated by FIG. 30. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 3000 is described with reference to systems, processes, control loops, and images described in reference to FIGS. 1A-29, process 3000 may be performed by other systems different from those systems, processes, control loops, and images and including a different selection of electronic devices, sensors, assemblies, mobile structures, and/or mobile structure attributes, for example.

In block 3002, a null zone corresponding to a manual user interface is characterized. For example, controller 130 may be configured to characterize null zone 2710 corresponding to manual user interface/joystick 2620. In one embodiment, controller 130 may be configured to display instructions to a user on a display of user interface 120 instructing the user to manipulate joystick 2620 to determine a set of null zone transition points 2720 distributed about a boundary (e.g., null zone boundary line segments 2722) of null zone 2710. For example, controller 130 may be configured to monitor control signals from joystick 2620 over control signal line 2622 to determine a set of null zone transition points corresponding to a null zone implemented by joystick 2620.

In another embodiment, controller 130 may be configured to receive one or more operational feedback signals corresponding to operation of thrust maneuver system 2672, such as detecting motion of mobile structure 101 (e.g., sensed by sensors 140-148), or detecting start up, throttle, thrust pressure, and/or other operational states of thrust maneuver system 2672, to determine a set of null zone transition points corresponding to a null zone implemented by control signal interface 2671 and/or joystick 2620. In a further embodiment, controller 130 may be configured to generate control signals and provide them to thrust maneuver system 2672 directly to determine a set of null zone transition points corresponding to a null zone implemented by control signal interface 2671 and/or thrust maneuver system 2672.

In block 3004, a null zone boundary corresponding to the null zone characterized in block 3002 is initialized. For example, controller 130 may be configured to convert the set of null zone transition points 2720 identified in block 3002 for joystick/manual user interface 2620 into a set of null zone boundary line segments 2722 that, when combined, characterize/represent a null zone boundary corresponding to null zone 2710, as described herein. In various embodiments, such null zone boundary may be characterized by a list of such null zone boundary line segments that together represent a continuous and single valued function corresponding to the null zone boundary. The set or list of null zone boundary line segments may be differentiated from one another by the polar angles of their end points relative to a neutral position for joystick/manual user interface 2620.

In block 3006, null zone compensated control signals are generated. For example, in some embodiments, controller 130 may be configured to receive raw joystick control signals from joystick 2620, convert the raw joystick control signals into null zone compensated control signals based on the null zone boundary initialized in block 3004, and provide the compensated control signals to thrust maneuver system 2672. In other embodiments, controller 130 may be configured to determine a thrust or other navigation control demand, convert that demand into a raw control signal corresponding to a raw control signal generated by joystick 2620 if used to implement the demand, convert the raw control signal into a null zone compensated control signal based on the null zone boundary initialized in block 3004, and provide the compensated control signal to thrust maneuver system 2672.

Embodiments of the present disclosure can use such techniques to provide adaptive, reliable, and accurate docking assist and/or other types of navigational control for mobile structures, for example, and can do so relatively inexpensively by leveraging already-installed navigation control systems and related cabling and control signal techniques, as described herein.

For example, in some embodiments, system 2600 in FIG. 26 may be implemented more generally as an autopilot system 2600 (e.g., user interface/controller 120/130, with one or more additional elements of system 100 shown in FIG. 1A) configured to adaptively integrate with thrust maneuver system 2672 and/or any other portion of navigation control system 190 to provide various types of autopilot functionality over control signal line 2622 disposed between manual user interface/joystick 2622 and control signal interface 2671, which may be configured to interface with propulsion system 2670, as shown in in FIG. 26, and/or any other element of navigation control system 190 (e.g., steering sensor/actuator 150, propulsion system 170, and/or thrust maneuver system 172), as described herein. As noted herein, control signal coupling 2635 may be configured to selectively transmit control signals generated by joystick 2620 to controller 130 over controller line 2632 (e.g., allowing controller 130 to monitor such control signals), pass or relay control signals generated by joystick 2620 to propulsion system 2670 over control signal line 2622, block control signals generated by joystick 2620 from reaching propulsion system 2670, and/or to generate, replace, or modify control signals generated by joystick 2620 according to control signals generated by controller 130 and provided over controller line 2632, all as controlled by controller 130 over controller line 2632. As such, controller 130 and control signal coupling 2635 may be configured to emulate at least a portion of the typical operation of manual user interface/joystick 2622 with respect to control signaling generated along control signal line 2622, such as in response to user input provided to manual user interface/joystick 2622, as described herein.

In particular, user interface/controller 120/130 may be configured to determine a maneuvering protocol governing how control signals communicated between manual user interface 2620 and control signal interface 2671 over control signal line 2622 cause propulsion system 2670 to maneuver mobile structure 101. In various embodiments, such learning process may be performed without any prior knowledge of the maneuvering protocol, for example, which allows user interface/controller 120/130 and control signal coupling 2635 to be coupled into any thrust maneuver system 2672, regardless of manufacturer or particular type or implementation of maneuvering protocol, manual user input 2620, control signal interface 2671, control signal line 2622, and/or propulsion system 2670.

In some embodiments, user interface/controller 120/130 may be configured to identify and/or modify only maneuvering signals generated by manual user interface 2620 (e.g., control signals corresponding to or generated by direct manual manipulation of manual user interface 2620, as opposed to handshake, device ID, frame ID, diagnostic, and/or other portions of the control signals communicated between manual user interface 2620 and control signal interface 2671), so as to eliminate the unnecessary (e.g., and typically relatively lengthy, complex, and error prone) learning of the full communication protocol governing control signals communicated between manual user interface 2620 and control signal interface 2671. Non-maneuvering signals may be relayed over control signal line 2622 and/or replicated by user interface/controller 120/130 and/or control signal coupling 2635. In various embodiments, a resulting maneuvering protocol may be used to control operation of thrust maneuver system 2672 and/or other portions of navigation control system 190, such as providing docking assist control signals (e.g., for docking assist and/or autonomous dockings) and/or other navigational control, as described herein.

In a particular embodiment, control signal line 2622 may be implemented by multiple CAN buses (e.g., 2 or more) between manual user input/joystick 2620 and control signal interface 2671 of propulsion system 2670. Control signal line 2622 may be configured to convey joystick deflection (e.g., how far joystick 2620 has been manually pushed by a user) along with other (e.g., typically unknown) data as control signals on the multiple CAN buses (e.g., similar to an open systems interconnection (OSI) layer 2 hub). Control signal coupling 2635 may be implemented with multiple dual-CAN bus interfaces so as to be coupled between manual user input/joystick 2620 and control signal interface 2671 of propulsion system 2670 across each of the multiple CAN buses of control signal line 2622. In various embodiments, user interface/controller 120/130 and/or control signal coupling 2635 (e.g., which may be implemented with one or more microcontrollers and/or other logic devices) may be configured to bidirectionally relay CAN frames across each dual-CAN bus interface, such that control signals/traffic can flow freely in both directions as if control signal coupling 2635 was absent from system 2600. If necessary for a particular implementation and/or application, a CAN terminator may be inserted and/or coupled to one or both sides of one or more dual-CAN bus interfaces of control signal coupling 2635.

In such embodiment, user interface/controller 120/130 may be configured to use control signal coupling 2635 to monitor control signals on the various CAN buses of control signal line 2622 and identify the ID, format, and/or other characteristics of CAN bus frames or messages containing joystick deflection data. For example, controller 130 may be configured to use a display or speaker of user interface 120 to instruct a user to manually manipulate joystick 2620, such as according to a particular learning pattern or deflection direction and/or magnitude, for example, and to identify frames and/or portions of the frames that change when joystick 2620 is manipulated according to the provided pattern or deflection direction. In another example, controller 130 may be configured to identify the absence of such frames and/or portions of frames while joystick 2620 is disconnected from control signal line 2622 (e.g., by a user instructed to do so by user interface 120). Once such frames or portions of frames are identified as maneuvering signals, controller 130 may be configured to generate modified maneuvering signals and insert them within the frames or portions of frames on the CAN buses to control operation of propulsion system 2670, for example.

In a specific example of control using a learned maneuvering protocol (e.g., CAN frame ID containing joystick deflection data, magnitude/sign of possible joystick deflections, as reflected in the joystick deflection data, and/or correlation of such data with navigational results/maneuvering of mobile structure 101), controller 130 and/or control signal coupling 2635 may be configured to implement software instructions and/or logic similar to the following pseudocode:

Given BusJ=Joystick Port,
Given BusE=Engine Port,
Given InputID=CAN ID of joystick message containing joystick deflection (message to modify),

```
Given BusJ = Joystick Port,
Given BusE = Engine Port,
Given InputID = CAN ID of joystick message containing joystick
deflection (message to modify),
    Given HIDData = Manual joystick deflection,
    Given ModifiedData = Controller-modified joystick deflection,
do:
while(BusJ.readFrames( ))
- if (BusJFrame.ID == InputID)
- - HIDData = BusJFrame.Data
- - BusJFrame.Data = ModifiedData
- RelayFrames(From BusJ to BusE)
- If (BusE.readSingleFrame( ))
- - RelaySingleFrame(From BusE to BusJ) // (avoids locking the system in
the event of bandwidth spikes in traffic in one direction)
while(BusE.readFrames( ))
- RelayFrames(From BusE to BusJ)
- If (BusJ.readSingleFrame( ))
- - RelaySingleFrame(From BusJ to BusE) // (avoids locking the system in
the event of bandwidth spikes in traffic in one direction)
if (NewModifiedDataReceived) // (updated controller-modified joystick
deflection?)
- ModifiedData = NewModifiedData
TransmitToHost(HIDData) // (optionally send manual joystick deflection
to controller)
loop.
```

The above pseudocode/logic relays all non-maneuvering (but possibly essential) control signal traffic using the general logic and communication protocol already implemented in joystick 2620 and control signal interface 2671, and all that is modified is the joystick deflection itself (e.g., the maneuvering signals), according to a learned maneuvering protocol. In various embodiments, the above pseudocode/logic, control signal coupling 2635, and/or controller 130 may be configured to maintain any specific timings of transmissions of CAN messages/control signals (e.g., typically difficult to reproduce accurately in a full emulation) by relying on the learned and proven implementation already present in thrust maneuver system 2672, as shown. For example, the communication of ModifiedData to control signal coupling 2635 may be asynchronous with the timing of CAN frames along control signal line 2622, which may be maintained by control signal coupling 2635 as it inserts ModifiedData into BusJFrame.Data and relays frames from BusJ to BusE.

Under some relatively extreme field conditions, there is a risk that controller line 2632 between controller 130 and control signal coupling 2635 may become disconnected or damaged, for example, or that controller 130 may otherwise fail to provide an updated ModifiedData to control signal coupling 2635 during operation of thrust maneuver system 2672. If such failure is left undetected, thrust maneuver system 2672 may repeatedly supply an old and substantially constant modified joystick deflection (e.g., as a modified CAN bus frame/control signals) to control signal interface 2671, which can essentially lock propulsion system 2670 in a powered state that cannot be overridden by additional manual input provided to joystick 2620 and that can result in damage to mobile structure 101 and/or surrounding structures.

In some embodiments, to address this risk, controller 130 and/or control signal coupling 2635 may be configured to send and receive modified joystick deflections according to a preselected or individualized or otherwise known maximum time interval. Control signal coupling 2635 may be configured to detect that the maximum time interval for a particular received modified joystick deflection has been exceeded and to enter a safe-fail mode. For example, such safe-fail mode may include setting ModifiedData to a default value (e.g., zero joystick deflection), relaying HIDData without modification to control signal interface 2671 (e.g., setting ModifiedData equal to HIDData), and/or generating a visible and/or audible alert via user interface 120 to notify a user of mobile structure 101 that assisted and/or autonomous navigation of mobile structure 101 via control line 2632 and/or control signal coupling 2635 has failed.

Figure 31:
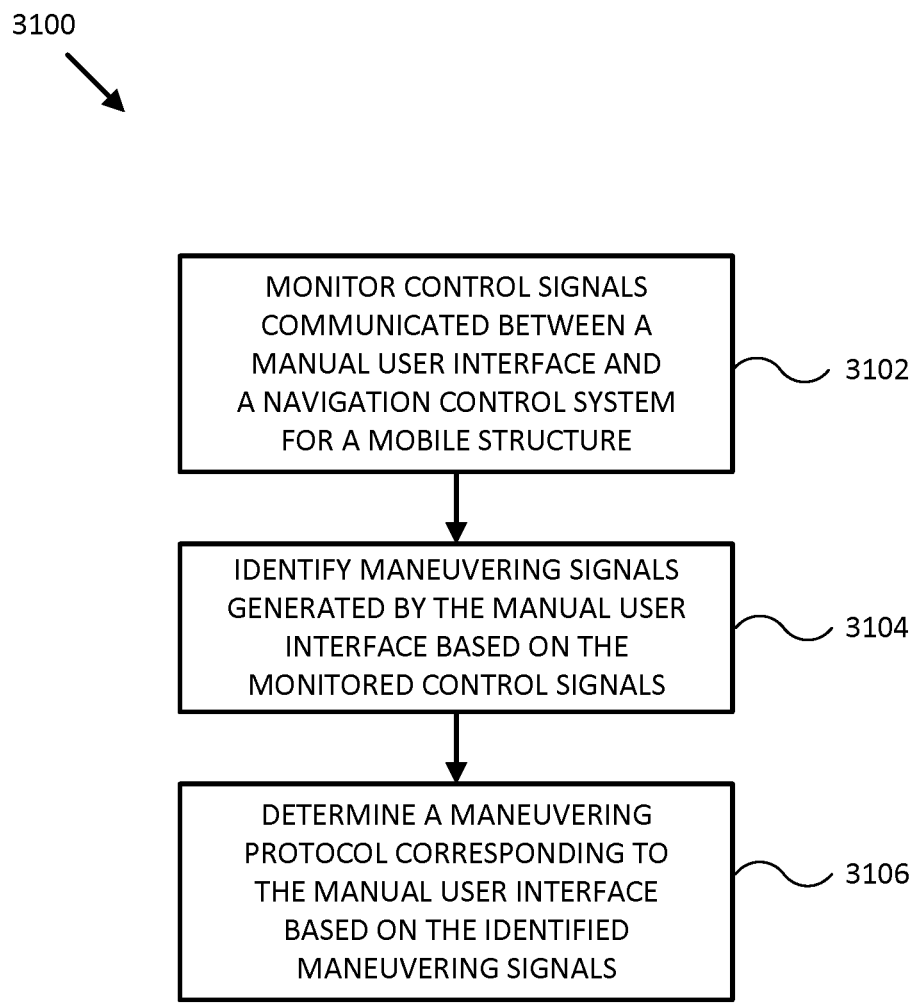
FIG. 31 illustrates a flow diagram of a process to determine a maneuvering protocol for a navigation control system in accordance with an embodiment of the disclosure.

FIG. 31 illustrates a flow diagram of a process 3100 to determine a maneuvering protocol for navigation control system 190 in accordance with an embodiment of the disclosure. It should be appreciated that any step, sub-step, sub-process, or block of process 3100 may be performed in an order or arrangement different from the embodiments illustrated by FIG. 31. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 3100 is described with reference to systems, processes, control loops, and images described in reference to FIGS. 1A-30, process 3100 may be performed by other systems different from those systems, processes, control loops, and images and including a different selection of electronic devices, sensors, assemblies, mobile structures, and/or mobile structure attributes, for example.

In block 3102, control signals communicated between a manual user interface and a navigation control system for a mobile structure are monitored. For example, controller 130 may be configured to use control signal coupling 2635 to monitor control signals communicated between manual user interface/joystick 2620 and control signal interface 2671 of propulsion system 2670. In some embodiments, control signal coupling 2635 may be configured to relay control signals, such as CAN bus frames and/or portions of frames transmitted by manual user interface/joystick 2620 and/or control signal interface 2671 along control signal line 2622 to controller 130 across controller line 2632. Controller 130 may receive the control signals and process the control signals to identify and/or extract control data, timing, and/or other control signal characteristics from the control signals, which may be stored and/or aggregated for further analysis and/or replay to manual user interface 2620 and/or control signal interface 2671 using control signal coupling 2635, for example.

In block 3104, maneuvering signals generated by a manual user interface are identified. For example, controller 130 may be configured to identify maneuvering signals generated by manual user interface/joystick 2620 based, at least in part, on the control signals monitored in block 3102. In one embodiment, controller 130 may be configured to display instructions to a user on a display of user interface 120 instructing the user to manipulate manual user interface 2620 according to one or more predefined learning patterns, deflection directions, and/or deflection magnitudes of manipulations of manual user interface 2620, for example, and to identify control signals (e.g., monitored in block 3102) that change according to such predefined learning patterns as maneuvering signals. For example, controller 130 may be configured to identify a set of maneuvering signals in the control signals monitored in block 3102 corresponding to such manipulations of manual user interface 2620.

In another embodiment, controller 130 may be configured to receive one or more operational feedback signals corresponding to operation of thrust maneuver system 2672, such as detecting motion of mobile structure 101 (e.g., sensed by sensors 140-148), or detecting start up, throttle, thrust pressure, and/or other operational states of thrust maneuver system 2672, to determine a set of maneuvering signals in the control signals monitored in block 3102 corresponding to such known manipulations of manual user interface 2620. In a further embodiment, controller 130 may be configured to generate control signals and provide them to thrust maneuver system 2672 directly to determine a set of maneuvering signals corresponding to manipulations of manual user interface 2620.

In block 3106, a maneuvering protocol corresponding to a manual user interface is determined. For example, controller 130 may be configured to determine a maneuvering protocol corresponding to manual user interface/joystick 2620 based, at least in part, on the maneuvering signals identified in block 3104. In one embodiment, controller 130 may be configured to determine the maneuvering protocol that is substantially the same as the maneuvering signals identified in block 3104, such that use of the maneuvering protocol includes replaying maneuvering signals identified in block 3104 to effect maneuvering of mobile structure 101. For example, controller 130 may be configured to retrieve stored maneuvering signals identified in block 3104 and use control signal coupling 2635 to generate and/or transmit control signals mimicking the identified maneuvering signals (e.g., to control signal interface 2671 of propulsion system 2670).

In another embodiment, controller 130 may be configured to determine a maneuvering protocol, based on the maneuvering signals identified in block 3104, including a mapping of a range of manipulation values to a range of possible manipulations of manual user interface 2620 and/or a range of accelerations and/or velocities of mobile structure 101 (e.g., as caused by propulsion system 2670 controlled by manual user interface 2620), such that use of the maneuvering protocol includes using such mapping to determine a manipulation value corresponding to a desired maneuver of mobile structure 101. For example, controller 130 may be configured to use control signal coupling 2635 to generate and/or transmit control signals corresponding to such determined manipulation value (e.g., to control signal interface 2671 of propulsion system 2670). In embodiments where control signal line 2622 is implemented as one or more CAN buses, controller 130 and/or control signal coupling 2635 may be configured to generate and/or transmit CAN bus frames with modified manual user interface deflections along control signal line 2622 (e.g., to control signal interface 2671), for example, or to replace manual user interface deflections in CAN bus frames transmitted along control signal line 2622 with modified manual user interface deflections, according to the determined maneuvering protocol, and as described herein.

Embodiments of the present disclosure can use such techniques to provide adaptive, reliable, and accurate docking assist and/or other types of navigational control for mobile structures, for example, and can do so relatively inexpensively by leveraging already-installed navigation control systems and related cabling and control signal techniques, as described herein.

Figure 32:
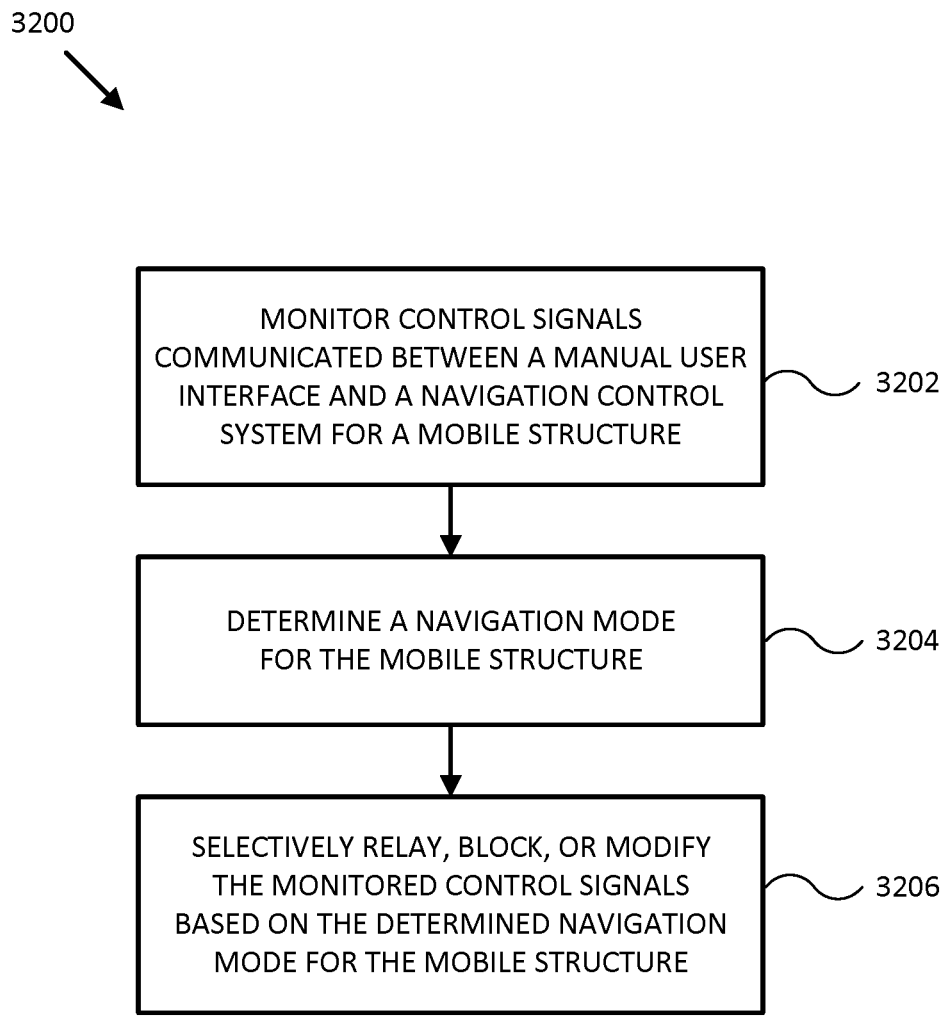
FIG. 32 illustrates a flow diagram of a process to provide autonomous and/or assisted navigational control for a mobile structure in accordance with an embodiment of the disclosure.

FIG. 32 illustrates a flow diagram of a process 3200 to provide autonomous and/or assisted navigational control for mobile structure 101 in accordance with an embodiment of the disclosure. It should be appreciated that any step, sub-step, sub-process, or block of process 3200 may be performed in an order or arrangement different from the embodiments illustrated by FIG. 32. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 3200 is described with reference to systems, processes, control loops, and images described in reference to FIGS. 1A-31, process 3200 may be performed by other systems different from those systems, processes, control loops, and images and including a different selection of electronic devices, sensors, assemblies, mobile structures, and/or mobile structure attributes, for example.

In block 3202, control signals communicated between a manual user interface and a navigation control system for a mobile structure are monitored. For example, controller 130 may be configured to use control signal coupling 2635 to monitor control signals communicated between manual user interface/joystick 2620 and control signal interface 2671 of propulsion system 2670, similar to block 3102 of process 3100 in FIG. 31. In some embodiments, control signal coupling 2635 may be configured to relay control signals, such as CAN bus frames and/or portions of frames transmitted by manual user interface/joystick 2620 and/or control signal interface 2671 along control signal line 2622 to controller 130 across controller line 2632. Controller 130 may receive the control signals and process the control signals to identify and/or extract control data, timing, and/or other control signal characteristics from the control signals, which may be stored and/or aggregated for further analysis and/or replay to manual user interface 2620 and/or control signal interface 2671 using control signal coupling 2635, for example.

In block 3204, a navigation mode for a mobile structure is determined. For example, controller 130 may be configured to determine a navigation mode for mobile structure 101 based on one or more of a user selection provided to user interface 120, a monitored environmental state of mobile structure 101 and/or an operational state of system 100, and/or a prior navigation mode for mobile structure 101. In some embodiments, the navigation mode may include one or more of a navigation assist mode, an autopilot or autonomous navigation mode, a manual navigation mode, and/or other navigation and/or docking modes, as described herein.

For example, a navigation assist mode may correspond to a configuration of system 100 where a mixture of manual input provided to manual user interface 2620 and modified control signals generated by controller 130 are used to pilot mobile structure 101, such as in a docking assist mode, as described herein. An autopilot or autonomous navigation mode may correspond to a configuration of system 100 where primarily control signals generated by controller 130 are used to pilot mobile structure 101, such as in an autonomous docking mode, as described herein. While in such mode, manual input applied to manual user interface 2620 may be used to exit such mode and enter a manual navigation mode, where control signals generated by manual user interface 2620 are primarily relayed to control signal interface 2671. In various embodiments, each navigation mode may include generating null zone compensated control signals so as to compensate for null zone associated with manual user interface 2620 and/or control signal interface 2671, as described herein (e.g., even when in manual navigation mode).

In block 3206, control signals are selectively relayed, blocked, or modified. For example, controller 130 may be configured to selectively relay, block, or modify (e.g., replace existing, modify existing, and/or generate new, inclusively) control signals monitored in block 3202 based, at least in part, on the navigation mode for mobile structure 101 determined in block 3204. In various embodiments, controller 130 may be configured to modify control signals monitored in block 3202 based, at least in part, on a learned or determined maneuvering protocol, such as the maneuvering protocol determined in block 3106 of process 3100.

In embodiments where the determined navigational mode is the navigation assist mode, controller 130 may be configured to use control signal coupling 2635 to generate and/or transmit modified control signals based on the control signals monitored in block 3202 (e.g., generated by manual user interface 2620) and the maneuvering protocol determined in block 3106, similar to and/or including the docking assist control signals provided in block 2506 of process 2500 in FIG. 25. In embodiments where the determined navigational mode is the autopilot or autonomous navigation mode, controller 130 may be configured to use control signal coupling 2635 to generate and/or transmit control signals based on the maneuvering protocol determined in block 3106, similar to and/or including the docking assist/autonomous docking control signals provided in block 2506 of process 2500 in FIG. 25. In embodiments where the determined navigational mode is the manual navigation mode, controller 130 may be configured to use control signal coupling 2635 to relay control signals generated by manual user interface 2620.

In any of such embodiments and/or modes, controller 130 may be configured to use control signal coupling 2635 and/or the maneuvering protocol determined in block 3106 to modify such control signals to compensate for a null zone associated with manual user interface 2620 and/or control signal interface 2671. Moreover, in any of such embodiments and/or modes, controller 130 may be configured to use control signal coupling 2635 to block control signals generated by manual user interface 2620 from reaching control signal interface 2671. More generally, controller 130 may be configured to use control signal coupling 2635 to implement and/or supplement any of the methods and/or methodologies described herein.

Embodiments of the present disclosure can use such techniques to provide adaptive, reliable, and accurate docking assist and/or other types of navigational control for mobile structures, for example, and can do so relatively inexpensively by leveraging already-installed navigation control systems and related cabling and control signal techniques, as described herein.

In addition, and to supplement the above, embodiments offer the following improvements. For example, controller 130 may be configured to receive relatively high resolution image of a docking environment (e.g., catways, etc.) and render a display view on a display of user interface 120 allowing a user to select a docking position and/or orientation for mobile structure 101. Perimeter ranging system 148 may be configured to provide fast and accurate (e.g., low noise and low latency) measurements of a position of mobile structure 101 relative to a target location, for example, and/or a relative velocity between mobile structure 101 and a dock or other navigation hazard or waypoint.

In general, docking assist system 100 may be configured to identify and avoid navigational hazards, while ignoring objects that do not present a navigational hazard. As such, embodiments may be implemented with artificial intelligence (AI) systems and techniques differentiate objects like sea gulls or floating debris that do not present a navigational hazard (indeed trying to avoid them would be dangerous) from, for example, the corner of a kayak, which could be of a similar size and color but should be avoided. Such intelligent systems/techniques may help determine a target pathway from a current position to a target location, avoiding obstacles, and taking into account the geometry and safety zone corresponding to mobile structure 101.

In various embodiments, docking assist system 100 may be configured to determine a difference between a target pathway and the actual position, the corresponding position and heading errors, and account for related sideslip dynamics. For example, such errors may be used to generate compensating navigation control signals. Because different boats operate according to different characteristic dynamics, embodiments provide such compensation adaptively. For example, often control signals need to be converted into the thrust axes of a particular vessel: some vessels have side thrusters, some have twin screws, some have thrust maneuver systems. Marine vessels can be complex places to install perimeter ranging systems. Installation is often done by end users on old boats, or by dealers. Unlike automotive applications, marine installations are often not factory fit. As such, installation and composition of elements of perimeter ranging system 148 should emphasize: low-latency; de-warping, stitching and motion stabilization of the sensors, with minimal cabling coming down to the control point; architecture that can accommodate a range of vessel sizes (e.g., 10 ft to 100 ft), and from sail to power; provide imagery into the distance with good resolution when approaching a dock (e.g., at 20 m), and to see all round as well as down for docking; provide imagery for a plan view of the environment so obstacles can be avoided and docking can be safe in all situations; minimal installation and setup, minimum number of sensors/installation points; small form factor and lightweight for ease of installation high up (>3m height); self-aligning, or with integral levelling (bubble level).

In some embodiments, docking assist system 100 may be configured to generate an audible warning to alert a user as the vessel's virtual bumper zone approaches an obstacle. The tone or volume can be modulated to indicate proximity. Furthermore, the region of proximity can be highlighted on a synthetic elevated view overlay, for example the lineation line between water and dock/boat can be overlaid on top of the synthetic elevated view and the proximity 'hot spots' can be pulsing in intensity.

For assisted docking, this visible warning can be useful in explaining to the user why the system is attenuating demand. For example, if the system has picked up a floating fender which the user would typically ignore but the system counts as an obstruction, then the pulsating outline around the floating fender would explain to the user why the joystick demand for velocity is not being delivered.

Should the virtual bumpers prevent entry into a tight berth, docking assist system 100 may notify the user and provide options. One is to reduce the size of the virtual bumper region, but this can be onerous and take time to do safely. Another is to allow the user to override the virtual bumpers via an override button, a user joystick action such as applying full joystick (like a kick-down switch on cruise control in a car), or other user interface techniques.

Blind spots can present a safety problem, over the sides, and aft, but particularly over the bow of a vessel. As the vessel moves forwards and approaches a dock, the dock can become obscured. To combat this, docking assist system 100 may in some embodiments include a camera or a pair of cameras looking over the bow and mounted on the toe rail or guard rail. In other embodiments, docking assist system 100 may be configured to use prior imagery of the dock, when it was visible, along with translational motion measurements (which themselves can be inferred from changes in imagery over time), to infer a range to the occluded dock edge. A camera system has the advantage over a human operator that, by using visual odometry (e.g., a measure of translational motion using differences in images over time), the historical imagery can be slid into exactly the right place relative to the boundary of the vessel. The existence of such blind spots can be automatically detected and sized during a calibration phase where the vessel performs a 360° spin, such as just after the system is installed.

A risk for autonomous docking is that the system drives the boat into an obstacle, either because an obstacle has not been detected, or because of a system fault. An "attenuation principle" can be applied to operation of docking assist system 100 to eliminate the risk of system 100 driving mobile structure 101 into an obstacle. This principle is defined such that detection of an obstacle cannot lead to velocity demand, but instead leads to the attenuation of a user's joystick or other manual user interface input, for example, or an attenuation of some other source of velocity demand (e.g., a docking assist navigation control signal/demand). For example, the output of the perimeter ranging system 148 can include a signal (or set of signals, forwards sideways rotation) in the range 0→1 where 1 implies leave the users velocity demand intact, and 0 means apply zero velocity demand (brakes) regardless of the user's demand. Such an attenuation signal cannot cause a vessel crash, but it can frustrate the user by preventing velocity demand, and it can fail to prevent a user induced crash. In various embodiments, the attenuation signal/gain adjustment is only allowed to fall below 1 where the user demands velocity towards an obstacle. Velocity demand away from an obstacle will never cause attenuation. Sliding along an obstacle is therefore possible, for example if a vessel is sliding into a dock, and the virtual bumper is close to touching down one side, then sideways velocity demand may be attenuated to 0 whereas forwards velocity demand would not be restricted until the bow approaches the front virtual bumper, so the vessel may continue following the path of least resistance along the direction of the dock.

In some embodiments, docking assist system 100 may be configured to generate a synthetic elevated view derived from a fixed camera installation, as described herein, or from an unmanned aerial vehicle (UAV) which can be automatically deployed and controlled by docking assist system 100. In some embodiments, as a user modifies the center or angle of a synthetic elevated view on the touch screen, docking assist system 100 may communicate with the UAV to cause it to move accordingly.

For boats with conventional propulsion systems (e.g., rudder and motor), it is not always possible to stop the boat (the wind will take the boat as the rudder loses control). In this case, the maneuver can be described as dynamic, which means it must be done in one go, keeping boat speed up. The stronger the wind and current, the higher the minimum boat speed. For these maneuvers, assisted docking may not be possible, and autonomous docking may be required. Once the user has specified the target location, docking assist system 100 determines a pathway which is appropriate for the vessel type. For example, a sailboat can come to a dock at 45°, then turn at the last minute and go into reverse to slow down. An outboard steered power boat cannot be docked using this strategy; rather, the engines should be turned to opposite lock and reverse thrust applied at the last minute, slowing the vessel and tucking in the stern. Vessels with bow thrusters have docking patterns which are different again. The boat type may be selected as part of calibration of docking assist system 100, and the appropriate set of docking patterns is then made available for selection by the user. For a docking scenario, docking assist system 100 may pick from the list of possible patterns and fit the chosen patterns to the specific scenario. A user may then be offered a set of choices (overlaid on a display of user interface 120) and can select their desired choice.

For velocity control, it is important to have a good measurement of velocity over the ground. GPS may sometimes not be good enough due to random walk (unless differential GPS is used, but this requires a base station mounted to the dock, with a radio link to the rover onboard), and noise in Doppler can be a limiting factor. So, another technique is needed, and a generic velocity measurement system should be capable of deployment anywhere worldwide. Docking assist system 100 may be configured to use visual odometry derived from imagery provided by visible or thermal, mono or stereo cameras. For single camera odometry, scaling is required, and one scaling solution is to scale from GPS at high speeds (>2 kts) where GPS suffers less from random walk.

In some embodiments, docking assist system 100 may be configured to compensate for wind and current effects by explicitly estimating the effects of wind and current through modelling. The wind can be measured through a wind vane and the current estimated from the difference between water speed measurements (e.g., a two-axis electromagnetic log, for example, which can measure water velocity as a vector) and ground speed, which can be measured using visual odometry employing embodiments of perimeter ranging system 148. Once current and wind are known, models can be applied to determine the effect on the vessel (e.g., wind tends to blow the bow downwind, due to the asymmetry where wind pressure acts at 0.25 of the chord of a body, which is ahead of the center of mass and ahead of the center of lateral resistance of the hull in the water). The expected disturbance can be used to determine a counteracting thrust demand set, as a feedforward term in the controller, reducing the demand on the feedback terms and improving overall control.

Boats vary in mass, thrust, and control dynamics (e.g., delays in gear changing, pod rotation and throttle changes, and dead zones which may surround the neutral joystick position). One way to handle these variations is a robust control system, as described herein. Furthermore, the dynamics may be measured through observation during vessel use (either manually by the user, or automatically).

In various embodiments, docking assist system 100 may be configured to use video analytics to highlight navigational hazards such as objects (like posts) which might otherwise go unnoticed or are within a certain distance of a known route. Once docking assist system 100 has established the pathway and yaw angles of a docking route, this may be displayed to the user as a zone through which the vessel occupies space, such as an animated walkthrough of the route/yaw the vessel will take, or other methods to show a user the expected route context before the user accepts the docking maneuver.

In the automotive space there are hybrid control systems, such as where a user controls brakes, throttle, and clutch, but the steering angle is automated or assisted. The same can be applied to the marine space, where the rudders, throttles, and gear positions, for example, can be controlled by the skipper or docking assist system 100. However, unlike automotive where speed and steering are independent variables, watercraft have considerable cross coupling. One form of hybrid control technique which is more suitable to boating systems is for the maneuver to be controlled automatically, but the pace of the maneuver to be controlled or adjusted by the user. For example, once a maneuver is selected, a joystick's right/left/rear/twist directions could be ignored, and the forward/neutral joystick dimension could be used to indicate to the system whether to run the maneuver at full speed, or to slow or halt the maneuver, depending on the forward deflection of the joystick.

In embodiments where system 100 includes a joystick or other manual interface device, docking assist system 100 may be configured to automatically activate assisted docking whenever the joystick/manual user interface is in use (whether or not synthetic elevated view camera is being viewed), to automatically open pre-defined applications on one or more user interfaces whenever the joystick/manual user interface is in use, and/or to automatically enable assisted docking whenever a synthetic elevated view is displayed. In embodiments where system 100 does not include a joystick or other similar manual interface device, docking assist system 100 may be configured to enable assisted docking when throttle control drops below a defined threshold; speed-over-ground drops below a defined threshold. In one embodiment, object recognition (e.g., using AI systems and techniques) may be used to identify and place mobile structure 101 dead-center over a trailer as a user drives forwards.

Under some relatively extreme field conditions, there is a risk that controller line 2632 between controller 130 and control signal coupling 2635 may become disconnected or damaged, for example, or that controller 130 may otherwise fail to provide an updated ModifiedData to control signal coupling 2635 during operation of thrust maneuver system 2672. If such failure is left undetected, thrust maneuver system 2672 may repeatedly supply an old and substantially constant modified joystick deflection (e.g., as a modified CAN bus frame/control signals) to control signal interface 2671, which can essentially lock propulsion system 2670 in a powered state that cannot be overridden by additional manual input provided to joystick 2620 and that can result in damage to mobile structure 101 and/or surrounding structures.

In some embodiments, to address this risk, controller 130 and/or control signal coupling 2635 may be configured to send and receive modified joystick deflections according to a preselected or individualized or otherwise known maximum time interval. Control signal coupling 2635 may be configured to detect that the maximum time interval for a particular received modified joystick deflection has been exceeded and to enter a safe-fail mode. For example, such safe-fail mode may include setting ModifiedData to a default value (e.g., zero joystick deflection), relaying HIDData without modification to control signal interface 2671 (e.g., setting ModifiedData equal to HIDData), and/or generating a visible and/or audible alert via user interface 120 to notify a user of mobile structure 101 that assisted and/or autonomous navigation of mobile structure 101 via control line 2632 and/or control signal coupling 2635 has failed.

As described herein, embodiments allow a pilot of mobile structure 101 to maintain a position against tide/current/wind effects, request directional thrusts on top of position holding, prevent collision via a virtual bumper, and dock a vessel. The pilot controls this via a manual user interface, such as a joystick, used to control operation of one or more elements of navigation control system 190, such as thrust maneuver system 172. Embodiments are also able to display aspects of such maneuvering and control to a pilot intuitively so as to provide for reliable and safe maneuvering of mobile structure 101. For example, a graphical docking user interface, rendered on a display of user interface 120 for example, may be configured to indicate what thrusts navigation control system 190 is generating in order to maintain position; how hard navigation control system 190 is working to achieve position maintenance; where navigation hazards (e.g., docking pontoons) are in relation to mobile structure 101; what inputs the pilot is providing; and why mobile structure 101 may not be responding. A pilot may incrementally enable/disable aspects of such docking user interface, for example, such as overriding or disabling the virtual bumper, as described herein.

Generally, a docking user interface according to embodiments described herein may include rendered graphics configured to represent navigation hazards and/or other obstructions detected in relation to mobile structure 101 and its (optional) virtual bumpers, to optimize the display of information relative to desired docking maneuvers, to represent the combined tide/current/wind force vectors, and to represent thrust vectors in relation to the direction of thrust and in relation to the potential thrust available at that direction.

More particularly, a docking user interface may include a number of live video feeds from cameras mounted about mobile structure 101. Desirably, such cameras are arranged within the docking user interface in their correct orientation relative to a (e.g., head-up) mobile structure perimeter indicator and/or image in the center of a maneuvering guide of the docking user interface, such as video feeds from port cameras rendered left of the maneuvering guide, video feeds from starboard cameras rendered right of the maneuvering guide, video feeds from rear cameras rendered below the center of the maneuvering guide, and video feeds from front cameras rendered above the center of the maneuvering guide. A plan view mobile structure perimeter indicator and/or image may be displayed in the center of the display/docking user interface. When the virtual bumper is active, the bumper may be drawn about the mobile structure perimeter indicator and/or image.

A live, dynamic obstruction map, which may be derived from a 2D or 3D model created by perimeter ranging system 148 (e.g., distance sensing camera feeds), may be shown around and in correct relation to the mobile structure perimeter indicator and/or image. The obstruction map may be generated to be color coded to indicate newest/oldest detected perimeter sensor data and/or heights of detected navigation hazards. Such docking user interface may include buttons or other controls to select a navigation mode (e.g., manual, or docking assist) or to enable, disable, and/or adjust the virtual bumper. If such virtual bumper is enabled, when the navigation control system prevents further motion because a navigation hazard is detected at or within the virtual bumper, a virtual bumper perimeter intrusion indicator or other visual effect may be rendered at the approximate position of the detected navigation hazard.

In various embodiments, elements of the docking user interface may be rendered differently according to selected navigation modes of operation, such as a manual navigation mode (e.g., where manual/joystick control signals are primarily passed directly through to navigation control system 190), a docking assist mode (e.g., where manual/joystick control signals are processed and/or adjusted before being provided to navigation control system 190, as described herein), and with or without virtual bumpers.

In additional embodiments, the general layout of the docking user interface (e.g., including the size and/or placement of the maneuvering guide relative to one or more video feeds) may be adjusted, such as according to user input and/or automatically based on a detected navigation hazard, for example, to emphasize video feeds in the direction that the pilot is attempting to dock the vessel (and de-emphasize accordingly the obstruction map.

In various embodiments, system 100 may not be configured to or be able to measure tide/current and wind directly through separate sensors, and yet this can be a critical component to docking, and therefore useful information to show a pilot of mobile structure 101—it may affect the pilot's strategy for docking. However, embodiments can determine the force required to maintain a stationary position against such navigation disturbances/effects, such as by evaluating the force generated by navigation control system 190 (e.g., which may be asymmetric due to the shape, size, keel, thruster placement, and/or other physical characteristics of mobile structure 101. Therefore, the opposite of the generated forces can be considered to be due to tide/current and wind and therefore shown as a combined vector, with suitable hysteresis.

Vessels using pod-style or other types of maneuvering drives can generally maneuver in all directions, but these and generally all drives are typically less effective in some directions than others. Therefore, holding position against a strong tide/current/wind effect may at certain angles require more effort from the drive than other directions. This is important information to show a pilot because the vessel may fail to hold position for tide/current/wind pushing at certain angles, and the vessel may be using a very large percentage of its maximum thrust to hold position for tide/current/wind at certain angles, thereby leaving little additional thrust available for a pilot demanded thrust maneuver.

Accordingly, in docking assist mode, the docking user interface may indicate the aggregate translational thrusting vector as a graphical bar chart centered on the mobile structure perimeter indicator and/or image and projecting towards or away from the direction of thrust (e.g., depending on desired visual feedback), where a relatively small graphic with few bars may represent relatively small amounts of thrust relative to maximum thrust for that direction, and a relatively large graphic with all bars may represent maximum thrust for that direction. Such graphical feedback also applies to aggregate rotational thrusts (e.g., generated by opposing drives). In dock assist mode, the docking user interface may indicate the aggregate rotational thrusting magnitude and direction as a graphic bar extending about mobile structure perimeter indicator and/or image in the maneuvering guide and extending towards or away from the direction of turning thrust (e.g., depending on desired visual feedback), where a relatively small graphic bar may represent relatively small amounts of thrust relative to maximum thrust for that rotation, and a relatively large graphic with all bars may represent maximum thrust for that rotation.

Figure 33:
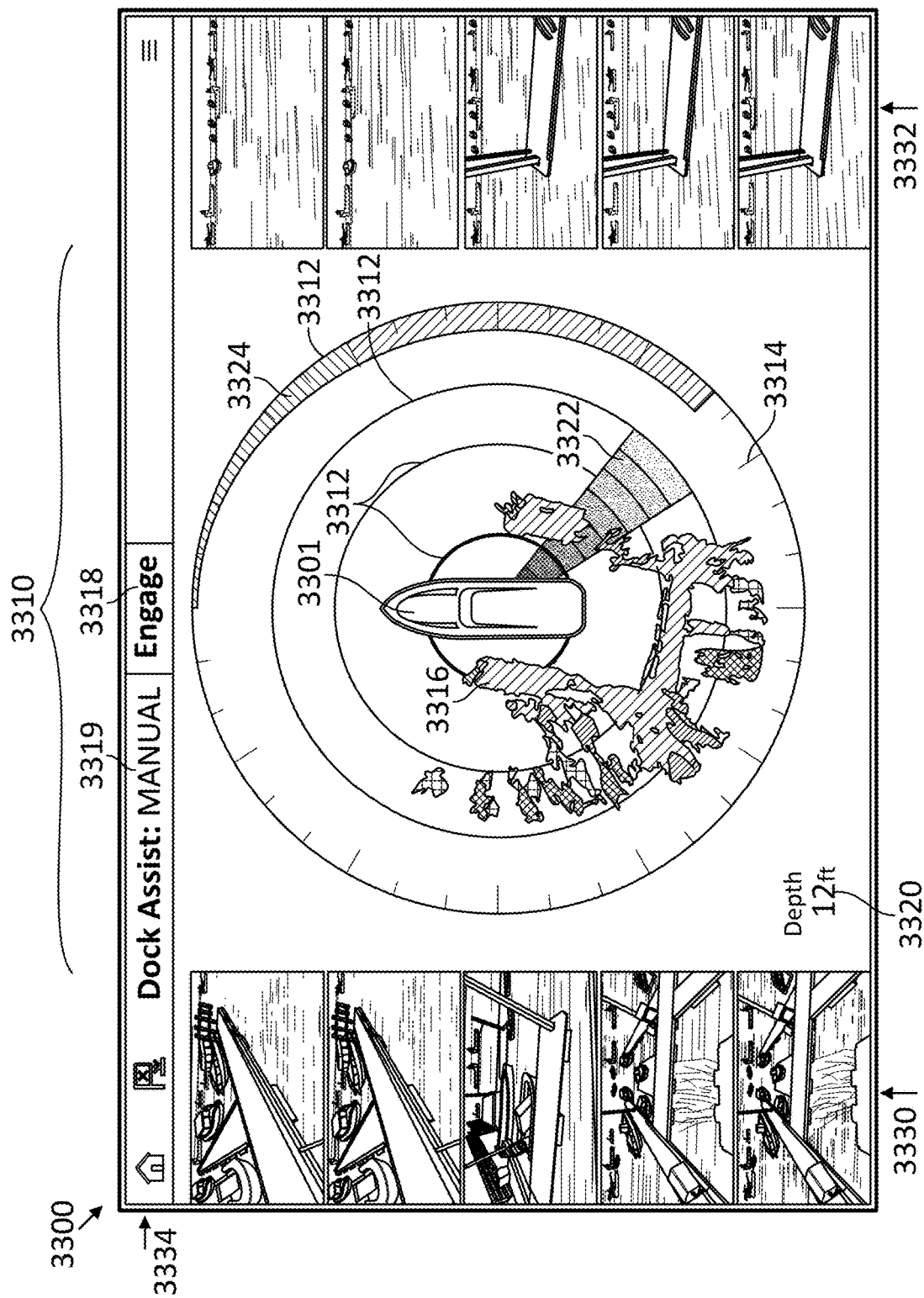
FIGS. 33-38 illustrate display views of a docking user interface in accordance with an embodiment of the disclosure.

FIGS. 33-38 illustrate various display views 3300-3800 of a docking user interface in accordance with an embodiment of the disclosure. For example, FIG. 33 shows display view 3300 corresponding to a manual navigation mode for system 100. As shown in FIG. 33, display view 3300 includes maneuvering guide 3310 disposed between port video feeds 3330 and starboard video feeds 3332. Each of the individual video feeds in video feeds 3330 and 3332 may be arranged within display view 3300 generally according to the mounting position on mobile structure 101 of the camera providing the video feed, relative to the orientation of mobile structure perimeter indicator 3301 (e.g., depicted in display view 3300 in a heading-up orientation). For example, in the embodiment shown in FIG. 33, port video feeds 3330 include, from top to bottom, a front video feed from a camera mounted near a bow of mobile structure 101 (e.g., possibly to port of a bow of mobile structure 101) and aimed substantially along a longitudinal axis of mobile structure 101, three port video feeds from cameras mounted along a port side of mobile structure 101 and aimed substantially to port, and a rear video feed from a camera mounted near a stern of mobile structure 101 (e.g., possibly to port of a stern of mobile structure 101) and aimed substantially antiparallel to a longitudinal axis of mobile structure 101. Starboard video feeds 3332 include the same distribution of video feeds and cameras, but to starboard of mobile structure 101.

In FIG. 33, maneuvering guide 3310 includes mobile structure perimeter indicator 3301 configured to indicate a perimeter of mobile structure 101, obstruction map 3316 showing various navigation hazards detected by perimeter ranging system 148, and translational and rotational thrust indicators 3322 and 3324 each rendered according to a greyscale render palette (e.g., while system 100 is in a manual navigation mode, as indicated by docking assist indicator 3319). In the embodiment shown in FIG. 33, such greyscale palette maps larger magnitude thrusts to whiter shades.

Translational thrust indicator 3322 may be implemented as a segmented cone-shaped bar graph configured to indicate a translational maneuvering thrust magnitude (e.g., corresponding to a radial length of translational thrust indicator 3322) and direction (e.g., corresponding to a radial direction of translational thrust indicator 3322) relative to the orientation of mobile structure perimeter indicator 3301 shown in maneuvering guide 3310. Rotational thrust indicator 3324 may be implemented as an arc-shaped semicircular bar graph configured to indicate a rotational maneuvering thrust magnitude (e.g., corresponding to an arc length of rotational thrust indicator 3324) and direction (e.g., clockwise or counterclockwise corresponding to the respective right or left disposition of rotational thrust indicator 3324) relative to the orientation of mobile structure perimeter indicator 3301 shown in maneuvering guide 3310. Although shown in display view 3300 as rendered beneath obstruction map 3316 (e.g., to ensure navigation hazards are viewable within maneuvering guide 3310), in other embodiments, translational and/or rotational thrust indicators 3322, 3324 may be rendered on top of obstruction map 3316 (e.g., to emphasize maneuvering situational awareness, or thrusts approaching maximum available thrust) and/or be rendered at least partially translucent relative to obstruction map 3316.

To help visually quantify the magnitudes indicated by translational thrust indicator 3322, maneuvering guide 3310 may include a set of translational thrust scale markers 3312 implemented as a plurality of circles with increasing radiuses and centered on mobile structure perimeter indicator 3301, where each circle corresponds to a particular translational thrust percentage of a maximum available translational thrust generated by navigation control system 190 across the circumference of the circle, for example, or where each circle corresponds to a particular absolute measure of translational thrust (e.g., in units of force). To help visually quantify the magnitudes indicated by rotational thrust indicator 3324, maneuvering guide 3310 may include a set of rotational thrust scale markers 3314 implemented as two pluralities (e.g., left and right) of radially oriented line segments each distributed evenly across half a circumference of an outer circle of translational thrust scale markers 3312, where each line segment corresponds to a particular rotational thrust percentage of a maximum available rotational thrust generated by navigation control system 190 (e.g., zero clockwise/counterclockwise thrust is at 0 degrees, and maximum clockwise/counterclockwise thrust is at 180 degrees), for example, or where each line segment corresponds to a particular absolute measure of rotational thrust (e.g., in units of force or torque).

In various embodiments, as shown in display view 3300, a docking user interface may include various other indicators and/or buttons, selectors, or other controls. For example, display view 3300 includes various menu selection button 3344 across a header of display view 3300, a docking assist selector 3318 (e.g., allowing a pilot to enable or disable a docking assist navigation mode for system 100 and/or select between a manual navigation mode and a docking assist navigation mode), and maneuvering guide 3310 may include depth indicator 3320 to help ensure safe navigation through relatively shallow water, such as that often found near a harbor.

Figure 34:
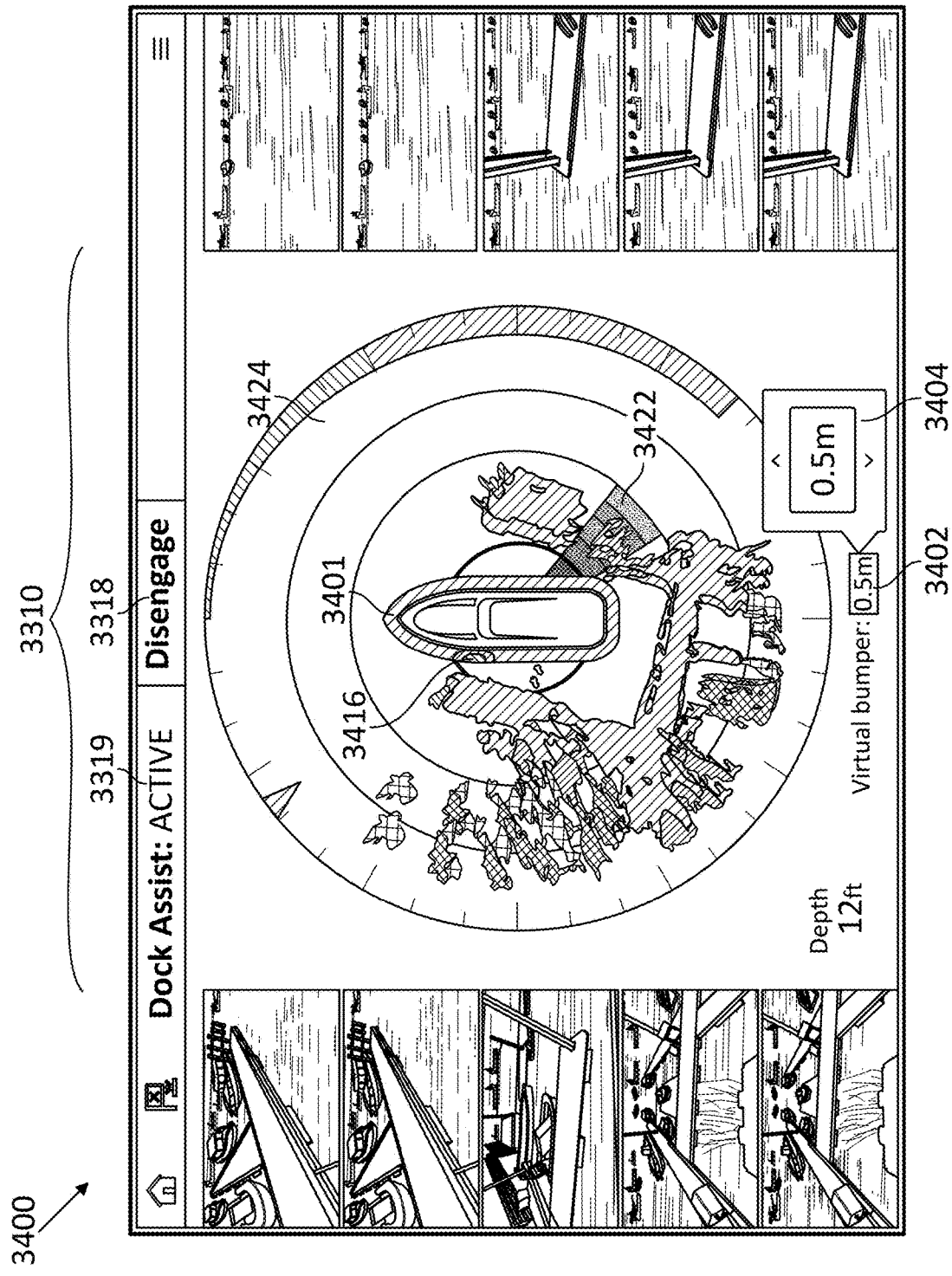

FIG. 34 shows display view 3400 corresponding to a docking assist navigation mode for system 100. As shown in FIG. 34, display view 3400 includes many of the same graphics rendered within display view 3300, and additionally includes translational and rotational thrust indicators 3422 and 3424 each rendered according to a color render palette (e.g., while system 100 is in a docking assist navigation mode, as indicated by docking assist indicator 3319 and docking assist selector 3318). In the embodiment shown in FIG. 34, such color palette maps larger magnitude thrusts to less translucent/more saturated colors.

In addition, maneuvering guide 3310 of display view 3400 includes additional graphics related to the enabled docking assist navigation mode. Specifically, maneuvering guide 3310 includes virtual bumper perimeter indicator 3401 disposed about mobile structure perimeter indicator 3301, where virtual bumper perimeter indicator 3401 may generally correspond to a safety perimeter for mobile structure 101. Also shown in maneuvering guide 3310 of display view 3400 is virtual bumper perimeter thickness indicator 3402 and virtual bumper perimeter thickness selector 3404, which may be configured to enable, disable, indicate, and/or provide for user selection of a thickness of a virtual bumper about mobile structure 101 corresponding to virtual bumper perimeter indicator 3401 disposed about mobile structure perimeter indicator 3301. For example, a user may tap virtual bumper thickness indicator 3402 to cause virtual bumper thickness selector 3404 to be rendered, thereby allowing the user to manipulate virtual bumper thickness selector 3404 to enable, disable, or adjust a thickness of the corresponding virtual bumper/perimeter indicator.

In some embodiments, system 100 may be configured to render virtual bumper perimeter intrusion indicator 3416 disposed substantially within virtual bumper perimeter indicator 3401, where virtual bumper perimeter intrusion indicator 3416 may be configured to indicate a relative position of a navigation hazard disposed within a monitoring perimeter of perimeter ranging system 148 of mobile structure 101 and detected at or within the thickness of virtual bumper perimeter indicator 3401. Such navigation hazard may be at least partially represented in obstruction map 3316. In various embodiments, virtual bumper perimeter intrusion indicator 3416 may be implemented by a graphics texture with a shape generally matching that of the intruding navigation hazard and including a color and/or pattern different than that used to render virtual bumper perimeter indicator 3401. In some embodiments, virtual bumper perimeter intrusion indicator 3416 may be animated and/or flashing to draw attention of a user. In further embodiments, such navigation hazard may be identified and visually highlighted in a corresponding video feed (e.g., port video feeds 3330), such as by an overlay similar in color, pattern, shape, and/or translucency to virtual bumper perimeter intrusion indicator 3416.

Figure 35:
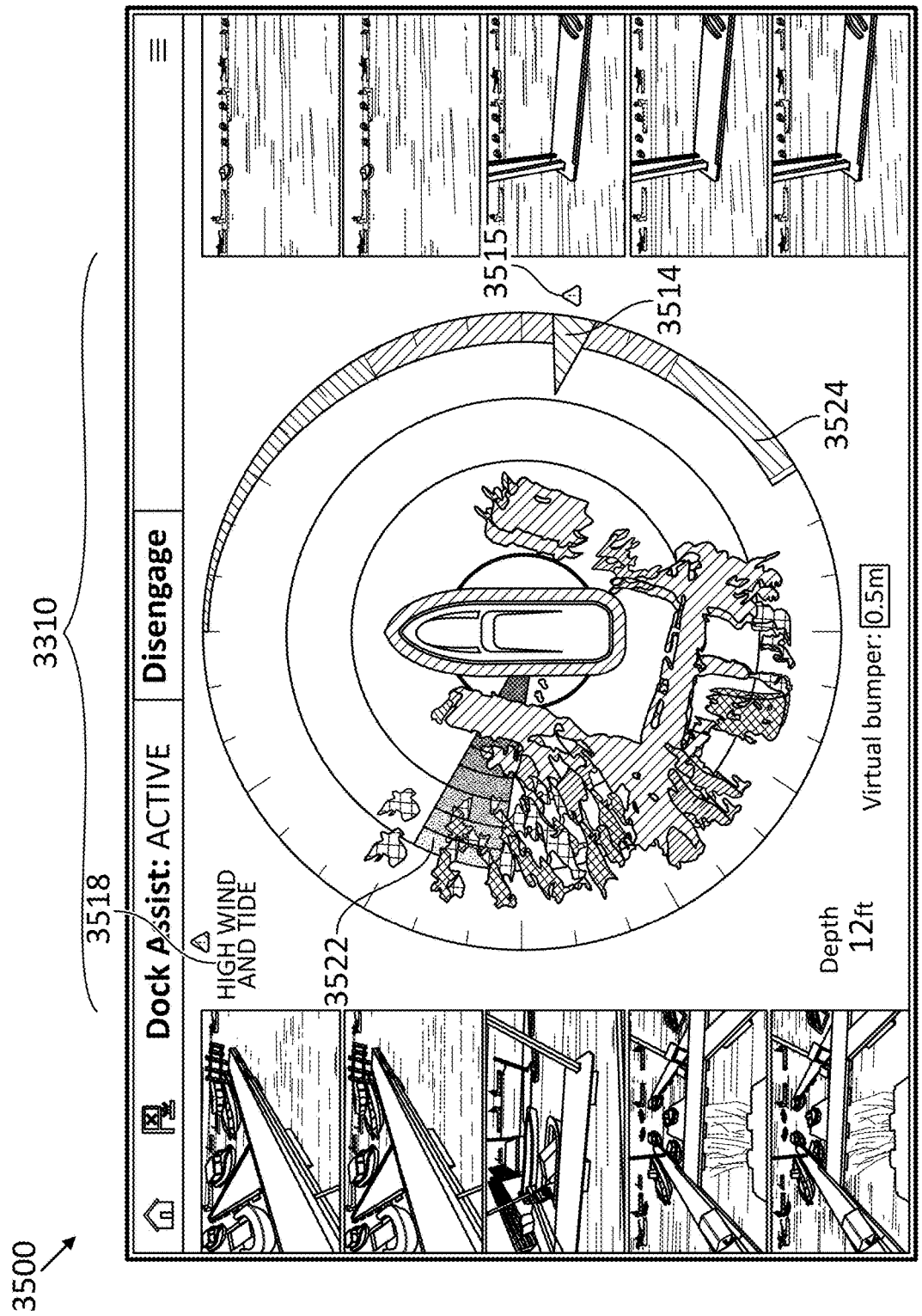

FIG. 35 shows display view 3500 corresponding to a docking assist navigation mode for system 100. In particular, display view 3500 shows modifications to display view 3400 configured to convey a relatively high level of environmental disturbance (e.g., relatively strong wind and/or tidal forces acting on mobile structure 101, relative to an available holding thrust capability of navigation control system 190). As shown in FIG. 35, display view 3500 includes many of the same graphics rendered within display view 3300, and additionally includes translational and rotational thrust indicators 3522 and 3524 each rendered according to a color render palette (e.g., while system 100 is in a docking assist navigation mode). In the embodiment shown in FIG. 35, such color palette maps thrusts approaching maximum available thrusts to a hazard color, such as orange, to help indicate to a user that alternative navigation techniques may be required.

In addition, maneuvering guide 3310 of display view 3500 includes additional graphics related to the relatively high level of environmental disturbance. Specifically, maneuvering guide 3310 includes external disturbance indicator 3514 configured to indicate a direction and magnitude of the aggregate external disturbance. In various embodiments, maneuvering guide 3310 may be implemented as a substantially triangular directional indicator positioned along an outer circle of translational thrust scale markers 3312 and pointing towards a center of mobile structure perimeter indicator 3301, so as to indicate a direction of the aggregate external disturbance. In some embodiments, a radial length of external disturbance indicator 3514 may be configured to indicate a relative magnitude of the aggregate external disturbance.

In various embodiments, display view 3500 may include various other warning graphics and/or indicators to help warn a user of a relatively high external disturbance, such as external disturbance threshold indicator 3518 (e.g., configured to indicate when translational/rotational thrust reaches or goes above a pre-selected threshold, mobile structure perimeter indicator 3301 nears a navigation hazard in obstruction map 3316, depth indicator 3320 provides a depth reading below a preselected threshold, and/or a combination of two or more of those and/or additional thresholds associated with navigation and/or docking of mobile structure 101), and external disturbance warning indicator 3515 (e.g., configured to indicate when a magnitude of the external disturbance reaches a particular threshold or rate of increase). Each of external disturbance indicator 3514, external disturbance warning indicator 3515, and external disturbance threshold indicator 3518 may be rendered according to a changing color depending on the magnitude of the external disturbance, for example, and/or the magnitude of the thrust(s) being used to compensate for the external disturbance.

Figure 36:
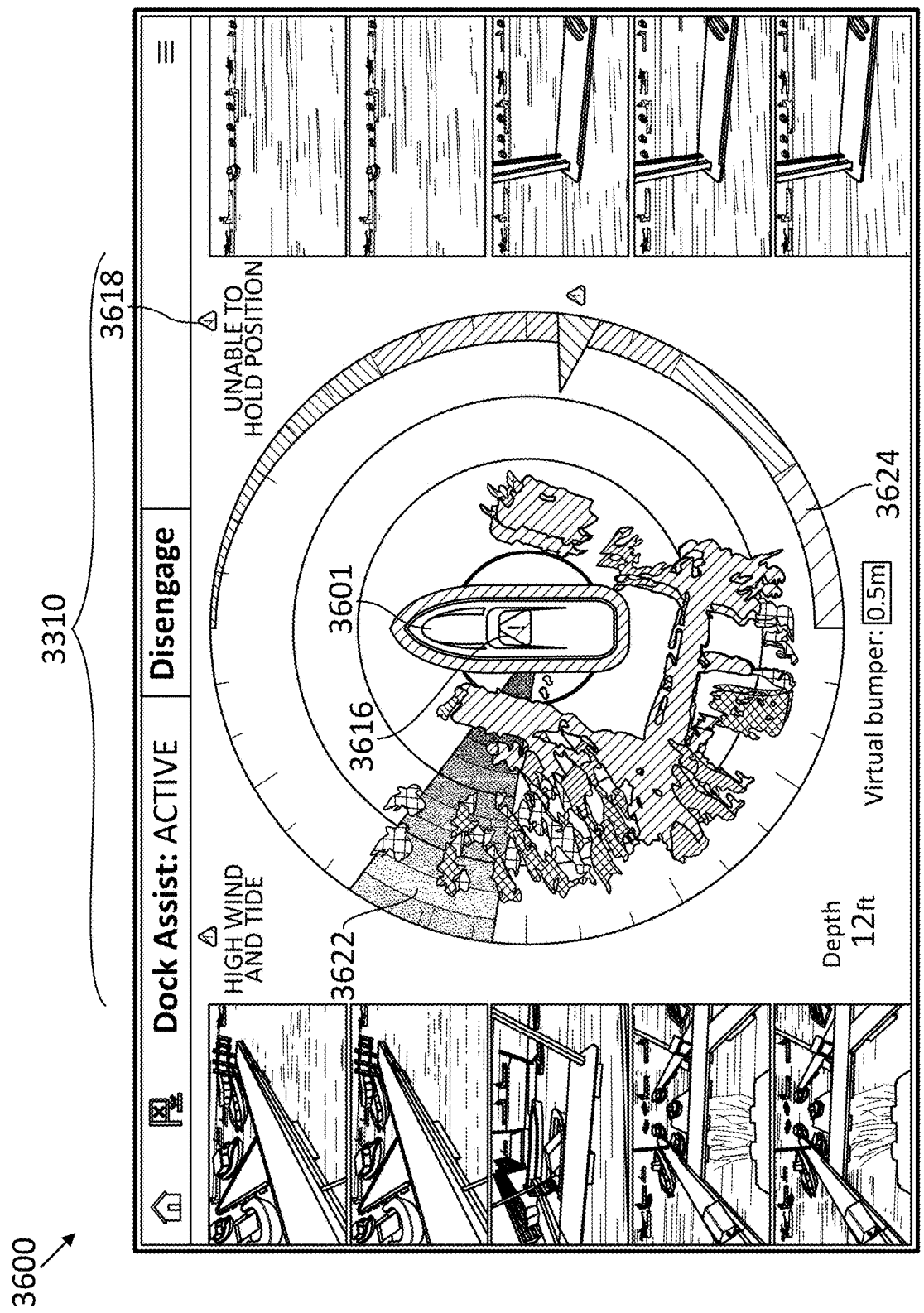

FIG. 36 shows display view 3600 corresponding to a docking assist navigation mode for system 100. In particular, display view 3600 shows modifications to display view 3400 configured to convey a level of environmental disturbance that cannot be compensated for using a particular element of navigation control system 190 (e.g., thrust maneuver system 172 of navigation control system 190). As shown in FIG. 36, display view 3600 includes many of the same graphics rendered within display views 3300 and 3400, and additionally includes translational and rotational thrust indicators 3622 and 3624 each rendered according to a color render palette (e.g., while system 100 is in a docking assist navigation mode). In the embodiment shown in FIG. 36, such color palette maps thrusts at maximum available thrusts (e.g., an unable to counteract the aggregate external disturbance) to a critical color, such as red, to help indicate to a user that alternative navigation techniques are required. Moreover, external disturbance indicator 3514 has been rendered with a maximum radial length (e.g., extending to a next smaller circle of translational thrust scale markers 3312) to help characterize the external disturbance.

In various embodiments, display view 3600 may include various other warning graphics and/or indicators to help warn a user of a critical external disturbance and related inability to maneuver, such as mobile structure perimeter indicator 3601 (e.g., shaded and/or animated to show critical safety concerns with navigation of mobile structure 101), mobile structure maneuver warning indicator 3616 (e.g., configured to indicate critical safety concerns with maneuvering of mobile structure 101), and thruster system threshold indicator 3618 (e.g., configured to indicate when translational/rotational thrust generated by one or more elements of navigation control system 190 is unable to counteract the aggregate external disturbances).

Figure 37:
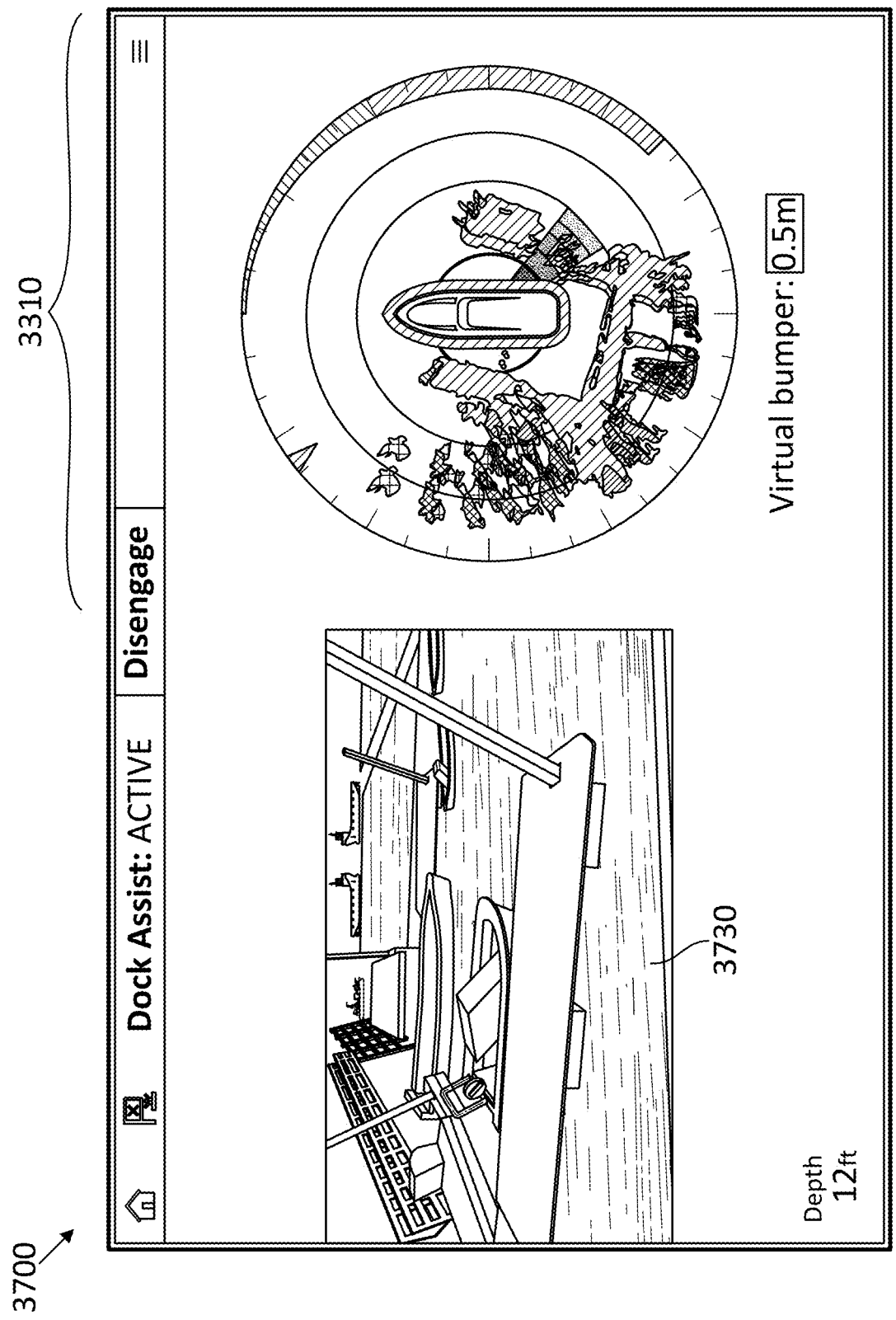

FIG. 37 shows display view 3700 corresponding to a docking assist navigation mode for system 100. In particular, display view 3700 shows modifications to display view 3400, or an updated docking user interface, resulting from user selection of a port video feed, for example, or from user selection of a viewpoint position substantially to port of mobile structure perimeter indicator 3301 within maneuvering guide 3310. Upon receiving such selection, controller 130 may be configured to update display view 3400 to display view 3700, where port video feed 3730 (e.g., one of the three port video feeds 3330) is enlarged to provide a more detailed view and maneuvering guide 3310 is reduced to allow port video feed 3730 to be enlarged. In other embodiments, controller 130 may be configured to detect approach of a navigation hazard (e.g., in a field of view of port video feed 3730) and automatically update display view 3400 to display view 3700 to help focus a user on the navigation hazard.

Figure 38:
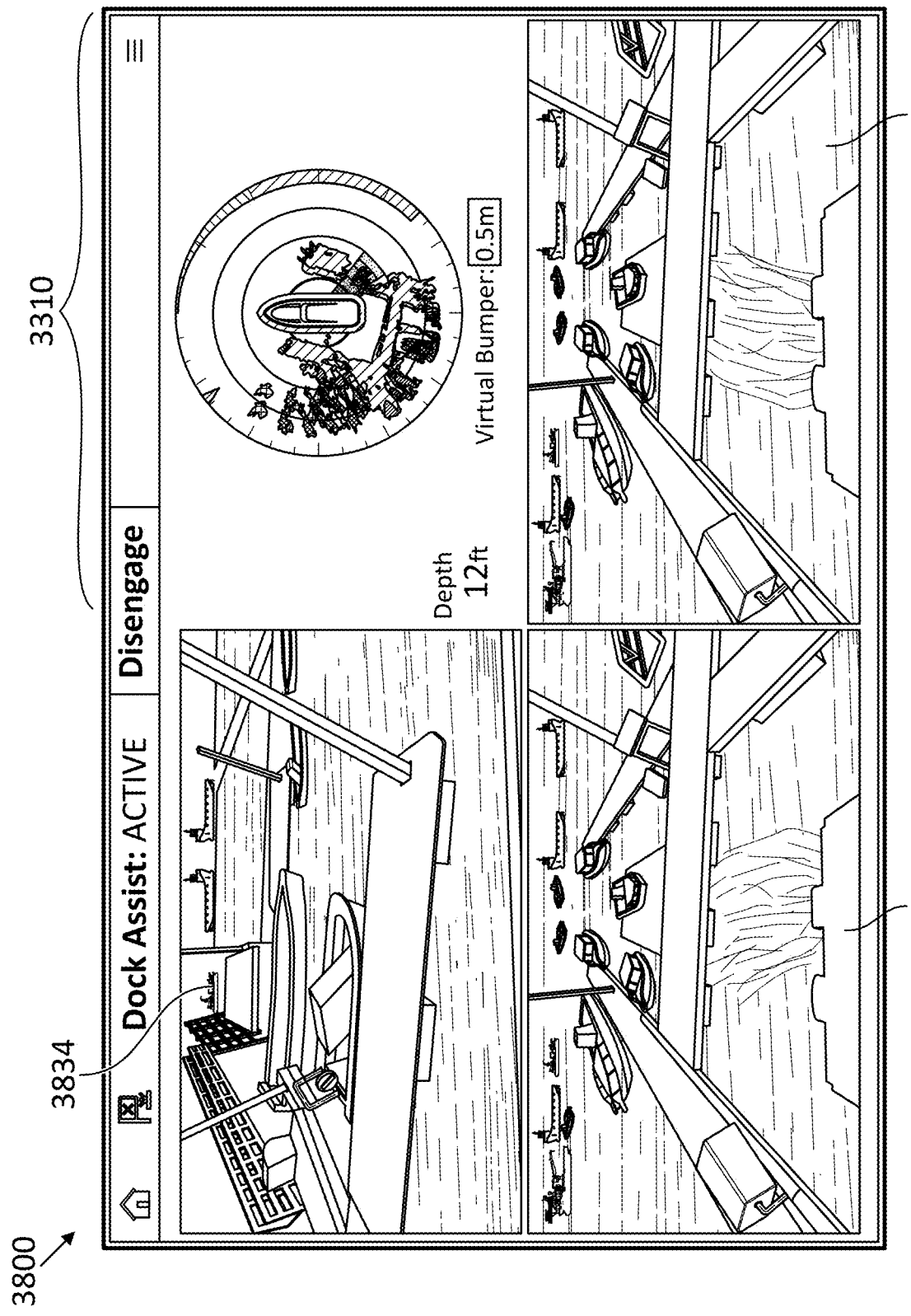

FIG. 38 shows display view 3800 corresponding to a docking assist navigation mode for system 100. In particular, display view 3800 shows modifications to display view 3400, or an updated docking user interface, resulting from user selection of a port video feed 3834 and a port-stern video feed 3830 of port video feeds 3330 and a starboard-stern video feed of starboard video feeds 3332, or from user selection of a viewpoint position substantially to port-stern of mobile structure perimeter indicator 3301 within maneuvering guide 3310. Upon receiving such selection, controller 130 may be configured to update display view 3400 to display view 3800, where video feeds 3830, 3832, and 3834 are enlarged to provide more detailed views and maneuvering guide 3310 is reduced to allow video feeds 3830, 3832, and 3834 to be enlarged. In other embodiments, controller 130 may be configured to detect approach of a navigation hazard (e.g., in a field of view of each of video feeds 3830, 3832, and 3834) and automatically update display view 3400 to display view 3800 to help provide a detailed and/or encompassing view the navigation hazard. In further embodiments, video feeds with adjoining and/or overlapping fields of view may be stitched together to form a continuous or semi-continuous panoramic view of the perimeter of mobile structure 101, and such aggregated panoramic video feed may be displayed above or below maneuvering guide 3310, such as in place of video feeds 3830 and 3832.

Figure 39:
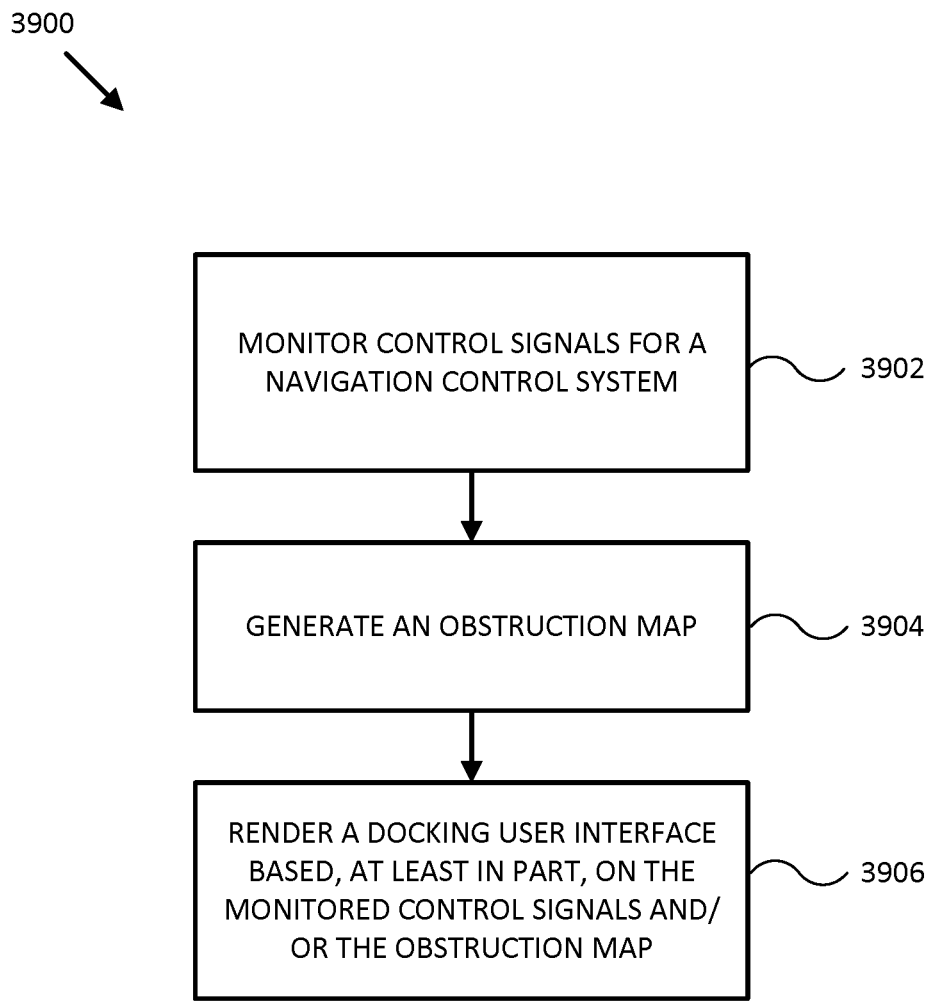
FIG. 39 illustrates a flow diagram of various operations to provide a docking user interface in accordance with an embodiment of the disclosure.

FIG. 39 illustrates a flow diagram of a process 3900 to provide a docking user interface for mobile structure 101 in accordance with an embodiment of the disclosure. It should be appreciated that any step, sub-step, sub-process, or block of process 3900 may be performed in an order or arrangement different from the embodiments illustrated by FIG. 39. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 3900 is described with reference to systems, processes, control loops, and images described in reference to FIGS. 1A-38, process 3900 may be performed by other systems different from those systems, processes, control loops, and images and including a different selection of electronic devices, sensors, assemblies, mobile structures, and/or mobile structure attributes, for example.

In block 3902, control signals for a navigation control system are monitored. For example, controller 130 may be configured to use control signal coupling 2635 to monitor control signals communicated between manual user interface/joystick 2620 and control signal interface 2671 of propulsion system 2670. In some embodiments, control signal coupling 2635 may be configured to relay control signals, such as CAN bus frames and/or portions of frames transmitted by manual user interface/joystick 2620 and/or control signal interface 2671 along control signal line 2622 to controller 130 across controller line 2632. Controller 130 may receive the control signals and process the control signals to identify and/or extract control data, timing, and/or other control signal characteristics from the control signals, which may be stored and/or aggregated for further analysis. For example, controller 130 may receive the control signals and convert them to translational and/or rotational thrust magnitudes and/or directions, which may be converted into translational and/or rotational thrust percentages of maximum available translational and/or rotational thrusts generated by one or more elements of navigation control system 190.

In block 3904, an obstruction map is generated. For example, controller 130 may be configured to generate obstruction map 3316 based, at least in part, on perimeter sensor data from perimeter ranging system 148 mounted to mobile structure 101. In various embodiments, obstruction map 3316 may include one or more navigation hazards disposed within a monitoring perimeter of perimeter ranging system 148, as described herein.

In block 3906, a docking user interface is rendered. For example, controller 130 may be configured to render a docking user interface (e.g., display views 3300-3800) based, at least in part, on the control signals monitored in block 3902. Such docking user interface may include maneuvering guide 3310, which may itself include mobile structure perimeter indicator 3301, obstruction map 3316 (e.g., generated in block 3904), and a translational thrust indicator (e.g., translational thrust indicators 3322, 3422, 3522, and/or 3622) configured to indicate a translational maneuvering thrust magnitude and direction relative to an orientation of mobile structure perimeter indicator 3301 within maneuvering guide 3310.

In related embodiments maneuvering guide 3310 may include a rotational thrust indicator (e.g., rotational thrust indicators 3324, 3424, 3524, and/or 3624) configured to indicate a rotational maneuvering thrust magnitude and direction relative to the orientation of mobile structure perimeter indicator 3301 within maneuvering guide 3310. In some embodiments, the translational thrust indicator and the rotational thrust indicator may be rendered according to a first or greyscale render palette while mobile structure 101 is piloted according to a manual navigation mode and according to a second or color render palette while mobile structure 101 is piloted according to a docking assist navigation mode, as described herein.

In further embodiments, maneuvering guide 3310 may include a set of translational thrust scale markers 3312 comprising a plurality of circles with increasing radiuses and centered on mobile structure perimeter indicator 3301, where each circle may correspond to a particular translational thrust percentage of a maximum available translational thrust generated by navigation control system 190 across the circumference of the circle. Maneuvering guide 3310 may also include a set of rotational thrust scale markers 3314 comprising two pluralities of radially oriented line segments each distributed evenly across half a circumference of an outer circle of the set of translational thrust scale markers 3312, where each line segment corresponds to a particular rotational thrust percentage of a maximum available rotational thrust generated by navigation control system 190.

In some embodiments, maneuvering guide 3310 may include virtual bumper perimeter indicator 3401 disposed about mobile structure perimeter indicator 3301 and corresponding to a safety perimeter for mobile structure 101, as described herein. In such embodiments, maneuvering guide 3310 may also include virtual bumper perimeter thickness indicator 3402 and/or virtual bumper perimeter thickness selector 3404 configured to enable, disable, indicate, and/or provide for user selection of a thickness of virtual bumper perimeter indicator 3401 disposed about mobile structure perimeter indicator 3301. Maneuvering guide 3310 may additionally include virtual bumper perimeter intrusion indicator 3416 disposed substantially within virtual bumper perimeter indicator 3401, where virtual bumper perimeter intrusion indicator 3416 is configured to indicate a relative position of a navigation hazard (e.g., a portion of obstacle map 3316) disposed within a monitoring perimeter of perimeter ranging system 148 of mobile structure 101 and detected at or within the thickness of virtual bumper perimeter indicator 3401 disposed about mobile structure perimeter indicator 3301.

In additional embodiments, the docking user interface may include one or more video feeds (e.g., port/starboard video feeds 3330/3332) provided by perimeter ranging system 148 mounted to mobile structure 101, where each video feed of the one or more video feeds may be rendered left of maneuvering guide 3310 if the video feed is provided by a camera (e.g., camera 214) of perimeter ranging system 148 that is disposed substantially on a port side of mobile structure 101 and is rendered right of maneuvering guide 3310 if the video feed is provided by a camera (e.g., camera 216) of perimeter ranging system 148 that is disposed substantially on a starboard side of mobile structure 101. In such embodiments, controller 130 may be configured to receive, from user interface 120, user selection of at least one video feed of the docking user interface and to render an updated docking user interface (e.g., display view 3700/3800) including the selected video feed(s) and maneuvering guide 3310. In alternative embodiments, controller 130 may be configured to receive, from user interface 120, user selection of a relative viewpoint position relative to mobile structure perimeter indicator 3301 and within maneuvering guide 3310 and to render an updated docking user interface (e.g., display view 3700/3800) including at least one video feed including a field of view that includes the selected relative viewpoint position.

Embodiments of the present disclosure can use such techniques to provide intuitive, reliable, and accurate docking user interfaces for mobile structures, for example, as described herein.

FIGS. 40-47C illustrate various display views 4000-4702 of a docking user interface in accordance with an embodiment of the disclosure. In various embodiments, each display view of FIGS. 40-47 may be generated using process 3900 to provide a docking user interface for mobile structure 101, as described herein. In general, display views 4000-4702 are similar in function to display views 3300-3800 of FIGS. 33-38 but include a selection of different or modified display elements configured to help a user of system 100 intuitively recognize a safety and/or operational status of mobile structure 101.

Figure 40:
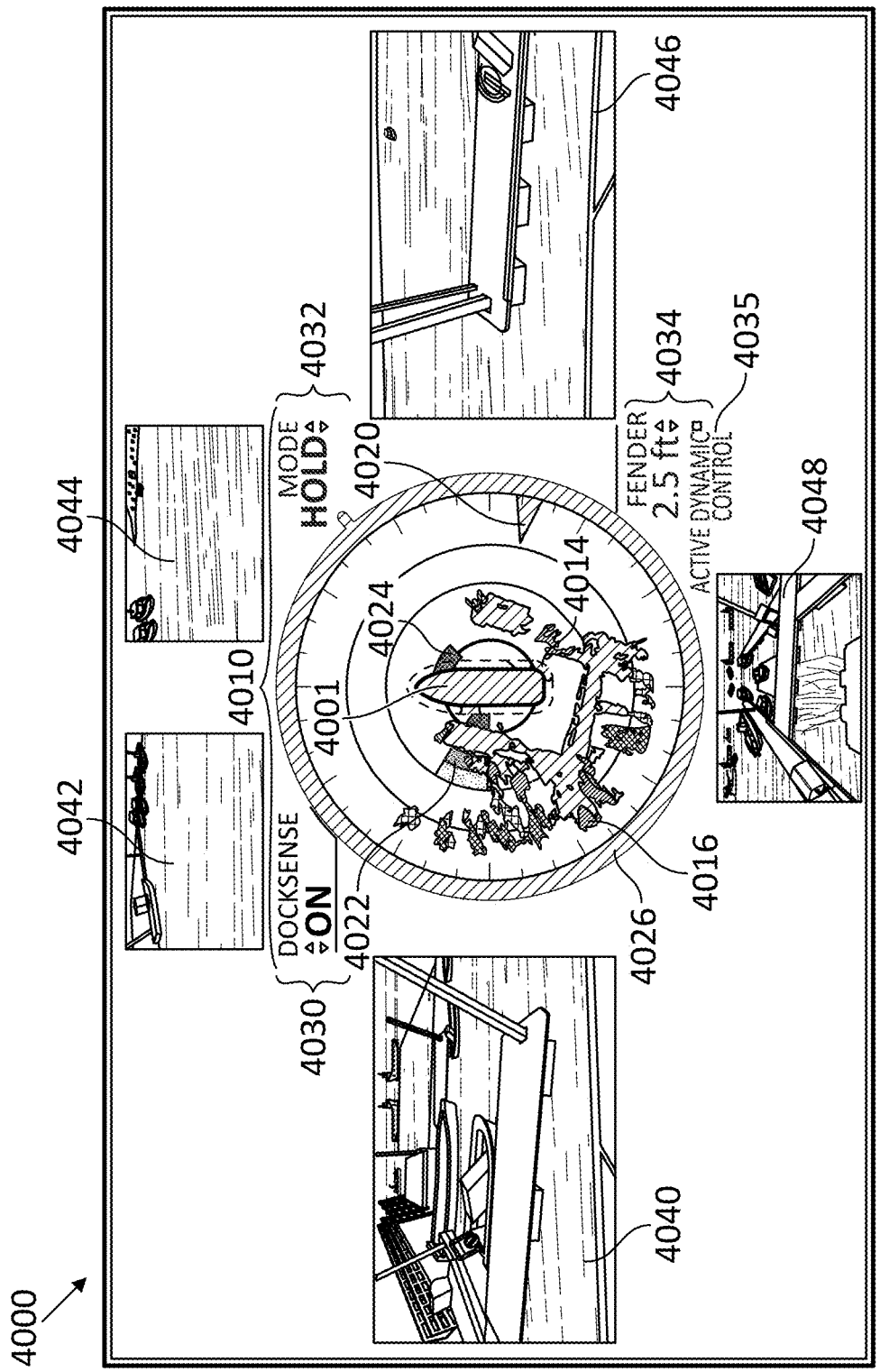
FIGS. 40-47C illustrate display views of a docking user interface in accordance with an embodiment of the disclosure.

For example, FIG. 40 shows display view 4000 corresponding to a docking assist navigation mode for system 100. As shown in FIG. 40, display view 4000 includes maneuvering guide 4010 disposed between port video 4040 starboard video feed 4046, and between bow video feeds 4042 and 4044 and stern video feed 4048. Each of the individual video feeds may be arranged within display view 4000 about maneuvering guide 4010 generally according to the mounting position on mobile structure 101 of the camera providing the video feed, relative to the orientation of mobile structure perimeter indicator 4001 (e.g., depicted in display view 4000 in a heading-up orientation). Such arrangement may be referred to as a geospatial video feed arrangement about maneuvering guide 4010. In various embodiments, the number and positioning of video feeds within such arrangement may depend on the number of cameras used and their location about mobile structure 101.

In the embodiment shown in FIG. 40, port video feed 4040 may be provided by a camera mounted along a port side of mobile structure 101 and aimed substantially to port, bow video feeds 4042 and 4044 may be provided by cameras mounted near a bow of mobile structure 101 (e.g., possibly to port and/or starboard of a bow of mobile structure 101) and aimed substantially along a longitudinal axis of mobile structure 101, starboard video feed 4046 may be provided by a camera mounted along a starboard side of mobile structure 101 and aimed substantially to starboard, and rear or stern video feed 4048 may be provided by a camera mounted near a stern of mobile structure 101 and aimed substantially antiparallel to a longitudinal axis of mobile structure 101.

In FIG. 40, maneuvering guide 4010 includes mobile structure perimeter indicator 4001 configured to indicate a perimeter of mobile structure 101, obstruction map 4016 showing various navigation hazards detected by perimeter ranging system 148, an external disturbance indicator 4020 configured to indicate a direction and magnitude of an aggregate external disturbance, and translational and rotational thrust indicators 4022 and 4024 each rendered according to a color render palette (e.g., while system 100 is in a docking assist navigation mode, as indicated by docking assist indicator/selector 4032). In the embodiment shown in FIG. 40, such color palette maps larger magnitude thrusts to less translucent/more saturated colors.

Translational thrust indicator 4022 may be implemented as a segmented cone-shaped bar graph configured to indicate a translational maneuvering thrust magnitude (e.g., corresponding to a radial length of translational thrust indicator 4022) and direction (e.g., corresponding to a radial direction of translational thrust indicator 4022) relative to the orientation of mobile structure perimeter indicator 4001 shown in maneuvering guide 4010. Rotational thrust indicator 4024 may be implemented as an arc-shaped semicircular bar graph configured to indicate a rotational maneuvering thrust magnitude (e.g., corresponding to an arc length of rotational thrust indicator 4024) and direction (e.g., clockwise or counterclockwise corresponding to the respective right or left disposition of rotational thrust indicator 4024) relative to the orientation of mobile structure perimeter indicator 4001 shown in maneuvering guide 4010. Although shown in display view 4000 as rendered beneath obstruction map 4016 (e.g., to ensure navigation hazards are viewable within maneuvering guide 4010), in other embodiments, translational and/or rotational thrust indicators 4022, 4024 may be rendered on top of obstruction map 4016 (e.g., to emphasize maneuvering situational awareness, or thrusts approaching maximum available thrust) and/or be rendered at least partially translucent relative to obstruction map 4016.

In particular, as shown in the embodiment shown in FIG. 40, rotational thrust indicator 4024 may be implemented as arc-shaped semicircular bar graph centered to mobile structure perimeter indicator 4001 and rendered with a diameter less than a length of mobile structure perimeter indicator 4001 and greater than half the length of mobile structure perimeter indicator 4001. Translational thrust indicator 4022 may be implemented similarly to translational thrust indicators 3322, 3422, 3522, and/or 3622 in FIGS. 33-36. To help visually quantify the magnitudes indicated by rotational thrust indicator 4024, maneuvering guide 4010 may include a set of rotational thrust scale markers (e.g., similar to scale markers 3314 in FIG. 33) implemented as two pluralities (e.g., left and right) of radially oriented line segments each distributed evenly across half a circumference of an outer circle of translational thrust scale markers of maneuvering guide 4010 (e.g., similar to translational thrust scale markers 3312 of FIG. 33), where each line segment corresponds to a particular rotational thrust percentage of a maximum available rotational thrust generated by navigation control system 190 (e.g., zero clockwise/counterclockwise thrust is at 0 degrees, and maximum clockwise/counterclockwise thrust is at 180 degrees), for example, or where each line segment corresponds to a particular absolute measure of rotational thrust (e.g., in units of force or torque).

In various embodiments, as shown in display view 4000, a docking user interface may include various other indicators and/or buttons, selectors, or other controls. For example, maneuvering guide 4010 of display view 4000 includes a perimeter ranging sensor indicator/selector 4030 (e.g., allowing a pilot to enable or disable perimeter ranging system 148 and/or elements thereof), a docking assist indicator/selector 4032 (e.g., allowing a pilot to enable or disable a docking assist navigation mode or select a hold, drift, or manual navigation mode for system 100 and/or select between a manual navigation mode and a docking assist navigation mode), and a virtual bumper perimeter thickness indicator/selector 4034 (e.g., which may be configured to enable, disable, indicate, and/or provide for user selection of a thickness of a virtual bumper about mobile structure 101 corresponding to a virtual bumper perimeter indicator disposed about mobile structure perimeter indicator 4001 (e.g., similar to virtual bumper perimeter indicator 3401 in FIG. 34).

In some embodiments, virtual bumper perimeter thickness indicator/selector 4034 may include an additional navigation assist indicator 4035 (e.g., a textual and/or graphical indicator) configured to indicate system 100 is providing navigation assist (e.g., docking assist and/or other navigation assist where system 100 is actively moderating a raw thrust demand in response to detected navigation hazards, such as in obstacle map 4016) for mobile structure 100. In various embodiments, maneuvering guide 4010 may include an additional navigation assist indicator 4026 (e.g., a graphical indicator) configured to indicate system 100 is providing navigation assist (e.g., docking assist) for mobile structure 100. In the embodiment shown in FIG. 40, navigation assist indicator 4026 is implemented as a blue color and variable graphic density or diffuse halo applied to an outer circle of translational thrust scale markers of maneuvering guide 4010. For example, such variable graphic density halo may be configured to highlight an operational state of system 100 and may be implemented with a uniform thickness and a relatively high graphic density at such outer circle (e.g., and features of such circle) that decreases to zero graphic density within the bounds of maneuvering guide 4010.

In further embodiments, system 100 may be configured to render one or more virtual bumper perimeter intrusion indicators 4014 disposed substantially within a virtual bumper perimeter indicator of mobile structure perimeter indicator 4001, where virtual bumper perimeter intrusion indicators 4014 may be configured to indicate relative positions of navigation hazards disposed within a monitoring perimeter of perimeter ranging system 148 of mobile structure 101 and detected at or within the thickness of such virtual bumper perimeter indicator of mobile structure perimeter indicator 4001. Such navigation hazard may be at least partially represented in obstruction map 4016. In various embodiments, each virtual bumper perimeter intrusion indicator 4014 may be implemented by a graphics texture with a shape generally matching that of the intruding navigation hazard and including a color and/or pattern different than that used to render the virtual bumper perimeter indicator of mobile structure perimeter indicator 4001, similar to virtual bumper perimeter intrusion indicator 3416 in FIG. 34. In some embodiments, virtual bumper perimeter intrusion indicator 4014 may be animated and/or flashing to draw attention of a user. In further embodiments, such navigation hazard may be identified and visually highlighted in a corresponding video feed (e.g., port video feed 4030), such as by an overlay similar in color, pattern, shape, and/or translucency to virtual bumper perimeter intrusion indicator 4014.

Figure 41A:
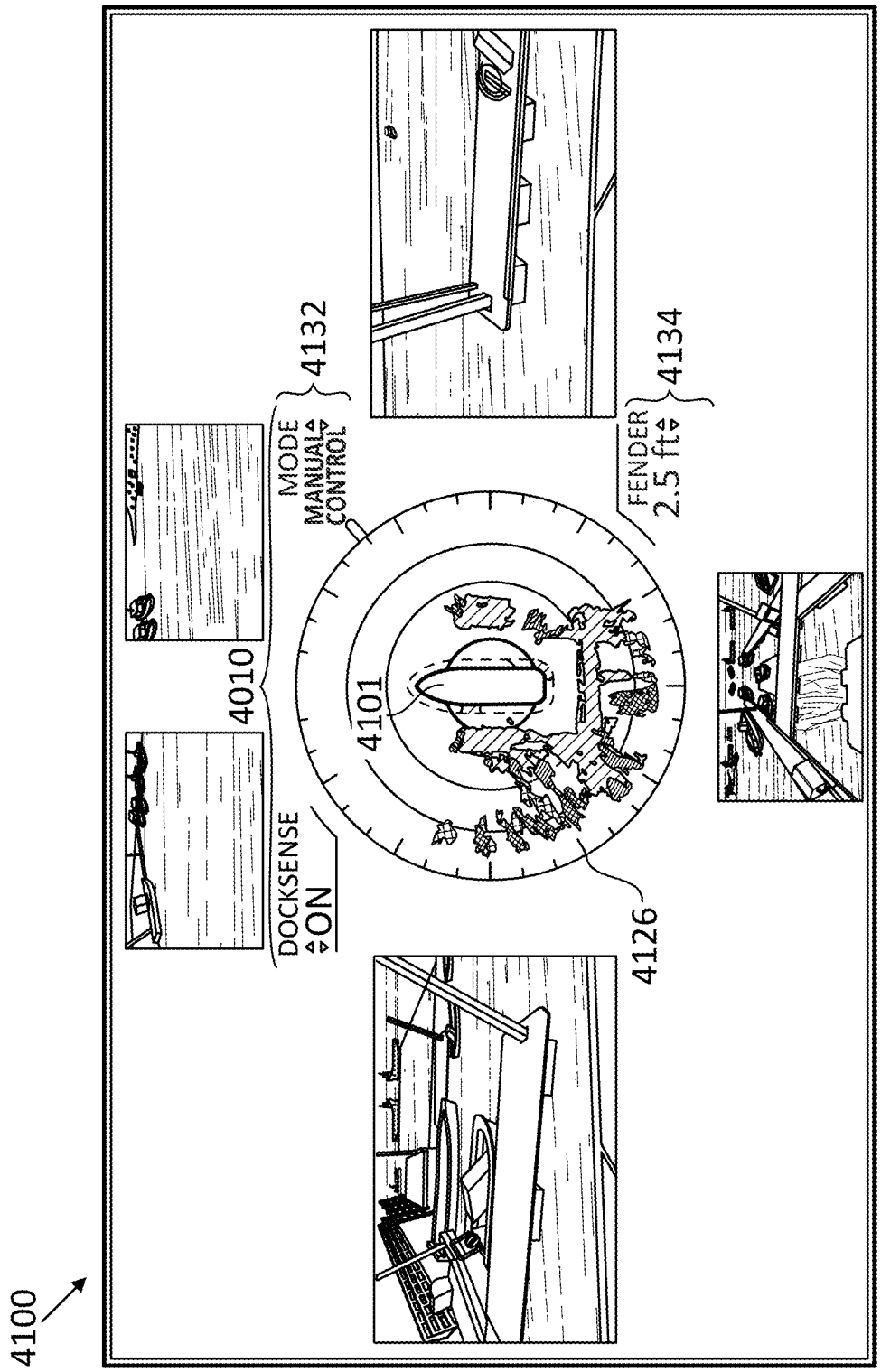

FIG. 41A shows display view 4100 corresponding to a manual navigation mode for system 100. As shown in FIG. 41A, display view 4100 includes many of the same graphics rendered within display view 4000, but docking assist indicator/selector 4132 is indicating a manual control mode, virtual bumper perimeter thickness indicator/selector 4134 is rendered with a different graphic element, and other elements of maneuvering guide 4010 are rendered to communicate the manual control mode to a pilot of mobile structure 101. For example, if present, translational and rotational thrust indicators may be rendered according to a greyscale render palette (e.g., while system 100 is in a manual navigation mode, as indicated by docking assist indicator 3319), where such greyscale palette maps larger magnitude thrusts to whiter shades. Translational thrust scale markers of maneuvering guide 4010, and particularly outer circle 4126 (e.g., and/or features of outer circle 4126) may be rendered in greyscale without color and lack the variable graphic density or diffuse halo of navigation assist indicator 4026 in FIG. 40. In some embodiments, system 100 may be configured to generate an audible alarm while in such manual navigation mode.

Figure 41B:
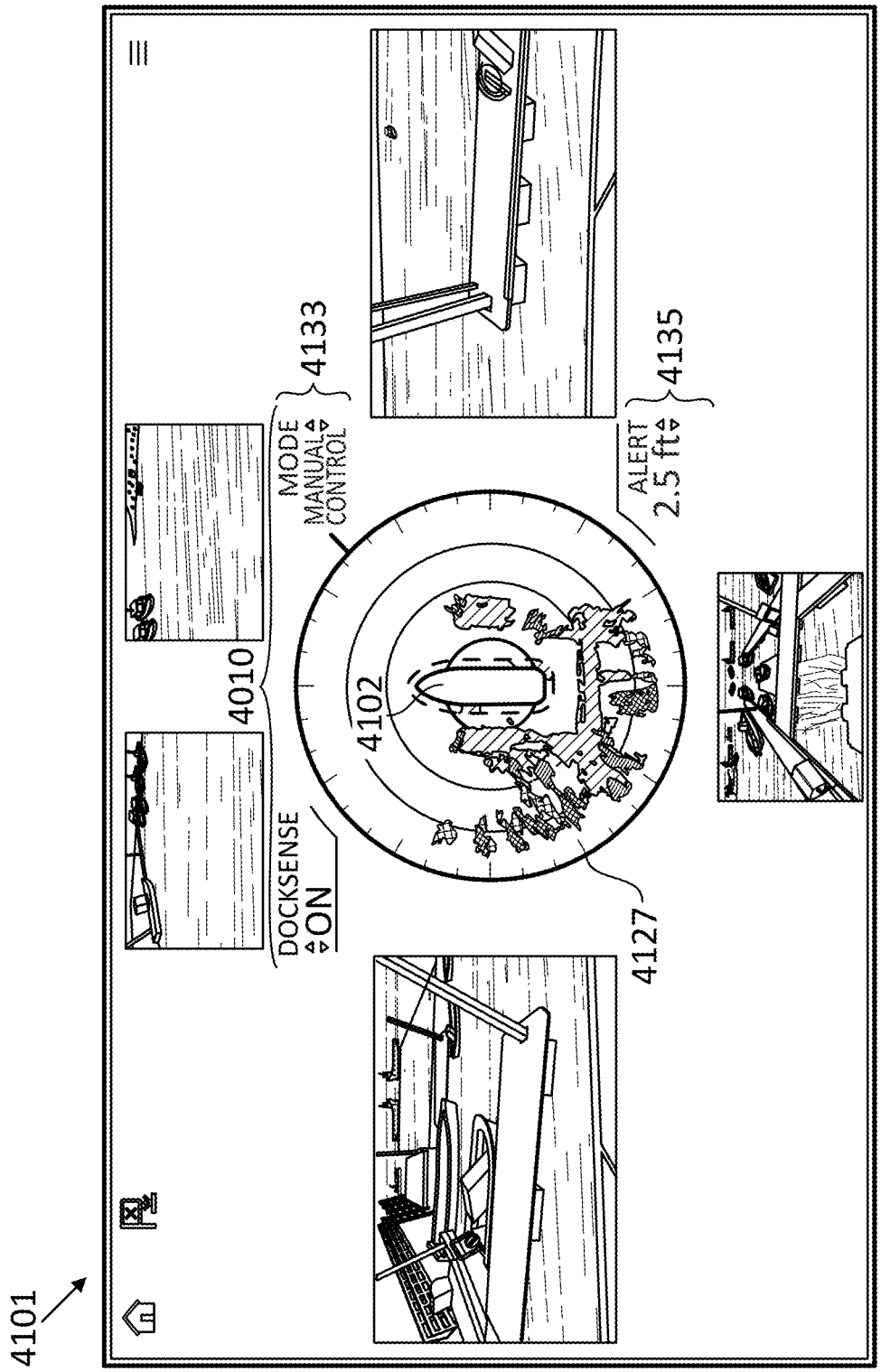

FIG. 41B shows display view 4101 corresponding to a manual navigation mode for system 100, similar to display view 4100 but with additional graphical rendering options to better emphasize such manual navigation mode to a user of system 100 or a pilot of mobile structure 101. As shown in FIG. 41B, display view 4101 includes many of the same graphics rendered within display view 4100, with docking assist indicator/selector 4133 indicating a manual control mode, but with virtual bumper perimeter thickness indicator/selector 4135 and outer circle 4127 rendered according to a critical color, such as red or orange, to help indicate to a user that system 100 is in a manual navigation mode. In various embodiments, other elements of maneuvering guide 4010 may be rendered to communicate the manual control mode to a pilot of mobile structure 101.

Figure 42:
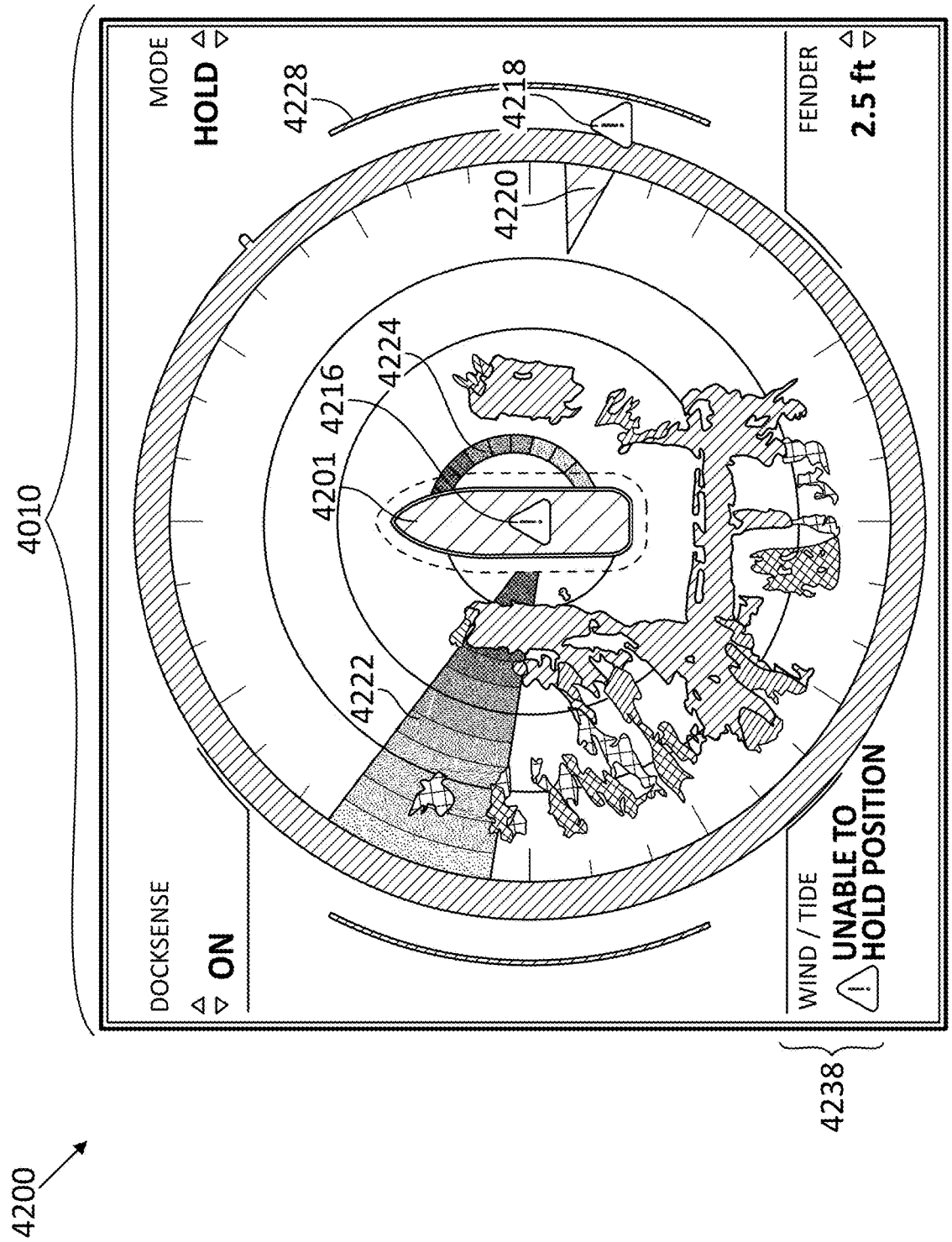

FIG. 42 shows display view 4200 corresponding to a docking assist navigation mode for system 100. In particular, display view 4200 shows modifications to display view 4000 configured to convey a level of environmental disturbance that cannot be compensated for using a particular element of navigation control system 190 (e.g., thrust maneuver system 172 of navigation control system 190). As shown in FIG. 42, display view 4200 includes many of the same graphics rendered within display views 4000 and 4100, and additionally includes translational and rotational thrust indicators 4222 and 4224 each rendered according to a color render palette (e.g., while system 100 is in a docking assist navigation mode). In the embodiment shown in FIG. 42, such color palette maps thrusts at maximum available thrusts (e.g., an unable to counteract the aggregate external disturbance) to a critical color, such as red, to help indicate to a user that alternative navigation techniques are required. Moreover, external disturbance indicator 4220 has been rendered with a critical color and/or a maximum radial length (e.g., extending to a next smaller circle of translational thrust scale markers of maneuvering guide 4010) to help characterize the external disturbance.

In various embodiments, display view 4200 may include various other warning graphics and/or indicators to help warn a user of a critical external disturbance and related inability to maneuver, such as mobile structure perimeter indicator 4201 (e.g., shaded and/or animated to show critical safety concerns with navigation of mobile structure 101), mobile structure maneuver warning indicator 4216 (e.g., configured to indicate critical safety concerns with maneuvering of mobile structure 101), external disturbance threshold indicator 4218 (e.g., configured to indicate when translational external disturbances reach a preset threshold associated with a bearing-dependent maximum translational thrust capability of navigation control system 190), and thruster system threshold indicator 4238 (e.g., configured to indicate when translational and/or rotational thrust generated by one or more elements of navigation control system 190 is unable to counteract the aggregate external disturbances).

Figure 43:
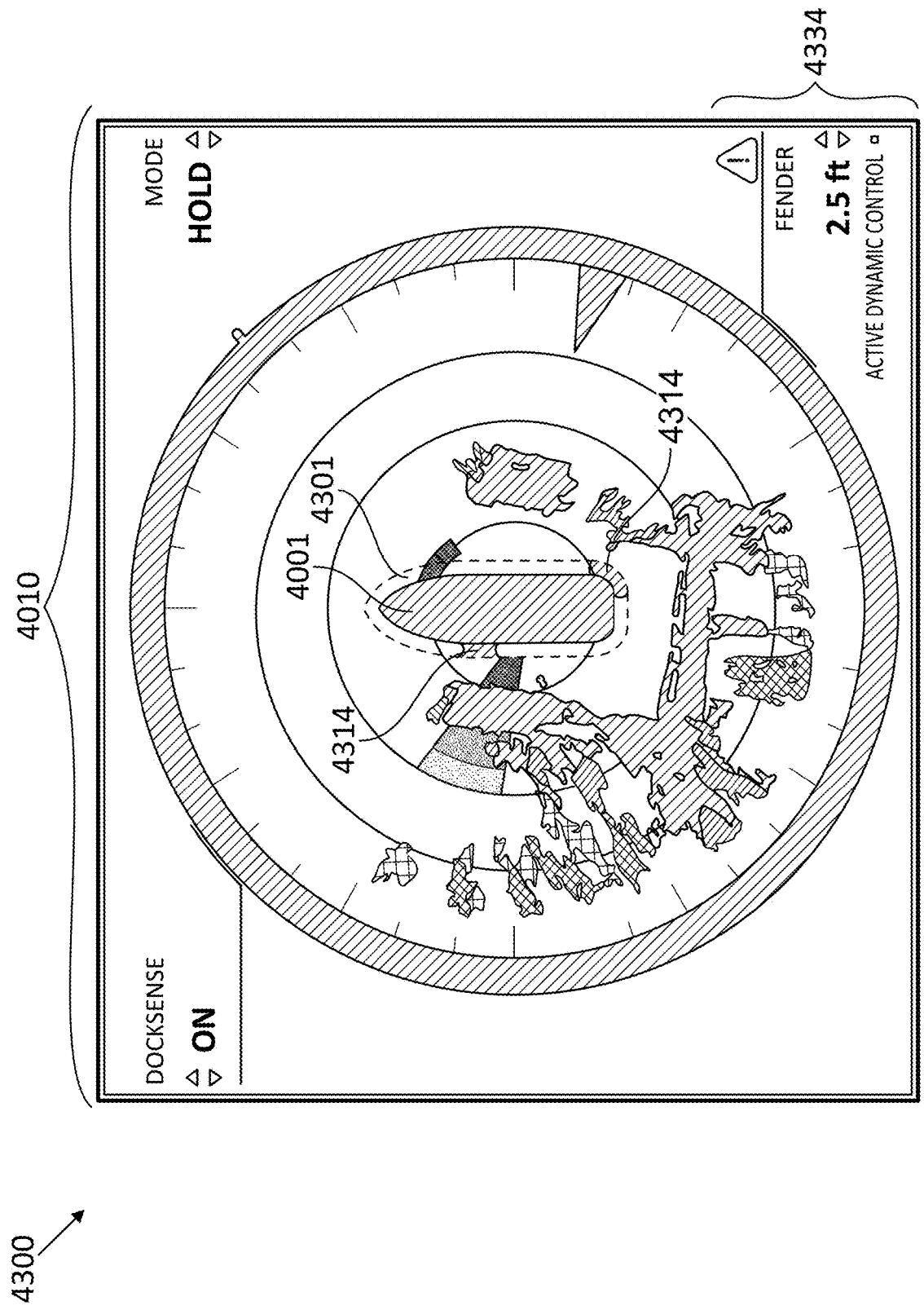

FIG. 43 shows display view 4300 corresponding to a docking assist navigation mode for system 100. In particular, display view 4300 presents a larger view of maneuvering guide 4010 of display view 4000 configured to convey that a navigation hazard identified in obstruction map 4016 is detected at or within the thickness of virtual bumper perimeter indicator 4301 of mobile structure perimeter indicator 4001. For example, system 100 may be configured to render virtual bumper perimeter intrusion indicators 4314 disposed substantially within virtual bumper perimeter indicator 4301, where virtual bumper perimeter intrusion indicators 4314 may be configured to indicate a relative position of a navigation hazard disposed within a monitoring perimeter of perimeter ranging system 148 of mobile structure 101 and detected at or within the thickness of virtual bumper perimeter indicator 4301. In addition, system 100 may be configured to render virtual bumper perimeter thickness indicator/selector 4334, and/or graphical and/or textual elements thereof, according to a critical color, such as red, for example, and/or to include a navigation hazard indicator, as shown.

Figure 44A:
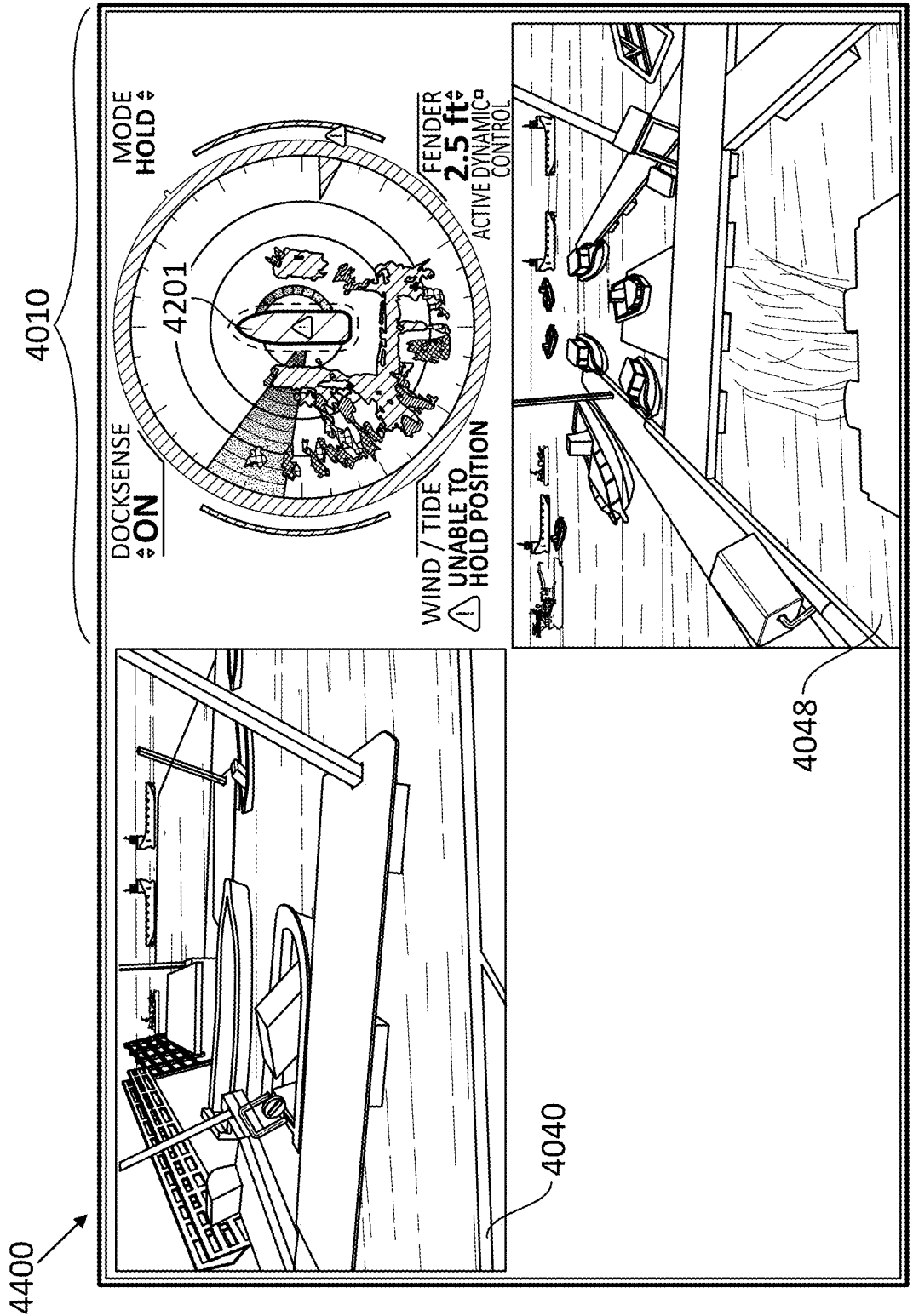

FIG. 44A shows display view 4400 corresponding to a docking assist navigation mode for system 100. In particular, display view 4400 shows modifications to display view 4000 and/or 4200, or an updated docking user interface, resulting from user selection of port video feed 4040 and stern video feed 4048, or from user selection of a viewpoint position substantially to port-stern of mobile structure perimeter indicator 4201 within maneuvering guide 4010. Upon receiving such selection, controller 130 may be configured to update display view 4000 and/or 4200 to display view 4400, where video feeds 4040 and 4048 are enlarged to provide more detailed views and maneuvering guide 4010 is moved to allow the video feeds to be enlarged while retaining their general relative mounting position and/or orientation arrangement relative to the orientation of mobile structure perimeter indicator 4201. In other embodiments, controller 130 may be configured to detect approach of a navigation hazard (e.g., in a field of view of each of such video feeds) and automatically update display views 4000 and/or 4200 to display view 4400 to help provide a detailed and/or encompassing view the navigation hazard. In further embodiments, video feeds with adjoining and/or overlapping fields of view may be stitched together to form a continuous or semi-continuous panoramic view of the perimeter of mobile structure 101, and such aggregated panoramic video feed may be displayed above or below maneuvering guide 4010, such as in place of video feeds 4040 and 4048.

Figure 44B:
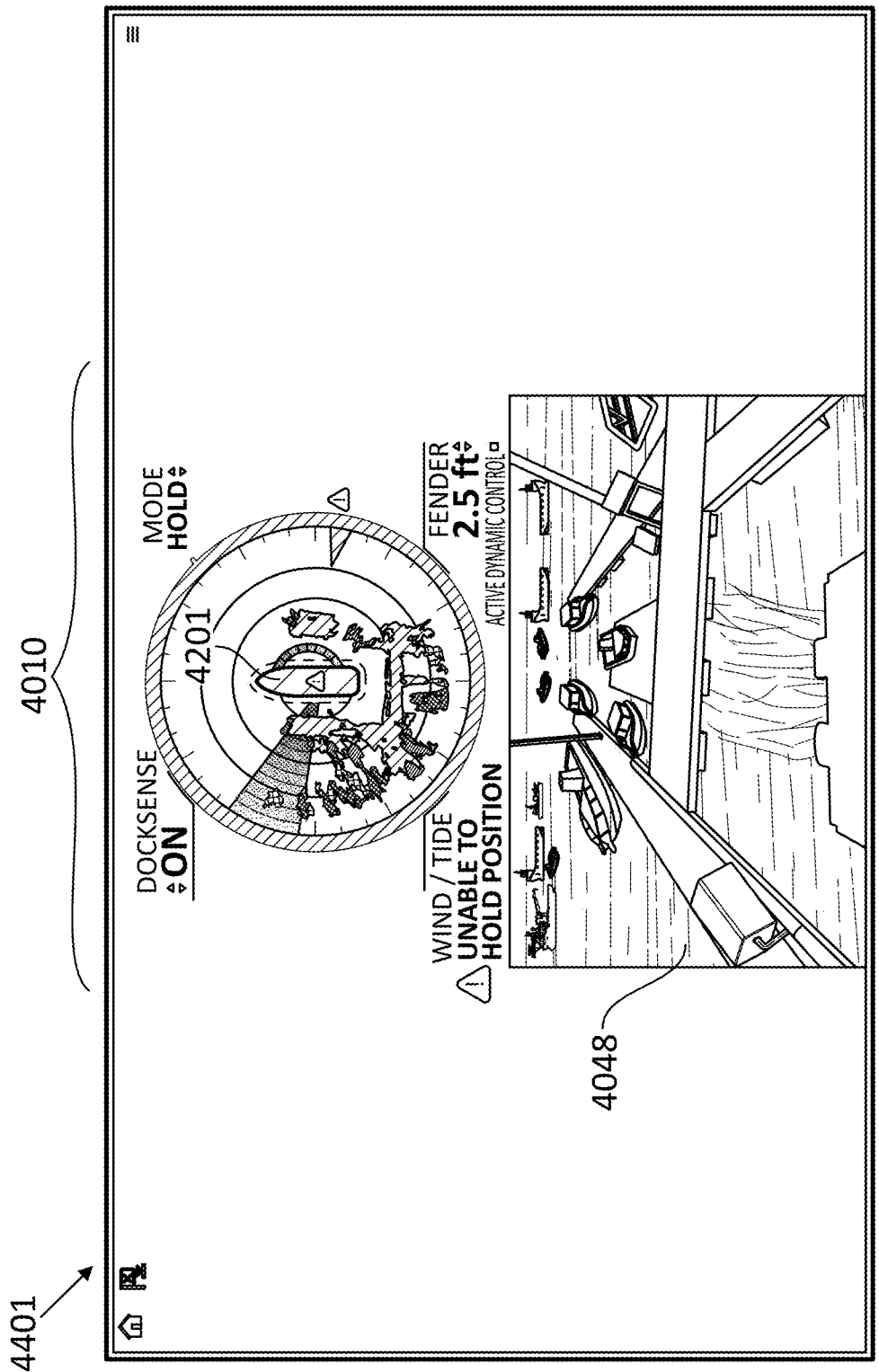

FIG. 44B shows display view 4401 corresponding to a docking assist navigation mode for system 100. In particular, display view 4400 shows modifications to display view 4000, 4200, and/or 4400, or an updated docking user interface, resulting from user selection of only stern video feed 4048, or from user selection of a viewpoint position substantially aft/to stern of mobile structure perimeter indicator 4201 within maneuvering guide 4010. Upon receiving such selection, controller 130 may be configured to update display view 4000, 4200, and/or 4400 to display view 4401, where video feed 4048 is enlarged and/or moved to provide more detailed views and maneuvering guide 4010 is moved to allow the video feeds to be enlarged while retaining their general relative mounting position and/or orientation arrangement relative to the orientation of mobile structure perimeter indicator 4201. In various embodiments, controller 130 may be configured to detect approach of a navigation hazard and automatically update display views 4000, 4200, and/or 4400 to display view 4401 to help provide a detailed and/or encompassing view the navigation hazard.

Figure 45:
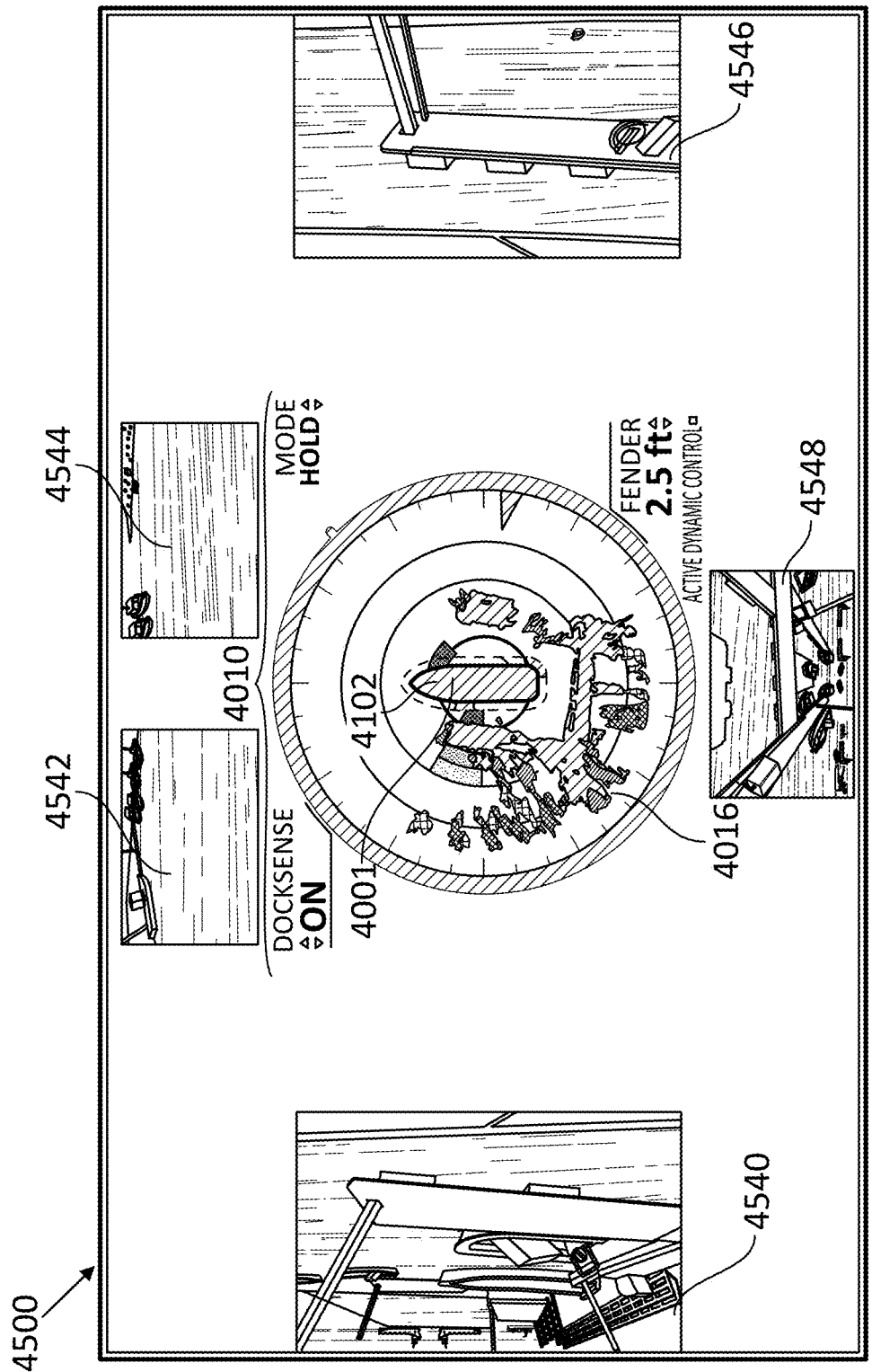

FIG. 45 shows display view 4500 corresponding to a docking assist navigation mode for system 100. In particular, display view 4500 shows modifications to display view 4000, or an updated docking user interface, resulting from user selection of a particular geospatial video feed arrangement where each video feed is rotated so that the relative orientation and position of structure presented within each video feed roughly corresponds to the relative orientation and position of such structure as presented within obstruction map 4016, relative to mobile structure perimeter indicator 4001 of maneuvering guide 4010. Such arrangement may be referred to as an apparent geospatial video feed arrangement about maneuvering guide 4010. For example, port video feed 4040 may be rendered rotated counterclockwise by 90 degrees to generate apparent port video feed 4540, starboard video feed 4046 may be rotated clockwise by 90 degrees to generate apparent starboard video feed 4546, and rear, stern, or aft video feed 4048 may be rotated by 180 degrees to generate apparent rear, stern, or aft video feed 4548. In various embodiments, the number and positioning of video feeds within such arrangement may depend on the number of cameras used and their location about mobile structure 101.

Figure 46:
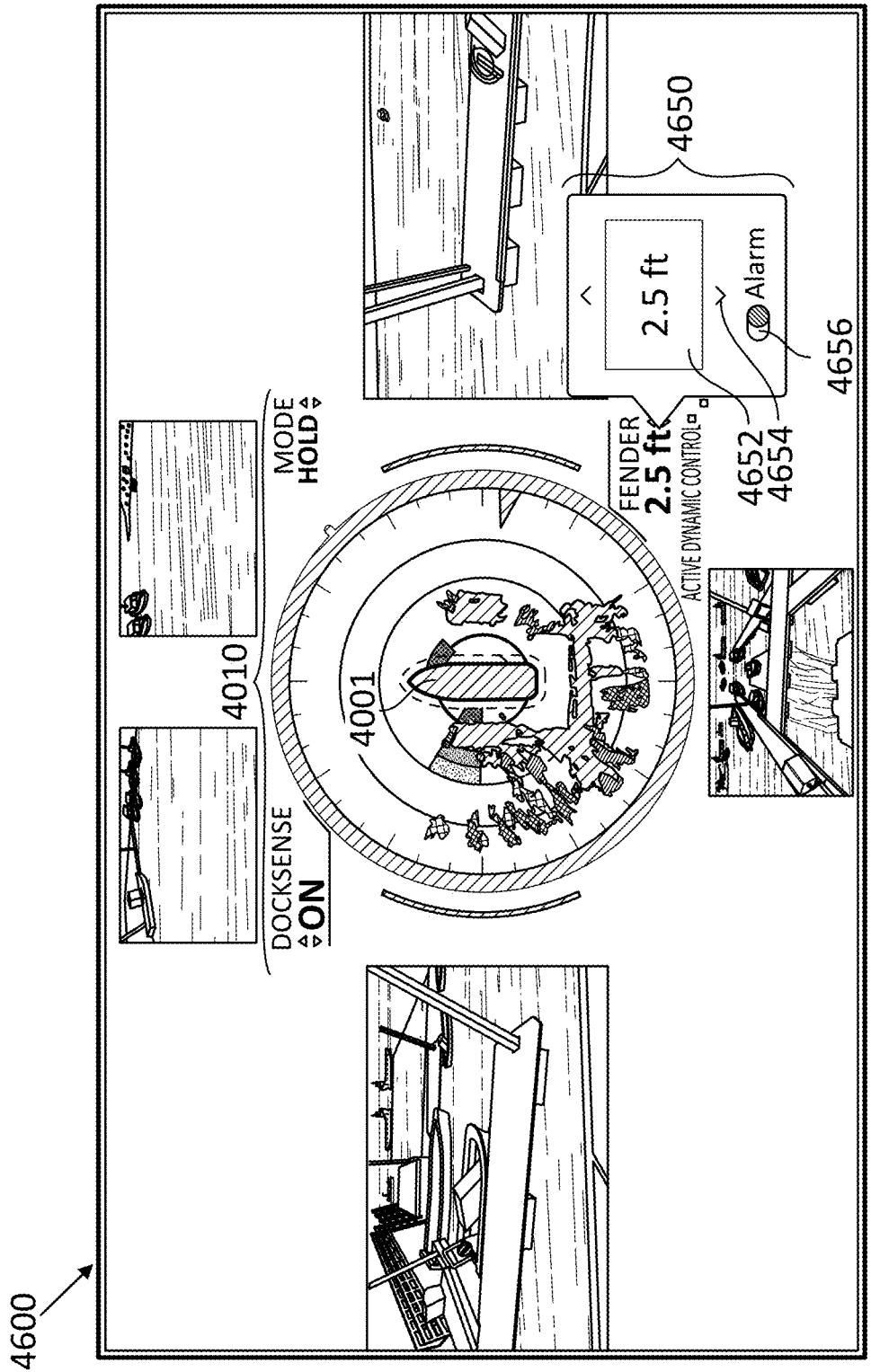

FIG. 46 shows display view 4600 corresponding to a docking assist navigation mode for system 100. In particular, display view 4600 shows modifications to display view 4000, or an updated docking user interface, resulting from user selection of virtual bumper perimeter thickness indicator/selector 4034. Upon detecting such selection, system 100 may be configured to render virtual bumper perimeter thickness selector menu 4650, linked graphically to virtual bumper perimeter thickness indicator/selector 4034 as shown, which may include one or more of thickness selection indicator 4652, thickness selectors 4654 (e.g., configured to adjust a thickness of virtual bumper perimeter indicator 4301 of mobile structure perimeter indicator 4001), and alarm selector 4656 (e.g., configured to enable/disable an audible and/or visual alarm if a navigation hazard enters virtual bumper perimeter indicator 4301).

Figure 47A:
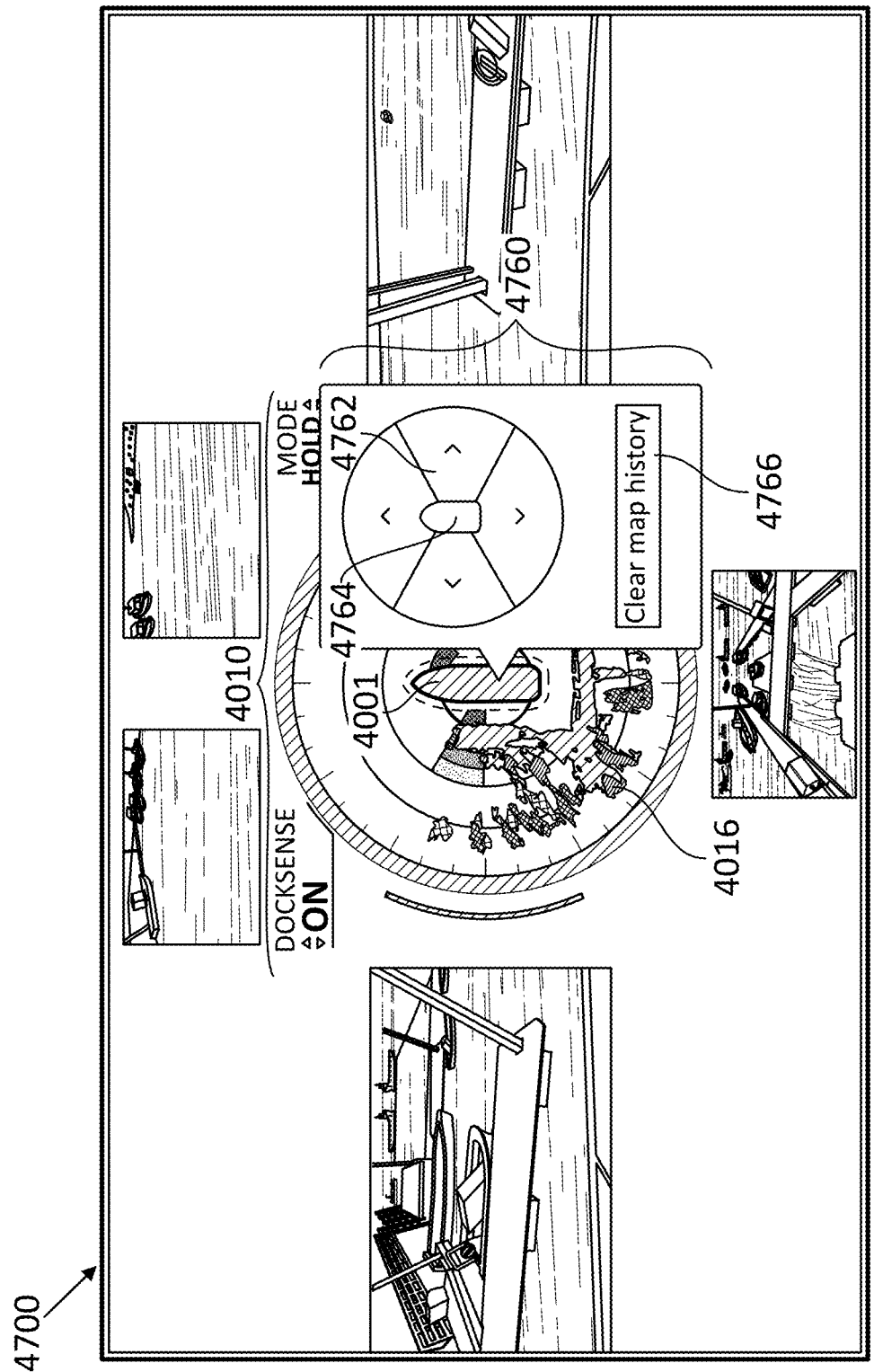

FIG. 47A shows display view 4700 corresponding to a docking assist navigation mode for system 100. In particular, display view 4700 shows modifications to display view 4000, or an updated docking user interface, resulting from user selection of mobile structure perimeter indicator 4001, for example. Upon detecting such selection, system 100 may be configured to render position adjustment menu 4760, linked graphically to mobile structure perimeter indicator 4001 as shown, which may include one or more of position adjustment selectors 4762 disposed about mobile structure orientation indicator 4764, and map reset selector 4766 (e.g., configured to clear aggregation of sensor and/or other data within obstruction map 4016, such that cleared navigation hazards will no longer affect assisted navigation of mobile structure 101). In various embodiments, position adjustment selectors 4762 may be selected to adjust a position of mobile structure 101 by a preset fixed distance (e.g., approximately ⅑, ⅙, or ⅓ of a meter, for each selection of position adjustment selectors 4762, for example), such that system 100 may be configured to control one or more elements of navigation system 190 to adjust an absolute and/or relative position of mobile structure 101 (e.g., relative to an object represented within obstruction map 4016) forward, port, starboard, or aft by such preset fixed distance.

Figure 47B:
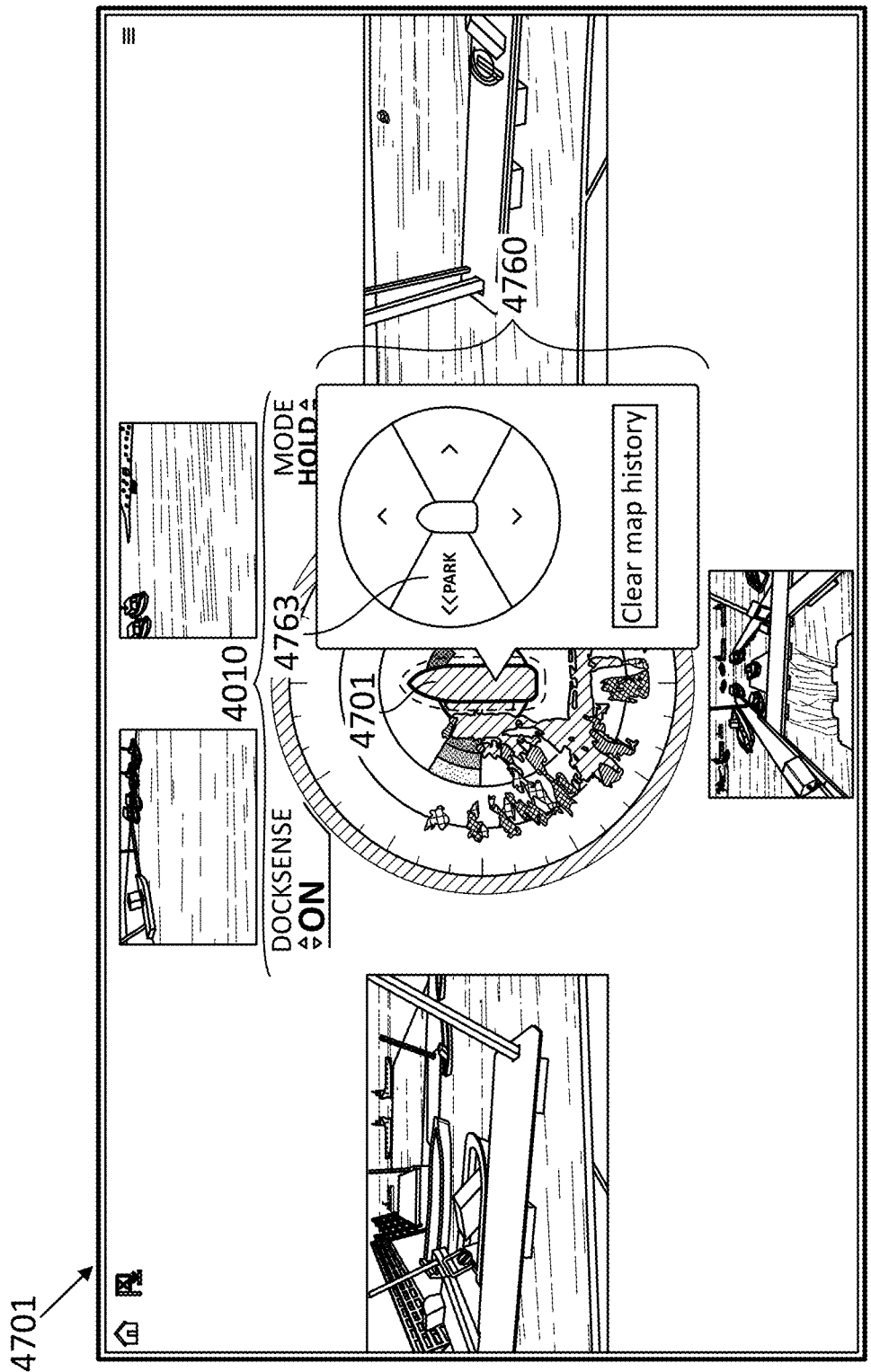

FIG. 47B shows display view 4701 corresponding to a docking assist navigation mode for system 100. In particular, display view 4701 shows modifications to display view 4700, or an updated docking user interface, resulting from system 100 detecting that mobile structure 101 has moved within a preset threshold distance (e.g., ⅑, ⅙, ⅓ of a meter) of a navigation hazard (e.g., a buoy or dock, for example) along the direction associated with one or more of position adjustment selectors 4762. For example, system 100 may be configured to detect such navigation hazard is within a preset threshold distance from a perimeter of mobile structure 101 along a particular direction associated with one or more of position adjustment selectors 4762 and render position adjustment/park selector 4763 in place of such one or more position adjustment selectors 4762, as shown. In general, park selector 4763 of position adjustment menu 4760 may be implemented as text and/or symbols to indicate that selection of park selector 4763 will move mobile structure 101 any required distance to contact the detected navigation hazard along the direction associated with park selector 4763. In various embodiments, system 100 may be configured to generate mobile structure perimeter indicator 4701 with coloring or other graphical indicator to identify approach to such navigation hazard, as described herein.

Figure 47C:
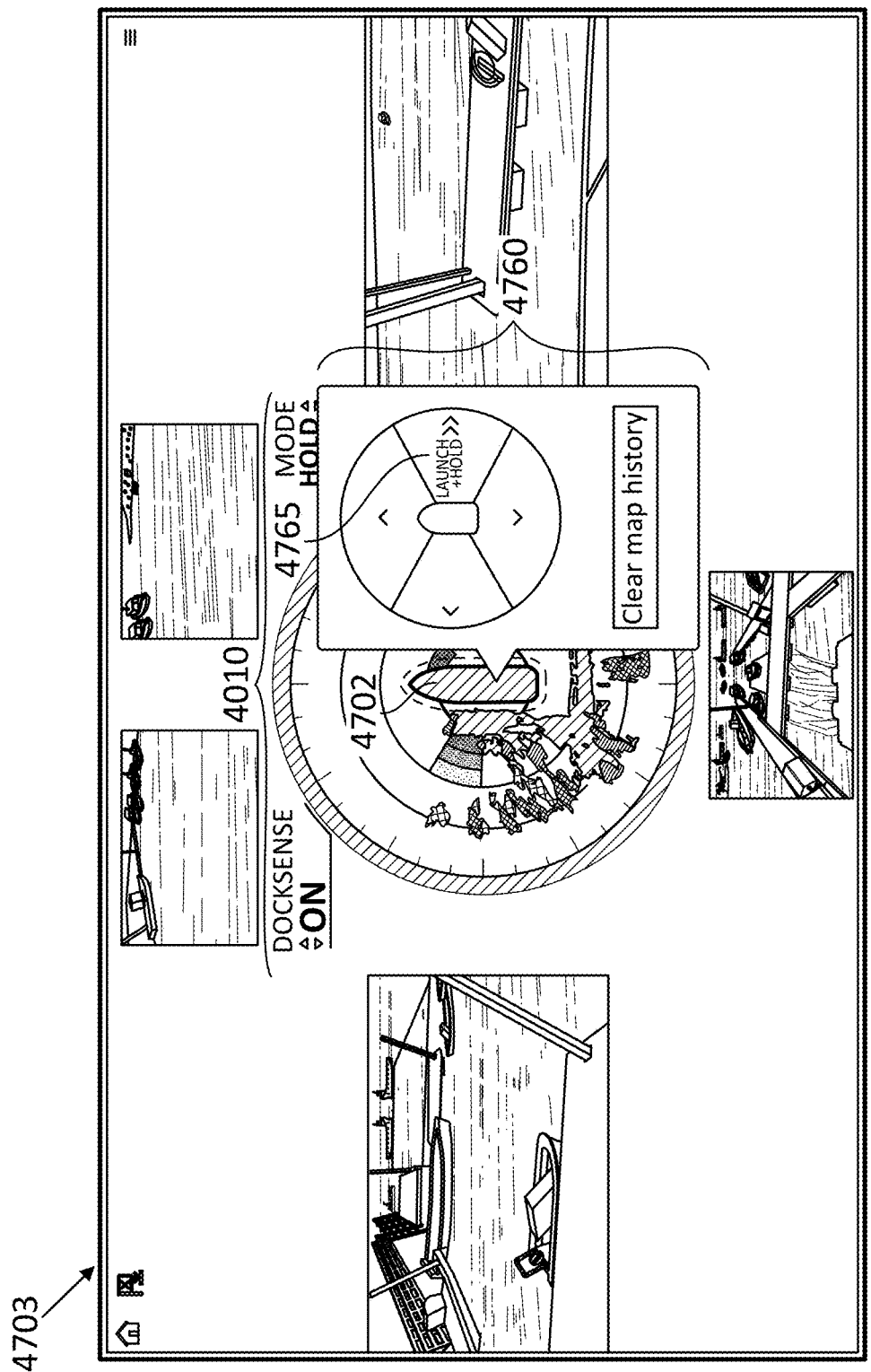

FIG. 47C shows display view 4702 corresponding to a docking assist navigation mode for system 100. In particular, display view 4702 shows modifications to display view 4700 or 4701, or an updated docking user interface, resulting from system 100 detecting that mobile structure 101 is docked to or within a preset threshold distance (e.g., ⅑, ⅙, ⅓ of a meter) of a navigation hazard (e.g., a buoy or dock, for example) along the direction associated with one or more of position adjustment selectors 4762. For example, system 100 may be configured to detect such navigation hazard is within a preset threshold distance from a perimeter of mobile structure 101 along a particular direction associated with one or more of position adjustment selectors 4762 and render position adjustment/launch selector 4765 in place of opposite ones of position adjustment selectors 4762, as shown. In general, launch selector 4765 of position adjustment menu 4760 may be implemented as text and/or symbols to indicate that selection of launch selector 4765 will move mobile structure 101 any required distance to safely launch or disembark from the detected navigation hazard along the direction associated with launch selector 4765. In some embodiments, system 100 may be configured to navigate mobile structure 101 to such safe disembark distance from the detected hazard and hold mobile structure 101 at such safe disembark distance (e.g., until receiving further direction from a user or pilot of mobile structure 101). In various embodiments, system 100 may be configured to generate mobile structure perimeter indicator 4702 lacking a portion of virtual bumper perimeter indicator 4301 or with coloring or other graphical indicator to identify contact (e.g., state and/or spatial location) with such navigation hazard prior to launch, as shown.

In various embodiments, position adjustment menu 4760 may be rendered within display views 4700, 4701, and/or 4702 and/or maneuvering guide 4010 to port, to starboard (as shown), off the bow, or aft of mobile structure perimeter indicators 4001, 4701, and/or 4702 so as to provide a view of portions of obstruction map 4016 corresponding to expected movement of mobile structure 101 in response to selection of park selector 4763 and/or launch selector 4765.

Embodiments of the present disclosure can use such display views and associated techniques to provide intuitive, reliable, accurate, and functional/feature rich docking user interfaces for mobile structures, for example, as described herein. Moreover, such docking user interfaces may facilitate assisted and/or fully autonomous docking, as is also described herein. FIGS. 48A-51 illustrate display views 4800-5100 of a docking user interface in accordance with an embodiment of the disclosure. In various embodiments, each display view of FIGS. 48A-51 may be generated using process 3900 to provide a docking user interface for mobile structure 101, as described herein, and/or similar or alternative processes incorporating techniques to compensate for various types of navigational biases (e.g., generally associated with environmental forces acting on mobile structure 101, similar and inclusive of various external disturbances described herein), such as process 5200 of FIG. 52. In general, display views 4800-5100 are similar in function to display views 3300-3800 of FIGS. 33-38 and/or 4000-4702 of FIGS. 40-47C but include a selection of different or modified display elements configured to help a user of system 100 intuitively recognize a safety and/or operational status of mobile structure 101 in the context of various navigational biases, as described herein.

Figure 48A:
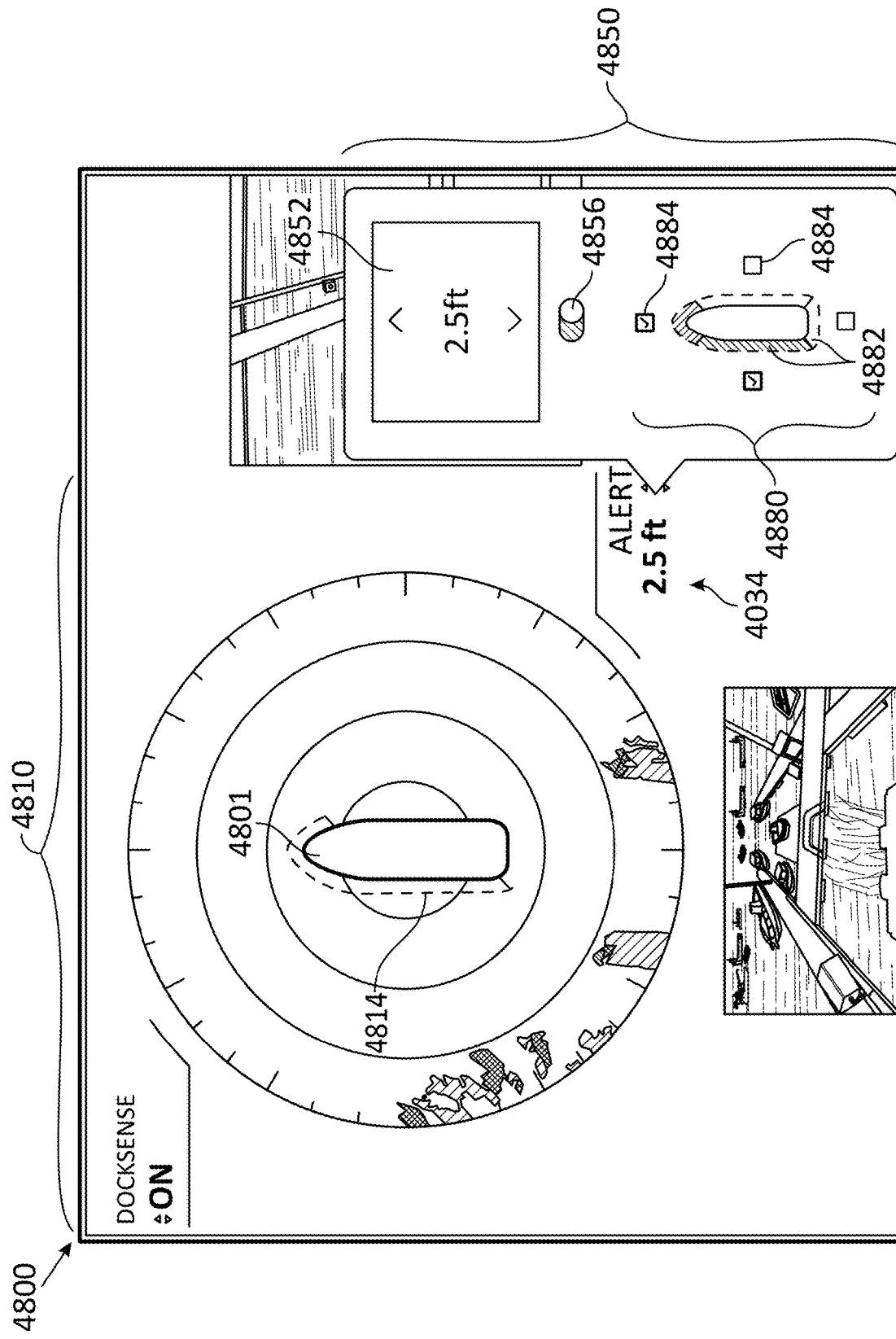
FIGS. 48A-51 illustrate display views of a docking user interface in accordance with an embodiment of the disclosure.

For example, FIG. 48A shows display view 4800 corresponding to a docking assist navigation mode for system 100. In particular, display view 4800 shows modifications to display view 4000, or an updated docking user interface, resulting from user selection of virtual bumper perimeter thickness indicator/selector 4034 of user interface including maneuvering guide 4810. Upon detecting such selection, system 100 may be configured to render virtual bumper perimeter thickness selector menu 4850, linked graphically to virtual bumper perimeter thickness indicator/selector 4034 as shown, which may include one or more of thickness selection indicator/selectors 4852 (e.g., configured to adjust a thickness of a safety perimeter corresponding to and/or represented by virtual bumper perimeter indicator 4814 about mobile structure perimeter indicator 4801), alarm selector 4856 (e.g., configured to enable/disable an audible and/or visual alarm if a navigation hazard enters the safety perimeter and/or a hazard monitoring area associated with virtual bumper perimeter indicator 4814 and/or mobile structure 101), and virtual bumper perimeter segment selector menu 4880, which may include virtual bumper perimeter indicator segments 4882 along with corresponding segment selectors 4884, as shown.

In various embodiments, virtual bumper perimeter indicator 4814 may be partitioned into various segments, such as the bow, stern, starboard, and port segments shown in FIG. 48A, each of which may be enabled, disabled, and/or selected for thickness adjustment using virtual bumper perimeter thickness selector menu 4850. For example, a user may select segment selectors 4884 to toggle enable/disable corresponding virtual bumper perimeter indicator segments 4882 of virtual bumper perimeter indicator 4814, which in turn enables/disables navigational hazard intrusion detection into portions of a safety perimeter and/or hazard monitoring area associated with enabled/disabled segments of virtual bumper perimeter indicator 4814. In other embodiments, a user may select segment selectors 4884 to select corresponding virtual bumper perimeter indicator segments 4882 and then adjust their thickness using thickness selection indicator/selectors 4852.

Figure 48B:
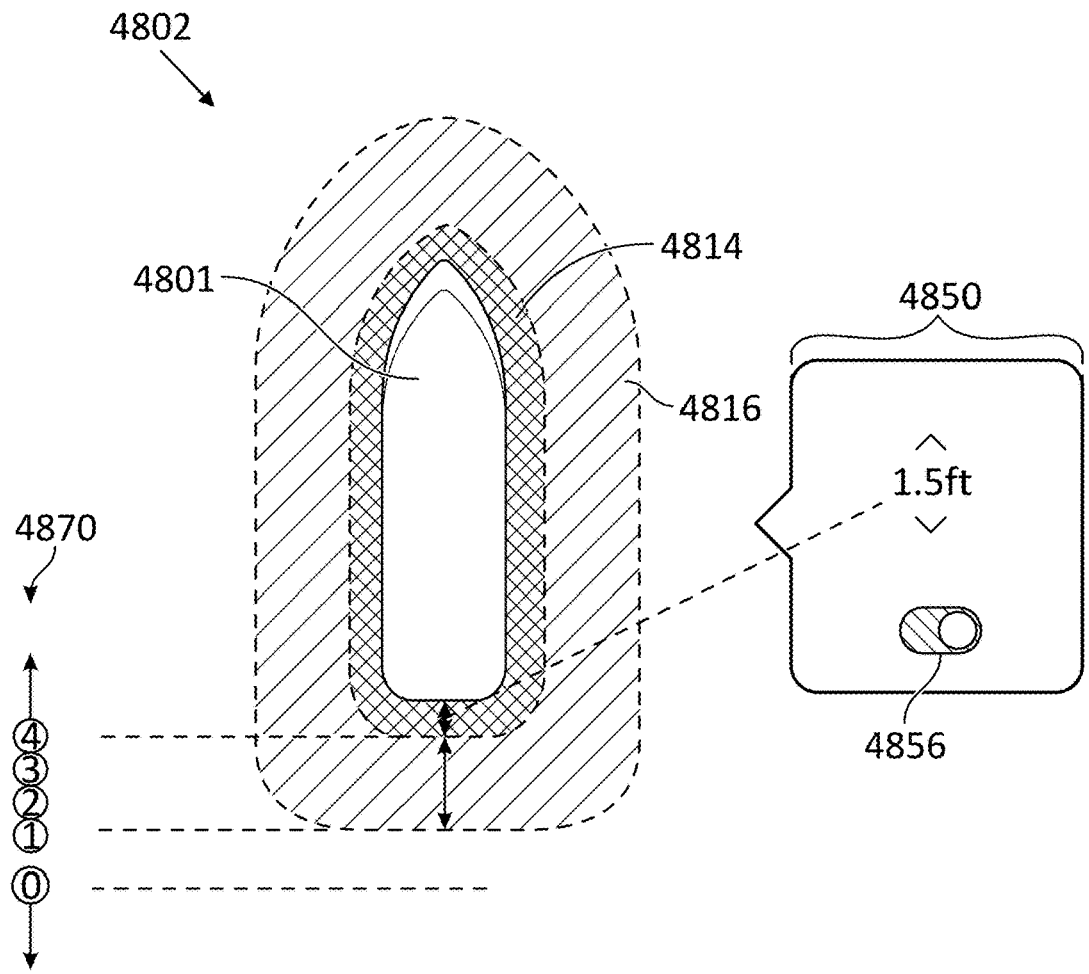

FIG. 48B shows display view 4802 illustrating a detailed view of a hazard monitoring area for system 100. As shown in FIG. 48B, display view 4802 includes virtual bumper perimeter indicator 4814 about mobile structure perimeter indicator 4801, along with a hazard monitoring area indicator 4816 about virtual bumper perimeter indicator 4814 and/or other elements of maneuvering guide 4810. In various embodiments, hazard monitoring area indicator 4816 and/or virtual bumper perimeter indicator 4814 (e.g., and corresponding hazard monitoring areas/safety perimeters) may be portioned into a series of hazard escalation zones 4870, which may all be based on a thickness of the virtual bumper perimeter selected by virtual bumper perimeter thickness selector menu 4850, as described more fully herein with respect to FIG. 48D. For example, in the embodiment shown in FIG. 48B, hazard escalation zone 4 may correspond to all ranges within a thickness of the virtual bumper perimeter (or virtual bumper perimeter segment) about a perimeter of mobile structure 101 (e.g., corresponding to virtual bumper perimeter indicator 4814), hazard escalation zone 3 may correspond to all ranges greater than hazard escalation zone 4 and less than twice the thickness of the virtual bumper perimeter, hazard escalation zone 2 may correspond to all ranges greater than hazard escalation zone 3 and less than or equal to three times the thickness of the virtual bumper perimeter, hazard escalation zone 1 may correspond to all ranges greater than hazard escalation zone 2 and less than four times the thickness of the virtual bumper perimeter, and hazard escalation zone 0 may correspond to all ranges greater than hazard escalation zone 1 (up to the maximum range or monitoring perimeter of perimeter ranging system 148).

Figure 48C:
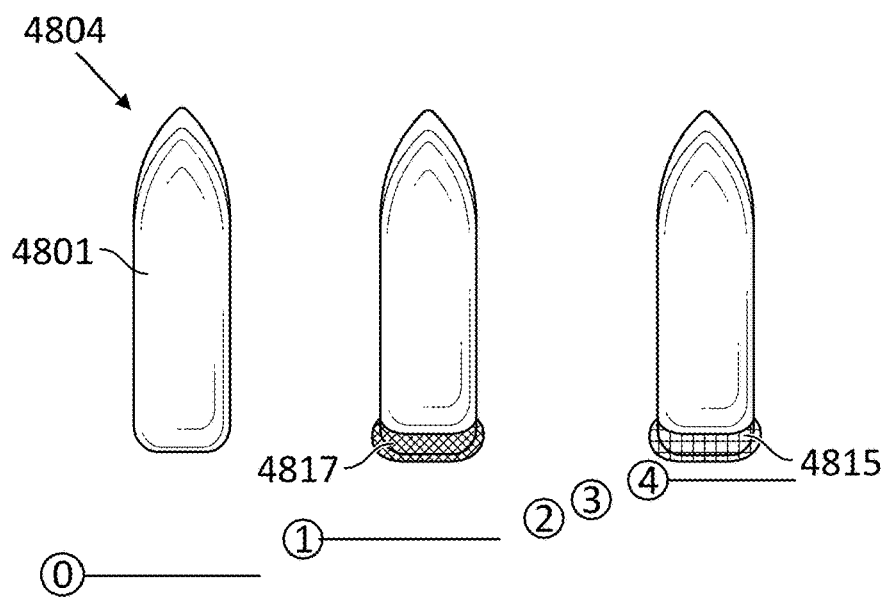

FIG. 48C shows display view 4804 illustrating virtual bumper perimeter intrusion indicators disposed substantially within virtual bumper perimeter indicator 4814 and configured to indicate a relative position and/or proximity of a navigation hazard disposed within a monitoring perimeter of perimeter ranging system 148. In various embodiments, such virtual bumper perimeter intrusion indicators may be rendered within maneuvering guide 3810. For example, the left mobile structure perimeter indicator 4801 of FIG. 48C includes no virtual bumper perimeter intrusion indicator because the nearest navigation hazard is either in hazard escalation zone zero or outside a monitoring perimeter of perimeter ranging system 148. The center mobile structure indicator 4801 includes non-critical virtual bumper perimeter intrusion indicator 4817 disposed within virtual bumper perimeter indicator 4814 and colored yellow (e.g., a caution color) with a relatively low saturation and/or pulsing according to a relatively low frequency (e.g., 1 Hz on/off) to indicate a navigation hazard off the stern of mobile structure 101 and within hazard escalation zone 1 (e.g., within hazard monitoring area 4816 but greater than three times the thickness of the virtual bumper perimeter). The right mobile structure indicator 4801 includes critical virtual bumper perimeter intrusion indicator 4815 disposed within virtual bumper perimeter indicator 4814 and colored red (e.g., a critical color) with a relatively high saturation and/or pulsing according to a relatively high frequency (e.g., 2, 3, 4 Hz on/off, or higher) to indicate a navigation hazard off the stern of mobile structure 101 and within hazard escalation zone 4 (e.g., within the hazard monitoring area corresponding to hazard monitoring area indicator 4816 and within the safety perimeter corresponding to virtual bumper perimeter indicator 4814). The color, color saturation, and/or pulsing frequency may be modulated between hazard escalation zones to clearly indicate to a user which hazard escalation zone is implicated by the navigation hazard intrusion.

Figure 48D:
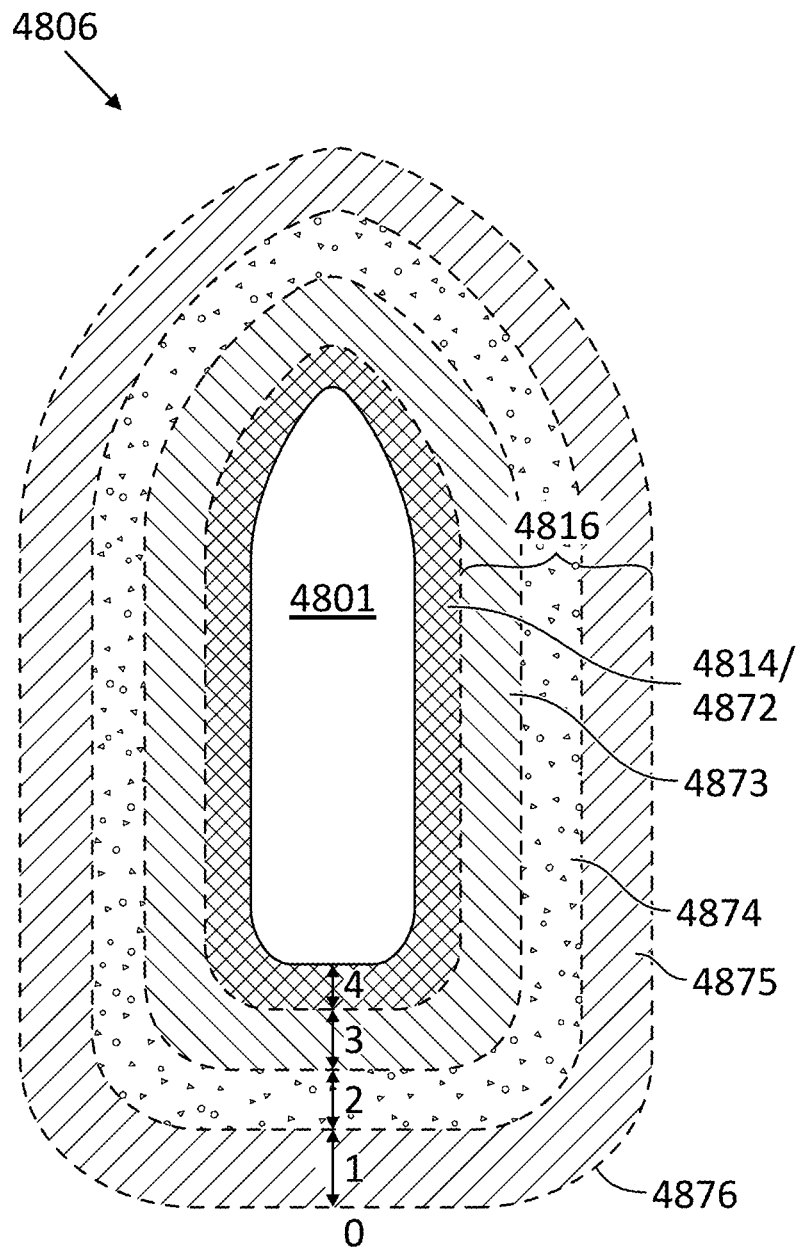

FIG. 48D shows display view 4806 illustrating a detailed view of a hazard monitoring area for system 100. As shown in FIG. 48D, display view 4806 includes various elements of maneuvering guide 4810, such as mobile structure indicator 4801, virtual bumper perimeter indicator 4814 corresponding to hazard escalation zone 4872 (e.g., also indicated as zone 4), and hazard monitoring area indicator 4816 corresponding to and/or incorporating hazard escalation zone 4873 (e.g., zone 3), hazard escalation zone 4874 (e.g., zone 2), hazard escalation zone 4875 (e.g., zone 1), and hazard escalation zone 4876 (e.g., zone 0), each zone with thicknesses defined similarly to zone identified in FIGS. 48B and C. In some embodiments, each hazard escalation zone within hazard monitoring area indicator 4816 may be rendered according to a different color and/or color saturation, for example, and perimeters between zones may be illustrated by dashed lines, as shown in FIG. 48D. In other embodiments, hazard monitoring area indicator 4816 may be rendered as a single color/color saturation/perimeter indicator about mobile structure indicator 4801 and/or within maneuvering guide 3810.

Figure 49:
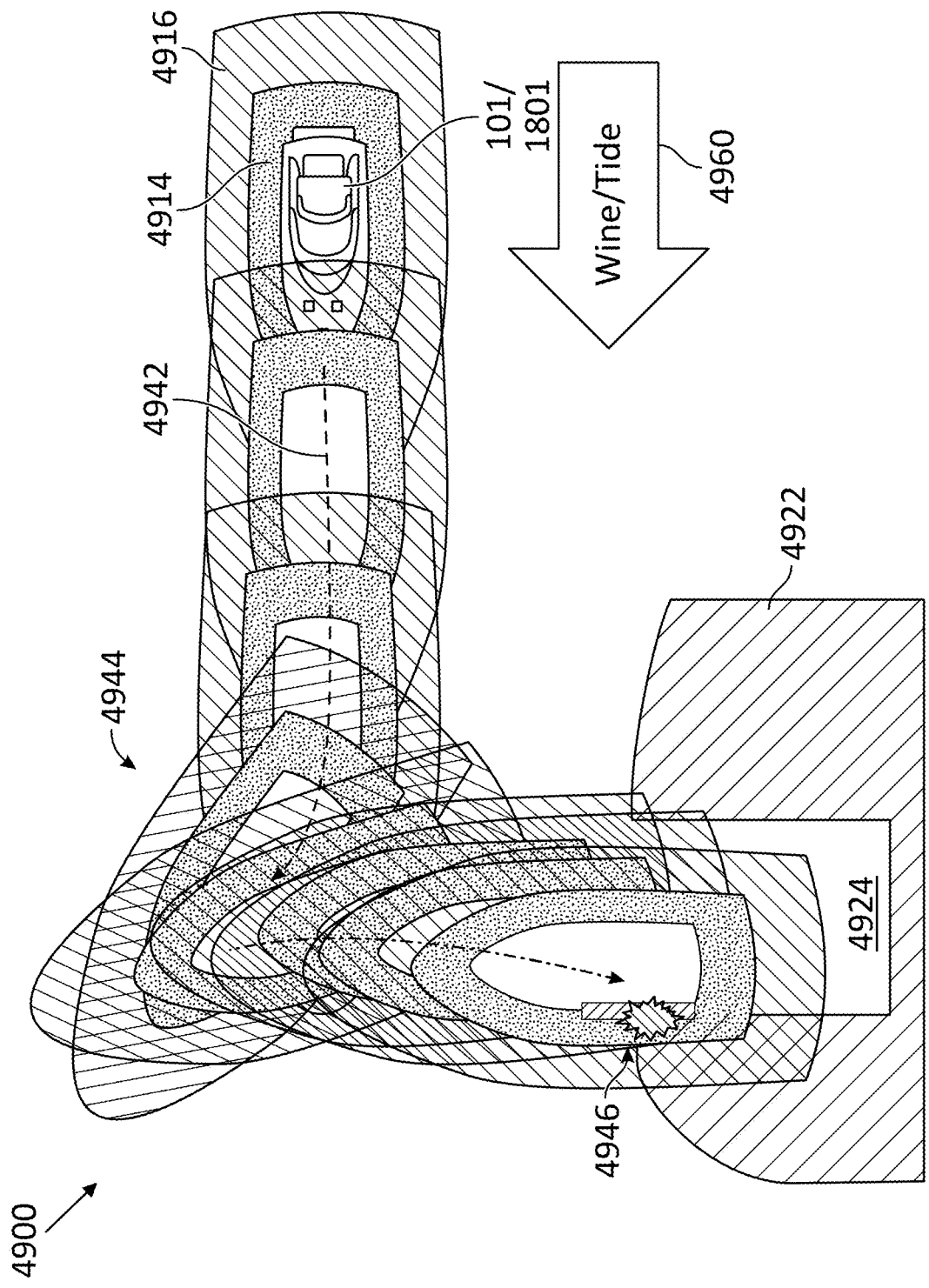
Figure 50:
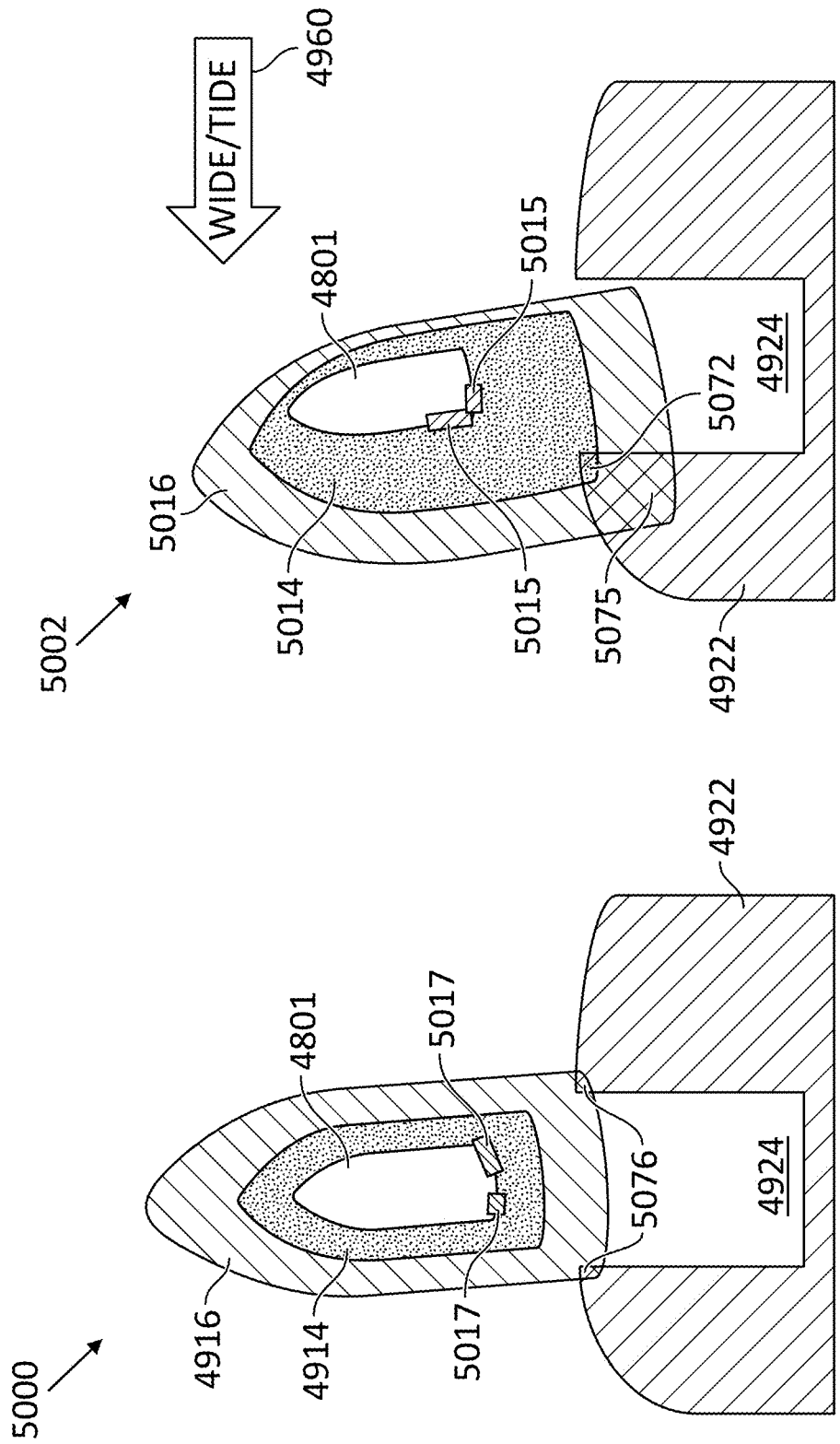

FIG. 49 shows display view 4900 illustrating a docking maneuver 4944 that does not properly compensate for wind/water current disturbances (e.g., represented by wind/water current disturbance indicator 4960) generating a navigational bias associated with navigation of mobile structure 101 (e.g., represented by mobile structure perimeter indicator 4801). For example, in the embodiment shown in FIG. 49, an orientation, position, and/or planned route of mobile structure indicator 4801 is shown relative to dock 4922 and slip or berth 4924 (e.g., as represented in an obstruction map) and relative to wind/water current disturbance indicator 4960 indicating a wind and/or water current disturbance generating a navigational bias tending to move mobile structure 101 to the left of the page. In particular, mobile structure 101 is shown traveling along target docking path 4942 with virtual bumper perimeter indicator 4914 and hazard monitoring area indicator 4916 kept concentric to and symmetrically spaced about mobile structure perimeter indicator 4914, which does not compensate for the navigational bias represented by wind/water current disturbance indicator 4960 and can result in collision 4946, such as when the navigational bias is sufficiently large that propulsion system 170 and/or thrust maneuver system 172 are unable to compensate within the time period between detection of an edge of berth 4924 and impact with the edge as mobile structure 101 (or an assisted pilot of mobile structure 1010) attempts to dock within berth 4924.

FIGS. 50A-B shows display views 5000 and 5002 illustrating embodiments of maneuvering guide 4810 that adjust positions of a safety perimeter corresponding to virtual bumper perimeter 4914 and a hazard monitoring area corresponding to hazard monitoring area indicator 4916, relative to mobile structure perimeter indicator 4801, to help compensate for navigational bias associated with navigation of mobile structure 101. In particular, display view 5000 of FIG. 50A shows virtual bumper perimeter indicator 4914 concentric to and symmetrically spaced about mobile structure perimeter indicator 4801, and hazard monitoring area indicator 4916 concentric to and symmetrically spaced about virtual bumper perimeter indicator 4914, because no navigational bias exists in FIG. 50A. As such, a maneuvering guide incorporating elements of display view 5000 would include non-critical virtual bumper perimeter intrusion indicators 5017 corresponding to non-critical hazard intrusion zones 5076, which represent minor overlapping portions of hazard monitoring area indicator 4916 and corners of berth 4924 in dock 4922 (e.g., of an obstruction map of maneuvering guide 4810).

By contrast, display view 5002 of FIG. 50B shows a spatially biased virtual bumper perimeter indicator 5014 and a spatially biased hazard monitoring area indicator 5016 (e.g., corresponding respectively to a spatially biased safety perimeter and a spatially biased hazard monitoring area within the monitoring perimeter of perimeter ranging system 148), each determined based, at least in part, on a determined direction and magnitude of the navigational bias represented by wind/water current disturbance indicator 4960. As such, a maneuvering guide incorporating elements of display view 5002 would include critical virtual bumper perimeter intrusion indicators 5015 corresponding to critical hazard intrusion zones 5075 and/or 5072, which represent major overlapping portions of spatially biased hazard monitoring area indicator 5016 and/or any overlapping portions of spatially biased virtual bumper perimeter indicator 5014 and corners of berth 4924 in dock 4922.

In various embodiments, spatially biased hazard monitoring area indicator 5016 encloses spatially biased virtual bumper perimeter indicator 5014 and/or spatially biased virtual bumper perimeter indicator 5014 encloses mobile structure perimeter indicator 4801. Spatially biased virtual bumper perimeter indicator 5014 and spatially biased hazard monitoring area indicator 5016 may be asymmetrically and/or elastically deformed and/or displaced relative to a center of mobile structure perimeter indicator 4801 along the determined direction of the navigational bias based, at least in part, on the determined magnitude of the navigational bias. Virtual bumper perimeter intrusion indicators 5015 may be configured to indicate a relative position and/or proximity of a navigation hazard (e.g., dock 4922) detected at or within a corresponding spatially biased hazard monitoring area, one or more spatially biased hazard escalation zones distributed within the spatially biased hazard monitoring area, and/or a corresponding spatially biased safety perimeter for mobile structure 101, as described herein.

In general, system 100 may be configured to render virtual bumper perimeter intrusion indicators 5015 disposed substantially within spatially biased virtual bumper perimeter indicator 5014 and/or adjacent mobile structure perimeter indicator 4801, where virtual bumper perimeter intrusion indicators 5015 disposed substantially within spatially biased virtual bumper perimeter indicator 5014 of mobile structure perimeter indicator 4801. In various embodiments, each virtual bumper perimeter intrusion indicator 5015 may be implemented by a graphics texture with a shape generally matching that of the intruding navigation hazard and including a color and/or pattern different than that used to render spatially biased virtual bumper perimeter indicator 5014, similar to virtual bumper perimeter intrusion indicator 3416 in FIG. 34. In some embodiments, virtual bumper perimeter intrusion indicators 5015 may be animated and/or flashing to draw attention of a user. In further embodiments, such navigation hazard and/or corresponding overlapping portions of spatially biased hazard monitoring area indicator 5016 and/or spatially biased virtual bumper perimeter indicator 5014 may be identified and visually highlighted in a corresponding video feed, such as by an overlay similar in color, pattern, shape, and/or translucency to virtual bumper perimeter intrusion indicators 5015.

Figure 51:
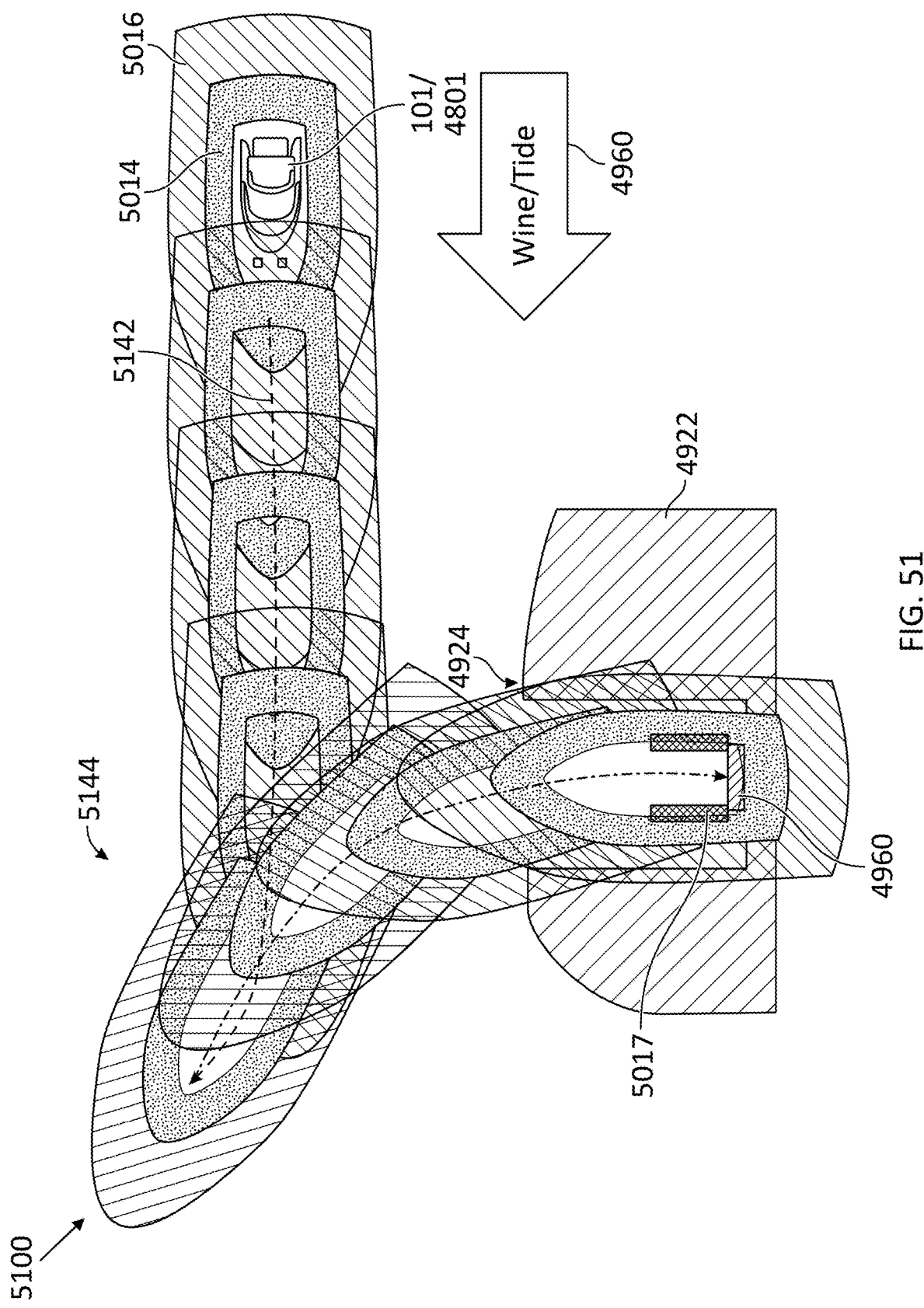

FIG. 51 shows display view 5100 illustrating a docking maneuver 5144 that properly compensates for wind/water current disturbances (e.g., represented by wind/water current disturbance indicator 4960) generating a navigational bias associated with navigation of mobile structure 101 (e.g., represented by mobile structure perimeter indicator 4801). For example, in the embodiment shown in FIG. 51, an orientation, position, and/or planned route of mobile structure indicator 4801 is shown relative to dock 4922 and slip or berth 4924 (e.g., as represented in an obstruction map) and relative to wind/water current disturbance indicator 4960 indicating a wind and/or water current disturbance generating a navigational bias tending to move mobile structure 101 to the left of the page. In particular, mobile structure 101 is shown traveling along target docking path 5142 with virtual bumper perimeter indicator 5014 and hazard monitoring area indicator 5016 spatially biased relative to mobile structure perimeter indicator 4801 based, at least in part, on a determined direction and magnitude of the navigational bias represented by wind/water current disturbance indicator 4960, which at least partially compensates for the navigational bias represented by wind/water current disturbance indicator 4960 and can avoid collisions by providing sufficient lead time and/or distance for propulsion system 170 and/or thrust maneuver system 172 to compensate for the navigational bias (e.g., within the time period between detection of an edge of berth 4924 and closest approach to an edge of dock 4922 as mobile structure 101 (or an assisted pilot of mobile structure 1010) dock within berth 4924. As such, system 100 may be configured to minimize non-critical virtual bumper perimeter intrusion indicators 5017 and/or critical virtual bumper perimeter intrusion indicators 5015. Moreover, by properly compensating for such navigational bias, critical virtual bumper perimeter intrusion indicators 5015 may be suppressed as both the navigational bias and an approach velocity of mobile structure 101 towards dock 4922 are extinguished.

In some embodiments, virtual bumper perimeter indicator 5014 and hazard monitoring area indicator 5016 may be spatially biased relative to mobile structure perimeter indicator 4801 based on the navigational bias, an absolute velocity of mobile structure 101, a minimum thrust availability direction, a relative hazard approach velocity, and/or other navigational bias characteristics, navigation control system characteristics or statuses, and/or a navigational status of mobile structure 101, including an orientation, position, and/or linear and/or angular velocity of mobile structure 101. For example, determining the direction and magnitude of the navigational bias may include determining an absolute velocity of mobile structure 101 and determining the direction and magnitude of the navigational bias based, at least in part, on the determined absolute velocity of the mobile structure 101. In other embodiments, determining the direction and magnitude of the navigational bias may include determining an environmental disturbance velocity impacting navigation of mobile structure 101, where the environmental disturbance velocity comprises a wind velocity and/or a water current velocity (e.g., using a wind sensor and/or water speed sensor), and determining the direction and magnitude of the navigational bias based, at least in part, on the determined environmental disturbance velocity.

In further embodiments, determining the direction and magnitude of the navigational bias may include determining a minimum thrust availability direction associated with thrust maneuver system 172 for mobile structure 101, and determining the direction and magnitude of the navigational bias based, at least in part, on the determined minimum thrust availability direction. For example, the amount and direction of asymmetric and/or elastic deformation and/or displacement of the safety perimeter and the hazard monitoring area may be based, at least in part, on the remaining thrust availability of thrust maneuver system 172, such that a direction adjustment corresponds to the minimum thrust availability (e.g., the direction in which thrust maneuver system 172 is least able to compensate for environmental disturbances) and a magnitude adjustment is determined based on the amount of remaining thrust availability, along the direction of minimum thrust availability, and the component of the magnitude of the environmental disturbance along the same direction.

In yet further embodiments, determining the direction and magnitude of the navigational bias may include determining a relative hazard approach velocity from the mobile structure towards a detected navigation hazard (e.g., based, at least in part, on perimeter sensor data), and determining the direction and magnitude of the navigational bias based, at least in part, on the determined relative hazard approach velocity. For example, the amount and direction of asymmetric and/or elastic deformation and/or displacement of the safety perimeter and the hazard monitoring area may be based, at least in part, on such hazard approach velocity, such that a direction adjustment corresponds to direction of the hazard approach velocity and a magnitude adjustment is determined based on the magnitude of the hazard approach velocity and the component of the magnitude of the environmental disturbance along the same direction.

Figure 52:
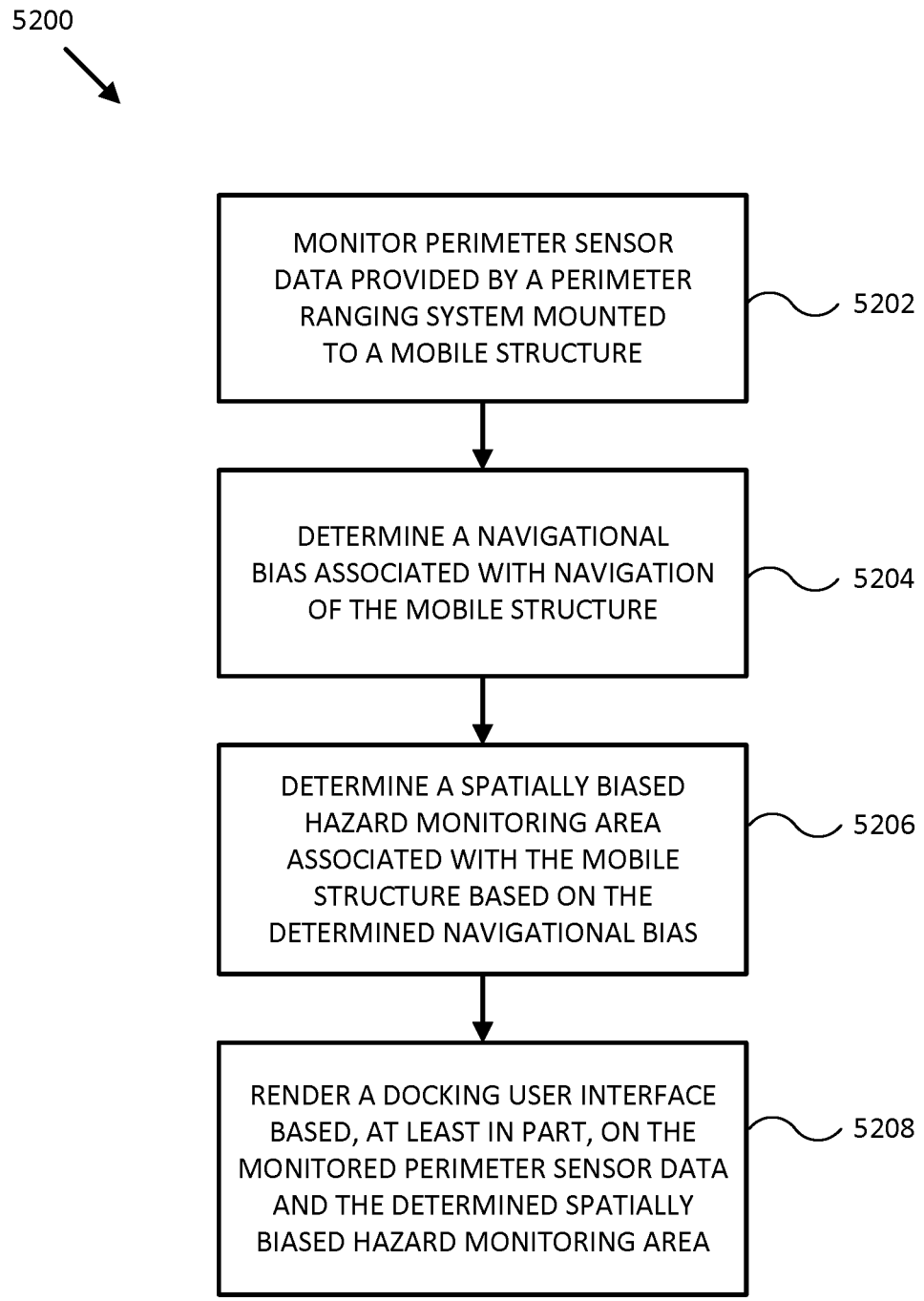
FIG. 52 illustrates a flow diagram of various operations to provide a docking user interface in accordance with an embodiment of the disclosure.

FIG. 52 illustrates a flow diagram of a process 5200 to provide a docking user interface for mobile structure 101 in accordance with an embodiment of the disclosure. It should be appreciated that any step, sub-step, sub-process, or block of process 5200 may be performed in an order or arrangement different from the embodiments illustrated by FIG. 52. For example, in other embodiments, one or more blocks may be omitted from or added to the process.

Furthermore, block inputs, block outputs, various sensor signals, sensor information, calibration parameters, and/or other operational parameters may be stored to one or more memories prior to moving to a following portion of a corresponding process. Although process 5200 is described with reference to systems, processes, control loops, and images described in reference to FIGS. 1A-51, process 5200 may be performed by other systems different from those systems, processes, control loops, and images and including a different selection of electronic devices, sensors, assemblies, mobile structures, and/or mobile structure attributes, for example.

In block 5202, perimeter sensor data provided by a perimeter ranging system are monitored. For example, controller 130 may be configured to monitor perimeter sensor data provided by perimeter ranging system 148 mounted to mobile structure 101. In various embodiments, such perimeter sensor data may correspond to at least a safety perimeter and/or a hazard monitoring area within a monitoring perimeter of perimeter ranging system 148, as described herein. Controller 130 may receive the perimeter sensor data and process the perimeter sensor data to identify ranges and/or directions to, relative velocities of, and/or other characteristics of navigation hazards within the monitoring perimeter of perimeter ranging system 148.

In block 5204, a navigational bias associated with navigation of a mobile structure is determined. For example, controller 130 may be configured to determine a direction and magnitude of a navigational bias associated with navigation of mobile structure 101. In various embodiments, such navigational bias may be associated with an environmental disturbance impacting navigation of mobile structure 101.

In one embodiment, controller 130 may be configured to determine the navigational bias by determining an absolute velocity of mobile structure 101 and determining the direction and magnitude of the navigational bias based, at least in part, on the determined absolute velocity of mobile structure 101. For example, controller 130 may be configured to receive a time series of absolute positions of mobile structure 101 from FNSS 146 and determine an absolute velocity of mobile structure 101 based on the time series of absolute positions of mobile structure 101. Controller 130 may also be configured to control navigation control system 190 to momentarily halt all absolute motion by mobile structure 101 and then allow mobile structure 101 to drift and determine the direction and magnitude of the navigational bias based on the drift velocity of mobile structure 101. In alternative embodiments, controller 130 may be configured to determine the direction and magnitude of the navigational bias based on thrust and/or other propulsion generated by navigation control system 190 to momentarily halt all absolute motion by mobile structure 101.

In related embodiments, controller 130 may be configured to determine the navigational bias by determining an environmental disturbance velocity impacting navigation of mobile structure 101, where the environmental disturbance velocity comprises a wind velocity and/or a water current velocity, and determining the direction and magnitude of the navigational bias based, at least in part, on the determined environmental disturbance velocity. Such environmental disturbance velocity may be determined based on orientation and/or position sensor data (e.g., provided by orientation sensor 140 and/or GNSS 146), wind or water speed sensor data (e.g., provided by speed sensor 142), perimeter sensor data (e.g., by measuring relative speeds of objects or hazards detected within the perimeter sensor data), and/or other sensor data described herein.

In further embodiments, controller 130 may be configured to determine the navigational bias by determining a minimum thrust availability direction associated with thrust maneuver system 172 for mobile structure 101, and determining the direction and magnitude of the navigational bias based, at least in part, on the determined minimum thrust availability direction. In general, lack of thrust availability in a particular direction, such as due to maneuvering characteristics of mobile structure 101, for example, or due to use of thrust maneuver system 172 to compensate for an existing environmental disturbance or otherwise navigate mobile structure 101, can render mobile structure 101 particularly susceptible to further environmental disturbances that act in the direction of the lack of thrust availability. Controller 130 may be configured to compensate for such lack by spatially biasing the safety perimeter and/or hazard monitoring zone at least partially towards the direction of the lack of thrust availability, which can significantly increase the safety of autonomous or assisted navigation under such conditions, particularly while docking. For example, the amount and direction of asymmetric and/or elastic deformation and/or displacement of the safety perimeter and the hazard monitoring area may be based, at least in part, on the remaining thrust availability of thrust maneuver system 172, such that a direction adjustment corresponds to the minimum thrust availability (e.g., the direction in which thrust maneuver system 172 is least able to compensate for environmental disturbances) and a magnitude adjustment is determined based on the amount of remaining thrust availability, along the direction of minimum thrust availability, and the component of the magnitude of the environmental disturbance along the same direction.

In yet further embodiments, controller 130 may be configured to determine the navigational bias by determining a relative hazard approach velocity from mobile structure 101 towards a detected navigation hazard based, at least in part, on perimeter sensor data provided by perimeter ranging system 148, and determining the direction and magnitude of the navigational bias based, at least in part, on the determined relative hazard approach velocity. In general, rapid approach of a navigation hazard can risk collision with the navigation hazard, and so controller 130 may be configured to compensate for such approach velocity by spatially biasing the safety perimeter and/or hazard monitoring zone at least partially towards the navigation hazard along the approach velocity, which can significantly increase the safety of autonomous or assisted navigation under such conditions, particularly while docking. For example, the amount and direction of asymmetric and/or elastic deformation and/or displacement of the safety perimeter and the hazard monitoring area may be based, at least in part, on such hazard approach velocity, such that a direction adjustment corresponds to direction of the hazard approach velocity and a magnitude adjustment is determined based on the magnitude of the hazard approach velocity and the component of the magnitude of the environmental disturbance along the same direction.

More generally, the navigation bias may be determined using any one or combination of the techniques described herein, and particularly with respect to block 5204.

In block 5206, a spatially biased hazard monitoring area is determined. For example, controller 130 may be configured to determine a spatially biased hazard monitoring area within a monitoring perimeter of perimeter ranging system 148 based, at least in part, on the direction and magnitude of the navigational bias determined in block 5204. More generally, controller 130 may be configured to determine a spatially biased safety perimeter for the mobile structure and a spatially biased hazard monitoring area within the monitoring perimeter of perimeter ranging system 148 based, at least in part, on the determined direction and magnitude of the navigational bias.

In various embodiments, the spatially biased hazard monitoring area may enclose the spatially biased safety perimeter and/or the spatially biased safety perimeter may enclose a perimeter of mobile structure 101. As such, the spatially biased safety perimeter may be disposed entirely within (or share a border with) the spatially biased hazard monitoring area, and the perimeter of mobile structure 101 may be disposed entirely within (or share a border with) the spatially biased safety perimeter. In some embodiments, the spatially biased safety perimeter and the spatially biased hazard monitoring area may be asymmetrically and/or elastically deformed and/or displaced relative to a center of the mobile structure along the determined direction of the navigational bias based, at least in part, on a determined magnitude of the navigational bias. As shown in FIGS. 48A-51, mobile structure perimeter indicator 4801, virtual bumper perimeter indicators 4814, 4914, and/or 5014, and/or hazard monitoring area indicators 4816, 4916, and/or 5016 may be rendered within a display view (e.g., and/or as part of maneuvering guide 4810) to represent the corresponding perimeter of mobile structure 101, spatially biased safety perimeter, and spatially biased hazard monitoring area.

In block 5208, a docking user interface is rendered. For example, controller 130 may be configured to render a docking user interface (e.g., display views 3300-3800, 4000-4703, and/or 4800-5100) based, at least in part, on the perimeter sensor data monitored in block 5902. More generally, controller 130 may be configured to render a docking user interface based, at least in part, on the perimeter sensor data monitored in block 5902 and the spatially biased safety perimeter and the spatially biased hazard monitoring area determined in block 5206. Such docking user interface may include maneuvering guide 4810, which may itself include mobile structure perimeter indicator 4801, virtual bumper perimeter indicator 4814 disposed about mobile structure perimeter indicator 4801 and corresponding to a safety perimeter for mobile structure 101, and/or virtual bumper perimeter intrusion indicator 4815/4817 disposed substantially within virtual bumper perimeter indicator 4814, where virtual bumper perimeter intrusion indicator 4815/4817 is configured to indicate a relative position and/or proximity of a navigation hazard disposed within a monitoring perimeter of perimeter ranging system 148.

In some embodiments, such as where the navigational bias is undetermined or zero, virtual bumper perimeter indicator 4814 may be concentric to and symmetrically spaced about mobile structure perimeter indicator 4801 by a selected indicator thickness corresponding to a selected thickness of the safety perimeter for the mobile structure. In such embodiments, a perimeter of the hazard monitoring area may be concentric to and symmetrically spaced about the safety perimeter by a hazard monitoring perimeter thickness (e.g., the aggregate thickness of hazard escalation zones 3, 2, and/or 1), which may be equal to or greater than the thickness of the safety perimeter for mobile structure 101. A rendered virtual bumper perimeter intrusion indicator 4815/4817 may be configured to indicate a relative position and/or proximity of the navigation hazard detected at or within the hazard monitoring area, within one or more hazard escalation zones 4870 distributed concentrically within the hazard monitoring area, and/or the safety perimeter for mobile structure 101.

In other embodiments, such as where the navigational bias is determined and non-zero, spatially biased hazard monitoring area indicator 5016 may enclose spatially biased virtual bumper perimeter indicator 5014 and/or spatially biased virtual bumper perimeter indicator 5014 may enclose mobile structure perimeter indicator 4801. Spatially biased virtual bumper perimeter indicator 5014 and spatially biased hazard monitoring area indicator 5016 may be asymmetrically and/or elastically deformed and/or displaced relative to a center of mobile structure perimeter indicator 4801 along the direction of the navigational bias, determined in block 5204, based, at least in part, on the magnitude of the navigational bias also determined in block 5204. Virtual bumper perimeter intrusion indicator 5015/5017 may be configured to indicate a relative position and/or proximity of a navigation hazard detected at or within spatially biased hazard monitoring area indicator 5016, one or more spatially biased hazard escalation zones distributed within spatially biased hazard monitoring area indicator 5016 and/or spatially biased virtual bumper perimeter indicator 5014 (e.g., hazard escalation zones 4870 spatially biased according to similar criteria as spatially biased virtual bumper perimeter indicator 5014, spatially biased hazard monitoring area indicator 5016, and/or interpolations between spatially biased virtual bumper perimeter indicator 5014 and a perimeter of spatially biased hazard monitoring area indicator 5016).

In some embodiments, maneuvering guide 4810 may include virtual bumper perimeter thickness selector menu 4850 including virtual bumper perimeter thickness indicator/selector 4852 and/or virtual bumper perimeter segment selector menu 4880, itself including virtual bumper perimeter segment selectors 4884 configured to enable, disable, indicate, and/or provide for user selection of a thickness of one or more perimeter indicator segments 4882 of virtual bumper perimeter indicator 4814 disposed about mobile structure perimeter indicator 4801.

In various embodiments, maneuvering guide 4810 may include an obstruction map 3316 (e.g., generated in block 3904) generated based, at least in part, on perimeter sensor data from perimeter ranging system 148 mounted to mobile structure 101. In various embodiments, obstruction map 3316 may include one or more navigation hazards disposed within a monitoring perimeter of perimeter ranging system 148, as described herein. Maneuvering guide 4810 may include a translational thrust indicator (e.g., translational thrust indicators 3322, 3422, 3522, and/or 3622) configured to indicate a translational maneuvering thrust magnitude and direction relative to an orientation of mobile structure perimeter indicator 3301 within maneuvering guide 3310. In related embodiments, maneuvering guide 4810 may include a rotational thrust indicator (e.g., rotational thrust indicators 3324, 3424, 3524, and/or 3624) configured to indicate a rotational maneuvering thrust magnitude and direction relative to the orientation of mobile structure perimeter indicator 4801 within maneuvering guide 4810. In some embodiments, the translational thrust indicator and the rotational thrust indicator may be rendered according to a first or greyscale render palette while mobile structure 101 is piloted according to a manual navigation mode and according to a second or color render palette while mobile structure 101 is piloted according to a docking assist navigation mode, as described herein.

In further embodiments, maneuvering guide 3310 may include a set of translational thrust scale markers 3312 comprising a plurality of circles with increasing radiuses and centered on mobile structure perimeter indicator 3301, where each circle may correspond to a particular translational thrust percentage of a maximum available translational thrust generated by navigation control system 190 across the circumference of the circle. Maneuvering guide 3310 may also include a set of rotational thrust scale markers 3314 comprising two pluralities of radially oriented line segments each distributed evenly across half a circumference of an outer circle of the set of translational thrust scale markers 3312, where each line segment corresponds to a particular rotational thrust percentage of a maximum available rotational thrust generated by navigation control system 190.

In additional embodiments, the docking user interface may include one or more video feeds (e.g., port/starboard video feeds 3330/3332) provided by perimeter ranging system 148 mounted to mobile structure 101, where each video feed of the one or more video feeds may be rendered left of maneuvering guide 4810 if the video feed is provided by a camera (e.g., camera 214) of perimeter ranging system 148 that is disposed substantially on a port side of mobile structure 101 and is rendered right of maneuvering guide 4810 if the video feed is provided by a camera (e.g., camera 216) of perimeter ranging system 148 that is disposed substantially on a starboard side of mobile structure 101. In such embodiments, controller 130 may be configured to receive, from user interface 120, user selection of at least one video feed of the docking user interface and to render an updated docking user interface (e.g., display view 3700/3800) including the selected video feed(s) and maneuvering guide 4810. In alternative embodiments, controller 130 may be configured to receive, from user interface 120, user selection of a relative viewpoint position relative to mobile structure perimeter indicator 4801 and within maneuvering guide 4810 and to render an updated docking user interface (e.g., display view 3700/3800) including at least one video feed including a field of view that includes the selected relative viewpoint position.

Embodiments of the present disclosure can use such techniques to provide intuitive, reliable, and accurate docking user interfaces for mobile structures, for example, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface for a mobile structure comprising a display; and
a logic device configured to communicate with the user interface and render a docking user interface on the display, wherein the logic device is configured to:
monitor perimeter sensor data provided by a perimeter ranging system mounted to the mobile structure, wherein the perimeter sensor data corresponds to at least a hazard monitoring area within a monitoring perimeter of the perimeter ranging system; and
render the docking user interface based, at least in part, on the monitored perimeter sensor data, wherein the docking user interface comprises a maneuvering guide comprising a mobile structure perimeter indicator, a virtual bumper perimeter indicator disposed about the mobile structure perimeter indicator and corresponding to a safety perimeter for the mobile structure, and/or a virtual bumper perimeter intrusion indicator disposed substantially within the virtual bumper perimeter indicator, wherein the virtual bumper perimeter intrusion indicator is configured to indicate a relative position and/or proximity of a navigation hazard disposed within the monitoring perimeter of the perimeter ranging system.

2. The system of claim 1, wherein:
the virtual bumper perimeter indicator is concentric to and symmetrically spaced about the mobile structure perimeter indicator by a selected indicator thickness corresponding to a selected thickness of the safety perimeter for the mobile structure;
a perimeter of the hazard monitoring area is concentric to and symmetrically spaced about the safety perimeter by a hazard monitoring perimeter thickness that is equal to or greater than the thickness of the safety perimeter for the mobile structure; and/or
the virtual bumper perimeter intrusion indicator is configured to indicate a relative position and/or proximity of the navigation hazard detected at or within the hazard monitoring area, one or more hazard escalation zones distributed concentrically within the hazard monitoring area, and/or the safety perimeter for the mobile structure.

3. The system of claim 1, wherein the logic device is configured to:
determine a direction and magnitude of a navigational bias associated with navigation of the mobile structure; and
determine a spatially biased safety perimeter for the mobile structure and a spatially biased hazard monitoring area within the monitoring perimeter of the perimeter ranging system based, at least in part, on the determined direction and magnitude of the navigational bias, wherein:
the spatially biased hazard monitoring area encloses the spatially biased safety perimeter and/or the spatially biased safety perimeter encloses the mobile structure perimeter;
the spatially biased safety perimeter and the spatially biased hazard monitoring area are asymmetrically and/or elastically deformed and/or displaced relative to a center of the mobile structure along the determined direction of the navigational bias based, at least in part, on the determined magnitude of the navigational bias; and
the virtual bumper perimeter intrusion indicator is configured to indicate a relative position and/or proximity of the navigation hazard detected at or within the spatially biased hazard monitoring area, one or more spatially biased hazard escalation zones distributed within the spatially biased hazard monitoring area, and/or the spatially biased safety perimeter for the mobile structure.

4. The system of claim 3, wherein the determining the direction and magnitude of the navigational bias comprises:
determining an absolute velocity of the mobile structure; and
determining the direction and magnitude of the navigational bias based, at least in part, on the determined absolute velocity of the mobile structure.

5. The system of claim 3, wherein the determining the direction and magnitude of the navigational bias comprises:
determining an environmental disturbance velocity impacting navigation of the mobile structure, wherein the environmental disturbance velocity comprises a wind velocity and/or a water current velocity; and
determining the direction and magnitude of the navigational bias based, at least in part, on the determined environmental disturbance velocity.

6. The system of claim 3, wherein the determining the direction and magnitude of the navigational bias comprises:
determining a minimum thrust availability direction associated with a thrust maneuver system for the mobile structure; and
determining the direction and magnitude of the navigational bias based, at least in part, on the determined minimum thrust availability direction.

7. The system of claim 3, wherein the determining the direction and magnitude of the navigational bias comprises:
determining a relative hazard approach velocity from the mobile structure towards the navigation hazard based, at least in part, on the perimeter sensor data; and
determining the direction and magnitude of the navigational bias based, at least in part, on the determined relative hazard approach velocity.

8. The system of claim 1, wherein the maneuvering guide comprises:

a virtual bumper perimeter thickness indicator, a virtual bumper perimeter thickness selector, and/or a virtual bumper perimeter segment selector configured to enable, disable, indicate, and/or provide for user selection of a thickness of one or more perimeter indicator segments of the virtual bumper perimeter indicator disposed about the mobile structure perimeter indicator.

9. The system of claim 1, wherein the maneuvering guide comprises:
an obstruction map generated based, at least in part, on the perimeter sensor data, wherein the obstruction map comprises at least the navigation hazard disposed within the monitoring perimeter of the perimeter ranging system;
a translational thrust indicator configured to indicate a translational maneuvering thrust magnitude and direction relative to an orientation of the mobile structure perimeter indicator;
and/or a rotational thrust indicator configured to indicate a rotational maneuvering thrust magnitude and direction relative to the orientation of the mobile structure perimeter indicator.

10. The system of claim 1, wherein the docking user interface comprises: one or more video feeds provided by a perimeter ranging system mounted to the mobile structure, wherein each video feed of the one or more video feeds is rendered left of the maneuvering guide if the video feed is provided by a camera of the perimeter ranging system that is disposed substantially on a port side of the mobile structure and is rendered right of the maneuvering guide if the video feed is provided by a camera of the perimeter ranging system that is disposed substantially on a starboard side of the mobile structure; wherein the system further comprises a navigation control system for the mobile structure, wherein:
the mobile structure comprises a watercraft;
the navigation control system comprises one or more of a steering actuator, a propulsion system, and a thrust maneuver system; and
the logic device is configured to generate control signals for the navigation control system to pilot the watercraft to remove the navigation hazard from a spatially biased hazard monitoring area within the monitoring perimeter and/or one or more spatially biased hazard escalation zones distributed within the spatially biased hazard monitoring area, and/or to avoid collision with the navigation hazard.

11. A method comprising:
monitoring perimeter sensor data provided by a perimeter ranging system mounted to a mobile structure, wherein the perimeter sensor data corresponds to at least a hazard monitoring area within a monitoring perimeter of the perimeter ranging system; and
rendering a docking user interface based, at least in part, on the monitored perimeter sensor data, wherein the docking user interface comprises a maneuvering guide comprising a mobile structure perimeter indicator, a virtual bumper perimeter indicator disposed about the mobile structure perimeter indicator and corresponding to a safety perimeter for the mobile structure, and/or a virtual bumper perimeter intrusion indicator disposed substantially within the virtual bumper perimeter indicator, wherein the virtual bumper perimeter intrusion indicator is configured to indicate a relative position and/or proximity of a navigation hazard disposed within the monitoring perimeter of the perimeter ranging system.

12. The method of claim 11, wherein:
the virtual bumper perimeter indicator is concentric to and symmetrically spaced about the mobile structure perimeter indicator by a selected indicator thickness corresponding to a selected thickness of the safety perimeter for the mobile structure;
a perimeter of the hazard monitoring area is concentric to and symmetrically spaced about the safety perimeter by a hazard monitoring perimeter thickness that is equal to or greater than the thickness of the safety perimeter for the mobile structure; and/or
the virtual bumper perimeter intrusion indicator is configured to indicate a relative position and/or proximity of the navigation hazard detected at or within the hazard monitoring area, one or more hazard escalation zones distributed concentrically within the hazard monitoring area, and/or the safety perimeter for the mobile structure.

13. The method of claim 11, wherein the maneuvering guide comprises:
a virtual bumper perimeter thickness indicator, a virtual bumper perimeter thickness selector, and/or a virtual bumper perimeter segment selector configured to enable, disable, indicate, and/or provide for user selection of a thickness of one or more perimeter indicator segments of the virtual bumper perimeter indicator disposed about the mobile structure perimeter indicator.

14. The method of claim 11, wherein the maneuvering guide comprises:
an obstruction map generated based, at least in part, on the perimeter sensor data, wherein the obstruction map comprises at least the navigation hazard disposed within the monitoring perimeter of the perimeter ranging system;
a translational thrust indicator configured to indicate a translational maneuvering thrust magnitude and direction relative to an orientation of the mobile structure perimeter indicator; and/or
a rotational thrust indicator configured to indicate a rotational maneuvering thrust magnitude and direction relative to the orientation of the mobile structure perimeter indicator;
wherein the docking user interface comprises:
one or more video feeds provided by a perimeter ranging system mounted to the mobile structure, wherein each video feed of the one or more video feeds is rendered left of the maneuvering guide if the video feed is provided by a camera of the perimeter ranging system that is disposed substantially on a port side of the mobile structure and is rendered right of the maneuvering guide if the video feed is provided by a camera of the perimeter ranging system that is disposed substantially on a starboard side of the mobile structure.

15. A method comprising:
determining a direction and magnitude of a navigational bias associated with navigation of a mobile structure;
determining a spatially biased safety perimeter for the mobile structure and a spatially biased hazard monitoring area within a monitoring perimeter of a perimeter ranging system mounted to the mobile structure based, at least in part, on the determined direction and magnitude of the navigational bias; and
rendering a docking user interface based, at least in part, on the spatially biased safety perimeter and/or the spatially biased hazard monitoring area, wherein the docking user interface comprises a maneuvering guide comprising a mobile structure perimeter indicator and a virtual bumper perimeter intrusion indicator disposed at least partially about and/or adjacent to the mobile structure perimeter indicator;

wherein the virtual bumper perimeter intrusion indicator is configured to indicate a relative position and/or proximity of a navigation hazard detected at or within the spatially biased hazard monitoring area, one or more spatially biased hazard escalation zones distributed within the spatially biased hazard monitoring area, and/or the spatially biased safety perimeter for the mobile structure.

16. The method of claim 15, wherein:

the spatially biased hazard monitoring area encloses the spatially biased safety perimeter and the spatially biased safety perimeter encloses a perimeter of the mobile structure;

the spatially biased safety perimeter and the spatially biased hazard monitoring area are asymmetrically and/or elastically deformed and/or displaced relative to a center of the mobile structure along the determined direction of the navigational bias based, at least in part, on the determined magnitude of the navigational bias; and the virtual bumper perimeter intrusion indicator is configured to indicate a relative position and/or proximity of a navigation hazard detected at or within the spatially biased hazard monitoring area, one or more spatially biased hazard escalation zones distributed within the spatially biased hazard monitoring area, and/or the spatially biased safety perimeter for the mobile structure.

17. The method of claim 15, wherein the determining the direction and magnitude of the navigational bias comprises:

determining an absolute velocity of the mobile structure; and determining the direction and magnitude of the navigational bias based, at least in part, on the determined absolute velocity of the mobile structure.

18. The method of claim 15, wherein the determining the direction and magnitude of the navigational bias comprises:

determining an environmental disturbance velocity impacting navigation of the mobile structure, wherein the environmental disturbance velocity comprises a wind velocity and/or a water current velocity; and determining the direction and magnitude of the navigational bias based, at least in part, on the determined environmental disturbance velocity.

19. The method of claim 15, wherein the determining the direction and magnitude of the navigational bias comprises:

determining a minimum thrust availability direction associated with a thrust maneuver system for the mobile structure; and determining the direction and magnitude of the navigational bias based, at least in part, on the determined minimum thrust availability direction.

20. The method of claim 15, wherein the determining the direction and magnitude of the navigational bias comprises:

determining a relative hazard approach velocity from the mobile structure towards the navigation hazard based, at least in part, on the perimeter sensor data; and determining the direction and magnitude of the navigational bias based, at least in part, on the determined relative hazard approach velocity, and wherein the method further comprises:

generating control signals for a navigation control system of the mobile structure to pilot the watercraft to remove the navigation hazard from the spatially biased hazard monitoring area, one or more of the spatially biased hazard escalation zones distributed within the spatially biased hazard monitoring area, and/or the spatially biased safety perimeter for the mobile structure, and/or to avoid collision with the navigation hazard.

* * * * *

UNITED STATES PATENT AND TRADEMARK OFFICE
CERTIFICATE OF CORRECTION

| | |
|---|---|
| PATENT NO. | : 12,117,832 B2 |
| APPLICATION NO. | : 18/077062 |
| DATED | : October 15, 2024 |
| INVENTOR(S) | : Mark C. Rivers and Stuart Newcombe |

It is certified that error appears in the above-identified patent and that said Letters Patent is hereby corrected as shown below:

In the Specification

Column 1, Lines 15-16, change "U.S. patent application Ser. No." to --U.S. Patent Application No.--.

Column 1, Line 63, change "U.S. patent application Ser. No." to --U.S. Patent Application No.--.

Column 2, Lines 56-57, change "U.S. patent application Ser. No." to --U.S. Patent Application No.--.

Column 31, Line 26, change "U.S. patent application Ser. No." to --U.S. Patent Application No.--.

Column 35, Line 15, change "U.S. patent application Ser. No." to --U.S. Patent Application No.--.

Signed and Sealed this
Third Day of December, 2024

Katherine Kelly Vidal
*Director of the United States Patent and Trademark Office*